(12) United States Patent
Short et al.

(10) Patent No.: US 8,788,690 B2
(45) Date of Patent: *Jul. 22, 2014

(54) SYSTEMS AND METHODS FOR PROVIDING CONTENT AND SERVICES ON A NETWORK SYSTEM

(71) Applicant: Nomadix, Inc., Agoura Hills, CA (US)

(72) Inventors: Joel E. Short, Los Angeles, CA (US); Florence C. I. Pagan, Los Angeles, CA (US); Joshua J. Goldstein, Agoura Hills, CA (US)

(73) Assignee: Nomadix, Inc., Agoura Hills, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/094,712

(22) Filed: Dec. 2, 2013

(65) Prior Publication Data

US 2014/0089182 A1    Mar. 27, 2014

Related U.S. Application Data

(63) Continuation of application No. 13/659,851, filed on Oct. 24, 2012, now Pat. No. 8,606,917, which is a continuation of application No. 13/566,904, filed on (Continued)

(51) Int. Cl.
*G06F 15/16* (2006.01)
*H04L 12/14* (2006.01)
*H04L 29/06* (2006.01)
*H04L 12/22* (2006.01)

(52) U.S. Cl.
CPC .......... *H04L 12/14* (2013.01); *H04L 29/06047* (2013.01); *H04L 29/06068* (2013.01); *H04L 12/22* (2013.01)
USPC ........... 709/230; 709/203; 709/217; 709/225; 709/229; 705/52; 705/75; 705/76; 705/317

(58) Field of Classification Search
USPC ......... 709/225, 227, 230, 217, 220, 203, 218, 709/219, 228, 229, 250, 221, 222, 244, 246
See application file for complete search history.

(56) References Cited

U.S. PATENT DOCUMENTS

| | | | |
|---|---|---|---|
| 4,691,346 | A | 9/1987 | Vanacore |
| 4,757,267 | A | 7/1988 | Riskin |

(Continued)

FOREIGN PATENT DOCUMENTS

| | | |
|---|---|---|
| AU | 2003255101 | 3/2004 |
| AU | 2006207853 | 11/2007 |

(Continued)

OTHER PUBLICATIONS

Aboba, B., 1. Lu, J. Alsop, 1. Ding, W. Wang; Review of Roaming Implementations; Sep. 1997; 35 Pages; Network Working Group, Request for Comments 2194.

(Continued)

*Primary Examiner* — Michael Y Won
(74) *Attorney, Agent, or Firm* — Knobbe Martens Olson & Bear LLP

(57) ABSTRACT

Systems and methods for managing and providing content and services on a network system. Aspects of the invention include location-based determination of network content and services that may be provided to client computers. Other aspects of the invention include authorization and authentication components that determine access rights of client computers. Additional aspects include systems and methods for redirecting client computers to different network content. The disclosed systems and methods may be used in numerous network system applications.

23 Claims, 59 Drawing Sheets

Related U.S. Application Data

Aug. 3, 2012, now Pat. No. 8,364,806, which is a continuation of application No. 12/685,585, filed on Jan. 11, 2010, now Pat. No. 8,266,266, which is a continuation of application No. 11/427,143, filed on Jun. 28, 2006, now Pat. No. 7,689,716, which is a continuation of application No. 09/693,060, filed on Oct. 20, 2000, now Pat. No. 7,194,554, which is a continuation-in-part of application No. 09/458,569, filed on Dec. 8, 1999, now Pat. No. 6,636,894, said application No. 09/693,060 is a continuation-in-part of application No. 09/458,602, filed on Dec. 8, 1999.

(60) Provisional application No. 60/111,497, filed on Dec. 8, 1998, provisional application No. 60/161,182, filed on Oct. 22, 1999, provisional application No. 60/160,890, filed on Oct. 22, 1999, provisional application No. 60/161,139, filed on Oct. 22, 1999, provisional application No. 60/161,189, filed on Oct. 22, 1999, provisional application No. 60/160,973, filed on Oct. 22, 1999, provisional application No. 60/161,181, filed on Oct. 22, 1999, provisional application No. 60/161,093, filed on Oct. 22, 1999.

(56) References Cited

U.S. PATENT DOCUMENTS

| | | | |
|---|---|---|---|
| 4,806,743 | A | 2/1989 | Thenery |
| 4,811,011 | A | 3/1989 | Sollinger |
| 4,816,654 | A | 3/1989 | Anderl et al. |
| 5,019,697 | A | 5/1991 | Postman |
| 5,030,807 | A | 7/1991 | Landt et al. |
| 5,048,079 | A * | 9/1991 | Harrington et al. ...... 379/115.01 |
| 5,065,393 | A | 11/1991 | Sibbitt |
| 5,077,607 | A * | 12/1991 | Johnson et al. .................. 725/74 |
| 5,124,984 | A | 6/1992 | Engel |
| 5,142,622 | A | 8/1992 | Owens |
| 5,148,389 | A | 9/1992 | Hughes |
| 5,149,945 | A | 9/1992 | Johnson et al. |
| 5,159,592 | A | 10/1992 | Perkins |
| 5,166,931 | A | 11/1992 | Riddle |
| 5,185,860 | A | 2/1993 | Wu |
| 5,221,838 | A | 6/1993 | Gutman et al. |
| 5,226,120 | A | 7/1993 | Brown et al. |
| 5,235,595 | A | 8/1993 | O'Dowd |
| 5,243,652 | A | 9/1993 | Teare et al. |
| 5,251,207 | A | 10/1993 | Abensour et al. |
| 5,253,161 | A | 10/1993 | Nemirovsky et al. |
| 5,258,906 | A | 11/1993 | Kroll |
| 5,280,581 | A | 1/1994 | Bathrick et al. |
| 5,287,269 | A | 2/1994 | Dorrough et al. |
| 5,287,461 | A | 2/1994 | Moore |
| 5,289,371 | A | 2/1994 | Abel et al. |
| 5,289,536 | A | 2/1994 | Hokari |
| 5,293,488 | A | 3/1994 | Riley |
| 5,309,437 | A | 5/1994 | Perlman |
| 5,319,648 | A | 6/1994 | Bux et al. |
| 5,321,395 | A | 6/1994 | Van Santbrink |
| 5,325,362 | A | 6/1994 | Aziz |
| 5,329,619 | A | 7/1994 | Page |
| 5,334,821 | A | 8/1994 | Campo et al. |
| 5,335,268 | A | 8/1994 | Kelly, Jr. et al. |
| 5,337,352 | A | 8/1994 | Kobayashi et al. |
| 5,351,186 | A | 9/1994 | Bullock et al. |
| 5,369,705 | A | 11/1994 | Bird |
| 5,371,852 | A | 12/1994 | Attanasio |
| 5,377,060 | A | 12/1994 | Nigam |
| 5,406,555 | A | 4/1995 | Yoshida |
| 5,410,543 | A | 4/1995 | Seitz et al. |
| 5,412,654 | A | 5/1995 | Perkins |
| 5,420,862 | A | 5/1995 | Perlman |
| 5,425,029 | A | 6/1995 | Hluchyj et al. |
| 5,425,085 | A | 6/1995 | Weinberger et al. |
| 5,426,427 | A | 6/1995 | Chinnock et al. |
| 5,430,782 | A | 7/1995 | Brady et al. |
| 5,432,789 | A | 7/1995 | Armstrong et al. |
| 5,442,633 | A | 8/1995 | Perkins et al. |
| 5,446,735 | A | 8/1995 | Tobagi et al. |
| 5,481,542 | A | 1/1996 | Logston |
| 5,490,139 | A | 2/1996 | Baker et al. |
| 5,490,252 | A | 2/1996 | Macera |
| 5,517,618 | A | 5/1996 | Wada et al. |
| 5,519,769 | A | 5/1996 | Weinberger et al. |
| 5,526,489 | A | 6/1996 | Nilakantan |
| 5,533,026 | A | 7/1996 | Ahmadi |
| 5,538,007 | A | 7/1996 | Gorman |
| 5,539,736 | A | 7/1996 | Johnson |
| 5,548,646 | A | 8/1996 | Aziz |
| 5,550,984 | A | 8/1996 | Gelb |
| 5,553,223 | A | 9/1996 | Greenlee et al. |
| 5,557,677 | A | 9/1996 | Prytz |
| 5,557,748 | A | 9/1996 | Norris |
| 5,572,528 | A | 11/1996 | Shuen |
| 5,574,779 | A | 11/1996 | Ely |
| 5,583,864 | A | 12/1996 | Lightfoot |
| 5,586,121 | A | 12/1996 | Moura et al. |
| 5,586,269 | A | 12/1996 | Kubo |
| 5,592,537 | A | 1/1997 | Moen |
| 5,596,722 | A | 1/1997 | Rahnema |
| 5,598,536 | A | 1/1997 | Slaughter |
| 5,602,991 | A | 2/1997 | Berteau |
| 5,604,896 | A | 2/1997 | Duxbury |
| 5,606,668 | A | 2/1997 | Shwed |
| 5,608,786 | A | 3/1997 | Gordon |
| 5,612,730 | A | 3/1997 | Lewis |
| 5,615,339 | A | 3/1997 | Ban |
| 5,617,540 | A | 4/1997 | Civanlar et al. |
| 5,617,565 | A | 4/1997 | Augenbraun et al. |
| 5,623,600 | A | 4/1997 | Ji et al. |
| 5,633,868 | A | 5/1997 | Baldwin et al. |
| 5,633,999 | A | 5/1997 | Clowes |
| 5,636,216 | A | 6/1997 | Fox et al. |
| 5,636,371 | A | 6/1997 | Yu |
| 5,644,719 | A | 7/1997 | Aridas |
| 5,649,001 | A | 7/1997 | Thomas |
| 5,651,002 | A | 7/1997 | Van Seters et al. |
| 5,651,058 | A | 7/1997 | Hackett-Jones et al. |
| 5,652,908 | A | 7/1997 | Douglas |
| 5,657,452 | A | 8/1997 | Kralowetz |
| 5,659,684 | A | 8/1997 | Giovannoni |
| 5,664,102 | A | 9/1997 | Faynberg |
| 5,664,228 | A | 9/1997 | Mital |
| 5,678,041 | A | 10/1997 | Baker |
| 5,694,549 | A | 12/1997 | Carlin et al. |
| 5,696,898 | A | 12/1997 | Baker et al. |
| 5,696,899 | A | 12/1997 | Kalwitz |
| 5,699,520 | A | 12/1997 | Hodgson |
| 5,708,654 | A | 1/1998 | Arndt |
| 5,708,655 | A | 1/1998 | Toth et al. |
| 5,708,780 | A * | 1/1998 | Levergood et al. ........... 709/229 |
| 5,710,883 | A | 1/1998 | Hong et al. |
| 5,717,737 | A | 2/1998 | Doviak |
| 5,724,355 | A | 3/1998 | Bruno et al. |
| 5,724,510 | A | 3/1998 | Arndt |
| 5,727,159 | A | 3/1998 | Kikinis |
| 5,727,950 | A | 3/1998 | Cook et al. |
| 5,740,171 | A | 4/1998 | Mazzola et al. |
| 5,742,604 | A | 4/1998 | Edsall et al. |
| 5,742,668 | A | 4/1998 | Pepe et al. |
| 5,742,762 | A | 4/1998 | Scholl et al. |
| 5,744,789 | A | 4/1998 | Kashi |
| 5,745,699 | A | 4/1998 | Lunn et al. |
| 5,745,884 | A | 4/1998 | Carnegie et al. |
| 5,749,075 | A | 5/1998 | Toader et al. |
| 5,751,961 | A | 5/1998 | Smyk |
| 5,751,971 | A | 5/1998 | Dobbins |
| 5,754,774 | A | 5/1998 | Bittinger et al. |
| 5,757,784 | A | 5/1998 | Liebowitz |
| 5,757,924 | A | 5/1998 | Friedman et al. |
| 5,758,083 | A | 5/1998 | Singh et al. |
| 5,758,186 | A | 5/1998 | Hamilton |
| 5,761,309 | A | 6/1998 | Ohashi et al. |

(56) References Cited

U.S. PATENT DOCUMENTS

| | | |
|---|---|---|
| 5,761,683 A | 6/1998 | Logan et al. |
| 5,764,890 A | 6/1998 | Glasser |
| 5,768,384 A | 6/1998 | Berson |
| 5,774,535 A | 6/1998 | Castro |
| 5,774,668 A | 6/1998 | Choquier |
| 5,774,869 A | 6/1998 | Toader |
| 5,781,189 A | 7/1998 | Holleran et al. |
| 5,781,550 A | 7/1998 | Templin et al. |
| 5,781,552 A | 7/1998 | Hashimoto |
| 5,781,909 A | 7/1998 | Logan et al. |
| 5,787,483 A | 7/1998 | Jam et al. |
| 5,790,541 A | 8/1998 | Patrick et al. |
| 5,790,548 A | 8/1998 | Sistanizadeh |
| 5,790,800 A | 8/1998 | Gauvin et al. |
| 5,793,762 A | 8/1998 | Penners et al. |
| 5,793,763 A | 8/1998 | Mayes et al. |
| 5,793,966 A | 8/1998 | Arnstein et al. |
| 5,793,978 A | 8/1998 | Fowler |
| 5,794,221 A | 8/1998 | Egendorf |
| 5,796,952 A | 8/1998 | Davis et al. |
| 5,798,706 A | 8/1998 | Kraemer et al. |
| 5,802,047 A | 9/1998 | Kinoshita |
| 5,802,285 A | 9/1998 | Hirviniemi |
| 5,802,310 A | 9/1998 | Rajaraman |
| 5,802,320 A | 9/1998 | Baehr et al. |
| 5,802,454 A | 9/1998 | Goshay et al. |
| 5,802,502 A | 9/1998 | Gell et al. |
| 5,805,803 A | 9/1998 | Birrell et al. |
| 5,806,043 A | 9/1998 | Toader |
| 5,809,415 A | 9/1998 | Rossmann |
| 5,812,531 A | 9/1998 | Cheung et al. |
| 5,812,776 A * | 9/1998 | Gifford .......................... 709/217 |
| 5,812,786 A | 9/1998 | Seazholtz |
| 5,812,819 A | 9/1998 | Rodwin |
| 5,815,664 A | 9/1998 | Asano |
| 5,818,845 A | 10/1998 | Moura et al. |
| 5,822,526 A | 10/1998 | Waskiewicz |
| 5,825,772 A | 10/1998 | Dobbins et al. |
| 5,832,229 A | 11/1998 | Tomoda |
| 5,835,061 A | 11/1998 | Stewart |
| 5,835,720 A | 11/1998 | Nelson et al. |
| 5,835,724 A | 11/1998 | Smith |
| 5,835,725 A | 11/1998 | Chiang |
| 5,835,727 A | 11/1998 | Wong |
| 5,841,769 A | 11/1998 | Okanoue et al. |
| 5,844,973 A | 12/1998 | Venkatraman |
| 5,845,070 A | 12/1998 | Ikudome |
| 5,848,233 A | 12/1998 | Radia |
| 5,852,812 A | 12/1998 | Reeder |
| 5,854,901 A | 12/1998 | Cole |
| 5,856,974 A | 1/1999 | Gervais |
| 5,859,971 A | 1/1999 | Bittinger et al. |
| 5,862,325 A | 1/1999 | Reed et al. |
| 5,862,328 A | 1/1999 | Colyer |
| 5,862,345 A | 1/1999 | Okanoue et al. |
| 5,864,610 A | 1/1999 | Ronen |
| 5,864,683 A | 1/1999 | Boebert |
| 5,881,234 A | 3/1999 | Schwob |
| 5,884,035 A | 3/1999 | Butman et al. |
| 5,889,470 A | 3/1999 | Kaycee et al. |
| 5,889,958 A | 3/1999 | Willens |
| 5,893,077 A | 4/1999 | Griffin |
| 5,894,321 A | 4/1999 | Downs |
| 5,894,479 A | 4/1999 | Mohammed |
| 5,898,830 A | 4/1999 | Wesinger, Jr. et al. |
| 5,901,287 A | 5/1999 | Bull et al. |
| 5,903,732 A | 5/1999 | Reed |
| 5,909,441 A | 6/1999 | Alexander, Jr. et al. |
| 5,909,549 A | 6/1999 | Complement |
| 5,910,954 A | 6/1999 | Bronstein et al. |
| 5,915,093 A | 6/1999 | Berlin |
| 5,915,119 A | 6/1999 | Cone |
| 5,916,302 A | 6/1999 | Dunn |
| 5,918,016 A | 6/1999 | Brewer |
| 5,918,018 A | 6/1999 | Gooderum |
| 5,920,699 A | 7/1999 | Bare |
| 5,922,049 A | 7/1999 | Radia |
| 5,923,853 A | 7/1999 | Danneels |
| 5,930,255 A | 7/1999 | Tsukamoto et al. |
| 5,931,917 A | 8/1999 | Nguyen |
| 5,936,542 A | 8/1999 | Kleinrock et al. |
| 5,938,726 A | 8/1999 | Reber et al. |
| 5,940,394 A | 8/1999 | Killian |
| 5,941,947 A | 8/1999 | Brown |
| 5,941,988 A | 8/1999 | Bhagwat et al. |
| 5,946,308 A | 8/1999 | Dobbins et al. |
| 5,946,687 A | 8/1999 | Gehani |
| 5,948,061 A | 9/1999 | Merriman et al. |
| 5,949,875 A | 9/1999 | Walker |
| 5,950,195 A | 9/1999 | Stockwell et al. |
| 5,951,694 A | 9/1999 | Choquier |
| 5,953,398 A | 9/1999 | Hill |
| 5,958,015 A | 9/1999 | Dascalu |
| 5,958,018 A | 9/1999 | Eng |
| 5,960,409 A | 9/1999 | Wexler |
| 5,963,915 A | 10/1999 | Kirsch |
| 5,968,126 A | 10/1999 | Ekstrom |
| 5,968,176 A | 10/1999 | Nessett et al. |
| 5,969,678 A | 10/1999 | Stewart |
| 5,970,490 A | 10/1999 | Morgenstern |
| 5,978,387 A | 11/1999 | Sherman |
| 5,979,757 A | 11/1999 | Tracy et al. |
| 5,982,773 A | 11/1999 | Nishimura |
| 5,987,430 A | 11/1999 | Van Horne et al. |
| 5,987,498 A | 11/1999 | Athing et al. |
| 5,987,523 A | 11/1999 | Hind |
| 5,987,611 A | 11/1999 | Freund |
| 5,991,292 A | 11/1999 | Focsaneanu et al. |
| 5,991,828 A | 11/1999 | Horie et al. |
| 5,999,536 A | 12/1999 | Kawafuji |
| 5,999,912 A | 12/1999 | Wodraz |
| 6,003,770 A | 12/1999 | Schilling |
| 6,006,258 A | 12/1999 | Kalajan |
| 6,006,272 A | 12/1999 | Aravamudan et al. |
| 6,011,782 A | 1/2000 | DeSimone |
| 6,012,083 A | 1/2000 | Savitzky |
| 6,012,088 A | 1/2000 | Li et al. |
| 6,014,698 A | 1/2000 | Griffiths |
| 6,018,771 A | 1/2000 | Hayden |
| 6,024,440 A | 2/2000 | Murthy et al. |
| 6,026,440 A | 2/2000 | Shrader et al. |
| 6,028,848 A | 2/2000 | Bhatia |
| 6,031,836 A | 2/2000 | Haserodt |
| 6,035,281 A | 3/2000 | Crosskey |
| 6,035,405 A | 3/2000 | Gage et al. |
| 6,038,233 A | 3/2000 | Hamamoto |
| 6,041,057 A | 3/2000 | Stone |
| 6,044,062 A | 3/2000 | Brownrigg |
| 6,047,051 A | 4/2000 | Ginzboorg et al. |
| 6,047,268 A | 4/2000 | Bartoli et al. |
| 6,052,120 A | 4/2000 | Nahi et al. |
| 6,052,725 A | 4/2000 | McCann et al. |
| 6,055,236 A | 4/2000 | Nessett |
| 6,055,243 A | 4/2000 | Vincent et al. |
| 6,058,389 A | 5/2000 | Chandra et al. |
| 6,058,418 A | 5/2000 | Kobata |
| 6,058,429 A | 5/2000 | Ames et al. |
| 6,061,334 A | 5/2000 | Berlovitch et al. |
| 6,061,349 A | 5/2000 | Coile |
| 6,061,356 A | 5/2000 | Terry |
| 6,061,650 A | 5/2000 | Malkin |
| 6,061,668 A | 5/2000 | Sharrow |
| 6,061,739 A | 5/2000 | Reed |
| 6,064,674 A | 5/2000 | Doidge et al. |
| 6,070,187 A | 5/2000 | Subramaniam et al. |
| 6,070,191 A | 5/2000 | Narendran et al. |
| 6,070,243 A | 5/2000 | See |
| 6,073,160 A | 6/2000 | Grantham |
| 6,073,175 A | 6/2000 | Tavs |
| 6,075,776 A | 6/2000 | Tanimoto et al. |
| 6,078,953 A | 6/2000 | Vaid et al. |
| 6,084,528 A | 7/2000 | Beach et al. |
| 6,085,247 A | 7/2000 | Parsons, Jr. et al. |
| 6,088,451 A | 7/2000 | He |

(56) References Cited

U.S. PATENT DOCUMENTS

| | | | |
|---|---|---|---|
| 6,088,725 A | 7/2000 | Kondo et al. |
| 6,091,732 A | 7/2000 | Alexander |
| 6,092,196 A | 7/2000 | Reiche |
| 6,094,659 A | 7/2000 | Bhatia |
| 6,094,663 A | 7/2000 | Snow et al. |
| 6,098,172 A | 8/2000 | Coss et al. |
| 6,101,543 A | 8/2000 | Alden |
| 6,108,330 A | 8/2000 | Bhatia |
| 6,112,239 A | 8/2000 | Kenner et al. |
| 6,115,376 A | 9/2000 | Sherer et al. |
| 6,115,545 A | 9/2000 | Mellquist |
| 6,119,160 A | 9/2000 | Zhang et al. |
| 6,119,161 A | 9/2000 | Lita et al. |
| 6,119,162 A | 9/2000 | Li et al. |
| 6,122,268 A | 9/2000 | Okanoue |
| 6,128,298 A | 10/2000 | Wootton |
| 6,128,601 A | 10/2000 | Van Horne et al. |
| 6,128,664 A | 10/2000 | Yanagidate et al. |
| 6,128,739 A | 10/2000 | Fleming, III |
| 6,130,892 A | 10/2000 | Short et al. |
| 6,134,680 A | 10/2000 | Yeomans |
| 6,137,791 A | 10/2000 | Frid et al. |
| 6,137,869 A | 10/2000 | Voit |
| 6,138,142 A | 10/2000 | Linsk |
| 6,138,144 A | 10/2000 | DeSimone |
| 6,138,162 A | 10/2000 | Pistriotto et al. |
| 6,141,010 A | 10/2000 | Hoyle |
| 6,141,653 A | 10/2000 | Conklin |
| 6,141,686 A | 10/2000 | Jackowski et al. |
| 6,141,690 A | 10/2000 | Weiman |
| 6,144,991 A | 11/2000 | England |
| 6,147,976 A | 11/2000 | Shand |
| 6,147,995 A | 11/2000 | Dobbins et al. |
| 6,148,336 A | 11/2000 | Thomas et al. |
| 6,154,172 A | 11/2000 | Piccionelli |
| 6,154,764 A | 11/2000 | Nitta |
| 6,154,775 A | 11/2000 | Coss |
| 6,154,839 A | 11/2000 | Arrow |
| 6,157,377 A | 12/2000 | Shah-Nazaroff |
| 6,157,647 A | 12/2000 | Husak |
| 6,157,925 A | 12/2000 | Jenkins et al. |
| 6,157,946 A | 12/2000 | Itakura et al. |
| 6,157,953 A | 12/2000 | Chang |
| 6,158,008 A | 12/2000 | Maria |
| 6,160,874 A | 12/2000 | Dickerman |
| 6,161,139 A | 12/2000 | Win et al. |
| 6,166,730 A | 12/2000 | Goode |
| 6,167,445 A | 12/2000 | Gai et al. |
| 6,167,513 A | 12/2000 | Inoue |
| 6,173,322 B1 | 1/2001 | Hu |
| 6,175,867 B1 | 1/2001 | Taghodoss |
| 6,175,869 B1 | 1/2001 | Ahuja et al. |
| 6,181,699 B1 | 1/2001 | Crinion et al. |
| 6,182,141 B1 | 1/2001 | Blum et al. |
| 6,182,154 B1 | 1/2001 | Campagnoni |
| 6,189,030 B1 | 2/2001 | Kirsch et al. |
| 6,194,992 B1 | 2/2001 | Short et al. |
| 6,199,100 B1 | 3/2001 | Filepp |
| 6,201,962 B1 | 3/2001 | Sturniolo |
| 6,202,169 B1 | 3/2001 | Razzaghe-Ashrafi |
| 6,205,148 B1 | 3/2001 | Takahashi |
| 6,205,481 B1 | 3/2001 | Heddaya et al. |
| 6,208,977 B1 | 3/2001 | Hernandez et al. |
| 6,212,560 B1 | 4/2001 | Fairchild |
| 6,219,694 B1 | 4/2001 | Lazaridis et al. |
| 6,219,786 B1 | 4/2001 | Cunningham |
| 6,219,790 B1 | 4/2001 | Lloyd |
| 6,223,205 B1 | 4/2001 | Harchol-Balter et al. |
| 6,223,286 B1 | 4/2001 | Hashimoto |
| 6,226,675 B1 | 5/2001 | Meltzer et al. |
| 6,226,677 B1 | 5/2001 | Slemmer |
| 6,226,752 B1 | 5/2001 | Gupta et al. |
| 6,232,764 B1 | 5/2001 | Rettig et al. |
| 6,233,604 B1 | 5/2001 | Van Horne et al. |
| 6,233,618 B1 | 5/2001 | Shannon |
| 6,233,686 B1 | 5/2001 | Zenchelsky et al. |
| 6,236,332 B1 | 5/2001 | Conkright et al. |
| 6,237,026 B1 | 5/2001 | Prasad |
| 6,237,037 B1 | 5/2001 | Larsson |
| 6,240,091 B1 | 5/2001 | Ginzboorg |
| 6,240,402 B1 | 5/2001 | Lynch-Aird |
| 6,240,513 B1 | 5/2001 | Friedman |
| 6,240,533 B1 | 5/2001 | Slemmer |
| 6,243,379 B1 | 6/2001 | Veerina et al. |
| 6,247,054 B1 | 6/2001 | Malkin |
| 6,249,527 B1 | 6/2001 | Verthein et al. |
| 6,249,820 B1 | 6/2001 | Dobbins |
| 6,253,327 B1 | 6/2001 | Zhang et al. |
| 6,256,307 B1 | 7/2001 | Salmonson |
| 6,256,674 B1 | 7/2001 | Manning et al. |
| 6,259,405 B1 | 7/2001 | Stewart |
| 6,266,335 B1 | 7/2001 | Bhaskaran |
| 6,282,180 B1 | 8/2001 | Paneth |
| 6,286,038 B1 | 9/2001 | Reichmeyer et al. |
| 6,286,039 B1 | 9/2001 | Van Horne et al. |
| 6,288,739 B1 | 9/2001 | Hales |
| 6,292,478 B1 | 9/2001 | Farris |
| 6,295,291 B1 | 9/2001 | Larkins |
| 6,298,383 B1 | 10/2001 | Gutman |
| 6,304,857 B1 | 10/2001 | Heindel |
| 6,307,836 B1 | 10/2001 | Jones et al. |
| 6,308,212 B1 | 10/2001 | Besaw |
| 6,308,213 B1 | 10/2001 | Valencia |
| 6,308,273 B1 | 10/2001 | Goertzel et al. |
| 6,310,886 B1 | 10/2001 | Barton |
| 6,311,275 B1 | 10/2001 | Jin |
| 6,317,790 B1 | 11/2001 | Bowker et al. |
| 6,317,837 B1 | 11/2001 | Kenworthy |
| 6,321,336 B1 | 11/2001 | Applegate |
| 6,326,918 B1 | 12/2001 | Stewart |
| 6,327,242 B1 | 12/2001 | Amicangioli et al. |
| 6,330,586 B1 | 12/2001 | Yates |
| 6,331,983 B1 | 12/2001 | Haggerty et al. |
| 6,338,046 B1 | 1/2002 | Saari et al. |
| 6,339,595 B1 | 1/2002 | Rekhter et al. |
| 6,343,066 B2 | 1/2002 | Magill et al. |
| 6,345,291 B2 | 2/2002 | Murphy, Jr. et al. |
| 6,349,289 B1 | 2/2002 | Peterson et al. |
| 6,353,614 B1 | 3/2002 | Borella et al. |
| 6,359,892 B1 | 3/2002 | Szlam |
| 6,366,893 B2 | 4/2002 | Hannula |
| 6,370,142 B1 | 4/2002 | Pitcher et al. |
| 6,377,982 B1 | 4/2002 | Rai |
| 6,377,990 B1 | 4/2002 | Slemmer et al. |
| 6,381,646 B2 | 4/2002 | Zhang |
| 6,381,650 B1 | 4/2002 | Peacock |
| 6,385,653 B1 | 5/2002 | Sitaraman et al. |
| 6,389,462 B1 | 5/2002 | Cohen |
| 6,393,466 B1 | 5/2002 | Hickman et al. |
| 6,393,468 B1 | 5/2002 | McGee |
| 6,393,484 B1 | 5/2002 | Massarani |
| 6,397,255 B1 | 5/2002 | Nurenberg et al. |
| 6,405,245 B1 * | 6/2002 | Burson et al. ................ 709/217 |
| 6,405,258 B1 | 6/2002 | Erimli et al. |
| 6,408,336 B1 | 6/2002 | Schneider et al. |
| 6,410,543 B1 | 6/2002 | Strobel et al. |
| 6,412,073 B1 | 6/2002 | Rangan |
| 6,414,635 B1 | 7/2002 | Stewart et al. |
| 6,418,118 B1 | 7/2002 | Hay et al. |
| 6,418,324 B1 | 7/2002 | Doviak |
| 6,424,636 B1 | 7/2002 | Seazholtz |
| 6,424,659 B2 | 7/2002 | Viswanadham et al. |
| 6,425,003 B1 | 7/2002 | Herzog et al. |
| 6,427,170 B1 | 7/2002 | Sitaraman et al. |
| 6,427,174 B1 | 7/2002 | Sitaraman et al. |
| 6,430,621 B1 | 8/2002 | Srikanth et al. |
| 6,434,619 B1 | 8/2002 | Lim et al. |
| 6,434,627 B1 | 8/2002 | Millet et al. |
| 6,438,125 B1 | 8/2002 | Brothers |
| 6,438,528 B1 | 8/2002 | Jensen |
| 6,438,578 B1 | 8/2002 | Schmid |
| 6,452,498 B2 | 9/2002 | Stewart |
| 6,453,353 B1 | 9/2002 | Win |
| 6,453,356 B1 | 9/2002 | Sheard et al. |

(56) References Cited

U.S. PATENT DOCUMENTS

| | | |
|---|---|---|
| 6,453,361 B1 | 9/2002 | Morris |
| 6,460,084 B1 | 10/2002 | Van Horne et al. |
| 6,463,051 B1 | 10/2002 | Ford |
| 6,463,473 B1 | 10/2002 | Gubbi |
| 6,463,474 B1 | 10/2002 | Fuh |
| 6,463,478 B1 | 10/2002 | Lau et al. |
| 6,466,076 B2 | 10/2002 | Yoshikawa |
| 6,466,976 B1 | 10/2002 | Alles |
| 6,466,981 B1 | 10/2002 | Levy |
| 6,466,986 B1 | 10/2002 | Sawyer et al. |
| 6,470,027 B1 | 10/2002 | Birrell |
| 6,470,385 B1 | 10/2002 | Nakashima et al. |
| 6,470,386 B1 | 10/2002 | Combar |
| 6,473,411 B1 | 10/2002 | Kumaki |
| 6,480,486 B2 | 11/2002 | Kikinis |
| 6,487,538 B1 | 11/2002 | Gupta |
| 6,487,605 B1 | 11/2002 | Leung |
| 6,490,620 B1 | 12/2002 | Ditmer et al. |
| 6,496,516 B1 | 12/2002 | Dabecki et al. |
| 6,496,704 B2 | 12/2002 | Yuan et al. |
| 6,496,850 B1 | 12/2002 | Bowman-Amuah |
| 6,502,131 B1 | 12/2002 | Vaid et al. |
| 6,505,201 B1 | 1/2003 | Haitsuka et al. |
| 6,510,531 B1 | 1/2003 | Gibbons |
| 6,512,754 B2 | 1/2003 | Feder et al. |
| 6,513,060 B1 | 1/2003 | Nixon et al. |
| 6,515,989 B1 | 2/2003 | Ronneke |
| 6,516,416 B2 | 2/2003 | Gregg et al. |
| 6,519,636 B2 | 2/2003 | Engel |
| 6,519,643 B1 | 2/2003 | Foulkes |
| 6,523,028 B1 | 2/2003 | DiDomizio |
| 6,526,052 B1 | 2/2003 | Rijhsinghani et al. |
| 6,526,056 B1 | 2/2003 | Rekhter et al. |
| 6,535,493 B1 | 3/2003 | Lee et al. |
| 6,535,511 B1 | 3/2003 | Rao |
| 6,539,395 B1 | 3/2003 | Gjerdingen et al. |
| 6,539,422 B1 | 3/2003 | Hunt et al. |
| 6,539,431 B1 | 3/2003 | Sitaraman et al. |
| 6,546,392 B1 | 4/2003 | Bahlmann |
| 6,546,425 B1 | 4/2003 | Hanson et al. |
| 6,549,220 B1 | 4/2003 | Hsu |
| 6,549,516 B1 | 4/2003 | Albert et al. |
| 6,553,178 B2 | 4/2003 | Abecassis |
| 6,557,038 B1 | 4/2003 | Becker |
| 6,563,793 B1 | 5/2003 | Golden et al. |
| 6,567,405 B1 | 5/2003 | Borella et al. |
| 6,567,850 B1 * | 5/2003 | Freishtat et al. ............... 709/224 |
| 6,571,221 B1 | 5/2003 | Stewart |
| 6,574,664 B1 | 6/2003 | Liu |
| 6,577,642 B1 | 6/2003 | Fijolek |
| 6,578,078 B1 | 6/2003 | Smith et al. |
| 6,580,717 B1 | 6/2003 | Higuchi |
| 6,584,505 B1 | 6/2003 | Howard |
| 6,587,880 B1 | 7/2003 | Saigo |
| 6,591,306 B1 | 7/2003 | Redlich |
| 6,597,693 B1 | 7/2003 | Leung |
| 6,598,167 B2 | 7/2003 | Devine et al. |
| 6,601,065 B1 | 7/2003 | Nelson et al. |
| 6,609,153 B1 | 8/2003 | Salkewicz |
| 6,609,154 B1 | 8/2003 | Fuh |
| 6,615,212 B1 | 9/2003 | Dutta et al. |
| 6,615,215 B1 | 9/2003 | Petty |
| 6,618,355 B1 | 9/2003 | Gulliford et al. |
| 6,618,398 B1 | 9/2003 | Marchetti et al. |
| 6,625,121 B1 | 9/2003 | Lau et al. |
| 6,625,645 B1 | 9/2003 | Van Horne |
| 6,633,899 B1 | 10/2003 | Coward |
| 6,636,504 B1 | 10/2003 | Albers |
| 6,636,894 B1 | 10/2003 | Short et al. |
| 6,640,251 B1 | 10/2003 | Wiget et al. |
| 6,643,701 B1 | 11/2003 | Aziz et al. |
| 6,654,808 B1 | 11/2003 | Chuah |
| 6,658,625 B1 | 12/2003 | Allen |
| 6,665,718 B1 | 12/2003 | Chuah |
| 6,667,968 B1 | 12/2003 | Tran |
| 6,671,379 B2 | 12/2003 | Nemirovski |
| 6,671,739 B1 | 12/2003 | Reed |
| 6,675,208 B1 | 1/2004 | Rai et al. |
| 6,681,330 B2 | 1/2004 | Bradford et al. |
| 6,687,732 B1 | 2/2004 | Bector |
| 6,691,227 B1 | 2/2004 | Neves et al. |
| 6,694,437 B1 | 2/2004 | Pao et al. |
| 6,697,018 B2 | 2/2004 | Stewart |
| 6,701,350 B1 | 3/2004 | Mitchell |
| 6,701,361 B1 | 3/2004 | Meier |
| 6,711,146 B2 | 3/2004 | Yegoshin |
| 6,714,987 B1 | 3/2004 | Amin |
| 6,717,943 B1 | 4/2004 | Schwering |
| 6,724,767 B1 | 4/2004 | Chong et al. |
| 6,728,792 B2 | 4/2004 | Wagner |
| 6,728,884 B1 | 4/2004 | Lim |
| 6,728,920 B1 | 4/2004 | Ebersman |
| 6,731,612 B1 | 5/2004 | Koss |
| 6,732,176 B1 | 5/2004 | Stewart |
| 6,735,633 B1 | 5/2004 | Welch et al. |
| 6,735,691 B1 | 5/2004 | Capps |
| 6,738,371 B1 | 5/2004 | Ayres |
| 6,738,382 B1 | 5/2004 | West |
| 6,742,036 B1 | 5/2004 | Das et al. |
| 6,751,677 B1 | 6/2004 | Ilnicki |
| 6,754,831 B2 | 6/2004 | Brownell |
| 6,757,740 B1 | 6/2004 | Parekh et al. |
| 6,759,960 B2 | 7/2004 | Stewart |
| 6,760,416 B1 | 7/2004 | Banks et al. |
| 6,760,444 B1 | 7/2004 | Leung |
| 6,771,290 B1 * | 8/2004 | Hoyle ............... 715/745 |
| 6,771,609 B1 | 8/2004 | Gudat et al. |
| 6,771,661 B1 | 8/2004 | Chawla |
| 6,775,267 B1 | 8/2004 | Kung |
| 6,775,290 B1 | 8/2004 | Merchant et al. |
| 6,779,035 B1 | 8/2004 | Gbadegesin |
| 6,779,118 B1 | 8/2004 | Ikudome et al. |
| 6,785,704 B1 | 8/2004 | McCanne |
| 6,785,730 B1 | 8/2004 | Taylor |
| 6,789,110 B1 | 9/2004 | Short |
| 6,795,852 B1 | 9/2004 | Kleinrock et al. |
| 6,795,856 B1 | 9/2004 | Bunch |
| 6,810,426 B2 | 10/2004 | Mysore et al. |
| 6,822,954 B2 | 11/2004 | McConnell et al. |
| 6,822,955 B1 | 11/2004 | Brothers |
| 6,823,059 B2 | 11/2004 | Kalmanek |
| 6,826,694 B1 | 11/2004 | Dutta et al. |
| 6,829,239 B1 | 12/2004 | Bhatia et al. |
| 6,834,341 B1 | 12/2004 | Bahl |
| 6,839,757 B1 | 1/2005 | Romano |
| 6,850,532 B2 | 2/2005 | Thubert |
| 6,856,676 B1 | 2/2005 | Pirot et al. |
| 6,856,800 B1 | 2/2005 | Henry et al. |
| 6,857,009 B1 | 2/2005 | Ferreria et al. |
| 6,868,399 B1 | 3/2005 | Short et al. |
| 6,876,668 B1 | 4/2005 | Chawla |
| 6,892,226 B1 | 5/2005 | Tso |
| 6,901,433 B2 | 5/2005 | San Andres |
| 6,907,449 B2 | 6/2005 | Srinivasan |
| 6,915,345 B1 | 7/2005 | Tummala |
| 6,922,672 B1 | 7/2005 | Hailpern |
| 6,934,754 B2 | 8/2005 | West et al. |
| 6,937,597 B1 | 8/2005 | Rosenberg et al. |
| 6,944,661 B2 | 9/2005 | Moore et al. |
| 6,947,398 B1 | 9/2005 | Ahmed |
| 6,950,433 B1 | 9/2005 | Okamoto |
| 6,950,628 B1 | 9/2005 | Meier et al. |
| 6,961,762 B1 | 11/2005 | Yeap |
| 6,970,927 B1 | 11/2005 | Stewart |
| 6,983,327 B2 | 1/2006 | Koperda |
| 6,985,479 B2 | 1/2006 | Leung et al. |
| 6,993,595 B1 | 1/2006 | Luptowski et al. |
| 6,996,073 B2 | 2/2006 | West |
| 7,003,578 B2 | 2/2006 | Kanada et al. |
| 7,007,080 B2 * | 2/2006 | Wilson ............... 709/221 |
| 7,009,556 B2 | 3/2006 | Stewart |
| 7,016,960 B2 | 3/2006 | Howard |
| 7,017,046 B2 | 3/2006 | Doyle et al. |
| 7,020,082 B2 | 3/2006 | Bhagavath et al. |

(56) References Cited

U.S. PATENT DOCUMENTS

| | | |
|---|---|---|
| 7,020,681 B1 | 3/2006 | Ayyagari et al. |
| 7,032,243 B2 | 4/2006 | Leerssen et al. |
| 7,035,248 B2 | 4/2006 | Wengrovitz |
| 7,043,532 B1 | 5/2006 | Humpleman et al. |
| 7,043,563 B2 | 5/2006 | Vange et al. |
| 7,047,415 B2 | 5/2006 | Doyle et al. |
| 7,051,087 B1 | 5/2006 | Bahl et al. |
| 7,058,594 B2 | 6/2006 | Stewart |
| 7,072,056 B1 | 7/2006 | Greaves et al. |
| 7,080,077 B2 | 7/2006 | Ramamurthy |
| 7,086,077 B2 | 8/2006 | Giammaressi |
| 7,086,085 B1 | 8/2006 | Brown et al. |
| 7,088,727 B1 | 8/2006 | Short et al. |
| 7,093,020 B1 | 8/2006 | McCarty et al. |
| 7,117,526 B1 | 10/2006 | Short |
| 7,120,678 B2 | 10/2006 | Greuel |
| 7,120,701 B2 | 10/2006 | Warrier et al. |
| 7,124,437 B2 | 10/2006 | Byrne |
| 7,126,915 B1 | 10/2006 | Lu |
| 7,139,268 B1 | 11/2006 | Bhagwat et al. |
| 7,145,898 B1 | 12/2006 | Elliott |
| 7,151,758 B2 | 12/2006 | Kumaki et al. |
| 7,159,035 B2 | 1/2007 | Garcia-Luna-Aceves et al. |
| 7,185,360 B1 | 2/2007 | Anton et al. |
| 7,188,085 B2 | 3/2007 | Pelletier |
| 7,194,554 B1 | 3/2007 | Short et al. |
| 7,197,556 B1 | 3/2007 | Short et al. |
| 7,210,035 B2 | 4/2007 | Doyle et al. |
| 7,216,043 B2 | 5/2007 | Ransom et al. |
| 7,216,152 B2 | 5/2007 | Short et al. |
| 7,225,249 B1 | 5/2007 | Barry |
| 7,240,106 B2 | 7/2007 | Cochran et al. |
| 7,269,653 B2 | 9/2007 | Mentze et al. |
| 7,272,639 B1 * | 9/2007 | Levergood et al. ............ 709/218 |
| 7,272,842 B2 | 9/2007 | Kay et al. |
| 7,283,542 B2 | 10/2007 | Mitchell |
| 7,287,071 B2 | 10/2007 | MacLean |
| 7,289,763 B2 | 10/2007 | Dennison et al. |
| 7,293,077 B1 | 11/2007 | Teo |
| 7,313,631 B1 | 12/2007 | Sesmun et al. |
| 7,319,673 B1 | 1/2008 | Briscoe |
| 7,324,972 B1 | 1/2008 | Oliver |
| 7,325,063 B2 | 1/2008 | Dillon |
| 7,333,500 B2 | 2/2008 | Roshko |
| 7,336,960 B2 | 2/2008 | Zavalkovsky et al. |
| 7,349,982 B2 | 3/2008 | Hannum et al. |
| 7,356,841 B2 | 4/2008 | Wilson et al. |
| 7,359,395 B2 | 4/2008 | Toporek et al. |
| 7,373,655 B1 | 5/2008 | Maria |
| 7,376,113 B2 | 5/2008 | Taylor et al. |
| 7,401,120 B2 | 7/2008 | Walbeck |
| 7,428,413 B2 | 9/2008 | Fink |
| 7,437,474 B2 | 10/2008 | Iyer et al. |
| 7,472,191 B2 | 12/2008 | Stewart |
| 7,474,617 B2 | 1/2009 | Molen et al. |
| 7,480,724 B2 * | 1/2009 | Zimler et al. ................ 709/229 |
| 7,493,084 B2 | 2/2009 | Meier et al. |
| 7,493,402 B2 | 2/2009 | McCarty et al. |
| 7,512,136 B2 | 3/2009 | Korotin |
| 7,526,538 B2 * | 4/2009 | Wilson ......................... 709/220 |
| 7,536,714 B2 | 5/2009 | Yuan |
| 7,539,291 B2 | 5/2009 | D'Angelo et al. |
| 7,552,090 B1 | 6/2009 | Barber |
| 7,554,995 B2 | 6/2009 | Short |
| 7,555,542 B1 | 6/2009 | Ayers et al. |
| 7,580,376 B2 | 8/2009 | West |
| 7,602,782 B2 | 10/2009 | Doviak |
| 7,685,311 B2 | 3/2010 | Friedman et al. |
| 7,689,710 B2 | 3/2010 | Tang et al. |
| 7,689,716 B2 | 3/2010 | Short et al. |
| 7,698,377 B2 | 4/2010 | Parekh et al. |
| 7,698,432 B2 | 4/2010 | Short et al. |
| 7,706,266 B2 | 4/2010 | Plamondon |
| 7,739,383 B1 | 6/2010 | Short et al. |
| 7,743,404 B1 | 6/2010 | Deutschmann et al. |
| 7,752,334 B2 | 7/2010 | Paunikar et al. |
| 7,774,612 B1 | 8/2010 | Deutschmann et al. |
| 7,783,777 B1 | 8/2010 | Pabla et al. |
| 7,809,126 B2 | 10/2010 | Marascio et al. |
| 7,813,741 B2 | 10/2010 | Hendrey et al. |
| 7,818,454 B2 | 10/2010 | Kim et al. |
| 7,822,871 B2 | 10/2010 | Stolorz et al. |
| 7,822,873 B1 | 10/2010 | Paunikar |
| 7,844,729 B1 | 11/2010 | Friedman et al. |
| 7,953,857 B2 | 5/2011 | Short et al. |
| 7,954,144 B1 | 5/2011 | Ebrahimi et al. |
| 8,051,206 B2 | 11/2011 | Paunikar et al. |
| 8,156,246 B2 | 4/2012 | Short et al. |
| 8,190,708 B1 | 5/2012 | Short et al. |
| 8,234,409 B2 | 7/2012 | Paunikar et al. |
| 8,244,886 B2 | 8/2012 | Short et al. |
| 8,266,266 B2 | 9/2012 | Short et al. |
| 8,266,269 B2 | 9/2012 | Short et al. |
| 8,370,477 B2 | 2/2013 | Short et al. |
| 8,370,524 B2 | 2/2013 | Paunikar et al. |
| 8,516,083 B2 | 8/2013 | Short et al. |
| 8,566,912 B2 | 10/2013 | Olshansky et al. |
| 8,594,107 B2 | 11/2013 | Short et al. |
| 2001/0003823 A1 | 6/2001 | Mighdoll et al. |
| 2001/0044818 A1 | 11/2001 | Liang |
| 2001/0054020 A1 | 12/2001 | Barth et al. |
| 2002/0006788 A1 | 1/2002 | Knutsson et al. |
| 2002/0016736 A1 | 2/2002 | Cannon et al. |
| 2002/0021689 A1 | 2/2002 | Robbins |
| 2002/0097674 A1 | 7/2002 | Balabhadraptreuni et al. |
| 2002/0133412 A1 | 9/2002 | Oliver et al. |
| 2002/0133558 A1 * | 9/2002 | Fenno et al. ................... 709/208 |
| 2002/0152311 A1 | 10/2002 | Veltman et al. |
| 2002/0178070 A1 | 11/2002 | Leveridge |
| 2003/0067911 A1 | 4/2003 | Kikinis |
| 2003/0069991 A1 | 4/2003 | Brescia |
| 2003/0083889 A1 | 5/2003 | Macklin |
| 2004/0015572 A1 | 1/2004 | Kang |
| 2004/0030797 A1 | 2/2004 | Akinlar et al. |
| 2004/0039798 A1 | 2/2004 | Hotz et al. |
| 2004/0076144 A1 | 4/2004 | Ishidoshiro |
| 2004/0203752 A1 | 10/2004 | Wojaczynski et al. |
| 2005/0021943 A1 | 1/2005 | Ikudome |
| 2005/0039209 A1 * | 2/2005 | Klebanoff et al. ............... 725/78 |
| 2005/0102205 A1 | 5/2005 | Yamamoto |
| 2005/0143065 A1 | 6/2005 | Pathan et al. |
| 2005/0148342 A1 | 7/2005 | Sylvain |
| 2005/0260973 A1 | 11/2005 | van de Groenendaal |
| 2006/0026170 A1 | 2/2006 | Kreitler et al. |
| 2006/0080446 A1 | 4/2006 | Bahl |
| 2006/0089122 A1 | 4/2006 | Zavalkovsky et al. |
| 2006/0135155 A1 | 6/2006 | Chung et al. |
| 2006/0174019 A1 | 8/2006 | Ikudome |
| 2007/0011268 A1 | 1/2007 | Banga et al. |
| 2007/0162598 A1 | 7/2007 | Gorodyansky |
| 2007/0201702 A1 | 8/2007 | Hendricks |
| 2007/0266125 A1 | 11/2007 | Lu et al. |
| 2007/0271598 A1 | 11/2007 | Chen et al. |
| 2007/0294417 A1 | 12/2007 | Ikudome |
| 2008/0148383 A1 | 6/2008 | Pitchaikani et al. |
| 2008/0271109 A1 | 10/2008 | Singh et al. |
| 2009/0024745 A1 | 1/2009 | Short et al. |
| 2010/0115113 A1 | 5/2010 | Short et al. |
| 2010/0332615 A1 | 12/2010 | Short et al. |
| 2011/0030037 A1 | 2/2011 | Olshansky et al. |
| 2012/0030737 A1 | 2/2012 | Pagan et al. |
| 2012/0185586 A1 | 7/2012 | Olshansky |
| 2013/0055358 A1 | 2/2013 | Short et al. |
| 2013/0238812 A1 | 9/2013 | Paunikar et al. |

FOREIGN PATENT DOCUMENTS

| | | |
|---|---|---|
| CA | 2330857 | 11/1999 |
| CA | 2296937 | 7/2000 |
| EP | 0573739 | 12/1993 |
| EP | 0742657 | 11/1996 |
| EP | 0762707 | 3/1997 |
| EP | 0767595 | 4/1997 |
| EP | 0848338 | 6/1998 |

(56) References Cited

FOREIGN PATENT DOCUMENTS

| | | |
|---|---|---|
| EP | 0873037 | 10/1998 |
| EP | 0889418 | 1/1999 |
| EP | 0901301 | 3/1999 |
| EP | 0909073 | 4/1999 |
| EP | 0912026 | 4/1999 |
| EP | 0917318 | 5/1999 |
| EP | 0924913 | 6/1999 |
| EP | 0946027 | 9/1999 |
| EP | 1076975 | 11/1999 |
| EP | 0986230 | 3/2000 |
| EP | 1222791 | 5/2001 |
| EP | 1111872 | 6/2001 |
| EP | 0560706 | 4/2006 |
| EP | 1026853 | 12/2007 |
| EP | 2093928 | 4/2011 |
| GB | 2283645 | 5/1995 |
| GB | 2311439 | 9/1997 |
| GB | 2326306 | 12/1998 |
| JP | 5-344122 | 12/1993 |
| JP | 6-209319 | 7/1994 |
| JP | 06-348625 | 12/1994 |
| JP | 7-030575 | 1/1995 |
| JP | 7-066809 | 3/1995 |
| JP | 7-202931 | 8/1995 |
| JP | 8-065306 | 3/1996 |
| JP | 8-242231 | 9/1996 |
| JP | 8-265372 | 10/1996 |
| JP | 08-265372 | 11/1996 |
| JP | 9-046352 | 2/1997 |
| JP | 09-305514 | 11/1997 |
| JP | 10-105516 A | 4/1998 |
| JP | 10-107839 | 4/1998 |
| JP | 11-055326 | 2/1999 |
| JP | 11-055726 | 2/1999 |
| JP | 2000-536163 | 3/1999 |
| JP | 11-177626 | 7/1999 |
| JP | 11-194983 | 7/1999 |
| JP | 11-282804 A | 10/1999 |
| JP | 2002-514802 | 11/1999 |
| JP | 2000-059416 | 2/2000 |
| JP | 2000-111870 | 4/2000 |
| JP | 2000-354127 | 12/2000 |
| JP | 2002-111870 | 4/2002 |
| JP | 4471554 | 3/2010 |
| JP | 4791589 | 7/2011 |
| JP | 4846036 | 10/2011 |
| JP | 5047436 | 7/2012 |
| JP | 5084086 | 9/2012 |
| WO | WO 95/27942 | 10/1995 |
| WO | WO 96/05549 | 2/1996 |
| WO | WO 96/39668 | 12/1996 |
| WO | WO/9702687 | 1/1997 |
| WO | WO 97/09672 | 3/1997 |
| WO | WO 97/11429 | 3/1997 |
| WO | WO 97/22936 | 6/1997 |
| WO | WO 97/27546 | 7/1997 |
| WO | WO 97/41586 | 11/1997 |
| WO | WO 97/48210 | 12/1997 |
| WO | WO 98/11702 | 3/1998 |
| WO | WO 98/12643 | 3/1998 |
| WO | WO 98/16036 | 4/1998 |
| WO | WO 98/16044 | 4/1998 |
| WO | WO 98/36587 | 8/1998 |
| WO | WO 98/54868 | 12/1998 |
| WO | WO 98/57465 | 12/1998 |
| WO | WO 99/01819 | 1/1999 |
| WO | WO 99/15995 | 4/1999 |
| WO | WO 99/28819 | 6/1999 |
| WO | WO 99/38303 | 7/1999 |
| WO | WO 99/39481 | 8/1999 |
| WO | WO 99/55056 | 10/1999 |
| WO | WO 99/57837 | 11/1999 |
| WO | WO 99/57865 | 11/1999 |
| WO | WO 99/57866 | 11/1999 |
| WO | WO 99/65183 | 12/1999 |
| WO | WO 99/66400 | 12/1999 |
| WO | WO 00/27092 | 5/2000 |
| WO | WO 00/58804 | 10/2000 |
| WO | WO 00/79406 A | 12/2000 |
| WO | WO 01/03011 | 1/2001 |
| WO | WO 01/63835 A | 8/2001 |
| WO | WO 02/067531 | 8/2002 |
| WO | WO 2004/017658 | 2/2004 |
| WO | WO 2004/100499 | 11/2004 |

OTHER PUBLICATIONS

Aceves, Wireless Internet Gateways (Wings), Proc. IEEE MILCOM '97, Monterey, California, Nov. 1997.
Arar, Y., Prepaid Internet Access Cards: Instant ISP, http://www.pcworld.com/article/5045/prepaid_internet_access_cards_instant_isp.html, PC World, Jul. 14, 1997, 2 pages.
Ascend Communications and ATCOM/INFO Announce Development Alliance, Jun. 22, 1999, Business Wire.
Ascend Communications Inc., Virtual Private Networks Resource Guide 1997.
Agrawal, Swan: A Mobile Multimedia Wireless Network, IEEE Personal Communications, Apr. 1996.
Airamo, Virtual Private Networks, Tik-110.501 Seminar on Network Security, Nov. 28, 1997.
Alexander, Active Bridging, University of Pennsylvania Technical Report No. MS-CIS-97-02, Jan. 1997.
Alonso, Database system issues in nomadic computing; Proceedings of the 1993 ACM SIGMOD International Conference on Management of Data, May 26, 1993.
Altmann, (Workshop '99) Assisting Users in Complex Purchasing Decisions, Jan. 12, 1999.
Altmann, Index Project: User support for buying QoS with regard to user's preferences, Sixth International Workshop on Quality of Service, May 18, 1998.
Amadio, Modelling IP Mobility, Nov. 1997.
Anderson, et al., The Magicrouter, an Application of Fast Packet Interposing, dated May 17, 1996 in 12 pages.
Auric Web Systems, InterACS: Internet Access Control System: Solutions for the Internet Service Provider, http://web.archive.org/web/19970708234615/http:/www.auricweb.com/InterACS.html, Jul. 8, 1997, 5 pages.
Auric Web Systems, The Intercard System Prepaid Internet Access Cards, http://web.archive.org/web/19970708234054/http:/www.auricweb.com/Accesscard.html, Auric Web Systems, Jul. 8, 1997, 4 pages.
"Auric Web Systems Unveils Software to Reduce Theoperating Costs of Internet Service Providers", http://www.allbusiness.com/technology/software-services-applications-internet/6971623-1.html, AllBusiness, Mar. 25, 1997, 2 pages.
Auric Web Systems, WebGate Card: FAQ, http://web.archive.org/web/19980520083043/http:/www.auricweb.com/faq.html, May 20, 1998, 5 pages.
Aoyama, The Cost of Adaptivity and Virtual Lanes in a Wormhole Router, 1995.
Appenzeller, et al., "User-Friendly Access Control for Public Network Ports," Department of Computer Science, Stanford University, dated Aug. 31, 1998 in 16 pages.
Apostolopoulos, G., et al.: "IBM Research Report L5: A Self Learning Layer-5 Switch", Computer Science/Mathematics, RC 21461(96867)Apr. 29, 1999, pp. 1-19.
ATCOM/INFO and Microsoft Plan Large-Scale Deployment of IPORT for Mid-1998, available at http://www.microsoft.com/presspass/press/1998/mar98/ipttrlp.mspx.
ATCOM/INFO to Display High-Speed Plug-And-Play Internet Access Software with Microsoft at HITEC, Jul. 22, 1999.
ATCOM/INFO's IPORT Brings High Speed Internet Access to Hotels in Japan and Mexico; ATCOM and Tut Systems Partner to Expand International Presence of 'Plug and Play' Internet Access, May 11, 1999.
Atkins, Internet Security Professional Reference; IP Spoofing and Sniffing, Ch. 6, 1996.

(56) References Cited

OTHER PUBLICATIONS

Atreus Systems Corporations and B2B Connect, In. Partner to Deliver Bundled Broadband Services to Mult-Tenant, High Ri Buildings, Feb. 14, 2000, Business Wire.
Babbage, Internet phone—changing the telephony paradigm?, BT Technology Journal, vol. 15, Iss. 2, Apr. 1997.
Badrinath, To Send or not to Send: Implementing Deferred Transmissions in a Mobile Host, Proceedings of 16th International Conference on Distributed Computing Systems, May 27, 1996.
Bagrodia, Vision, Issues, and Architecture for Nomadic Computing, IEEE Personal Communications, Dec. 1995.
Baker, Local Control Over Filtered WWW Access, Fourth International World Wide Web Conference, Dec. 13, 1995.
Baker, M., et al.; Supporting Mobility in MosquitoNet, Proceedings of the 1996 USENIX Technical Conference, San Diego, CA Jan. 1996.
Baker, RFC 1812; Requirements for IP Version 4 Routers, Jun. 1995.
Barnes, Defense Data Network Usage Accounting Enhancement Approaches, Apr. 1989.
Beermann, C.; Re: Support for cern like Pass/Fair proxy limits?; 2 pages; available at <http://www.squid-cache.org/mail-archieve/squiq-users/199611/0385.html> (visited Feb. 1, 2005).
Beigl, System Support for Mobile Computing, Computers & Graphics, vol. 20, Iss. 5, Sep. 1996.
Berkowitz, Howard C.: PIER Working Group, Router Renumbering Guide, Aug. 1996, http://tools.ietf.org/pdf/draft-ietf-pier-rr-02.pdf.
Berners-Lee, T. et al.; Hypertext Transfer Protocol—HTTP/1.0; May 1996; 54 pages; Network Working Group, Request for Comments 1945.
Bhagwat, P., Charles Perkins, Satish Tripathi; Network Layer Mobility: An Architecture and Survey, IEEE Personal Communications, vol. 3, iss. 3, pp. 54-64; Jun. 1996.
Bieszczad, Towards plug-and-play networks with mobile code, Proceedings of the International Conference for Computer Communications ICCC'97, Mar. 1997.
Bjorn, The Case for Quality of Service on Demand Empirical Evidence from the INDEX Project, ISQE'99, Workshop on Internet Service Quality Economics, Cambridge, MA, USA, Dec. 1999.
Blackwell, Secure Short-Cut Routing for Mobile IP, Proceedings of the USENIX Summer 1994 Technical Conference on USENIX Summer 1994 Technical Conference, Jun. 10, 1994.
Bojorquez, Victor, CheckPoint Software Tech. Ltd., How to Configure Firewall-1 With Connect Control, Oct. 10, 1999.
Borella et al., IETF Internet-Draft-Distributed Network Address Translation, Internet Engineering Task Force, Oct. 1998.
Boutell, CGI Programming in C & Perl, 1996.
Braden, et al., "Requirements for Internet Gateways", RFC 1009, Jun. 1987.
Braden, RFC 1122 Requirements for Internet Hosts—Communication Layers, Oct. 1989.
Brattli, The Software Network, Providing Continuous Network Connectivity for Multihoming Mobile Computers, Dec. 16, 1996.
Broman, Implementation and Analyses of the Mobile-IP Protocol, Jan. 25, 1996.
Brown, A Strategic Plan for Ubiquitous Laptop computing, vol. 41, No. 1, Communications of the ACM, Jan. 1998.
Brown, M-TCP: TCP for Mobile Cellular Networks, Jul. 29, 1997.
Bush, Mobile ATM Orderwire and Network Configuration, 1996.
Caceres, Fast & Scalable Handoffs for Wireless Internetworks, Proceedings of the 2nd annual international conference on Mobile computing and networking, Nov. 1996.
Caronni et al., Efficient Security for Large and Dynamic Multicast Groups, Jun. 1998.
Complaint for Patent Infringement of U.S. Patent No. 6,130,892; 7,088,727; 6,636,894; 6,857,009 and 6,868,399.
Complaint for Patent Infringement of U.S. Patent No. 6,130,892; 7,088,727; 6,636,894; 6,868,399; 6,789,110 and 7,554,995.
Case No. 07-1946 GPS (VBK) *Nomadix, Inc.* v. *Second Rule LLC*, Expert Report of Peter Alexander, Ph.D., Regarding Invalidity of U.S. Patent No. 6,130,892; 7,088,727; 6,636,894; 6,857,009, and 6,868,399.
Case No. 04CV1485 BTM (POR): *IP3 Networks, Inc.* v. *Nomadix, Inc.*—Jul. 23, 2004 Complaint for: (1) Declaratory Judgment of Patent Non-Infringement and Invalidity of U.S. Patent No. 6,636,894; (2) Declaratory Judgment of Patent Non-Infringement of U.S. Patent No. 6,130,893; (3) Trade Libel; (4) Libel Under Cal. Civ. Code § 45; (5) Unfair Competition Under Cal. Bus. & Prof. Code § 17200, Et Seq.: and (6) Intervention Interference with Prospective Economic Advantage.
Case No. 04CV1485 BTM (POR): *IP3 Networks, Inc.* v *Nomadix, Inc.*—Sep. 20, 2004 Amended Complaint for: (1) Declaratory Judgment of Patent Non-Infringement and Invalidity of U.S. Patent No. 6,636,894; (2) Declaratory Judgment of Patent Non-Infringement of U.S. Patent No. 6,130,893; (3) Trade Libel; (4) Libel Under Cal. Civ. Code § 45; (5) Unfair Competition Under Cal. Bus. & Prof. Code § 17200, Et Seq.: and (6) Interntion Interference with Prospective Economic Advantage—Demand for Jury Trial.
Case No. 04CV1485 BTM (POR): *IP3 Networks, Inc.* v. *Nomadix, Inc*—Oct. 21, 2004 Answer and Counterclaims of Nomadix, Inc. to the Amended Complaint dated Oct. 21, 2004.
Case No. 04CV1485 BTM (POR): *IP3 Networks, Inc.* v *Nomadix, Inc.*, Plaintiff/Counter-Defendant IP3 Networks Inc.'s Reply to Defendant Nomadix, Inc.'s Counter-claim, dated Nov. 15, 2004.
Case No. 04CV1485 BTM (POR): *IP3 Networks, Inc.* v *Nomadix, Inc.*, Plaintiff IP3 Networks Inc.'s Responses to Defendant Nomadix, Inc.'s First Set of Interrogatories (Nos. 1-5) dated Feb. 22, 2005.
Case No. 07-1946 GPS (VBK) *Nomadix, Inc.* v. *Second Rule LLC*, Complaint for Patent Infringement of U.S. Patent No. 6,130,892; 7,088,727; 6,636,894; 6,857,009, and 6,868,399 dated Mar. 23, 2007.
Case No. 07-1946 GPS (VBK) *Nomadix, Inc.* v. *Second Rule LLC*, First Amended Answer, Affirmative Defenses and Counterclaims of Second Rule LLC, Jul. 16, 2007.
Case No. 07-1946 DDP (VBKx) *Nomadix, Inc.* v. *Second Rule LLC*, Plaintiffs Reply to Defendant's First Amended Answer and Counterclaims, Demand for Jury Trial, 6 pages; Filed Jul. 31, 2007.
Case No. 07-1946 GPS (VBK) *Nomadix, Inc.* v. *Second Rule LLC*, Plaintiff's Reply to Defendant's First Amended Answer and Counterclaims and Demand for Jury Trial, Jul. 31, 2007.
Case No. 07-1946 GPS (VBK) *Nomadix, Inc.* v. *Second Rule LLC*, Defendant's Initial Disclosure of Prior Art dated Jan. 18, 2008.
Case No. 07-1946 GPS (VBK) *Nomadix, Inc.* v. *Second Rule LLC*, Defendant's Response to Plaintiff's Claim Chart, dated Feb. 19, 2008.
Case No. 07-1946 GPS (VBK) *Nomadix, Inc.* v. *Second Rule LLC*, Defendant's First Supplemental Response to Plaintiff's Claim Chart dated Apr. 18, 2008.
Case No. 07-1946 DDP (VBKx) *Nomadix, Inc.* v. *Second Rule LLC*, Plaintiff Nomadix Inc.'s Proposed Claim Construction Statement, dated May 23, 2008.
Case No. 07-1946 GPS (VBK) *Nomadix, Inc.* v. *Second Rule LLC*, Second Rule LLC's Response to Nomadix, Inc.'s Proposed Claim Construction Statement dated Jun. 6, 2008.
Case No. 07-1946 DDP (VBKx) *Nomadix, Inc.* v. *Second Rule LLC*, Proposed Joint Claim Construction Statement dated Jul. 2, 2008.
Case No. 07-1946 DDP (VBKx) *Nomadix, Inc.* v. *Second Rule LLC*, Declaration of Don P. Foster re: Second Rule LLC's Opening Claim Construction Brief, dated Aug. 4. 2008.
Case No. 07-1946 DDP (VBKx) *Nomadix, Inc.* v. *Second Rule LLC*, Declaration of Mark Lezama in Support of Nomadix, Inc.'s Opening Claim Construction Brief, dated Aug. 4. 2008.
Case No. 07-1946 DDP (VBKx) *Nomadix, Inc.* v. *Second Rule LLC*, Defendant's Opening Claim Construction Brief, dated Aug. 4. 2008.
Case No. 07-1946 DDP (VBKx) *Nomadix, Inc.* v. *Second Rule LLC*, Plaintiff's Opening Claim Construction Brief, Redacted Public Version, dated Aug. 4. 2008.
Case No. 07-1946 DDP (VBKx) *Nomadix, Inc.* v. *Second Rule LLC*, Declaration of Don P. Foster Re: Second Rule LLC's Reply to Plaintiff's Opening Claim Construction Brief, dated Aug. 22, 2008.

(56) References Cited

OTHER PUBLICATIONS

Case No. 07-1946 DDP (VBKx) *Nomadix, Inc. v. Second Rule LLC*, Declaration of Douglas G. Muehlhauser in Support of Nomadix Inc.'s Claim Construction Brief, dated Aug. 22, 2008.
Case No. 07-1946 DDP (VBKx) *Nomadix, Inc. v. Second Rule LLC*, Declaration of Mark Lezama in Support of Nomadix, Inc.'s Reply Claim Construction Brief, dated Aug. 22, 2008.
Case No. 07-1946 DDP (VBKx) *Nomadix, Inc. v. Second Rule LLC*, Defendant's Reply to Plaintiff's Opening Claim Construction Brief, dated Aug. 22, 2008.
Case No. 07-1946 DDP (VBKx) *Nomadix, Inc. v. Second Rule LLC*, Reply Claim Construction Brief, dated Aug. 22, 2008.
Case No. 07-1946 DDP (VBKx) *Nomadix, Inc. v. Second Rule LLC*, Declaration of Peter Alexander, Ph.D. in Support of Second Rule, LLC for Partial Summary Judgement dated Sep. 4, 2008.
Case No. 07-1946 DDP (VBKx) *Nomadix, Inc. v. Second Rule LLC*, Notice of Motion and Motion of Second Rule LLC for Partial Summary Judgment; Sep. 5, 2008.
Case No. 07-1946 DDP (VBKx) *Nomadix, Inc. v. Second Rule LLC*, Declaration of Don P. Foster Re: Motion of Second Rule, LLC for Partial Summary Judgement dated Sep. 5, 2008.
Case No. 07-1946 DDP (VBKx) *Nomadix, Inc. v. Second Rule LLC*, Defendant's Statement of Uncontroverted Facts and Conclusions of Law in Support of Defendant's Partial Summary Judgement dated Sep. 5, 2008.
Case No. 07-1946 DDP (VBKx) *Nomadix, Inc. v. Second Rule LLC*, Memorandum of Law in Support of Motion of Second Ruel, LLC for Partial Summary Judgement dated Sep. 5, 2008.
Case No. 07-1946 DDP (VBKx) *Nomadix, Inc. v. Second Rule LLC*, Order Requesting Supplemental Briefing.
Case No. 07-1946 DDP (VBKx) *Nomadix, Inc. v. Second Rule LLC*, Defendant's Supplemental Post-Hearing Claim Construction Brief.
Case No. 07-1946 DDP (VBKx) *Nomadix, Inc. v. Second Rule LLC*, Nomadix, Inc.'s Supplemental Claim Construction Brief.
Case No. 07-1946 DDP (VBKx) *Nomadix, Inc. v. Second Rule LLC*, Claim Construction Order dated Oct. 3, 2008.
Case No. 07-1946 GPS (VBK) *Nomadix, Inc. v. Second Rule LLC*, Expert Report of Peter Alexander, Ph.D.; Oct. 31, 2008.
Case No. 07-1946 DDP (VBKx) *Nomadix, Inc. v. Second Rule LLC*, Amended Claim Construction Order (Motion filed on Aug. 4, 2008).
Case No. CV 09-8441 (C.D. Cal. 2009), *Nomadix, Inc. v. Hewlett-Packard Co.*, Complaint filed Nov. 17, 2009.
Case No. CV 10-0381 (C.D. Cal. 2010), *Nomadix, Inc. v. SolutionInc Technologies Ltd.*, Complaint filed Jan. 19, 2010.
Case No. 2:08-cv-00264-DF-CE, *Linksmart Wireless Technology, LLC, v. T-Mobile USA, Inc., et al.*, Defendants' Patent Local Rule 4-2 Preliminary Constructions and Extrinsic Evidence, filed Jan. 21, 2010.
Case No. 2:08-cv-00264-DF-CE, *Linksmart Wireless Technology, LLC, v. T-Mobile USA, Inc., et al.*, Best Western's Supplemental Claim Construction Brief, filed Apr. 16, 2010.
Case No. 2:08-cv-00264-DF-CE, *Linksmart Wireless Technology, LLC, v. T-Mobile USA, Inc., et al.*, Claim Construction Brief of Defendants, filed Apr. 16, 2010.
Case No. 2:08-cv-00264-DF-CE, *Linksmart Wireless Technology, LLC, v. T-Mobile USA, Inc., et al.*, Declaration of Kevin Jeffay, Ph.D., filed Apr. 16, 2010.
Case No. 2:08-cv-00264-DF-CE, *Linksmart Wireless Technology, LLC, v. T-Mobile USA, Inc., et al.*, Declaration of Noah A. Levine in Support of Claim Construction Brief of Defendants filed Apr. 16, 2010.
Case No. 2:08-cv-00264-DF-CE, *Linksmart Wireless Technology, LLC, v. T-Mobile USA, Inc., et al.*, Defendant Barnes & Noble Booksellers, Inc.'s First Amended Answer to Plaintiffs Complaint, filed Apr. 22, 2010.
Case No. 2:08-cv-00264-DF-CE, *Linksmart Wireless Technology, LLC, v. T-Mobile USA, Inc., et al.*, Defendant Mail Boxes Etc., Inc.'s First Amended Answer to Plaintiffs Complaint, filed Apr. 22, 2010.
Case No. 2:08-cv-00264-DF-CE, *Linksmart Wireless Technology, LLC, v. T-Mobile USA, Inc., et al.*, Defendants' SBC (AT&T), Wayport, McDonalds, Barnes & Noble and Mail Boxes etc. Joint Unopposed Motion for Leave to Amend Their Respective First Answers and Counterclaims, filed Apr. 22, 2010.
Case No. 2:08-cv-00264-DF-CE, *Linksmart Wireless Technology, LLC, v. T-Mobile USA, Inc., et al.*, Defendant SBC Internet Services, Inc. D/B/A AT&T Internet Services's ("AT&T") First Amended Answer to Plaintiffs Complaint, Linksmart Wireless Technology, filed Apr. 22, 2010.
Case No. 2:08-cv-00264-DF-CE, *Linksmart Wireless Technology, LLC, v. T-Mobile USA, Inc., et al.*, McDonald's Corp.'s First Amended Answer, Defenses, and Counterclaims to Complaint, filed Apr. 22, 2010.
Case No. 2:08-cv-00264-DF-CE, *Linksmart Wireless Technology, LLC, v. T-Mobile USA, Inc., et al.*, Wayport, Inc.'s First Amended Answer, Defenses, and Counterclaims to Complaint, filed Apr. 22, 2010.
Nomadix, Inc.'s Disclosure of Asserted Claims and Infringement Contentions, *Nomadix, Inc. v. Hewlett-Packard Company et al.*, No. CV09-08441 DDP (VBKx), May 24, 2010.
Defendants' Joint Invalidity Contentions, *Nomadix, Inc. v. Hewlett-Packard Company et al.*, No. CV09-08441 DDP (VBKx), Jul. 1, 2010.
Plaintiff's Preliminary Invalidity Contentions and Accompanying Document Production, *Nomadix, Inc. v. Hewlett-Packard Company et al.*, No. CV09-08441 DDP (VBKx), Jul. 1, 2010.
Defendants' Supplemental Joint Invalidity Contentions, *Nomadix, Inc. v. Hewlett-Packard Company et al.*, No. CV09-08441 DDP (VBKx), Jul. 15, 2010.
Plaintiff's Preliminary Invalidity Contentions and Accompanying Document Production Regarding U.S. Patent Nos. 6,996,073 and 7,580,316, *Nomadix, Inc. v. Hewlett-Packard Company et al.*, No. CV09-08441 DDP (VBKx), Jul. 15, 2010.
Defendants' Supplemental Joint Invalidity Contentions, *Nomadix, Inc. v. Hewlett-Packard Company, et al.*, Case No. 09-CV-8441 DDP (VBKx) and *Nomadix, Inc. v. Solutionic Technologies Limited*, Case No. 2:10-CV-00381 DDP (VBKx), (Central District of California, Western Division, and dated Jul. 22, 2011.
Exhibit A, Asserted Claims, filed in Defendants' Supplemental Joint Invalidity Contentions, *Nomadix, Inc. v. Hewlett-Packard Company, et al.*, Case No. 09-CV-8441 DDP (VBKx) and *Nomadix, Inc. v. Solutionic Technologies Limited*, Case No. 2:10-CV-00381 DDP (VBKx), (Central District of California, Western Division, and dated Jul. 22, 2011, in 2 pages.
Exhibit B, Supplemental Prior Art List filed in Defendants' Supplemental Joint Invalidity Contentions, *Nomadix, Inc. v. Hewlett-Packard Company, et al.*, Case No. 09-CV-8441 DDP (VBKx) and *Nomadix, Inc. v. Solutionic Technologies Limited*, Case No. 2:10-CV-00381 DDP (VBKx), (Central District of California, Western Division, and dated Jul. 22, 2011, in 2 pages.
Exhibit C1, Claim Comparison for U.S. Patent No. 6,130,892 filed in Defendants' Supplemental Joint Invalidity Contentions, *Nomadix, Inc. v. Hewlett-Packard Company, et al.*, Case No. 09-CV-8441 DDP (VBKx) and *Nomadix, Inc. v. Solutionic Technologies Limited*, Case No. 2:10-CV-00381 DDP (VBKx), (Central District of California, Western Division, and dated Jul. 22, 2011, in 4 pages.
Exhibit C2, Claim Comparison for U.S. Patent No. 7,088,727 filed in Defendants' Supplemental Joint Invalidity Contentions, *Nomadix, Inc. v. Hewlett-Packard Company, et al.*, Case No. 09-CV-8441 DDP (VBKx) and *Nomadix, Inc. v. Solutionic Technologies Limited*, Case No. 2:10-CV-00381 DDP (VBKx), (Central District of California, Western Division, and dated Jul. 22, 2011, in 7 pages.
Exhibit C3, Claim Comparison for U.S. Patent No. 7,554,995 filed in Defendants' Supplemental Joint Invalidity Contentions, *Nomadix, Inc. v. Hewlett-Packard Company, et al.*, Case No. 09-CV-8441 DDP (VBKx) and *Nomadix, Inc. v. Solutionic Technologies Limited*, Case No. 2:10-CV-00381 DDP (VBKx), (Central District of California, Western Division, and dated Jul. 22, 2011, in 25 pages.
Exhibit C4, Claim Comparison for U.S. Patent No. 6,636,894, filed in Defendants' Supplemental Joint Invalidity Contentions, *Nomadix, Inc. v. Hewlett-Packard Company, et al.*, Case No. 09-CV-8441 DDP (VBKx) and *Nomadix, Inc. v. Solutionic Technologies Limited*, Case No. 2:10-CV-00381 DDP (VBKx), (Central District of California, Western Division, and dated Jul. 22, 2011, in 18 pages.

(56) References Cited

OTHER PUBLICATIONS

Exhibit C5, Claim Comparison for U.S. Patent No. 7,194,554 filed in Defendants' Supplemental Joint Invalidity Contentions, *Nomadix, Inc. v. Hewlett-Packard Company, et al.*, Case No. 09-CV-8441 DDP (VBKx) and *Nomadix, Inc. v. Solutionic Technologies Limited*, Case No. 2:10-CV-00381 DDP (VBKx), (Central District of California, Western Division, and dated Jul. 22, 2011, in 18 pages.
Exhibit C6, Claim Comparison for U.S. Patent No. 6,868,399 filed in Defendants' Supplemental Joint Invalidity Contentions, *Nomadix, Inc. v. Hewlett-Packard Company, et al.*, Case No. 09-CV-8441 DDP (VBKx) and *Nomadix, Inc. v. Solutionic Technologies Limited*, Case No. 2:10-CV-00381 DDP (VBKx), (Central District of California, Western Division, and dated Jul. 22, 2011, in 22 pages.
Exhibit C7, U.S. Patent No. 7,689,716 filed in Defendants' Supplemental Joint Invalidity Contentions, *Nomadix, Inc. v. Hewlett-Packard Company, et al.*, Case No. 09-CV-8441 DDP (VBKx) and *Nomadix, Inc. v. Solutionic Technologies Limited*, Case No. 2:10-CV-00381 DDP (VBKx), (Central District of California, Western Division, and dated Jul. 22, 2011, in 11 pages.
First Claim Construction Order, *Nomadix, Inc. v. Hewlett-Packard Company et al.*, No. CV-09-08441 DDP (VBKx), filed Aug. 31, 2011 in 17 pages.
Second Claim Construction Order, *Nomadix, Inc. v. Hewlett-Packard Company et al.*, No. CV-09-08441 DDP (VBKx), filed Oct. 24, 2011 in 19 pages.
Case No. 09-CV-8441 DDP (VBKx), *Nomadix, Inc. v. Hewlett-Packard Co. et al.*, Defendants' Supplemental Invalidity Contentions Regarding the Prior Art Work of Mr. Ko Ikudome, dated Nov. 4, 2011, 21 pages including Exhibits I1-I3.
Case No. 09-CV-8441 DDP (VBKx), *Nomadix, Inc. v. Hewlett-Packard Co. et al.*, Defendants' Supplemental Invalidity Contentions Regarding the SPINACH Prior Art and the Vos Publication, dated Nov. 21, 2011, 64 pages including Exhibits I4, S1-S3, and V1-V3.
Case No. 09-CV-8841 DDP (VBKx), Defendants' Supplemental Invalidity Contentions Regarding John Birrell, Jr., received Dec. 23, 2011, 37 pages.
Case No. 09-CV-8441 DDP (VBKx), *Nomadix, Inc. v. Hewlett-Packard Co.* Invalidity Expert Report of Kevin Jeffay, Ph.D. (redacted), Jan. 31, 2012.
Case No. CV 09-8441 DDP (VBKx), *Nomadix, Inc. v. Hewlett-Packard Co.*, Expert Report of Stuart G. Stubblebine, Ph.D. Regarding Validity of Nomadix, Inc.'s Patents (redacted), Mar. 19, 2012.
Case No. CV 09-8441 DDP (VBKx), *Nomadix, Inc. v. Hewlett-Packard Co.*, Defendant Hewlett-Packard Company's Memorandum of Contentions of Fact and Law, filed May 29, 2012.
Case No. CV 09-8441 DDP (VBKx), *Nomadix, Inc. v. Hewlett-Packard Co.*, Nomadix, Inc.'s Memorandum of Contentions of Fact and Law, filed May 29, 2012.
Casey, Realizing Mobile Computing Personae, Ph.D. Thesis, Oct. 1995.
Chapman, D. B., et al.: "Building Internet Firewalls," O'Reilly & Associates, Inc., 103 Morris Street, Suite A Sebastopol, CA 95472, IP3 002885-002944; dated Sep. 1995.
Chapman, Network (In)Security Through IP Packet Filtering, Proceedings of the Third USENIX UNIX Security Symposium, Sep. 1992.
Chartrand, Patents: A Little Box Holds Out the Enticing Promise . . . , New York Times, at C6 (Jun. 1, 1996).
Chatel, M.: Classical versus Transparent IP Proxies (RFC1919), published as an RFC by ISOC on Mar. 1, 1996.
Check Point Ad, Sep. 14, 1998.
Check Point FireWall-I White Paper, v.3, Jun. 1997.
Check Point Software Delivers Breakthrough Security Advancements with Firewall-1 3.0, Oct. 7, 1996.
Check Point SoftwareCheck Point Firewall-I 4.0 Gains Int'l Recognized ITSEC Security Cert., Nov. 9, 1998.
Chen, et al. : "Popeye—Using Fine-grained Network Access Control to Support Mobile Users and Protect Intranet Hosts", Dec. 11, 2000.
Cheshire, Internet Mobility 4×4, Mobility: Processes, Computers, and Agents, SIGCOMM '96, Aug. 30, 1996.
Cheswick, The Design of a Secure Internet Gateway, Apr. 20, 1990.
Chikarmane, V., Rick Bunt, Carey Williamson; Mobile IP-based Multicast as a Service for Mobile Hosts; Proceedings of the 1995 Workshop on Physics and Computer Modeling; Jun. 5-6, 1995.
Chikarmane, Multicast Support for Mobile Hosts Using Mobile IP, May 16, 1997.
Chikarmane, Network Support for Mobile Hosts in a TCP/IP internetwork, Aug. 1995.
Cho, An Efficient Location and Routing Scheme for Mobile Computing Environments, IEEE Journal on Selected Areas in Communications, 1995.
Cisco, "Single-User Network Access Security TACACS+", Mar. 30, 1995, 9 pages, Cisco White Paper; XP992124521.
Cisco Systems, Inc., Interface Queue Management (white paper); "Online!"; Aug. 3, 1995; 12 pages; INET; XP002210177; available at <URL: http://www.cisco.com/warp/publicI614/16.html> (retrieved on Aug. 16, 2002).
Cisco Systems, Inc., LocalDirector Quick Start Guide and User Reference Manual, Version 1.0, Jul. 1996.
Cisco, High-Performance Stateful Firewall Delivers Unparalleled Security, PIX Firewall Data Sheet, 1996.
Cobb, Universal Mobile Addressing, IEEE Workshop on Mobile Computing Systems and Applications, 1994.
Collier, Netlets: The Future of Networking, Apr. 4, 1998.
Comer, An Architecture for a Campus-Scale Wireless Mobile Internet, Purdue University Department of Computer Science Technical Report No. CSD-TR 95-058, Sep. 1995.
Comer, "Internetworking with TCP/IP vol. 1, Chapter 10, Principles, Protocols, and Architecture," 3rd ed., Prentice Hall 1995.
Copper Mountain Introduces CopperPowered Hotel Initiative to Deliver Cost-effective Always-on or Usage-based Broadband Access to Hotel Guests, Dec. 6, 1999, Business Wire.
Dahm, Redirecting your visitors, May 1999.
Damani, ONE-IP: techniques for Hosting a Service on a Cluster of Machines, Jun. 29, 2004.
Data Communication Over the Telephone Network Procedures for Starting Sessions of Data Transmission Over the General Switched Telephone Network, ITU-T Recommendation V.8, approved on Sep. 20, 1994.
Denning et al., Location-Based Authentication: Grounding Cyberspace for Better Security, copy right 1996, Elsevier Science Ltd., pp. 1-6.
Deering et al., Network Working Group RFC 966—Host Groups: A Multicast Extension to the Internet Protocol, Dec. 1985.
Desrosiers, Transparent Access of Remote Resources, IBM Technical Disclosure Bulletin, vol. 27, No. 7B, p. 4230, Dec. 1984.
Detailed Scenario for Access VPDN Dial-in Using L2TP; Internet, Online!; XP002175644; URL:www.cisco.com (retrieved on Aug. 22, 2001); 1998; p. 1, figure 4, table 1.
Devivo, Internet Security Attacks at the Basic Levels, ACP SIGOPS Operating Systems Review, vol. 32, Iss. 2, Apr. 1998.
Droms, R., Dynamic Host Configuration Protocol, Oct. 1993, 1 page, Network Working Group, Request for Comments 1541.
Droms, R., Dynamic Host Configuration Protocol, Mar. 1997, 1 page, Network Working Group, Request for Comments 2131.
Duda, Mobile Agent Architecture for Nomadic Computing, International Conference on Computer Communications, Cannes, 1997.
Edell, R. J. et al., "Billing Using and Pricing for TCP", IEEE Journal on selected areas in communications, US, IEEE Inc. New York, vol. 13, NR . 7, pp. 1162-1175; XP000525655; ISSN: 0733-8716, Apr. 15, 1995.
Edell, Demand for Internet Access: What we learn from the INDEX trial, Mar. 13, 1999.
Edell, Internet Demand Experiment: Technology and Market Trial, Ph.D. Thesis, Spring, 2001.
Egevang, IP Network Address Translator, Network Working Group RFC 1631, pp. 1-10, May 1994.
Elastic Networks Unveils YesWare; Mobility Software Solution Target Visitor-Based Networking; PRNewswire, Apr. 12, 1999.
Elton, Peter: "Linux as a Proxy Server", Linus Journal Archive, vol. 1997, Issue 44 (Dec. 1997) Article 3, ISSN: 1075-3583, ("Eldon07") See http://portal.acm.org/citation.cfm?id=327077.327080.

(56) References Cited

OTHER PUBLICATIONS

Estrin, Inter-organization networks: implications of access control: requirements for interconnection protocol, ACM SIGCOMM Computer Communication Review, vol. 16, Iss. 3, Aug. 1986.
Eventou, A., Anywhere Online Access, Auric Web Systems find many applications for its WEBGate card that's a prepaid key to Internet, Dec. 22, 1997, 1 page.
Felten, Web Spoofing: An Internet Con Game, Princeton University Technical Report No. 540-96, Feb. 1997.
Fielding, RFC 2068 Hypertext Transfer Protocol HTTP 1.1, Jan. 1997.
Ford, Securing a Mobile Internet, Oct. 7, 1999.
Fujino, N. et at, "Mobile information service based on multi-agent architecture", (1997), IEICE Transactions on Communications, JP, Institute of Electronics Information and Comm. Eng. Tokyo, vol. E8C-B, NR. 10, pp. 1401-1406; XP000734533; ISSN: 0916-8516.
Furnell et al., A Security Framework for Online Distance Learning and Training, 1998.
Gao, Q., Anthony Acampora; A Virtual Home Agent Based Route Optimization for Mobile IP; 2000 IEEE Wireless Communications and Networking Conference; pp. 592-596; Sep. 23-28, 2000.
Giovanardi, Transparent Mobile IP: An Approach and Implementation, Global Telecommunications Conference, 1997, Nov. 3, 1997.
Gisle AAS et al., Apache.pm; 18 pages; available at <http://www.apache.org/docs>, last modified Mon Apr. 18, 2011 (http://apache.perl.org/).
Google Groups: "home network" laptop; Aug. 3, 2004; IP3 002769-70; Newsgroups: comp.sys.sun.admin. Newsgroups: comp.sys.sun.admin.
Google Groups: netswitcher; Aug. 2, 2004; IP3 002516; Newsgroups: comp.os.ms-windows.networking.win95.
Google Groups: network configuration laptop packets; Aug. 2, 2004 IP3 002765-66; Newsgroups: comp.protocols.tcp-ip.
Google Groups: network laptop settings, Jul. 30, 2004; IP# 002467-68; Laptop on Dual Networks; Newsgroups: comp.os.ms-windows.nt.admin.networking.
Google Groups: network settings DHCP mobile, Aug. 3, 2004 IP3 002511-15; Newsgroups: comp.sys.mac.comrn.
Google Groups: redirect "login page" Jul. 28, 2004; IP 3 002873-74; Newsgroups: microsoft.public.inetserver.iis.activeserverpages.
Google Groups: View Thread, Aug. 2, 2004, IP3 002505-06; Newsgroups: microsoft, public.win95.networking.
Google Groups: View Thread, Aug. 2, 2004, IP3 002507-10; Newsgroups: comp.os.os2.networking.tcp-ip.
Grant, TACACS+ Protocol Version 1.75 Internet Draft (TACACS+)/ RFC1492, Oct. 1996.
Gray, Mobile Agents for Mobile Computing, May 2, 1996.
Guerin, RadioNet Driver Implementation for the Mobile Internet Router, Jun. 1994.
Gupta, A Client Oriented IP Level Redirection, M.S. Thesis, Aug. 1998.
Gupta, Firewall Traversal for Mobile IP, Mar. 17, 1997.
Gupta, Secure and mobile networking, Mobile Networks and Applications, vol. 3, Iss. 4, 1998.
Gupta, Solaris Mobile IP: Design and Implementation, Feb. 17, 1998.
Haas, Mobile-TCP: An Asymmetric Transport, Proceedings of ICC'97—International Conference on Communications, Jun. 1997.
Hance, Product Information—Netswitcher, the ultimate windows network setup utility; IP 3 002517; Netswitcher.TM., Developed and Marketed by: J.W. Hance, 1950-18 E. Greyhound Pass, Suite 305, Carmel, Indiana 46033 USA, Aug. 2, 2004.
Harrison, Mobile Multicaset (MoM) Protocol, Proceedings of the 3rd annual ACM/IEEE international conference on Mobile computing and networking, Sep. 26, 1997.
Heberlein, Attack Class: Address Spoofing, Proceedings of the Nineteenth National Information Systems Security Conference, Oct. 1996.
Heilbronner, S.: "Requirements for Policy-Based Management of Nomadic Computing Infrastructions," Proc. Of the Sixth Workshop of the HP Openview University Association (HPOVUA '99), Bologna, Italy, Jun. 1999.
Heilbronner, Nomadic Computing Systems on the Internet—Infrastructure and Management Requirements, Mar. 31, 1997.
Heilbronner. S., Requirements for Policy-Based Management of Nomadic Computing Infrastructures; 1998; 14 pages.
Hierarchical admission control scheme for supporting mobility in mobile IP Ki-Il Kim; Sang-Ha Kim; Jung-Mo Moon; Yeong-Jin Kim. MILCOM 2002. Proceedings, vol. 1, Iss., Oct. 7-10, 2002 pp. 431-453 vol. 1.
Hills, Wireless Data Network Infrastructure at Carnegie Mellon University, Feb. 1996.
Hinrichs, Susan: "Policy-Based Management Bridiging the Gap", Dec. 6, 1999; pp. 209-218; Computer Security Applications Conference, 1999 (ACSAC 1999), Proceedings, 15th Annual Phoenix, Arizona, USA Dec. 6110, 1999, Los Alamitos, California, IEEE Comput. Soc.; XP010368586.
Hluchyj, M. G. et al., Queueing Disciplines for Integrated Fast Packet Networks, IEEE 1992, 7 pages.
Hodes, Composable Ad-hoc Mobile Services for Universal Interaction, Aug. 2, 1997.
Hornig, C.; A Standard for the Transmission of IP Datagrams over Ethernet Networks; Apr. 1984; 3 pages; Network Working Group, Request for Comments 894.
Hotel Online Special Report, Internet Access for the Road Warrior Easier Than Ever IPORT Version 2.0 Released, available at http://www.hotel-online.com/News/Press Releases1998 3rd/July98 IPORTAccess.html, dated Nov. 14, 2007, 2 pages.
Hotelier, ATCOM/INFO Makes High-Speed Internet Access to Corporate Networks Secure for Business Travelers, Jul. 17, 1999.
Housel, WebExpress: A Client/intercept based system for optimizing Web browsing in a wireless environment, Mobile Networks & Applications, vol. 3, No. 4, Jan. 1999.
How to Determine the Version of Windows 95/98/Me in Use, http://support.microsoft.com/kb/158238, Jan. 21, 2010.
Hubbard, Firewalling the Net, BT Technology Journal, vol. 15, Iss. 2, Apr. 1997.
Industry-Leading Internet Access System Now Makes Plug and Play—High-Speed Internet Access for the Road Warrior Easier Than Ever, Jul. 20, 1998.
Information Sciences Institute; Internet Protocol, DARPA Internet Program, Protocol Specification; Sep. 1981; 45 pages; available at <http://www.faqs.org/rfcs/rfc791.html> (visited 0002-01-2005).
Inouye, Dynamic Network Reconfiguration Support for Mobile Computers, Proceedings of the 3rd annual ACM/IEEE international conference on Mobile computing and networking, Sep. 26, 1997.
Inouye, Physical Media Independence: System Support for Dynamically Available Network Interfaces, Jan. 20, 1997.
Internet Access: ATCOM/INFO Releases IPORT Central Office Solution. IPORT-CO Makes Plug & Play High-Speed Internet Access Possible too Multiple Properties from a Single Server-Product Announcement, ATCOM-IPORT Press Release Oct. 26, 1998.
Internet is the Key, as the Integration of Locations and their Information Begins, Nikkei Electronics, Jul. 13, 1998.
Internet Technologies Handbook, Chapter 15, Dial-up Technology, Cisco Systems, Indianapolis: Ciscos Press, 1998.
Ioannidis, IP-based Protocols for Mobile Internetworking, Proceedings of the Conference on Communications Architecture & Protocols, Sep. 3, 1991.
Ioannidis, Protocols for Supporting Mobile IP Hosts, Jul. 1992.
Ipfwadm-2.3.0, source code module ipfwadm.c, Jul. 30, 1996.
IPORT Central Office Solution, Nov. 1998, pp. 1-20.
IPORT Connection Methods and Concepts for IPORT v2.x; Nov. 1998, pp. 1-9.
Jain, PC-notebook based mobile networking: Algorithms, architectures and implementations; 1CC95 vol. 2, Jun. 1995.
Johnson, D. B., "Ubiquitous Mobile Host Internetworking", 0-8186-4000-6/93 1993 IEEE, pp. 85-90.
Johnson, Mobile Host Internetworking Using IP Loose Source Routing, Carnegie Mellon University Technical Report No. CS-93-128, Feb. 1993.

(56) References Cited

OTHER PUBLICATIONS

Johnson, Protocols for Adaptive Wireless and Mobile Networking, Feb. 1996.
Johnson, Scalable and robust internetwork routing for mobile hosts, Proceedings of the 14th International Conference on Distributed Computing Systems, Jun. 21, 1994.
Johnson, Scalable Support for Transparent Mobile Host Internetworking, Wireless Networks, vol. 1, Iss. 3, 1995.
Jones, America Online FAQ for Non-Members, USENET News posting Mar. 11, 1995 (retrieved from google.com) 6 pages.
Kaashoek et al., Efficient Reliable Group Communication for Distributed Systems, Jul. 1992.
Kalkbrenner, et al., Quality of Service (QoS) in Distributed Hypermedia-Systems, Jul. 1995, IEEE, v 10-8186-7180, pp. 529-534.
Kausar, et al., A Charging Model for Sessions on the Internet, European conference on Multimedia Applications, Services and Techniques, Department of Computer Science, University College London, 1999. pp. 246-261.
Katz, The Bay Area Research Wireless Access Network (BARWAN), Proceedings of the 279 KATZ, The Bay Area Research Wireless Access Network (BARWAN), Proceedings of the 41 st IEEE International Computer Conference, Feb. 25-28, 1996.
Kent et al., RFC 2401—Security Architecture for the Internet Protocol, Network Working Group, Nov. 1998.
Kleinrock, L.: "Nomadicity in the NII", Computer Science Department, UCLA, Los Angeles, CA; Cross-Industry Working Team Papers & Reports, Pub. Date: Jun. 1995.
Kleinrock, L.: "Nomadic Computing", Computer Science Department, UCLA, Los Angeles, CA; Information Network and Data Communication' IFIP/ICCC International Conference on Information Network and Data Communication Pub. Date: Jun. 1996, Trondheim, Norway.
Kleinrock, L.: "Nomadicity: Anytime, Anywhere in a Disconnected World", Computer Science Department, UCLA, Los Angeles, CA; Mobile Network and Applications, Special Issue on Mobile Computing and System Services Pub. Date Dec. 1996, vol. 1, Issue 4.
Kleinrock, L.: "Nomadic Computing—An Opportunity", Computer Science Department, UCLA, Los Angeles, CA; ACM SIGCOMM, Computer Communications Review, Pub. Date: Jan. 1995, vol. 25, Issue 1.
Kleinrock, L.: "Nomadic Computing" (Keynote address) *Int'l Conf. on Mobile Computing and Networking*, Nov. 1995, Berkley, California, ACM.
Koblas, Socks, Proceedings of the Third USENIX UNIX Security Symposium (Baltimore, MD: USENIX Association), Sep. 1992.
Kostick, Building a Linux Firewall (Linux Journal 24), Apr. 1, 1996.
Kostick, C.: "IP Masquerading with Linux", Linux Journal Issue 27, Jul. 1996 ("Kostic96") See http://delivery.acm.org/10.1145/330000/325560/a3-kostick.html?key1=325560&key2=59 . . . Oct. 16, 2008.
Kostick, "System Administration, IP Masquerading Code Follow-up, vol. 1997, Iss. 43, Nov. 1997 (This is a follow-up article to the author's 'IP Masquerading with Linux', in Linux Journal Issue 27)".
Kruus, Peter S., A Survey of Multicast Security Issues and Architectures, 1998.
Kuri, Jurgen, Gruppenreise Ins Internet Gemeinsamer Internet—Zugang durch das LAN, 1998.
Kunzinger, Network Layer Mobility: Comparison of CDPD and Mobile-IP, IBM Technical Report 29.2003, 1995.
La Porta, Challenges for nomadic computing: Mobility management and wireless communications, Mobile Networks and Applications, vol. 1, Iss. 1, Aug. 1996.
Lain Langdon, Education for Changing Times—An Online Learning Framework, Oct. 15, 1996.
Layer 2 Tunneling Protocol; Internet, Online!; XP002175644; Retrieved from the Internet: URL:www.cisco.com (retrieved on Aug. 22, 2001); 1998; Cisco Systems, Inc.
Lear, RFC 1627, Network 10 Considered Harmful, Jul. 1994.

Lee, Adaptive Network Support for Mobile Multimedia, Proceedings of the 1st annual international conference on Mobile computing and networking, Nov. 13, 1995.
Leech, RFC 1928; SOCKS Protocol Version 5, Mar. 1996.
Leu, Implementation considerations for Mobile IP, Proceedings of the 21st International Computer Software and Applications Conference, Nov. 11, 1997.
Levene, Mark and Loizou, George, A Guided Tour of Relational Databases and Beyond, Springer-Verlag London Limited, Great Britain, 1999.
Leveridge, Campus World and BT's On-Line Education Services, BT Technology Journal, Apr. 1997.
Li and Leung, Supporting Personal Mobility for Nomadic Computing Over the Internet, ACM SIGMOBILE Mobile Computing and Communications Review, Apr. 1997.
Lin, An Architecture for a Campus-Sized Wireless Mobile Network, Ph.D. Thesis, Dec. 1996.
Lioy, Providing TCP-Level Services to Mobile Computers, M.S. Thesis, 1997.
Liu, D.: "Automatically Configure a System to Route Internet Traffic to a Proxy," originally disclosed y IBM on Apr. 1, 1999 UTC, RD v42 n420 Apr. 1999 article 42099.
Livingston Enterprises, Inc., ChoiceNet Administrator's Guide, Jan. 1997, Pleasanton, CA, available at http://portmasters.com/tech/docs/pdf/choice.pdf.
Lo et al., IETF Internet-Draft—Realm Specific IP: A Framework, Internet Engineering Task Force, Feb. 1999.
Loeb, S.: "Interactive Billing for Broadband and Multimedia Services," Community Networking, 1995. Pub. Date: Jun. 20-22, 1995, Princeton, NJ.
Loon, Alleviating the Latency and Bandwidth Problems in WWW Browsing, Proceedings of the USENIX Symposium on Internet Technologies and Systems on USENIX Symposium on Internet Technologies and Systems, Dec. 8, 1997.
Luotonen. A. et al.; World-Wide Web Proxies; Apr. 1994; 8 pages.
MacEachern, D.; Apache/Perl Integration Project; README; 2 pages; <http://svn.apache.org/viewvc/perl/modperl/branches/1.x/README?revision=176423>, Dec. 6, 1997.
Maciel, Dynamic Gateways: a novel approach to improve networking performance and availability on parallel servers, Apr. 21, 1998.
Make users go thru login, Available at http://www.microsoft.public.inetserver.iis.activeserverpages.html(visited Oct. 5, 2005 but including items dated Jan. 19, 1998).
Macker, Mobile Ad Hoc Networking and the IETF, ACM SIGMOBILE Mobile Computing and Communications Review, vol. 3, Iss. 1, Jan. 1999.
Major telecom Company Launches Education Internet Service for Schools, Sep. 20, 1995.
Making the Most of Home pages, E-mail, The Internet and Presentation Graphics, The Journal, Aug. 1, 1998.
Malkin, G.; Dial-in Virtual Private Networks Using Layer 3 Ttunneling; Proceedings of the Conference on Local Computer Networks, XX, XX; Nov. 2, 1997; pp. 555-561; XP002084438.
Maltz, David A. and Pravin Bhagwat, "MSOCKS: An Architecture for Transport Layer Mobility," Proceedings of the 17th Annual Joint Conference of the IEEE Computer and Communications Societies (INFOCOM '98), Mar. 29, 1998, pp. 1037-1045.
Manuel Gunter, Virtual Private Networks over the Internet, Aug. 3, 1998.
Maruyama et al, "A secure LAN sockets system for everyone which need not modify existing DHCP clients", Study Report of Information Processing Society of Japan, Jul. 16, 1999, vol. 99, No. 56, pp. 131-136.
McKinley, R., Prepaid Internet Access Cards, http://www.cardtrak.com/news/1997/07/14/prepaid_internet_access_cards, CardTrak.com, Jul. 14, 1997, 1 page.
Messmer, "Gateway Handles Thorny Problems with Addressing IP Networks", Network World, p. No. 8, Nov. 28, 1994.
Messmer, New room-service fare: High-speed Internet access, Dec. 7, 1998.
Metz, C.: "AAA Protocols; Authentication, Authorization, and Accounting for the Internet," Internet Computing, IEEE, vol. 3, No. 6, pp. 75-79, Nov./Dec. 1999.

(56) References Cited

OTHER PUBLICATIONS

Michard, A. et al.; The Aquare/le resource discovery system; Computer Networks and ISDN Systems; 1998; pp. 1185-1200; vol. 30, NR. 13; North Holland Publishing; Amsterdam, NL; XP004147404; ISSN: 0169-7552.
Microsoft TechNet: Dial-Up Networking and Mobile Computing: The Basics, http://technet.microsoft.com/en-us/library/cc751107, 2010.
Microsoft WindowsNT ResourceKit, Version 4.0, Supplement One, Microsoft Press, 1997.
Microsoft WindowsNT Workstation ResourceKit: Comprehensive Resource Guide and Utilities for Windows NT Workstation Version 4.0, Microsoft Press, 1996.
Microsoft Computer Dictionary, Fourth Edition, Microsoft Press, 1999.
Moby Dick, The Mobile Digital Companion, LTR 20422, Jul. 1997.
Mockapetris, P.; Domain Names—Concepts and Facilities; Nov. 1987; 49 pages; Network Working Group, Request for Comments 1034.
Mod . . . perl.c; Copyright;1995-1997 The Apache Group; 20 pages.
Mogul, RFC 950; Internet Standard Subnetting Procedure, Network Working Group, Aug. 1985.
Moore, Campus World, 1998.
Myles, Comparison of Mobile Host Protocols for IP, Apr. 14, 1993.
Mysore, A New Multicasting-based Architecture for Internet Host Mobility, Sep. 26, 1997.
Nelson, Context-Aware and Location Systems, Jan. 1998.
NetGame Ltd. Announces its High-Speed, In-Room Hotel Internet Access Product to be Displayed at HITEC 99, Jun. 16, 1999, Business Wire.
Network Working Group Request for Comments: 1009—Requirements for Internet Gateways (Jun. 1987).
Network Working Group Request for Comments: 1027—Using ARP to Implement Transparent Subnet Gateways (Oct. 1987).
Network Working Group Request for Comments: 1034—Domain Names—Concepts and Facilities (Nov. 1987).
Network Working Group Request for Comments: 1531—Dynamic Host Confirmation Protocol (Oct. 1993).
Network Working Group Request for Comments: 1919—Classical Versus Transparent IP Proxies (Mar. 1996).
Network Working Group Request for Comments: 1945—Hypertext Transfer Protocol—HTTP/1.0 (May 1996).
Network Working Group Request for Comments: 826—Ehternet Address Resolution Protocol (Nov. 1982).
Network Working Group Request for Comments: 894—Standards for Transmission of IP Datagrams Over Ethernet Networks (Apr. 1984).
Network Working Group Request for Comments: 925—Mutli-LAN Address Resolution (Oct. 1984).
Networking Working Group, Radius Accounting, Request for Comments: 21 39, Obsoletes: 2059; Category: Informational, C. Rigney, Livingston, Apr. 1997; IP 3 002991-003013.
Neves, Adaptive Recovery for Mobile Enviroments, Communications of the ACM, vol. 40, Iss. 1, Jan. 1997.
Newman, Flow Labelled IP: A Connectionless Approach to ATM, Proceedings of the Conference on Computer Communications (IEEE Infocom), Mar. 24, 1996.
Newton, Harry, Newton's Telecom Dictionary, p. 206, Telecom Books and Flatiron Publishing, Miller Freeman, Inc., New York, NY, 1998.
Nomadix Joins Copper Mountain Networks to Provide High-Speed Internet Access to Hotels Guests, Dec. 6, 1999, Business Wire.
Peine, An Introduction to Mobile Agent Programming and the Ara System, University of Kaiserslautern Technical Report ZRI-Report Jan. 1997.
Perkins, C. E. et al.: "DHCP for mobile networking with TCP/IP" Proceeding IEEE International Symposium on Computer and Communications, Jun. 27, 1995, pp. 255-261, XP002132695.
Perkins, "Providing Continuous Network Access to Mobile Hosts Using TCP/IP." Computer Networks and ISDN Systems, Nov. 1993.
Perkins, A Mobile Networking System Based on Internet Protocol (IP) in USENIX Symposium on Mobile and Location-Independent Computing, Aug. 2, 1993.
Perkins, C. E. ED—Insitute of Electrical and Electronics Engineers: "Mobile-AP, Ad-Hoc Networking, and Nomadicity" Proceedings of the 20th Annual International Computer Software and Applications Conference (COMPSAC). Seoul, Aug. 21-23, 1996, Proceedings of the Annual International Computer Software and Applications Conference (COMPSAC), Los Alamitos, IEEE COMP, vol. Conf. 20, Aug. 21, 1996, pp. 472-476, XO 000684381, ISBN 0-8186-7579-9.
Perkins, C.E., et al.: "A Mobile Networking System Based on Internet Protocol", Pers+B296onal Communications, IEEE< Pub. Date: 1st Qtr 1994, vol. 1, Issue 1.
Perkins, Highly Dynamic Destination-Sequenced Distance-Vector Routing (DSDV) for Mobile Computers, ACM SIGCOMM Computer Communication Review, vol. 24, Iss. 4, Oct. 1994.
Perkins, Internet Mobile Host Protocol (IMHP), Jun. 13, 1994.
Perkins, Mobile IP; Communications Magazine, IEEE vol. 35, Issue 5, May 1997.
Perkins, Mobile Networks and Applications, vol. 3, Issue 4, 1999; Special Issue: mobile networking in the Internet, pp. 319-334; 1998; ISSN:1383-469X; Kluwer Academic Publishers Hingham, MA.
Perkins, Mobile networking through Mobile IP, IEEE Internet Computing, Jan. 1998.
Perkins, Mobile-IP, Ad-Hoc Networking, and Nomadicity; Proceedings of the 20th Annual International Computer Software and Applications Conference (COMPSAC), Seoul, Aug. 21, 1996.
Perkins, RFC 2002: IP Mobility Support, Oct. 1996.
Perkins, Mobility Support in IPv6, Proceedings of the 2nd annual international conference on Mobile computing and networking, Nov. 10, 1996.
Perkins, et al., Resource discovery protocol for mobile computing, Mobile Networks and Applications 1 (1996) 447-455.
Person, et al., Using Windows 95, Platinum Edition, pp. 205-209,812-813, Que Corporation, 1996.
Pissinou, A middleware-based architecture to support transparent data access by mobile users in heterogeneous environments, Research Issues in Data Engineering, Feb. 28, 2000.
Pitoura, Building Information Systems for Mobile Environments, Proceedings of the third international conference on Information and knowledge management, Nov. 29, 1994.
Pitoura, Dealing with Mobility: Issues and Research Challenges; Purdue University Computer Science Department Technical Report CSD-TR-93-070, Nov. 1993.
PIX, Network Translation Inc., Private Internet Exchange (PIX) Technical White Paper (Network Address Translation and the Private Internet Exchange, 1994.
PIX Network Translation Inc., Private Internet Exchange (PIX) Technical White Paper, May 16, 1995.
PIX, Network Translation Inc., Private Internet Exchange Reference Manual, Oct. 5, 1995.
Plummer, D., An Ethernet Address Resolution Protocol or Converting Network Protocol Addresses to 48.bit Ethernet Address for Transmission on Ethernet Hardware; Nov. 1982; 8 pages; Network Working Group, Request for Comments 826.
Poger, Secure Public Internet Access Handler (SPINACH), Proceedings of the USENIX Symposium on Internet Technologies and Systems, Dec. 8, 1997.
Polydorou, Performance Analysis and Comparison of Two Wireless Wide Area Networks, Dec. 1996.
Poslad, Software Agents for Future Communication Systems—Chapter 9: Agent-Oriented Middleware for Integrating Customer Network Services, 1999.
Postel, J.; Multi-Lan Address Resolution; Oct. 1984; 14 pages; Network Working Group, Request for Comments 925.
Postel, RFC 793, Transmission Control Protocol, Sep. 1981.
Rajagopalan, An Adaptive Location Management Strategy for Mobile IP, Proceedings of the 1st annual international conference on Mobile computing and networking, Nov. 13, 1995.
Rajagopalan, Mobile Internetworking Protocols for Wireless Networks with ATM Backbones, MILCOM '97 Conference Proceedings, Nov. 2, 1997.

(56) References Cited

OTHER PUBLICATIONS

Rao, A Proxy-Based Personal Portal, Proceedings of the WebNet99 Conference, Hawaii, Oct. 1999, p. 913.

Rao, iProxy: A Programmable Proxy Server, Poster Proceedings of the WebNet99 Conference, Oct. 1999, p. 1676.

Rao, A Proxy-Based Personal Web Archiving Service, ACM SIGOPS Operating Systems Review, Jan. 2001.

Redi, Mobile IP: A Solution for Transparent, Seamless Mobile Computer Communications, Upcoming Trends in Mobile Computing and Communications, Jul. 1998.

Rekhter, RFC 1597, Address Allocation for Private Internets, Mar. 1994.

Rekhter, RFC 1918, Address Allocation for Private Internets, Feb. 1996.

Richards, et al., A Platform for Determining How People Value the Quality of their Internet Access, Sixth IEEE/IFIP, May 1998, pp. 85-90.

Richards, et al., Mapping User Level QOS from a Single Parameter, 1988, pp. 1-15.

Rigney, C., Radius Accounting, Network Working Group, Request for Comments: 2139, Apr. 1997.

Rigney, RFC 2138, Remote Authentication Dial in User Service (RADIUS), Apr. 1997.

Rigney, RFC 2058, Remote Authentication Dial in User Service (RADIUS), Jan. 1997.

Rigney, RFC 2059, RADIUS Accounting, Jan. 1997.

Rizzo, A Dynamic Pricing Framework to Support a Scalable, Usage-based Charging Model for Packet-switched Networks, May 7, 1999.

Robinet, An implementation of a gateway for hierarchically encoded video across ATM and IP networks, Proceedings of the IFIP TC-6 Eigth International Conference on High Performance Networking, Sep. 21, 1998.

Rowe, Reliability of WWW Name Servers, Computer Networks and ISDN Systems, Apr. 1995.

Rupp, Index: A Platform for Determining how People Value the Quality of their Internet Access, Index Project Report #98-010P, May 1998.

Sandhu et al., Decentralized Group Hierarchies in UNIX: An Experiment and Lessons Learned, Oct. 1998.

Sato, Yutaka: "Details of Functions of Multi-purpose Proxy Server DeleGate-Access/Route Conrol and Protocol Conversion", Interface vol. 21, No. 9, p. 130-146, Sep. 1995.

Scale, How to Cost-Effectively Scale Web Servers, Packet Magazine, Third Quarter, 1996.

Schilit, A System Architecture for Context-Aware Mobile Computing, Ph.D. Thesis, May 1995.

Schoen, et al., "Convergence Between Public Switching and the Internet", published Sep. 21, 1997 in World Telecom Congress Proceedings, pp. 549-560.

Schooler, A Distributed Architecture for Multimedia Conference Control, Nov. 1991.

Shamsuddin, Positioning of Wireless Broadband, Jun. 1996.

Short, Joel E.: "Auto-Porting and Rapid Protyping with Application to Wireless and Nomadic Network Algorithms, A dissertation submitted in partial satisfaction of the requirement for the degree of Doctor of Philosophy in Computer Science," University of California, Los Angeles, Published Oct. 26, 1996; pp. xv, 118-124; Co+B343pyright Jan. 16, 1977.

Short, Mobile Wireless Network System Simulation, Wireless Networks, vol. 1, Iss. 4, Nov. 1995.

Shreedhar, M. et al.; Efficient Fair Queuing Using Deficit Round Robin; Proceedings of the International Workshop on Community Networking; XX, XX, Aug. 1, 1995; pp. 231-242; XP000541659.

Sietmann, R.; "Tatifmodelle gegen staus auf der infobahn", (Apr. 1998). Funkschau, DE, Franzis-Verlag K. G. Munchen, vol. 71, NR. 8 pp. 28-30; XP000779238; ISSN: 0016-2841.

Simpson and Weiner, The Oxford English Dictionary, 2nd Edition, vol. III, pp. 514-515, Oxford University Press, 1989.

Simpson and Weiner, The Oxford English Dictionary, 2nd Edition, vol. VII, p. 881, Oxford University Press, 1989.

Single-User Network Access Security TACACS+ http://www.cisco.com/warp/public/614/7.html IP3 002876-002884; dated Aug. 10, 2005.

Smith, M. et al., Network Security Using NAT and NAPT; Aug. 2002; pp. 355-360; 10th IEEE International Conference; XP-002246149.

Smoot, Carl-Mitchell, et al., "Using ARP to Implement Transparent Subnet Gateways", RFC 1027, Oct. 1987.

Srisuresh et al., RFC 2663—IP Network Address Translator (NAT) Terminology and Considerations, Network Working Group, Aug. 1999.

Srisuresh, P. et al., TraditionalIP Network Address Translator (Traditional NA 7); Jan. 2001; 16 pages; The Internet Society; XP•002227044.

Stevens, ARP: Address Resolution Protocol; TCP Illustrated, 1994.

Stevens, R, TCP Connection Handshake, 1994.

Stevens, W. R.; TCP/IP Illustrated, vol. 1—The Protocols; Addison-Wesley Professional Computing Series; pp. 53-62 and 231-235 (Printed Jul. 2001).

Stewart, J. N., Working with Proxy Servers; Mar. 1997; pp. 19-22; WebServer Magazine.

Sudan, Gateway Based Approach for Conducting Multiparty Multimedia Sessions over Heterogeneous Signaling Domains, Proceedings of the INFOCOM '97 Sixteenth Annual Joint Conference of the IEEE Computer and Communications Societies, Apr. 9, 1997.

Tanenbaum, Andrew S.: "Computer Networks", 1996, pp. 420-24, 3rd edition, prendice Hall of India, New Delhi, India.

Taylor, Internetwork Mobility the CDPD Approach, Jun. 11, 1996.

Team Internet Technical Specifications, Infomine Network Solutions and Services, Helena, Montana, Sep. 7, 1998.

Tennenhouse, D. L., Jonathan M. Smith, W. David Sincoskie, David I. Wetherall, Gary J. Minden; A Survey of Active Network Research; IEEE Communications Magazine; Jan. 1997; pp. 80-86; IEEE.

Teraoka, A Network Architecture Providing Host Migration Transparency, ACM SIGCOMM Computer Communication Review, Sep. 1991.

Teraoka, Host Migration Transparency in IP Networks: The VIP Approach; ACM SIGCOMM Computer Communication Review, vol. 23, Iss. 1, Jan. 1993.

Teraoka, VIP: A Protocol Providing Host Mobility, Communications of the ACM, Aug. 1994.

The 'Security Digest' Archives, TCP-IP Distribution List, Aug. 1994, http://securitydigest.org/tcp-ip/archive/1994/08.

The Independent, Hardware hustle hits the classroom, May 20, 1996.

Thomsen, Mobile Agents—The new paradigm in computing, ICL Systems Journal, vol. 12, Issue 1, pp. 14-40, May 1997.

TIS Firewall Toolkit Overview, Jun. 30, 1994.

Troy, Timothy N., "Servicing with Software," Hotel & Motel Management, Sep. 20, 1993, p. 28, vol. 208, No. 16, Advanstar Communications, Inc.

Tsuchiya et al., Extending the IP Internet Through Address Reuse, ACM SIGCOMM Computer Communication Review, 1993.

Tut Systems Launches Hotel Internet Management System, PublicPort(TM) Latest Addition to Multi-Tenant Unit Product Line Allows Hotel Owners to Use Existing Copper Infrastructure to Provide 'Plug and Play' Internet Services, Jun. 23, 1999.

Universal Subscriber Gateway, Nomadix, Inc. 2701 Ocean Park Blvd., Suite 231, Santa Monica, California 90405; 1999.

USG Product Timeline, Nomadix, Inc. 2701 Ocean Park Blvd., Suite 231, Santa Monica, California 90405; 1999.

Valencia, RFC 2341, Cisco Layer Two Forwarding (Protocol) "L2F", May 1998.

Varaiya, INDEX Project Proposal—Executive Summary,INDEX Project Report #98-005P, Aug. 6, 1996.

Venema, TCP Wrapper; Network monitoring, access control, and booby traps, Proc. Of the Third Usenix UNIX Security Symposium, USENIX Association, Sep. 1992.

Vos, Jos and Willy Konijnenberg, Linux Firewall Facilities for Kernel-level Packet Screening, Nov. 18, 1996, 19 pages.

Wahl, RFC 2256, A Summary of the X.500(96) User Schema for use with LDAPv3, Dec. 1997.

Webb, Automatic Redirection, Jun. 8, 1997.

(56) References Cited

OTHER PUBLICATIONS

Wessels, D.; Squid Proxy Server Configuration File 1.93.2.2, "TAG deny_info"; Mar. 1997; 19 pages; available at <http://www.squid-cache.org/mail-archieve/squid-users/199703/att0250/squid.conf> ; (visited Feb. 1, 2005).
Windows History: Windows Desktop Timeline, Jun. 30, 2003, available at http://www.microsoft.com/windows/WinHistoryProGraphic.mspx on Jan. 21, 2010, Microsoft, pp. 1-2.
Xylomenos, IP Multicast for Mobile Hosts, IEEE Communications Magazine, vol. 35, Iss. 1, Jan. 1997.
Yang, C., Jiing-Ching Yang, Kun-Da Wu, Jian-Xing Lee, Yuh-Rong Leu; An Efficient Multicast Delivery Scheme to Support Mobile IP; Proceedings of the 10th International Workshop on Database and Expert Systems Applications; 1999; 6 pages; IEEE Computer Society, Washington DC.
Yeom, IP Multiplexing by Transparent Port-Address Translator, USENIX Tenth System Administration Conference, Sep. 29, 1996.
Yokoi, T. et al., Internet Quality & Traffic Management (III), The Journal of the Institute of Electronics, Information and Communication Engineers, 2000, Jan. 2005, vol. 83, No. 1, pp. 57-63.
Zhao, Flexible Connectivity Management for Mobile Hosts, Stanford University Technical Report No. CSL-TR-97-735, Sep. 1997.
Zhao, et al., International Conference on Mobile Computing and Networking; Proceedings of the 4th annual ACM/IEEE international conference on Mobile computing and networking; pp. 145-156; ACM Press New York, NY; 1998.
U.S. Appl. No. 60/072,175 by Brothers, filed Jan. 22, 1998.
U.S. Appl. No. 60/084,014, filed May 4, 1998; In re: Ikudome; entitled "User Specific Automatic Web Redirection System".
U.S. Appl. No. 09/295,966, filed Apr. 21, 1999.
U.S. Appl. No. 10/919,214, filed Aug. 16, 2004—file history of U.S. Publication No. 2005-0021943, published Jan. 27, 2005.
U.S. Appl. No. 11/645,924, filed Dec. 26, 2006—file history of U.S. Publication No. 2007-0294417, published Dec. 20, 2007.
U.S. Appl. No. 11/375,740, filed Mar. 14, 2006—file history of U.S. Publication No. 2006-0174019, published Aug. 3, 2006.
U.S. Appl. No. 60/111,497 by Kleinrock, filed Dec. 8, 1998.
U.S. Appl. No. 09/458,602, filed Dec. 8, 1999.
Office Action in U.S. Appl. No. 09/458,602 mailed Aug. 26, 2011.
Office Action in U.S. Appl. No. 12/685,585 mailed Nov. 4, 2011.
Office Action in U.S. Appl. No. 12/875,043 mailed Sep. 9, 2011.
Request for Reexamination of U.S. Pat. No. 6,636,894, filed Nov. 18, 2011, Control No. 95/001,831, 191 pages including Exhibits CC-A through CC-I.
Decision of Rejection, in JP App. No. 2001-533680, Office Action dated Jan. 26, 2010.
Decision of Rejection, in JP App. No. 2001-533680, dated Dec. 14, 2010.
Office Action dated Feb. 15, 2011, JP Patent Application No. 2010-167190.
Extended Search Report dated Oct. 8, 2009, Application No. EP 09005810.8.
Response to Examination Report filed Jun. 7, 2010, Application No. EP 09005810.8.
Office Action dated Apr. 27, 2009, CA Patent Application No. 2,388,623.
Office Action dated Jun. 15, 2010 in CA Patent Application No. 2698604.
Final Office Action dated Jan. 6, 2011, in CA Patent Application No. 2698604.
Office Action dated Sep. 25, 2009, JP Patent Application No. 2001-533719.
Decision of Rejection in JP Patent Application No. 2001-533719 dated Apr. 6, 2010.
Preliminary Report and Office Action with translation, dated Apr. 22, 2011 in JP Application No. 2010-069550.
Notice of Allowance in JP Application No. 2001-533719 entitled "Systems and Methods for Redirecting Users Attempting to Access a Network Site," mailed Jun. 19, 2012.
Decision in Request for Reexamination of U.S. Pat. No. 6,636,894, filed Nov. 18, 2011, Control No. 95/001,831, mailed Dec. 20, 2011, 19 pages.
Comments on the Denial of Petition under 37 C.F.R. §§ 1.181 and 1.927 for Review of the Examiner's Order Denying Inter Partes Reexamination, in Proceeding No. 95/001,831, for U.S. Pat. No. 6,636,894, dated Jun. 26, 2012.
Office Action in U.S. Appl. No. 12/875,043 mailed Dec. 21, 2011.
Decision on Petition under 37 C.F.R. § 1.181 and 1.927, Control No. 95/001,831, mailed Feb. 28, 2012, 15 pages.
Reexamination Certificate for U.S. Pat. No. 6,779,118 (8926th), for User Specific Automatic Data Redirection System, Mar. 27, 2012.
Office Action in U.S. Appl. No. 13/271,099 mailed Apr. 9, 2012.
Office Action in U.S. Appl. No. 13/271,099 mailed Jun. 9, 2012.
Office Action in U.S. Appl. No. 13/271,099 mailed Sep. 10, 2012.
Petition Decision in U.S. Appl. No. 13/271,099 mailed Apr. 16, 2013.
Petition Decision in U.S. Appl. No. 13/271,099 mailed Jun. 12, 2013.
Decision for Granting Request for Prioritized Examination in U.S. Appl. No. 12/685,585 mailed Jun. 12, 2012.
Office Action in U.S. Appl. No. 13/244,866 mailed Nov. 18, 2011.
Office Action in Canadian Application No. 2725720 mailed Apr. 30, 2013.
Decision on Appeal in JP App. No. 2001-533680, dated Aug. 7, 2012.
Office Action dated Jul. 18, 2012 in CA Patent Application No. 2698604.
Preliminary Report of Inquiry Letter in JP Patent Application No. 2001-533719 dated Dec. 26, 2011.
Bestavros, A. and Michael J. Ocean, Chapter 12: "Virtualization and Programming Support for Video Sensor Networks with Application to Wireless and Physical Security," Distributed Video Sensor Networks, 2011, pp. 179-192.
Braden, B. et al., RFC2309 *Recommendations on Queue Management and Congestions Avoidance in the Internet;* Apr. 1998; 13 page; "Online!" IETF, INET XP002210176; available at <URL: http://www.faqs.org/rfcs/rfc2309.html> (retrieved on Aug. 16, 2002).
Korba, Larry, "Security System for Wireless Local Area Networks," Ninth IEEE International Symposium on Personal, Indoor and Mobile Radio Communications, Sep. 8, 1998, pp. 1550-1554.
Lee, Chooi-Tian and J.W. Harris, "Designing a Virtual Access Control Configuration Protocol for Implementation over ISDN and Shared-Media Networks," Proceedings 21st IEEE Conference on Local Computer Networks, Oct. 13, 1996, pp. 116-125.
Salifu, Abdul-Mumin, "Detection of Man-in-the-Middle Attack in IEEE 802.11 Networks," M.S. Thesis, Kwame Nkrumah University of Science and Technology, May 2011, 79 pages.
Stoll, Frank, "The Need for Decentralization and Privacy in Mobile Communications Networks," Computers & Security vol. 14 iss. 6, 1995, pp. 527-539.
Tantawy, Ahmed N. and Martina Zitterbart, "A Scheme for High-Performance LAN Interconnection Across Public MAN's," IEEE Journal on Selected Areas in Communications, vol. 11, No. 8, Oct. 1993, pp. 1133-1144.
US 5,852,325, 12/1998, Reed et al. (withdrawn)

* cited by examiner

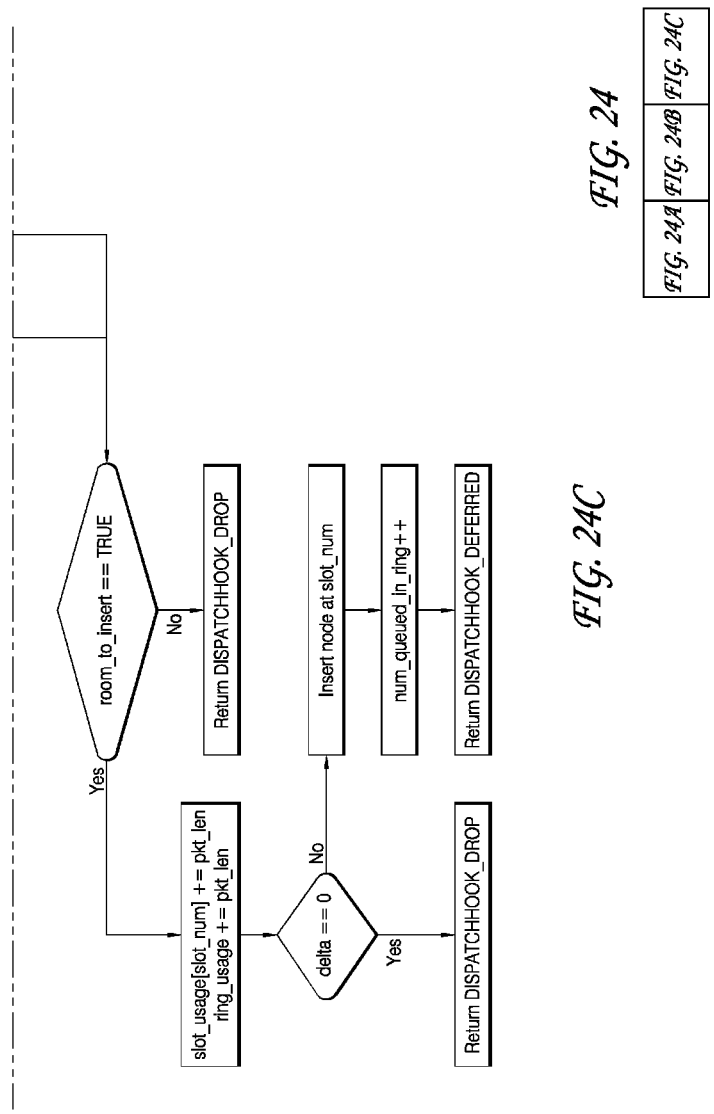

| FIG. 50A | FIG. 50B |

SYSTEMS AND METHODS FOR PROVIDING CONTENT AND SERVICES ON A NETWORK SYSTEM

CROSS-REFERENCE TO RELATED APPLICATIONS

This application is a continuation of U.S. patent application Ser. No. 13/659,851 filed Oct. 24, 2012, which is a continuation of U.S. patent application Ser. No. 13/566,904 filed Aug. 3, 2012, now U.S. Pat. No. 8,364,806, which is a continuation of U.S. patent application Ser. No. 12/685,585, filed Jan. 11, 2010, now U.S. Pat. No. 8,266,266, which is a continuation of U.S. patent application Ser. No. 11/427,143, filed on Jun. 28, 2006, now U.S. Pat. No. 7,689,716, which is a continuation of U.S. patent application Ser. No. 09/693,060, filed on Oct. 20, 2000, now U.S. Pat. No. 7,194,554, which is a continuation-in-part of U.S. patent application Ser. No. 09/458,569, filed on Dec. 8, 1999, now U.S. Pat. No. 6,636,894, titled "Systems And Methods For Redirecting Users Having Transparent Computer Access To A Network Using A Gateway Device Having Redirection Capability," which claims the benefit of the filing date and priority to U.S. Provisional Application Ser. No. 60/111,497 filed on Dec. 8, 1998. U.S. patent application Ser. No. 09/693,060 is also a continuation-in-part of U.S. application Ser. No. 09/458,602, filed Dec. 8, 1999, titled "Systems and Methods For Authorizing, Authenticating and Accounting Users Having Transparent Computer Access To A Network Using A Gateway Device." U.S. application Ser. No. 09/693,060 also claims the benefit of U.S. Provisional Application Ser. No. 60/161,182, filed Oct. 22, 1999, titled "Systems and Methods for Dynamic Bandwidth Management on a Per Subscriber Basis in a Computer Network"; U.S. Provisional Application Ser. No. 60/160,890, filed Oct. 22, 1999, titled "Systems and Methods for Creating Subscriber Tunnels by a Gateway Device in a Computer Network"; U.S. Provisional Application Ser. No. 60/161,139, filed Oct. 22, 1999, titled "Information And Control Console For Use With A Network Gateway Interface"; U.S. Provisional Application Ser. No. 60/161,189, filed Oct. 22, 1999, titled "Systems and Methods for Transparent Computer Access and Communication with a Service Provider Network Using a Network Gateway Device"; U.S. Provisional Application Ser. No. 60/160,973, filed Oct. 22, 1999, titled "Systems and Methods for Enabling Network Gateway Devices to Communicate with Management Systems to Facilitate Subscriber Management"; U.S. Provisional Application Ser. No. 60/161,181, filed Oct. 22, 1999, titled "Gateway Device Having an XML Interface and Associated Method"; and U.S. Provisional Application Ser. No. 60/161,093, filed Oct. 22, 1999, titled "Location-Based Identification and Authorization for use With a Gateway Device." All of the above applications are incorporated by reference in their entirety.

BACKGROUND

1. Field

The present invention relates generally to systems and methods for controlling network access, and more particularly, to systems and methods for establishing dynamic user network access.

2. Background Description

User access to computer networks has traditionally been based upon a two step authentication process that either provides a user total network access, or refuses the user any access whatsoever. In the first step of the process, a user establishes a communication link with a network via a telephone line, dedicated network connection (e.g., Broadband, Digital Signal Line (DSL)), or the like. In the second step of the authentication process, the user must input identification information to gain access to the network. Typically, the input identification information includes a user name and password. Using this information, the network or service provider verifies that the user is entitled to access the network by determining whether the identification information matches subscriber information contained in a subscriber table (or database) that stores identification information for all users authorized to access the network. Where user input information matches subscriber data in the subscriber table, the user is authorized to access any and all services on the network. On the other hand, if the user input identification information fails to match subscriber data in the table, the user will be denied access to the network. Thus, once a user's identity is compared to data stored within a subscription table, the user is either entitled network access, or denied access altogether. Furthermore, where the user is authorized access to the network, the user is typically authorized to access any destination accessible via the network. Therefore, conventional authentication of users is based on an all-or-nothing approach to network access.

In many conventional network access applications, such as in conventional Internet access applications, the subscriber database (or table) not only stores data corresponding to the identity of subscribers authorized to access the network, but also stores information that can vary based upon the particular subscriber. For instance, the subscriber database can include subscriber profiles that indicate the type of access a subscriber should receive, and other related information, such as the fees due by the subscriber for network access. Although information in the subscriber database may vary from user to user, information unique to the database is generally used for billing or network maintenance purposes. For instance, conventional subscriber databases typically include data such as the cost the subscriber is paying for network access, and the amount of time the subscriber has accessed the network. Thus, where a subscriber to an Internet Service Provider (ISP) has purchased Internet access, a source profile database may contain information that enables a user to be authenticated and tracks the user's access for accounting purposes, such as maintaining a log of the user's time on the network.

Additionally, in conventional network access systems, in order for a user to connect to on-line services (e.g., the Internet), the user must install client side software onto the user's computer. Client side software is typically provided by a network administrator or network access provider, such as an ISP with whom the user has subscribed for Internet access, and enables the client to configure his or her computer to communicate with that network access provider. Continuing with the illustrative example of a user accessing the Internet via an ISP, the user must install ISP software on the client computer, and thereafter establish an account with the ISP for Internet access. Typically, a user subscribes to an ISP, such as AMERICA ONLINE™, EARTHLINK™, COMPUSERVE™ or the like, by contracting directly with the ISP for Internet access. Usually, the user pays for such Internet access on a monthly fixed fee basis. Regardless of the user's location, the user may dial up an access number provided by the ISP and obtain Internet access. The connection is often achieved via a conventional telephone modem, cable modem, DSL connection, or the like.

Because users accessing networks through conventional methods, such as through ISPs, are either allowed or denied access to a network in an all or nothing approach, users cannot be dynamically authorized access to a network such that the user's access and authorization to particular networks or sites is customizable. What is needed is a method and system that allows users dynamic and customizable access that may vary based upon any number of variables associated with a user, such as a user location, user name or password, user computer, or other attributes. For example, it would be advantageous for some users to be authorized access to all Internet sites, while others may be denied access to particular sites. In addition to authorizing user access to a network, it would be advantageous for a network, such as an ISP or enterprise network, to selectively permit users a range of authorization, such that the user's access is not based upon an all or nothing approach.

In addition, user digital communications addresses such as internet or IP addresses are conventionally associated with a fixed physical location, such as a user's business telephone line. However, portable communications devices such as laptop computers are becoming increasingly popular, and it is common for a user to access the internet from locations as diverse as hotel rooms and airplanes.

Digital communications networks are set up to route communications addressed to a communication address to the associated physical location. Thus, if a laptop computer is connected to a remote location, communications to and from the computer will not be associated with the user's communications address.

In order for a computer (host) to communicate across a network (e.g., the internet), software protocols (e.g., Transport Control Protocol/Internet Protocol (TCP/IP)) must be loaded into the host. A host computer sends information (i.e., packets of data) to devices on the network (routers) which receive the packets and send the packets back to the destination host.

The destination host will route replies back using a similar process. Each host computer and router must be configured so it will know who to send the packets of data to. A router will receive the packets only if the host computers specifically send (address) the packets to that router. If a host is configured incorrectly (bad address), then the host computer and router will be unable to communicate.

With the advent of mobile computers (laptops) and the desire to plug them into various networks to gain access to the resources on the network and internet, a mobile computer must be configured for each network it plugs into. Traditionally this new configuration can be done either (i) manually in software on the mobile computer (usually causing the mobile computer to be restarted to load in the new configuration), or (ii) with a new set of protocols which must be utilized on the mobile computer to obtain the configuration information from a device on the network to which the computer is being connected. When new services (protocols) are created to add functionality to the host computers, these new protocols must be updated in the host computers or routers, depending upon the type of new functionality being added.

SUMMARY

In one innovative aspect, a method for granting access to a computer network is provided. The method includes receiving at an access controller a request to access the network from a source computer, the request including a transmission control protocol (TCP) connection request having a source IP address and a destination IP address. The method further includes determining by the access controller whether the source computer must login to access the network. The determining includes comparing the source IP address with profiles of authorized source devices, each profile including an IP address, wherein if the source IP address is included in a profile of an authorized source device, the source device is granted access without further authorization. The determining also includes, if the source IP address is not included in a profile associated with an authorized source device, then determining whether the destination IP address is included in a plurality of destination IP addresses associated with the access controller, wherein if the destination IP address is included in the plurality of destination IP addresses, the source device is granted access without further authorization. The determining further includes, if the destination IP address is not included in the plurality of destination IP addresses, then the access controller determines the source device must be authorized to access the network and provides the source device with a login page. The method further includes using the access controller to authenticate credentials provided from the source device via the login page. The method also includes authorizing the source device access to the network if the provided credentials are authenticated.

In a further innovative aspect, a system for providing network access to a source device is provided. The system includes an access controller configured to receive a request to access the network from the source device, the request including a transmission control protocol (TCP) connection request having a source IP address and a destination IP address, the access controller further configured to redirect the source device to a login page if it is determined that authentication is required prior to network access being granted. The authentication is based on comparing the source IP address with profiles of authorized source devices, each profile including an IP address, wherein if the source IP address is included in a profile of an authorized source device, the source device is granted access without further authorization, and if the source IP address is not included in a profile associated with an authorized device, then determining whether the destination IP address is included in a plurality of destination IP addresses associated with the access controller, wherein if the destination IP address is included in the plurality of destination IP addresses, the source device is granted access without further authorization, and if the destination IP address is not included in the plurality of destination IP addresses, then the access controller authorizes network access to the computing device after authenticating user credentials received from the source device via the login page have been authenticated.

Further aspects of the invention include systems and methods for providing location-based content to a client computer connected to a system, such as a gateway system, via a network. The network may include an intermediary network device between the client computer and the system. The system receives a request for content from the client computer, and it produces alternate content based in part on a physical location identifier received in association with the request for content and transmits the alternate content to the client device in response to the request for content. The alternate content may differ from the requested content. The physical location identifier may originate from the intermediary network device. The physical location may be, among other things, a room in a hotel, a type of room in a hotel, a suite, a room in an office, a terminal in an airport, an airplane, a building, a multi-unit residence, a part of a multi-unit residence, a unit in a multi-unit residence, a wing of a building, or a retail outlet.

An aspect of the invention is a method of managing network access of a client computer connected to a network management system. The method includes receiving one or more data packets from a client computer, the one or more data packets comprising a request for network content from an external server; determining authorization rights associated with the client computer, the authorization rights indicating whether the client computer is entitled to access the requested network content, the authorization rights being based on a user profile selected from a user profile database communicatively connected to the network management system; producing, if the determined authorization rights indicate that the client computer is not entitled to access the requested network content, a redirection response configured to cause the client computer to initiate a request for network content at a network location different from the request for network content from the external server, the redirection response configured to indicate to the computer that the redirection response originated from the external server; and transmitting the redirection response to the client computer in response to the request for network content.

These and other features and advantages of the present invention will be apparent to those skilled in the art from the following detailed description, taken together with the accompanying drawings, in which like reference numerals refer to like parts unless the context indicates otherwise.

BRIEF DESCRIPTION OF THE DRAWINGS

FIGS. 17A-B are a block diagram of a gateway device in accordance with an embodiment of the present invention.

FIGS. 20-23 and 24A-C are detailed flowchart diagrams of a method for bandwidth management in accordance with an embodiment of the present invention, wherein the steps are written in pseudo code.

DETAILED DESCRIPTION

Figure 1:
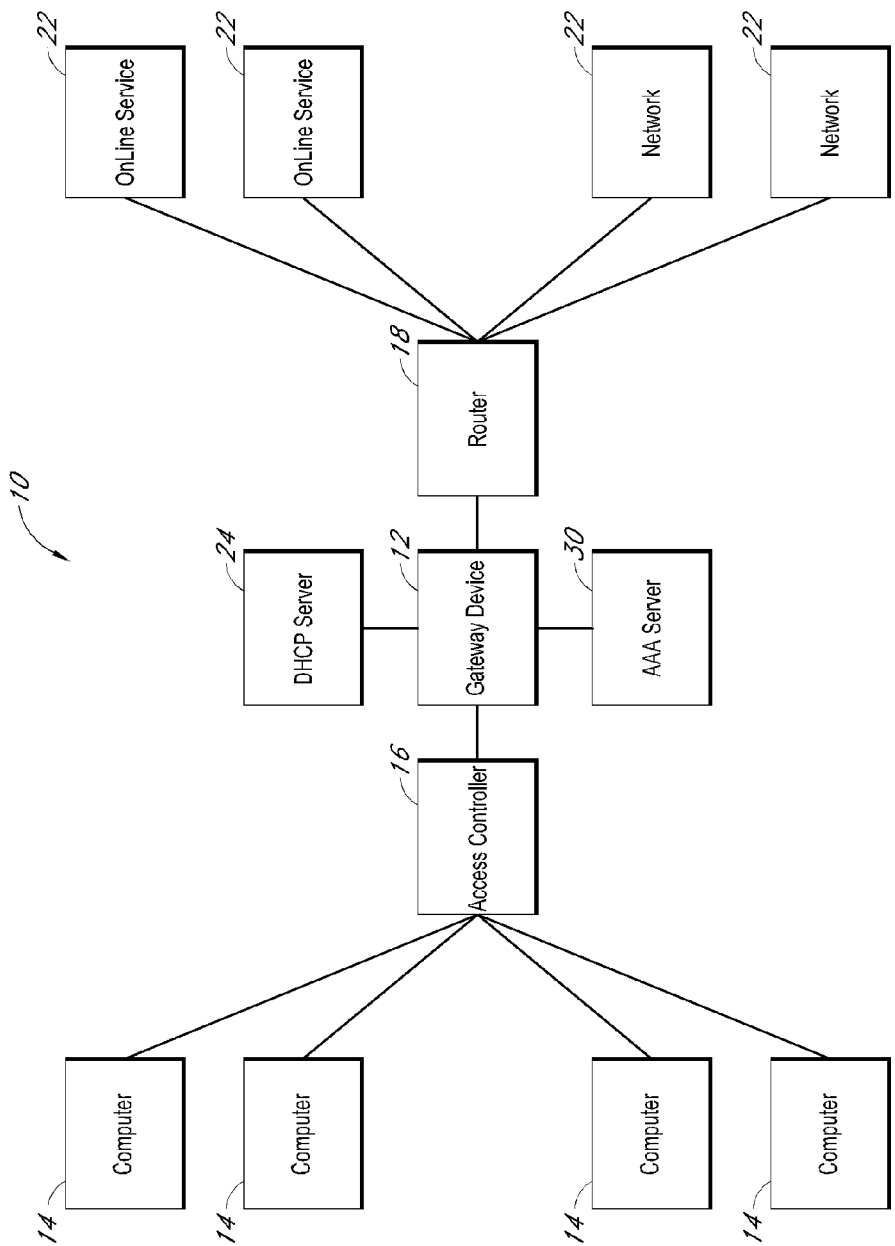
FIG. 1 is a block diagram of a computer system that includes a AAA server for authenticating, authorizing and accounting sources accessing networks and/or online services, according to one embodiment of the present invention.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

The present invention includes a method and system for selectively implementing and enforcing Authentication, Authorization and Accounting (AAA) of users accessing a network via a gateway device. According to the present invention, a user may first be authenticated to determine the identity of the user. The authentication capability of the system and method of the present invention can be based upon a user ID, computer, location, or one or more additional attributes identifying a source (e.g., a particular user, computer or location) requesting network access. Once authenticated, an authorization capability of the system and method of the present invention is customized based upon the identity of the source, such that sources have different access rights based upon their identity, and the content and/or destination requested. For instance, access rights permit a first source to access a particular Internet destination address, while refusing a second source access to that same address. In addition, the authorization capability of the system and method of the present invention can be based upon the other information contained in the data transmission, such as a destination port, Internet address, TCP port, network, or similar destination address. Moreover, the AAA of the present invention can be based upon the content type or protocol being transmitted. By authenticating users in this manner, each packet can be filtered through the selective AAA process, so that a user can be identified and authorized access to a particular destination. Thus, each time the user attempts to access a different destination, the user is subject to the AAA, so that the user may be prevented access from a particular site the AAA system and method deem inaccessible to the user based upon the user's authorization while permitting access to other sites that the AAA method and system deem accessible. Additionally, according to one embodiment of the invention, source access to the network may be tracked and logged by the present invention for accounting and historical purposes.

According to one embodiment of the invention, there is disclosed a method for selectably controlling and customizing source access to a network, wherein the source is associated with a source computer, and wherein the source computer has transparent access to the network via a gateway device and no configuration software need be installed on the source computer to access the network. The method includes receiving at the gateway device a request from the source computer for access to the network, identifying an attribute associated with the source based upon a packet transmitted from the source computer and received by the gateway device, and accessing a source profile corresponding to the source and stored in a source profile database, wherein the source profile is accessed based upon the attribute, and wherein the source profile database is located external to the gateway device and in communication with the gateway device. The method also includes determining the access rights of the source based upon the source profile, wherein access rights define the rights of the source to access the network.

According to one aspect of the invention, determining the access rights of the source based upon the source profile includes determining the access rights of the source based upon the source profile, wherein the access rights define the rights of the source to access a requested network destination.

According to another aspect of the invention, the method includes assigning a location identifier to the location from which requests for access to the network are transmitted, and the location identifier is the attribute associated with the source. Furthermore, according to the invention, accessing a source profile corresponding to the source can include accessing a source profile stored in a source profile database, where the source profile database includes a remote authentication dial-in user service (RADIUS), or a lightweight directory access protocol (LDAP) database.

According to yet another aspect of the invention, the method includes updating the source profile database when a new source accesses the network. Additionally, the method can include maintaining in the source profile database a historical log of the source's access to the network. Moreover, the attribute associated with the source can be based upon a MAC address, User ID or VLAN ID associated with the source computer from which the request for access to the network was transmitted. According to yet another aspect of the invention, receiving at the gateway device a request from a source for access can include the step of receiving a destination address from the source.

According to another embodiment of the invention, there is disclosed a system for selectably controlling and customizing access, to a network, by a source, where the source is associated with a source computer, and wherein the source computer has transparent access to the network via a gateway device and no configuration software need be installed on the source computer to access the network. The system includes a gateway device for receiving a request from the source for access to the network, and a source profile database in communication with the gateway device and located external to the gateway device, wherein the source profile database stores access information identifiable by an attribute associated with the source, and wherein the attribute is identified based upon a data packet transmitted from the source computer and received by the gateway device. The system also includes a AAA server in communication with the gateway device and source profile database, wherein the AAA server determines if the source is entitled to access the network based upon the access information stored within the source profile database, and wherein the AAA server determines the access rights of the source with the access rights defining the rights of the source to access destination sites via the network.

According to one aspect of the invention, the packet received by the gateway device includes at least one of VLAN ID, a circuit ID, and a MAC address. Additionally, according to another aspect of the invention, the source profile database includes a remote authentication dial-in user service (RADIUS) or a lightweight directory access protocol (LDAP) database. Furthermore, the source profile database can include a plurality of source profiles, wherein each respective source profile of the plurality of source profiles contains access information. According to the invention, each respective source profile can also contain historical data relating to the duration of network access for use in determining the charges due for the network access. According to yet another aspect of the invention, the source profile database can be located within the AAA server.

According to another embodiment of the present invention, there is disclosed a method for redirecting a source attempting to access a destination through a gateway device, wherein source is associated with a source computer, and wherein the gateway device enables the source to communicate with a network without requiring the source computer to include network software configured for the network. The method includes receiving at the gateway device a request from the source to access the network, identifying the source based upon an attribute associated with the source, and accessing a source profile database located external to the gateway device, where the source profile database stores access rights of the source. The method further includes determining the access rights of the source based upon the identification of the source, wherein the access rights define the rights of the source to access destination sites via the network.

According to one aspect of the invention, accessing a source profile database includes accessing a source profile database that includes a remote authentication dial-in user service (RADIUS), or a lightweight directory access protocol (LDAP) database. According to another aspect of the invention, the method can include assigning a location identifier to the location from which requests for access to the network are transmitted, wherein the location identifier is the attribute associated with the source. The method can also include updating the source profile database when a new source accesses the network, and maintaining in an accounting database a historical log of the source's access to the network, wherein the accounting database is in communication with the source profile database.

According to yet another aspect of the invention, receiving at the gateway device a request from a source for access can include the step of receiving a destination address from the source. Moreover, determining if the source computer is entitled to access the destination address can further include denying the source computer access where the source profile indicates that the source computer is denied access. Determining if the source is entitled to access the network can also further include directing the source to a login page when the source profile is not located within the source profile database.

According to yet another embodiment of the invention, there is disclosed a system for enabling transparent communication between a computer and a service provider network. The system includes a computer, and a network gateway device in communication with the computer for connecting the computer to a computer network, where the network gateway device receives source data that represents a user attempting to access said computer network. The system also includes a service provider network in communication with the network gateway device, where the service provider network includes an authentication server located external to the network gateway device and in communication with the network gateway device. The authentication server has therein a source profile database comprising source profiles that represent users authorized to access said computer network, and compares the source data to said source profiles to determine if the user attempting to access the computer network can access the computer network.

According to one aspect of the invention, the system can include an accounting system for maintaining historical data concerning use of the service provider network. According to another aspect of the invention, the authentication server includes a remote authentication dial-in user service (RADIUS), or a lightweight directory access protocol (LDAP) database. Furthermore, the source profile database can include a plurality of source profiles, where each respective source profile of the plurality of source profiles contains access information. According to yet another aspect of the invention, the source data includes an attribute associated with the computer and transmitted from the computer to the gateway device. According to another aspect of the invention, the source data includes login information associated with a respective user.

The Authentication, Authorization and Accounting method and system according to the present invention enable users transparent access to a computer network employing a gateway device. Therefore, each user may have differing rights to access services, sites or destinations via the network. Thus, the present invention differs from conventional AAA methods and systems by offering dynamic AAA services which authenticate users and offer those users varying degrees of authorization to utilize the accessed network. Furthermore, the source profile database of the present invention can be located external to the gateway device, and on a network non-local to the network from which access is requested. An external source profile database is desirable because each gateway device allows a finite number of users to access the network, so that multiple gateway devices may be required. Additionally, administering and maintaining one consolidated database of authentication data is easier than multiple smaller databases. Moreover, locating the database external to the local network allows an ISP or third party provider to maintain the confidentiality of the information stored within the database and maintain and control the database in any manner the third party provider so desires.

The present invention also comprises a method and system for redirecting users to a portal page where users have transparent access to a computer network utilizing a gateway device. The method and system advantageously operates in a manner transparent to the user since the user need not reconfigure their computer and no additional software need be added to the computer for reconfiguration purposes.

According to the invention, users accessing the gateway device are redirected to a portal page. Where stored user profiles permit the users access to the destination network, the users can be forwarded to the destination network or a portal page established by the network, user, or another entity. Otherwise, users are directed to a login page in which the users must input user information so that the users can obtain access to networks and online services. The redirection function according to the present invention can be utilized to direct new or existing users to customized homepages established by the gateway device or individual users.

A method for dynamically creating new users having transparent computer access to a destination network is disclosed, wherein the users otherwise have access to a home network through home network settings resident on the users' computers, and wherein the users can access the destination network without altering the home network settings. The method includes receiving at a gateway device a request from a user for access to a destination network, determining if the user is entitled access to the destination network based upon a user profile corresponding to the user and stored within a user profile database in communication with the gateway device, and redirecting the user to a login page when the user profile does not include rights to access the destination network. Furthermore, the method of the present invention can include the step of forwarding the user to the destination network when the user profile includes rights to access the destination network. The method can also include the step of automatically redirecting the user to a portal page following receipt of a request for access to the destination network prior to determining if the user is entitled access to the destination network.

According to one aspect of the invention, the method can include the step of establishing a login page on a webserver local to the gateway device prior to redirecting the user to the login page. The method can also include accepting user information at the login page which is thereafter utilized by the gateway device to authorize the user access to the destination network. The user profile database can be updated with the user information.

According to another aspect of the invention, the user may be forwarded from the login page and returned to a portal page or directed to a destination address which can be an Internet destination address. Redirecting the user to a login page can include redirecting a browser located on the user's computer to the login page. Furthermore, redirecting the browser located on the user's computer can include receiving a Hyper-Text Transfer Protocol (HTTP) request for the destination address and responding with an HTTP response corresponding to the login page.

According to another embodiment of the invention, a system for dynamically creating new users having transparent computer access to a destination network is disclosed, wherein the users otherwise have access to a home network through home network settings resident on the users' computers, and wherein the users can access the destination network without altering the home network settings. The system includes a gateway device for receiving a request from a user for access to the destination network, and a user profile database comprising stored access information and in communication with the gateway device. The system further includes an Authentication, Authorization and Accounting (AAA) server in communication with the gateway device and user profile database, where the AAA server determines if a user is entitled to access the destination network based upon the access information stored within the user profile database, and wherein the AAA server redirects the user to a login page where the access information does not indicate the user's right to access the destination network. The system can also direct the user to a portal page upon the user's access to the network, prior to determining the access rights of the user.

According to one aspect of the invention, the login page is maintained local to the gateway device. The user profile database and AAA server can also be located within the gateway device. Furthermore, the user profile database can be located within the AAA server.

According to another embodiment of the invention, the user profile database includes a plurality of user profiles, wherein each respective user profile of the plurality of user profiles contains access information. In addition, each respective user profile may contain historical data relating to the duration of destination network access for use in determining the charges due for the destination network access.

According to another embodiment of the invention, a method for redirecting users having transparent computer access to a destination network is disclosed, wherein the users otherwise have access to a home network through home network settings resident on the users' computers, and wherein the users can access the destination network without altering the home network settings. The method includes receiving at a gateway device a request from a user for access to a destination address, such as an Internet address, and redirecting the user to a portal page, wherein the user computer remains configured for accessing the home network, and wherein no additional configuration software need be installed on the user's computer. Furthermore, redirecting the user to a portal page can comprise redirecting the user to a portal page created by an administrator associated with the portal page, or redirecting the user to a portal page customized by the user.

According to another embodiment of the invention, a system for redirecting users having transparent computer access to a destination network is disclosed, where the users otherwise have access to a home network through home network settings resident on the users' computers, and wherein the users can access the destination network without altering the home network settings. The system includes a gateway device for receiving a request from a user for access to the destination network, and an AAA server in communication with the gateway device, where the AAA server intercepts the request from the user for access to the destination network and redirects the user to a portal page, wherein the user's computer remains configured for accessing the home network, and wherein no additional configuration software need be installed on the user's computer. According to one aspect of the invention, the AAA server is located entirely within the gateway device. The portal page of the system can also be maintained on a server local to the gateway device.

A unique advantage of the transparent redirection of users to a portal page, and, in certain circumstances from the portal page, to a login page where users subscribe for network access is that a user can obtain access to networks or online services without installing any software onto the user's computer. On the contrary, the entire process is completely transparent to the user. As such, the method and apparatus of the present invention facilitates transparent access to destination networks without requiring a user to reconfigure the home network settings resident on the user computer and without having to install reconfiguration software.

The method and system of the various embodiments facilitate transparent access to a destination network. According to one embodiment, the method and system facilitate the addition of new subscribers to the network. According to another embodiment, all users can be redirected to a portal page, which can include advertising, without requiring reconfiguration of the users' computers, or new software to be added on the users' computers.

According to another embodiment, a portable "Nomadic" router or translator is provided. The nomadic router enables a laptop computer or other portable terminal which is configured to be connected to a local home network to be connected to any location on the internet or other digital data communication system. The nomadic router automatically and transparently re-configures the terminal to its new location and processes outgoing and incoming data.

The nomadic router includes a processor which appears as the home network to the terminal, and appears as the terminal to the communication system. The terminal has a permanent address, the nomadic router has a router address, and the terminal transmits outgoing data to the system including the permanent address as a source address. The processor translates the outgoing data by replacing the permanent address with the router address as the source address. The terminal receives incoming data from the system including the router address as a destination address, and the processor translates the incoming data by replacing the router address with the permanent address as the destination address.

The terminal can be directly connected to a point on a local network, and the nomadic router connected to another point in the network. The nomadic router can be employed to implement numerous applications including nomadic e-mail, network file synchronizer, database synchronizer, instant network, nomadic internet, mobile virtual private network and trade show router, and can also be utilized as a fixed nomadic router.

The nomadic router can be implemented as software and/or hardware. The nomadic router establishes location and device transparency for a digital communication terminal such as a laptop computer. The terminal can be connected to any of a variety of networks and locations which can employ a variety of communication interface devices.

The nomadic router automatically converts the actual location address to a unique communication address for the user such as an internet address, such that the terminal performs communications originating from the communication address regardless of the physical location of the terminal.

The nomadic router also automatically configures the terminal to utilize a selected one of the interface devices, and switches from one to another if the first device malfunctions or becomes otherwise unavailable.

The nomadic router includes software and services which can be packaged in a personal portable device to support a rich set of computing and communications capabilities and services to accommodate the mobility of nomads (users) in a transparent, integrated, and convenient form. This is accomplished by providing device transparency and location transparency to the user.

There is a vast array of communication device alternatives such as Ethernet, Wireless LAN, and dialup modem among which the users switches when in the office, moving around the office, or on the road (such as at a hotel, airport, or home). The device transparency in the nomadic router provides seamless switching among these devices (easily, transparently, intelligently, and without session loss. The location transparency support in the nomadic router prevents users from having to reconfigure (e.g., IP and gateway address) their network device (laptop) each time they move to a new network or subnetwork.

The present nomadic router provides a separation of location and identity by providing a permanent IP address to the network device (host). The nomadic router provides independence between the location, communication device, and the host operating system. There are no new standards need to be adopted by the networking community. All specialized processing is stored internally to the nomadic router with standard interfaces to the host device and various communication devices.

The nomadic router supports the migration to Network Computers by providing identity and security services for the user. The nomadic router also supports multiple parallel communication paths across the communications network for soft handoff, increased throughput, and fault tolerance by supporting multiple communication substrates.

A portable router for enabling a data communication terminal to be location and device transparent according to the present invention, comprises: a first module for storing a digital communication address of a user; a second module for detecting a data communication network location to which the terminal is connected; a third module for detecting communication devices that are connected to the terminal; a fourth module for establishing data communication between the terminal and the network such that the communication address of the location from the second module is automatically converted to the communication address of the user from the first module; and a fifth module for automatically selecting a communication device which was detected by the third module for use by the fourth module.

The present nomadic router utilizes a unique process embodied in a self-contained apparatus which manipulates the packets of data being sent between the host computers and routers. This process provides an intelligent active universal translation of the content of the packets being transmitted between the host computer and nomadic router. The translation allows the host computer to communicate with the nomadic router even when the host computer is not configured to communicate with the nomadic router.

This is achieved by the nomadic router pretending to be the router which the host is configured for, and by the nomadic router pretending to be the host which the router expects to communicate with. Therefore, the nomadic router supports the mobility of computers in that it enables these computers to plug into the network at different locations (location independence) without having to install, configure, or utilize any new protocols on the mobile computer.

The mobile computer continues to operate without being aware of the change in location or new configuration, and the nomadic router translates the data allowing the host to think that it is communicating with the router. By putting this process in a self-contained apparatus, the deployment of new protocols can be performed independently of the host computer and its operating system (host independent).

All specialized processing and translation is stored internally in the nomadic router with standard interfaces to the host device and various communication devices. Thus, no new standards need be adopted. By removing the complexity of supporting different network environments out of the mobile computer and into this self-contained apparatus, the nomadic router allows the host computer to maintain a very minimal set of software protocols and functionality (e.g., the minimum functionality typically installed in network computers) to communicate-across the network.

The nomadic router translation ability also enables the use of alternate communication paths (device independence) without the host computer being aware of any new communication device that utilizes an alternate communication path. The translation of the packets is done not just at the physical, link, or network layer of the protocol stack but at the transport and application layers as well. This allows the network card, protocol stack, and application running on the host computer to be independent of the network environment and configuration.

As an example of the communication device independence, the translation allows soft handoff, increased throughput, and fault tolerance by supporting multiple communication substrates. In addition, the nomadic router translation ability provides a flexible process for deploying enhanced nomadic and mobile computing software and services such as filtering of packets and determining which packets should be allowed to be transmitted between the mobile computer and the nomadic router or local area network (Internal Firewall).

The router apparatus can be: (i) carried with the mobile user (e.g., using an external box); (ii) attached to the mobile computer (e.g., PCMCIA card); (iii) installed inside the mobile computer (e.g., a chip in the laptop); (iv) or installed into the network infrastructure so it will already be there when the mobile computer user arrives (e.g., a box which plugs into the local area network translating packets being sent between the host and nomadic router, or a chip which is installed in routers on the network). The nomadic router can also be provided in the form of software which is loaded into and run in the mobile computer or another computer or router on a network.

These and other features and advantages of the present invention will be apparent to those skilled in the art from the following detailed description, taken together with the accompanying drawings, in which like reference numerals refer to like parts unless the context indicates otherwise.

According to another embodiment, a portable "Nomadic" router or translator is provided. The nomadic router enables a laptop computer or other portable terminal which is configured to be connected to a local home network to be connected to any location on the internet or other digital data communication system. The nomadic router automatically and transparently re-configures the terminal to its new location and processes outgoing and incoming data:

The nomadic router includes a processor which appears as the home network to the terminal, and appears as the terminal to the communication system. The terminal has a permanent address, the nomadic router has a router address, and the terminal transmits outgoing data to the system including the permanent address as a source address. The processor translates the outgoing data by replacing the permanent address with the router address as the source address. The terminal receives incoming data from the system including the router address as a destination address, and the processor translates the incoming data by replacing the router address with the permanent address as the destination address.

The terminal can be directly connected to a point on a local network, and the nomadic router connected to another point in the network. The nomadic router can be employed to implement numerous applications including nomadic e-mail, network file synchronizer, database synchronizer, instant network, nomadic internet, mobile virtual private network and trade show router, and can also be utilized as a fixed nomadic router.

The nomadic router can be implemented as software and/or hardware. The nomadic router establishes location and device transparency for a digital communication terminal such as a laptop computer. The terminal can be connected to any of a variety of networks and locations which can employ a variety of communication interface devices.

The nomadic router automatically converts the actual location address to a unique communication address for the user such as an internet address, such that the terminal performs communications originating from the communication address regardless of the physical location of the terminal.

The nomadic router also automatically configures the terminal to utilize a selected one of the interface devices, and switches from one to another if the first device malfunctions or becomes otherwise unavailable.

The nomadic router includes software and services which can be packaged in a personal portable device to support a rich set of computing and communications capabilities and services to accommodate the mobility of nomads (users) in a transparent, integrated, and convenient form. This is accomplished by providing device transparency and location transparency to the user.

There is a vast array of communication device alternatives such as Ethernet, Wireless LAN, and dialup modem among which the users switches when in the office, moving around the office, or on the road (such as at a hotel, airport, or home). The device transparency in the nomadic router provides seamless switching among these devices (easily, transparently, intelligently, and without session loss. The location transparency support in the nomadic router prevents users from having to reconfigure (e.g., IP and gateway address) their network device (laptop) each time they move to a new network or subnetwork.

The present nomadic router provides a separation of location and identity by providing a permanent IP address to the network device (host). The nomadic router provides independence between the location, communication device, and the host operating system. There are no new standards need to be adopted by the networking community. All specialized processing is stored internally to the nomadic router with standard interfaces to the host device and various communication devices.

The nomadic router supports the migration to Network Computers by providing identity and security services for the user. The nomadic router also supports multiple parallel communication paths across the communications network for soft handoff, increased throughput, and fault tolerance by supporting multiple communication substrates.

A portable router for enabling a data communication terminal to be location and device transparent according to the present invention, comprises: a first module for storing a digital communication address of a user; a second module for detecting a data communication network location to which the terminal is connected; a third module for detecting communication devices that are connected to the terminal; a fourth module for establishing data communication between the terminal and the network such that the communication address of the location from the second module is automatically converted to the communication address of the user from the first module; and a fifth module for automatically selecting a communication device which was detected by the third module for use by the fourth module.

The present nomadic router utilizes a unique process embodied in a self-contained apparatus which manipulates the packets of data being sent between the host computers and routers. This process provides an intelligent active universal translation of the content of the packets being transmitted between the host computer and nomadic router. The translation allows the host computer to communicate with the nomadic router even when the host computer is not configured to communicate with the nomadic router.

This is achieved by the nomadic router pretending to be the router which the host is configured for, and by the nomadic router pretending to be the host which the router expects to communicate with. Therefore, the nomadic router supports the mobility of computers in that it enables these computers to plug into the network at different locations (location independence) without having to install, configure, or utilize any new protocols on the mobile computer.

The mobile computer continues to operate without being aware of the change in location or new configuration, and the nomadic router translates the data allowing the host to think that it is communicating with the router. By putting this process in a self-contained apparatus, the deployment of new protocols can be performed independently of the host computer and its operating system (host independent).

All specialized processing and translation is stored internally in the nomadic router with standard interfaces to the host device and various communication devices. Thus, no new standards need be adopted. By removing the complexity of supporting different network environments out of the mobile computer and into this self-contained apparatus, the nomadic router allows the host computer to maintain a very minimal set of software protocols and functionality (e.g., the minimum functionality typically installed in network computers) to communicate-across the network.

The nomadic router translation ability also enables the use of alternate communication paths (device independence) without the host computer being aware of any new communication device that utilizes an alternate communication path. The translation of the packets is done not just at the physical, link, or network layer of the protocol stack but at the transport and application layers as well. This allows the network card, protocol stack, and application running on the host computer to be independent of the network environment and configuration.

As an example of the communication device independence, the translation allows soft handoff, increased throughput, and fault tolerance by supporting multiple communication substrates. In addition, the nomadic router translation ability provides a flexible process for deploying enhanced nomadic and mobile computing software and services such as filtering of packets and determining which packets should be allowed to be transmitted between the mobile computer and the nomadic router or local area network (Internal Firewall).

The router apparatus can be: (i) carried with the mobile user (e.g., using an external box); (ii) attached to the mobile computer (e.g., PCMCIA card); (iii) installed inside the mobile computer (e.g., a chip in the laptop); (iv) or installed into the network infrastructure so it will already be there when the mobile computer user arrives (e.g., a box which plugs into the local area network translating packets being sent between the host and nomadic router, or a chip which is installed in routers on the network). The nomadic router can also be provided in the form of software which is loaded into and run in the mobile computer or another computer or router on a network.

Referring now to FIG. 1, a computer system 10 is illustrated in block diagram form. The computer system 10 includes a plurality of computers 14 that can communicate with one or more online services 22 or networks via a gateway device 12 providing the interface between the computers 14 and the various networks 20 or online services 22. One embodiment of such a gateway device has been described in U.S. patent application Ser. No. 08/816,174 (referred to herein as the Gateway Device Application), the contents of which are incorporated herein by reference. Briefly, the gateway device 12 facilitates transparent computer 14 access to the online services 22 or networks 22, such that the computers 14 can access any networks via the device 12 regardless of their network configurations. Additionally, the gateway device 12 includes the ability to recognize computers attempting to access a network 12, the location of computers attempting to access a network, the identity of users attempting to gain network access, and additional attributes, as will be discussed below with respect to the dynamic AAA methods and systems of the present invention.

As illustrated in FIG. 1, the computer system 10 also includes an access concentrator 16 positioned between the computers 14 and the gateway device 12 for multiplexing the signals received from the plurality of computers onto a link to the gateway device 12. Depending upon the medium by which the computers 14 are connected to the access concentrator, the access concentrator 16 can be configured in different manners. For example, the access concentrator can be a digital subscriber line access multiplexer (DSLAM) for signals transmitted via regular telephone lines, a cable head end (a Cable Modem Termination Shelf (CMTS)) for signals transmitted via coaxial cables, a wireless access point (WAP) for signals transmitted via a wireless network, a switch, or the like.

The computer system 10 further includes a AAA server 30 that dynamically authenticates and authorizes user access, as explained in detail below, such that users are subjected to a AAA process upon attempting to gain access to a network through the gateway device 12. Finally, as is shown in FIG. 1, the computer system 10 typically includes one or more routers 18 and/or servers (not shown in FIG. 1) to control or direct traffic to and from a plurality of computer networks 20 or other online services 22. While the computer system 10 is depicted to have a single router, the computer system 10 can have a plurality of routers, switches, bridges, or the like that are arranged in some hierarchical fashion in order to appropriately route traffic to and from the various networks 20 or online services 22. In this regard, the gateway device 12 typically establishes a link with one or more routers. The routers, in turn, establish links with the servers of the networks 20 or online services 22, based upon the user's selection. It will be appreciated by one of ordinary skill in the art that one or more devices illustrated in FIG. 1 may be combinable. For example, although not shown, the router 18 may be located entirely within the gateway device 12.

Users and computers attempting to access a network 20 or online service 22 via the gateway device 12 are referred to hereinafter as sources. According to AAA methods and systems of the present invention, a source attempting to access a network via the gateway device 12 is authenticated based on attributes associated therewith. These attributes can include the identity of a particular user or computer, location through which access is requested, requested network or destination, and the like. As is explained in detail in the Gateway Device Application, these attributes are identified by data packets transmitted to the gateway device 12 from the computers through which access is requested. According to one embodiment, methods and systems of the present invention provide dynamic authentication, authorization and accounting based upon these attributes. Generally, as used herein authentication refers to the identification of the source, authorization refers to the determination of permittable source access, and accounting refers to the tracking of a source's access to a network.

Referring now to the authentication function of systems and methods of present invention, it will be appreciated that authenticating a source attempting to access the network is often crucial to network administration, as network access and services are not typically laid open for all users regardless of identity or payment. As stated above, a source may be identified by the gateway device 12 by one or more attributes contained within data packets transmitted to the device from the computer associated with the source attempting to access a network or service, referred to hereinafter as the source computer. For instance, where the source is a user, the source computer is the computer through which the user is attempting to access a network or network destination. On the other hand, where the source is a computer through which one or more user may request access to a network, the source computer is that computer through which access is requested.

According to one aspect of the invention, a source computer attempting to access a network via the gateway device 12 may be identified one or more attributes that include a circuit ID, MAC address, user name, ID and/or password, or particular location (e.g., a communications port in a hotel room), or the like, transmitted to the gateway device 12 via data packets generated by the source computer, as described in U.S. Provisional Application Ser. No. 60/161,093, titled "Location-Based Identification and Authorization for use With a Gateway Device." It will be appreciated that one or more of these attributes can be used in the present invention to identify the source accessing the network. By means of an illustrative example, where sources are different users having dissimilar authentication and authorization rights, the users may identify themselves by their respective login information (e.g., user name and password) such that they will be independently identified despite the use of the same equipment, such as the same computer. On the other hand, where the source is a computer, diverse users using the computer will have like authentication and authorization rights regardless of the individual rights of each user, as the rights are associated with the computer (e.g., identified by MAC address), rather than with the respective users.

The authentication of sources via an attribute associated with the source is performed by the AAA server 30, illustrated in FIG. 1. The AAA server 30 stores source profiles corresponding to sources identified by the AAA server 30. According to one aspect of the present invention, the AAA server 30 is located entirely within the gateway device 12. According to another aspect of the invention, the AAA server 30 can comprise a plurality of components, at least some of which are external to the gateway device 12, or alternatively, the AAA server 30 can be located entirely external to the gateway device 12. For example, the location of the AAA server 30 may be such that the gateway device 12 communicates with the AAA server 30 via internet protocol. According to one embodiment of the invention, the AAA server 30 can be maintained by an ISP, which identifies sources authorized to communicate with the network via the ISP. Therefore, it will be appreciated that the AAA server 30 may be located at any internet address and stored on any computer accessible via internet protocol.

According to one aspect of the invention, a separate source profile exists for each source accessing the system. Source profiles are maintained in a source profile database, which may be an internal component of the AAA server 30, an external component of the AAA server 30, or a separate component in communication with the AAA server 30. Preferably, the source profile database is located external to the gateway device and network to alleviate administrative burden on the network so that the network does not have to set up and maintain separate authentication databases on each network or gateway device. This is also preferable because each gateway device 12 allows a finite number of users to access the network, which requires multiple gateway devices to accommodate a large number of sources. Secondly, administering and maintaining one consolidated database of authentication data is easier than multiple smaller databases. Lastly, locating the source profile database external to the local network can allow an ISP or third party provider to maintain the confidentiality of the information stored within the database and maintain and control the database in any manner the third party provider so desires.

The source profile includes one or more names, passwords, addresses, VLAN tags, MAC addresses and other information pertinent to identify, and, if so desired, bill, a source. Upon a source's attempt to access a network via the gateway device 12, the AAA server 30 attempts to authenticate the source by comparing stored source profiles in the source profile database with the attributes received from the gateway device 12 or source to determine the source identity. As an illustrative example, where a user attempts to access the network by entering a user ID and password, the user ID and password are compared against all IDs and passwords stored in the source profile database to determine the identity of the user. As such, the source profile database generally comprises a database or data storage means in communication with processing means located within the AAA server 30 or gateway device 12, where the source profile database and processor work in conjunction to compare received attributes to stored source profile information, as is well known in the art.

The source profile database may comprise programmable storage hardware or like means located on a conventional personal computer, mainframe computer, or another suitable storage device known in the art. Additionally, the means for comparing the received data to the data within the database can comprise any software, such as an executable software program, which can compare data. For example, the AAA server 30 may store source profiles on a hard drive of a personal computer, and the means for comparing the received source data to the source profiles resident on the computer can include computer software, such as Microsoft Excel (Microsoft Excel is a trademark of Microsoft Corporation, Redmond, Wash.). According to another embodiment of the invention, the AAA server 30 or source profile database can comprise a Remote Authentication Dial-In User Service (RA- DIUS) or a Lightweight Directory Access Protocol (LDAP) database, which are well known to those of skill in the art.

If a source fails to correspond to a source profile in the AAA server 30 at the time of authentication, the source will not be permitted access to the network. When this occurs, a user or user associated with a non-user source may be requested to input source profile information to the AAA server 30 so that the AAA server 30 can add the source's profile to the AAA server 30, and more specifically, to the source profile database. For example, this may occur the first time a user attempts to access the gateway device 12. According to another aspect of the invention, where the source cannot be identified, the source may be directed to a login page in order to gather additional information to identify the source. For instance, the information may be entered with the aid of a webpage, a pop-up control panel or user interface, which can open when the source initially connects to the gateway device 12, as effectuated by a home page redirection capability, described herein and in U.S. patent application Ser. No. 09/458,569, now U.S. Pat. No. 6,636,894, entitled "Systems And Methods For Redirecting Users Having Transparent Computer Access To A Network Using A Gateway Device Having Redirection Capability," incorporated elsewhere herein (referred to hereinafter as the "Redirection Application").

According to one aspect of the invention, the AAA server 30 can identify the source in communication with the gateway device in a manner that is transparent to computer users. That is, according to one aspect of the invention, a user will not be required to input identification information, reconfigure the source computer or otherwise change the source computer's primary network settings. Furthermore, no additional configuration software will have to be added to the source computer. After a packet is received by the gateway device, attributes identified by the data packet can be compared with the data contained in the source profile database. Therefore, in addition to not requiring the reconfiguration of computers accessing the network, AAA servers of the present invention have the ability to authenticate sources without requiring interactive steps by the computer user, such as the entering of a user ID. For instance, the AAA server 30 may automatically identify the source based upon a MAC address, so that authorization of the source can be readily determined. Therefore, it will be appreciated that the AAA server 30 can determine the user, computer, or location from which access is requested by comparing the attributes associated with the received data packet (such as in a header of the data packet) with data drawn from the source profile database. As will be described below, the access rights associated with the source may also be stored within the source profile database so that the system and method of the present invention can dynamically authorize access to particular services or destinations.

Once the source has established the network service connection via the authentication process discussed above, and a tunnel has been opened to facilitate a communication line between the source computer and a network, the gateway device 12 communicates with the AAA server 30 to assemble source profile information, or source-specific data. The source profile information that the gateway device assembles may include a MAC address, name or ID, circuit ID, billing scheme related data, service level data, user profile data, remote-site related data, and like data related to the source. As such, the AAA server 30 can transmit to the gateway device 12 any requisite information relating to the source's authorization rights and use of the network, as is next explained in detail.

In addition to authenticating users, the AAA server 30 of the present invention provides an authorization function, in which the source access rights are determined. The present invention enables dynamic authorization of sources, such that each source might have different respective network usage or access rights. After authentication, the AAA server 30 compares the attributes of the source with the access rights of the source associated with the user, computer, location or attribute(s). The access rights may be stored within the source profile database or within a separate subscription database located internal or external to the gateway device 12. Therefore, separate databases may be utilized, where one stores identification information on sources for authentication, and another database stores the access rights of those sources that have been authenticated. However, because the profiles of all sources, identified by attribute or a combination of attributes, are stored in a source profile database, it may be advantageous to locate information regarding access rights in the source profile database, which already contains information regarding each authenticated source, as described above.

According to one aspect of the invention the source profile database stores information defining the access rights of a source. For example, a source profile database may contain information indicating that a source having a particular MAC address has purchased pre-paid access, or that a given circuit ID has free access or unlimited access. Guests in a particular room or rooms of a hotel, for example, suites and penthouses, may receive free unlimited Internet access. Therefore, access rights can be available contingent upon the source's location (e.g. room) or location status (e.g. suite). In this event, no further identification is required, as the location from which the source is requesting access is known to the gateway device and stored in the source profile database.

In addition to storing information concerning what each source is authorized to access, the source profile database can also include specialized access information associated with a particular source, such as the bandwidth of the source's access, or a homepage to which the source should be directed. For example, a user accessing the network from a penthouse may receive a higher access baud rate than someone accessing the network from a typical hotel room. For example, where a user is transparently accessing the gateway device from a hotel room, the hotel network administrator may enter user access information into the source profile database based upon access rights associated with a room in the hotel. This can also be done automatically by the gateway device or a local management system, such as a hotel property management system, when the user checks into his or her room. Additionally, the user may establish the information to be contained within the source profile database upon first accessing the gateway device. For instance, a new user may be directed to enter a credit card number, e-wallet account information, pre-paid calling card number or like billing information to obtain access to the system. A source profile can also include historical data relating to a source's access to the network, including the amount of time a source has accessed the network. Specialized access or accounting information contained within the source profile database may be established by the system administrator, or by the source who has purchased or otherwise established access to the network.

According to one aspect of the invention, the authorization capability of the AAA server 30 can be based upon the type of services the source is attempting to access, such as a destination address, identified by the gateway device 12 based upon data received from the source computer. The destination can be a destination port, Internet address, TCP port, network, or the like. Moreover, the authorization capability of the AAA server 30 can be based upon the content type or protocol being transmitted. According to the system and method of the present invention, each packet can be filtered through the selective AAA process, so that any or all sources can be authorized access to a particular destination based on the access rights associated with the respective sources. Therefore, according to the present invention, each time the source attempts to access a different destination, the source is subject to the AAA, so the source may be prevented access from a particular site the AAA server 30 deems inaccessible to the source based upon the source's authorization. Alternatively, the AAA method according to the present invention allows some or all sources to connect directly to a specific site, such as credit card or billing servers for collecting billing information, which can collect payment or billing information so that the source profile can be updated and the source thereafter authorized access to networks. According to the system and method of the present invention, a source's authorization can also depend upon objective criteria, such as a specific time, so that the session can be terminated at a specific time, after a specific time has elapsed, or according to other dynamic information determined by the network provider. Furthermore, authorization can be associated with a combination of attributes. For example, a user may be authorized access to a network where the user has input the user's identification and has accessed the network from a particular room. Such a requirement could prevent unauthorized users also staying in a particular room from obtaining network access. Therefore, AAA can be based upon the origination, destination, and type of traffic.

Figure 2:
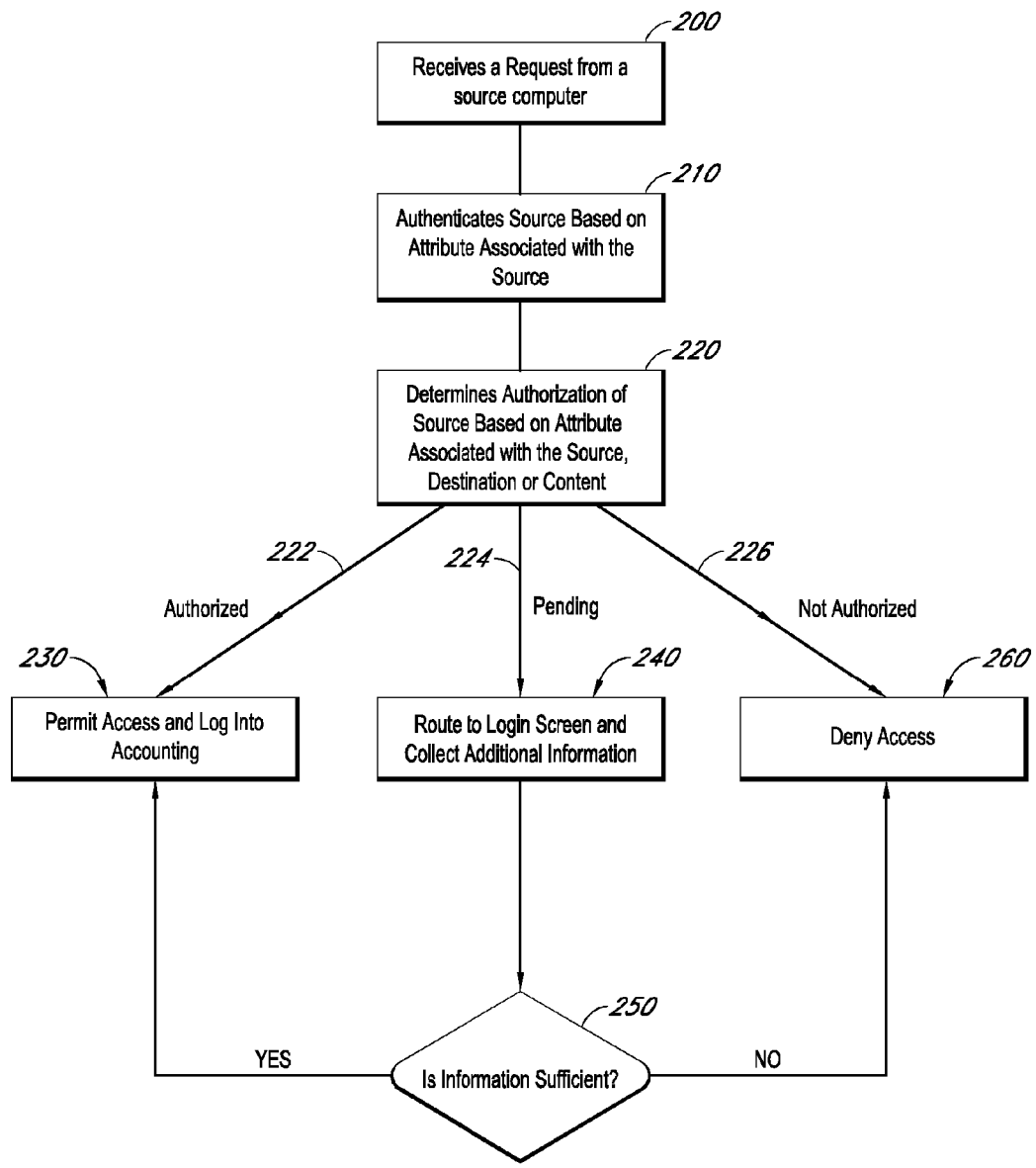
FIG. 2 is a flow chart of a method in which a AAA server performs authentication, authorization, and accounting, according to one aspect of the invention.

By way of further explanation, a flow chart of the operation of the AAA server 30 will be described with respect to FIG. 2, according to one aspect of the invention. In operation, a source computer requests (block 200) access to a network, destination, service, or the like. Upon receiving a packet transmitted to the AAA server 30, the AAA server 30 examines the packet to determine the identity of the source (block 210). The attributes transmitted via the packet are temporarily stored in the source profile database so that the data can be examined for use in determining authorization rights of the source. The attributes contained in the packet can include network information, source IP address, source port, link layer information, source MAC address, VLAN tag, circuit ID, destination IP address, destination port, protocol type, packet type, and the like. After this information is identified and stored, access requested from a source is matched against the authorization of that source (block 230).

Once a source profile has been determined by accessing the authorization rights stored in the source profile database, three possible actions can result. Specifically, once a source's authorization rights have been retrieved the AAA server 30 may determine a source to have access 222, to be pending or in progress 224, or to not have access 226. First, a source is deemed valid (i.e., to have access) where the source profile database so states. If a source is determined to be valid, the source's traffic can be allowed to proceed out of the gateway device to the networks or online services the user associated with the source wishes to access (block 230). Alternatively, the source may be redirected to a portal page, as described in the Redirecting Application, prior to being allowed access to the requested network. For example, a user may be automatically forwarded to a user-input destination address, such as an Internet address, for example, where a user has free access associated with the user's hotel room. Alternatively, this may occur where the user has already purchased access and the user has not exhausted available access time. Furthermore, an accounting message may be initiated 230 to log the amount of time the user is utilizing the gateway device such that the user or location may be billed for access.

If the second scenario occurs, in which the source is deemed pending 224 or in progress, the source may take steps to become authenticated (block 240) so that the source information is recorded in the source profile database. For example, a user may have to enter into a purchase agreement, requiring the user to enter a credit card number. If the user needs to purchase access, or if the system needs additional information about the user, the user can be redirected from the portal page via Home Page Redirect (HPR) and Stack Address Translation (SAT) to a location, such as a login page, established to validate new users. SAT and HPR can intervene to direct the user to a webserver (external or internal) where the user has to login and identify themselves. This process is described in detail in the Redirecting Application. After inputting any necessary and sufficient information, the user is then permitted access to a destination address (block 230, 250). Where the information provided is insufficient the user will not be authorized access (block 260). Finally, a third scenario can occur in which a source is deemed not to have access 226 so that the user is not permitted to access a destination via the network (block 260).

Referring now to the accounting function of systems and methods of the present invention, upon authorizing a source network access, the AAA server 30 can register an accounting start to identify that the source is accessing the network. Similarly, when the source logs off or terminated the network session, an accounting stop can be registered by the AAA server 30. Accounting starts or stops can be identified by the gateway device 12 or by the AAA server 30 upon a source's authentication or authorization to access a desired destination. Furthermore, accounting starts or stops can be registered in the source profile, or can be stored in a database separate from the AAA server 30 and located external to the network. Typically, accounting starts and stops include time stamps that indicate the amount of time a source has been accessing the network. Using this data, the time between the accounting start and accounting stop can be tallied so that the source's total connection time may be computed. Such information is valuable where the source is charged by an increment of time, such as an hour. A billing package, as are well known in the art, could then tally a user's total time accessing the network over a set period, such as each month, so that a bill can be created for the source. Because networks and ISPs often may charge a set rate for a specific duration of time (i.e., flat rate pricing), such as a month, regardless how much time is being spent accessing the network, accounting stops and starts may not be required for billing purposes. Nevertheless, accounting starts and stops may generally be recorded by the network provider or ISP for usage statistics.

An ISP or similar access provider would additionally benefit from being able to track subscriber's use of the ISP to establish bills, historical reports, and other relevant information. Preferably, the AAA server 30 is in communication with one or more processors for determining any fees which may be charged to the source, or due from the source, for network access or services. The AAA server 30 retrieves the historical accounting data in a real time basis or after a specific interval of time has elapsed. Preferably, the AAA server 30 retains such data in an easily accessible and manipulatable format such that the access provider (e.g., ISP) can produce reports representative of any desired type of historical data. For example, to project future use of the access provider, the AAA server 30 produces reports tallying the number of users accessing the Internet at certain time periods and from specific locales. Moreover, where the access provider provides alternative access to users, such as charging for faster connections (i.e., higher baud rate) for additional fees, the access provider may wish to analyze historical data using the AAA server 30 to best meet future customer demands. Such data may relate to network sessions currently on-going, the duration of those sessions, the bandwidth currently being used, the number of bytes that have been transferred and any other pertinent information. The AAA server 30 may be implemented using well known programs, such as Eclipse Internet Billing System, Kenan Broadband Internet Billing Software (manufactured by Lucent Technologies), or TRU RADIUS Accountant.

It will be appreciated that the AAA server 30 can dynamically account source access to a network in the same manner in which access is customizable on a source by source basis. That is, the AAA server 30 can maintain accounting records that vary depending upon the identity of a source, source location, source requested destination, or the like. Like the access or authorization rights, this information can be maintained in the source profile database or a similar accounting database. For instance, the AAA server 30 may determine that a particular source is only charged for accessing particular sites, and will only register an accounting site when those particular sites are accessed. Therefore, the AAA server 30 will identify account information stored in the subscriber's source profile to determine accounting starts, accounting stops, billing rates, and the like.

Referring again to FIG. 1 in describing another embodiment of the invention, a computer system 10 including a gateway device 12 is depicted in block diagram form. The computer system 10 typically includes a plurality of computers 14 that access a computer network in order to gain access to networks 20 or other online services 22. For example, the computers 14 can be plugged into ports that are located in different rooms of a hotel, business, or a multi-dwelling unit. Alternatively, the computers 14 can be plugged into ports in an airport, an arena, or the like. The gateway device 12 provides an interface between the plurality of computers 14 and the various networks 20 or other online services 22. One embodiment of a gateway device has been described by the aforementioned U.S. patent application Ser. No. 08/816,174.

Most commonly, the gateway device 12 is located near the computers 14 at a relatively low position in the overall network (i.e., the gateway device 12 will be located within the hotel, multi-unit residence, airport, etc.). However, the gateway device 12 can be located at a higher, position in the system by being located closer to the various networks 20 or other online services 22, if so desired. For example, the gateway device 12 could be located at a network operating center or could be located before or after a router 18 in the computer network. Although the gateway device 12 can be physically embodied in many different fashions, the gateway device 12 typically includes a controller and a memory device in which software is stored that defines the operational characteristics of the gateway device 12. Alternatively, the gateway device 12 can be embedded within another network device, such as an access concentrator 16 or a router 18. Moreover, the software that defines the functioning of the gateway device 12 can be stored on a PCMCIA card that can be inserted into a computer of the plurality of computers 14 in order to automatically reconfigure the computer to communicate with a different computer system, such as the networks 20 and online services 22.

The computer system 10 typically includes an access concentrator 16 positioned between the computers 14 and the gateway device 12 for multiplexing the signals received from the plurality of computers onto a link to the gateway device 12. Depending upon the medium by which the computers 14 are connected to the access concentrator, the access concentrator 16 can be configured in different manners. For example, the access concentrator can be a digital subscriber line access multiplexer (DSLAM) for signals transmitted via regular telephone lines, a cable head end for signals transmitted via coaxial cables, a wireless access point (WAP) for signals transmitted via a wireless network, a cable modem termination shelf (CMTS), a switch or the like. As also shown in FIG. 1, the computer system 10 typically includes one or more routers 18 and/or servers (not shown in FIG. 1) to control or direct traffic to and from a plurality of computer networks 20 or other online services 22. While the computer system 10 is depicted to have a single router, the computer system 10 can have a plurality of routers, switches, bridges, or the like that are arranged in some hierarchical fashion in order to appropriately route traffic to and from the various networks 20 or online services 22. In this regard, the gateway device 12 typically establishes a link with one or more routers. The routers, in turn, establish links with the servers of other networks or other online service providers, such as Internet service providers, based upon the user's selection. It will be appreciated by one of ordinary skill in the art that one or more devices illustrated in FIG. 1 may be combinable. For example, although not shown, the router 18 may be located entirely within the gateway device 12.

The gateway device 12 of the present invention is specifically designed to adapt to the configuration of each of the computers 14 that log onto the computer system 10 in a manner that is transparent to the user and the computer networks 20 or online services 22. In the embodiment shown in FIG. 1, the computer system 10 employs dynamic host configuration protocol (DHCP) service, which is a protocol well known to those of skill in the art and currently implemented in many computer networks. In DHCP networks an EP address is assigned to an individual computer of the plurality of computers 14 when the computer logs onto the computer network through communication with the gateway device 12. The DHCP service can be provided by an external DHCP server 24 or it can be provided by an internal DHCP server located within the gateway device.

In order to allow a user of the computer to communicate transparently with computer networks 20 or online services 22, the gateway device must be able to communicate with the user computer, as well as the various online services 22 or networks 20. In order to support this communication, the gateway device 12 generally performs a packet translation function that is transparent to both the user and the network. In this regard, for outbound traffic from a computer to a network or on-line service, the gateway device 12 changes attributes within the packet coming from the user, such as the source address, checksum, and application specific parameters, to meet the criteria of the network to which the user has accessed. In addition, the outgoing packet includes an attribute that will direct all incoming packets from the accessed network to be routed through the gateway device. In contrast, the inbound traffic from the computer network or other online service that is routed through the gateway device undergoes a translation function at the gateway device so that the packets are properly formatted for the user's host computer. In this manner, the packet translation process that takes place at the gateway device 12 is transparent to the host, which appears to send and receive data directly from the accessed computer network. By implementing the gateway device as an interface between the user and the computer network or other online service, however, the user will eliminate the need to re-configure their computer 12 upon accessing subsequent networks as well as the need to load special configuration software on their computer to support the reconfiguration.

Figure 3:
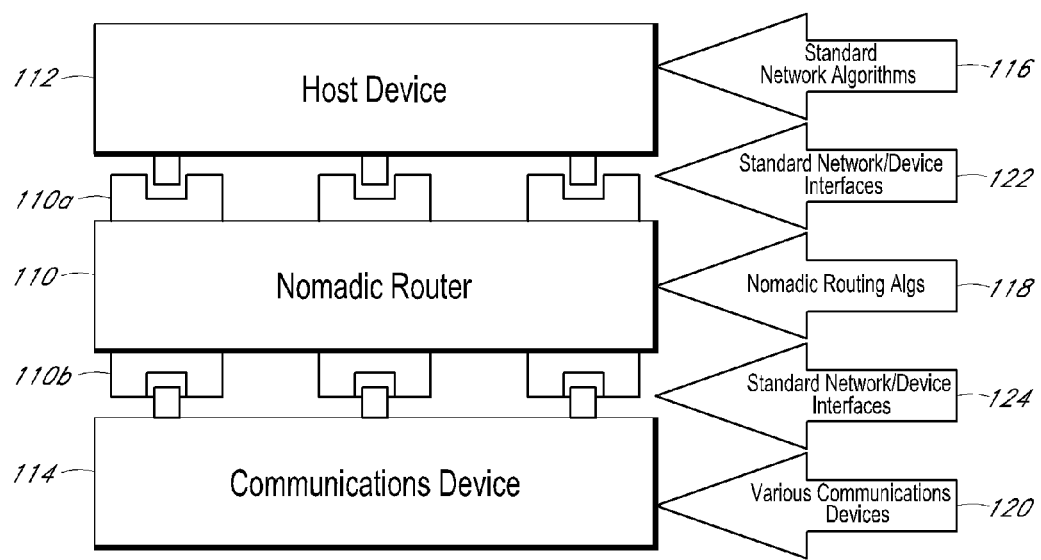
FIG. 3 is a diagram illustrating the implementation of the present nomadic router between the host computing device and various communication devices through standard interfaces.

FIG. 3 illustrates a "Nomadic" translator or router 110 embodying the present invention as being connected between a host device or computer 112 and a communications device 114. The host device 112 is a laptop computer or other fixed or mobile digital data communication terminal which is sufficiently portable or mobile that it can be carried from one location or another. A laptop computer, for example, can be used in any convenient location such as an airplane, customer's office, home, etc.

The communications device 114 can be part of any type of communication system to which the host computer 112 can be connected. Such communication systems include, but are not limited to, local networks, wide area networks, dial-up and direct internet connections, etc. In a typical application the communications device will connect the host computer to a local network which itself is connected to the internet. Thus, the host device 112 is able to communicate with an unlimited number of networks and nodes which are themselves interconnected with routers, switches, bridges, etc. in any known manner.

The present router 110 includes a terminal interface 110a which normally is used to connect the router 110 to the host device 112, and a system interface 110b which connects the router 110 to the communications device 114. As will be further described below, the router 110 generally includes a processor consisting of hardware and/or software which implements the required functionality. The router 110 is further configured to operate in an alternate mode in which the host device 112 is connected directly to a network, and the router 110 is also connected to a point in the network via the system interface 110b. In this case, the terminal interface 110 as is unused.

Although the device 110 is described herein as being a router, it will be understood that the router 110 is not a conventional router in that it includes the capability for providing interconnectability between networks. Instead, the present router 110 is essentially a translator which enables the host device 112 to be automatically and transparently connected to any communications device 114, and process incoming and outgoing data for the device 122.

The host device 112 is provided with a permanent internet address which is conveniently not changed in accordance with the present invention. The device 122 is also initially configured to communicate with a particular gateway or other home device at its base location. The gateway has a home address which the device 122 attempts to locate when it is connected to any communication system. Without the functionality of the present nomadic router 110, the host device 122 would not be able to operate at a remote location because it would not find its gateway.

It will be understood that the term "home" does not relate to a residence, but is the network, gateway or other communication device or system to which the terminal is normally connected and which corresponds to the home internet or IP address.

FIG. 3 further illustrates a top protocol layer 116 representing the host computing device 112 which generates and consumes data that is transferred through the communications device 114. This interface 116 is done just below the IP layer, and above the link layer in the typical OSI/ISO model. In the middle is a layer 118 which represents the router 110 and whose function it is to adaptively configure and utilize the underlying communications device and provide the router support described herein. A lower layer 120 is a physical communication which carries out the communication (potentially wire-lined Internet based, ad-hoc or wireless) as made available and determined for use by the nomadic router or user. Between the router layer 118 and the layers 116 and 120 are interfaces 122 and 124 which the router 110 identifies and configures dynamically.

Figures 9A, 9B, 9C:
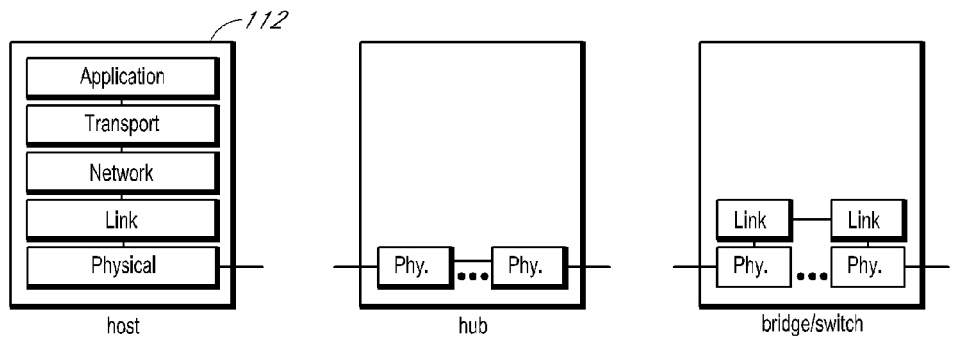
FIGS. 9A-G are diagrams illustrating protocol stack implementations for various network devices, and the translation function happening at all layers of the protocol stack in the nomadic router.

The present router operates with host computers, routers, and other network devices through well-defined standard interfaces such as specified by the IETF (Internet Engineering Task Force) and IEEE standardization committees. These standards specify the packet format, content, and physical communication characteristics. As shown in FIG. 9a, host computers have to be configured at various layers of the protocol stack depending on the communication capabilities and configuration of the current network being attached to.

Hubs, as shown in FIG. 9b, provide a well-defined interface to connect host computers and network devices by transmitting packets across multiple physical connections. Hubs do not provide any manipulate or translation of the content of the packets being transmitted.

Bridges or switches, as shown in FIG. 9c, provide an intelligent filtering mechanism by which they only transmit packets across multiple physical connection based upon which physical connection the device is connected to, according to the link layer addressing (Media Access Control Address). Bridges and switches do not manipulate the content of the packet and do not provide any higher layer protocol functionality.

Figures 9D, 9E, 9F:
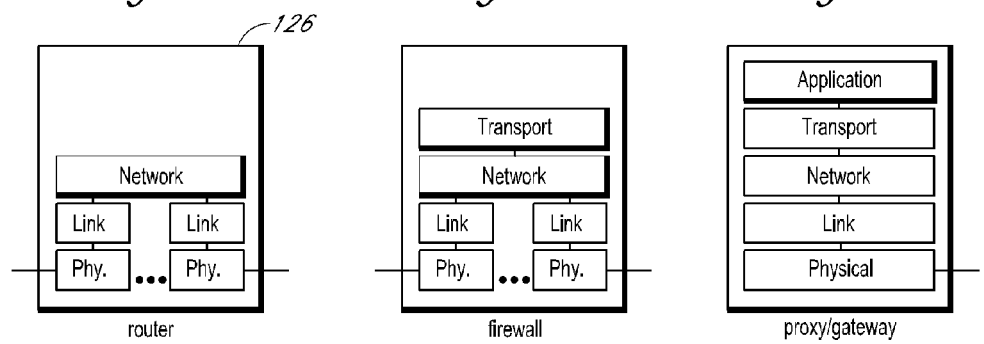

Routers, as shown in FIG. 9d, accept packets based upon the destination address at the network layer in the packet. The host computer must explicitly address the packet at the link layer to the router. The router will then retransmit the packet across the correct physical connection based upon how it is configured. No modification or translation of the packet is performed at any layer of the protocol stack other than the network layer.

Firewalls, as shown in FIG. 9e, filter packets at the network and transport layers to only allow certain packets to be retransmitted on to the other physical connection. Firewalls do not manipulate the content of the packet, only forward it on to the next hop in the network if it passes the transport (port) or network (IP address) filter.

Figure 9G:
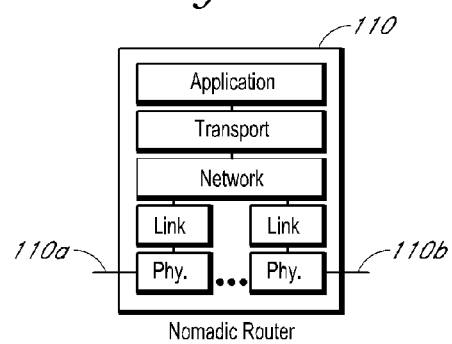

Proxys and gateways, as show in FIG. 9f, only receive packets explicitly addressed to them by host computers. They only manipulate packets at the application level. The present nomadic outer 110, as shown in FIG. 9g, manipulates the content of the jackets at the link, network, transport, and application layers of the protocol stack to provide a translation between how the host computer is configured and the configuration of the network the host computer is currently attached to.

Unlike all other devices shown in FIGS. 7a to 7f, the router 110 will automatically intercept and translate packets without the other devices being aware of the router 110 or have to be configured to use it. The translation algorithms in the router 110 which provide this location independence are provided completely internal to the router 110. Thus no new standards need to be developed, accepted, or implemented in host computers 112 or routers 126 to deploy new network services when using the nomadic router.

Whenever a new or different communication device (which includes the link and physical layers) is utilized in a host computer 112, the host computer's network layer must be aware of this new communication device. Since the router 110 has its own network interface to the communication device, alternate communication devices can be utilized in the router 110 which the host computer 112 can utilize but does not have to be configured to use.

Permanent Addressing not Location Based

Today we communicate with individuals in terms of the location of their communications instruments (for instance, their computer's IP address or their fax machine's phone number). In order to support mobility and changing communication environments and devices, it is necessary to create an environment where people communicate with other people, and not specifically with the devices they use. To transparently support mobility and adaptivity in a wireless, potentially ad-hoc, communication internetwork, a common virtual network must be provided by an intelligent device or agent which supports the various computing hosts and communication devices.

Figure 4:
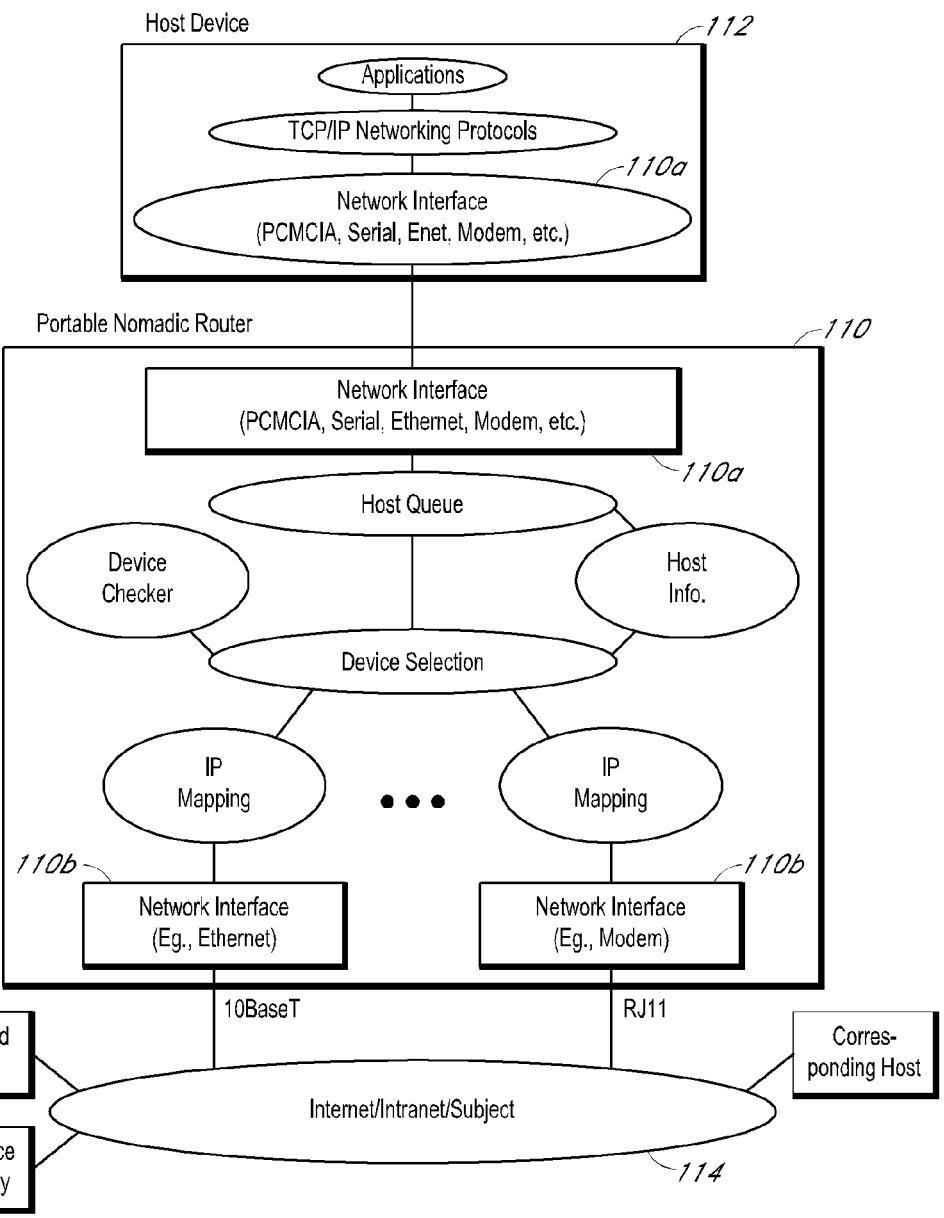
FIG. 4 is a diagram illustrating the basic nomadic router architecture, which is referred to as the hardware implementation architecture.

The present nomadic router 110 provides the mapping between the location based IP address used in the Internet today and the permanent user based address housed in the host CPU in the device 112. This is illustrated in FIG. 4 as "IP Mapping". This mapping is done without support or knowledge of such mapping by the host CPU or user.

Figure 5:
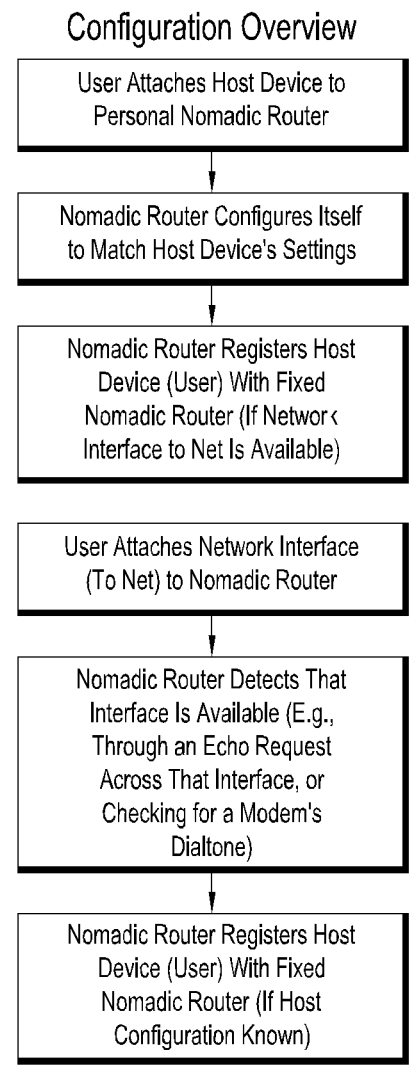
FIG. 5 is a flowchart illustrating a configuration overview of the basic steps performed when a host device is attached to the present nomadic router and when a network interface is attached to the router.

The Internet RFC 2002 Mobile IP protocol specifies the mapping between permanent and temporary IP addresses. The unique aspect of the nomadic router is that the Mobile IP protocols are not necessarily running in, or supported by, the host CPU but rather are internal to the nomadic router. The host configuration information such as its IP number are discovered or determined as illustrated—in FIG. 6 and stored in the nomadic router 110 as illustrated in FIG. 4 as "Host Info." This configuration process is overviewed in FIG. 5.

Optional Off-Loaded Processing

As illustrated in FIG. 4, the nomadic router 110 can provide off-load communication processing for the host CPU by being physically separate from the host device 112. The adaptation, selection, and transportation of information across the network is performed by the nomadic router 110. This allows the host terminal or device 112 to utilize the network without having to directly support the network protocols. By having the nomadic router be responsible for adapting to the current network substrate, the host CPU can maintain a higher performance by not having to run the routing, adaptation, packetization, etc. algorithms or packet processing.

The nomadic router can also queue, transmit, and receive data independent of whether or not the host device 112 is available or even attached. The CPU 11 built into the nomadic router 110 provides all necessary computing routines to be a fully functional network co-processor independent of the host CPU. This will allow increased battery for the user since the nomadic router does not have numerous user I/O devices as does the host device 112.

Location Independence

The instant network nomadic router provides the ability to provide ubiquitous and reliable support in a location independent fashion. This removes any burden on the user for device reconfiguration (e.g., IP address configuration, gateway or next hop router address, netmask, link level parameters, and security permissions) or data transmission.

The problem with existing protocol stacks is that communicating devices have to be reconfigured every time the communication environment changes. TCP/IP requires a new network, node and gateway number. Appletalk will automatically choose an unused node number and discover the network number, but all open communications are lost and services have to be restarted to begin using the new information.

This occurs, for example, when a PowerBook is plugged into a network, put to sleep, and then powered up in a different network. All network services, are restarted upon wakeup, and network applications get confused if they, are not restarted. The nomadic router solves this problem by providing temporary as well as permanent network and node numbers similar, to that provided by Mobile IP. However, the nomadic router will also work with other protocol stacks (e.g., AppleTalk).

Figure 7:
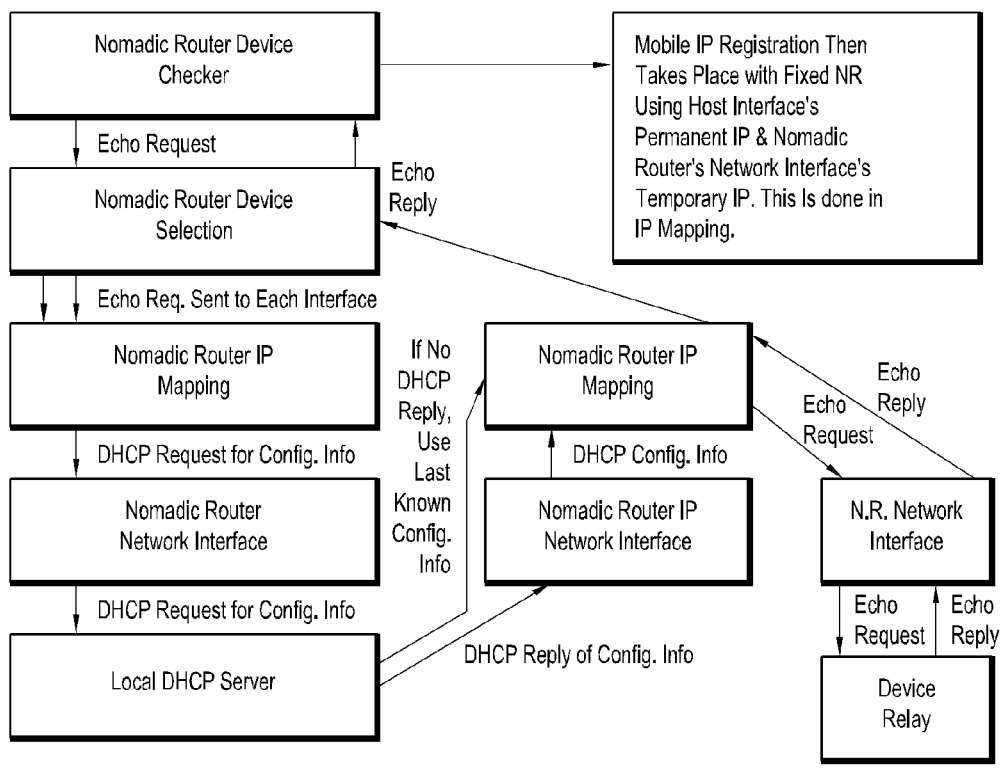
FIG. 7 is a flowchart illustrating the process by which the router initializes and checks the various communication device interfaces for initialization, activation, etc.

Mobile IP provides location independence at the network level and not at the link level. All link level parameters, which are device specific, will be automatically configured as illustrated in FIG. 7 when a new communications (network interface) device is attached to the nomadic router. The nomadic router completely eliminates the need for manual configuration by adaptively supporting device independence.

A problem with existing routers today is that they require manual configuration and exist external to the node. To overcome this, the nomadic router can support automatic configuration and full router functionality internally. This allows a mobile or nomadic node to adapt to various communication and network devices dynamically, such as when the user plugs in a PCMCIA card or attaches a communications device to the serial port.

Once the nomadic router becomes aware of the available communication devices and activates them, the transport of data across the multiple communication substrates can take place. The unique algorithm and protocol in the nomadic router which chooses the most appropriate device to use, is shown in FIG. 4 and FIG. 7 as part of the nomadic router Device Checker through the "nomadic router Device Selection" across each interface.

There are numerous factors that can affect the selection of utilizing one or more devices. Such factors typically include available bandwidth, cost to initiate and maintain connection, power requirements and availability, and user's preference.

Figure 8:
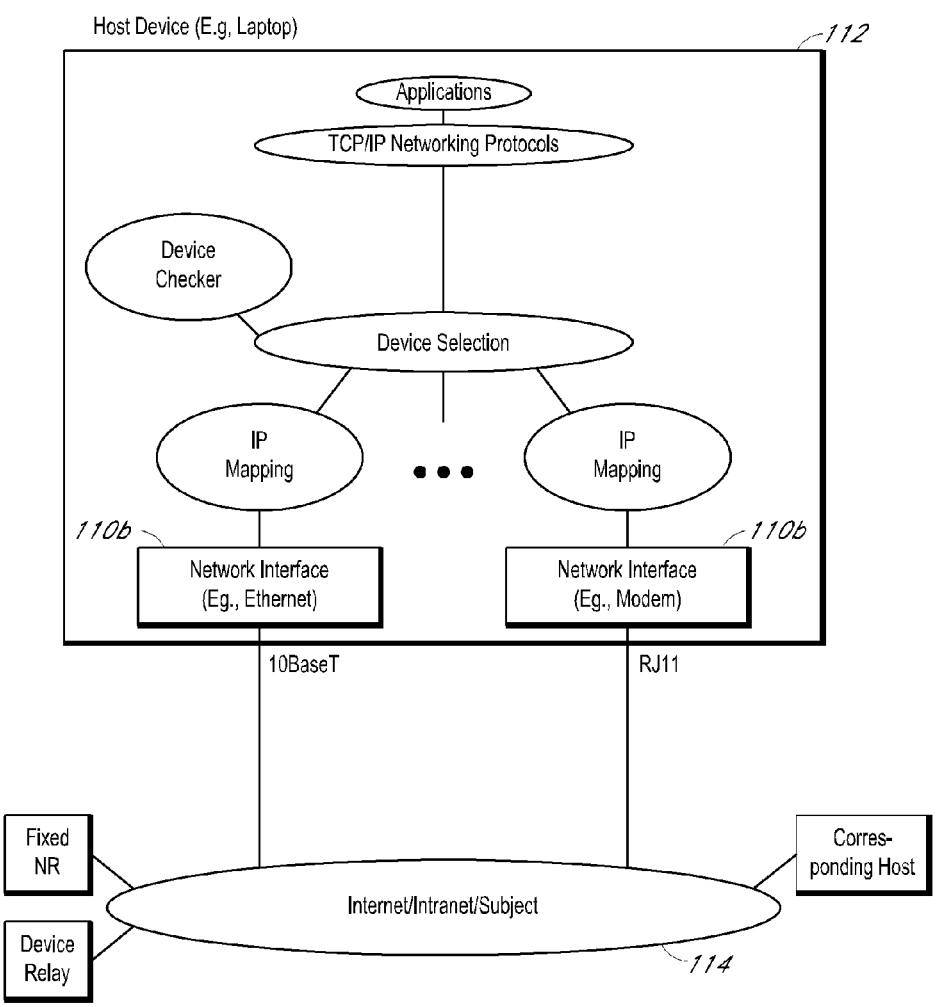
FIG. 8 is a diagram illustrating the basic nomadic router architecture when implemented as software in the host device.

Another feature of the nomadic router is the support for alternate or simultaneous use of various communication substrates. This is performed as part of step 5 in FIG. 8 when the source address is that of the communication substrate that the nomadic router is going to send the packet out on. Host computers will now indirectly be able to utilize two or more communication substrates, either to increase throughput or to provide soft-, handoff capability.

This functionality is not supported in today's typical protocol stacks (e.g., TCP/IP or AppleTalk). Once the nomadic router becomes aware of the available communication devices and activates them, the transport of data across the multiple communication substrates can take place. The unique algorithm and protocol in the nomadic router which chooses the most appropriate device to use is part of the "nomadic router Device Checker" through the "nomadic router Device Selection" across each interface.

There are numerous factors that can affect the selection of utilizing one or more devices. Such factors typically include available bandwidth, cost to initiate and maintain connection, power requirements and availability, and user's preference.

Apparatus Packaging

As described above, the nomadic router can be packaged in several different hardware configurations. The nomadic router can be embedded in the host computer, or network device such as a switch or router. It can also be implemented as a PCMCIA card which plugs into the host computer or as self-contained external box.

Figure 12A:
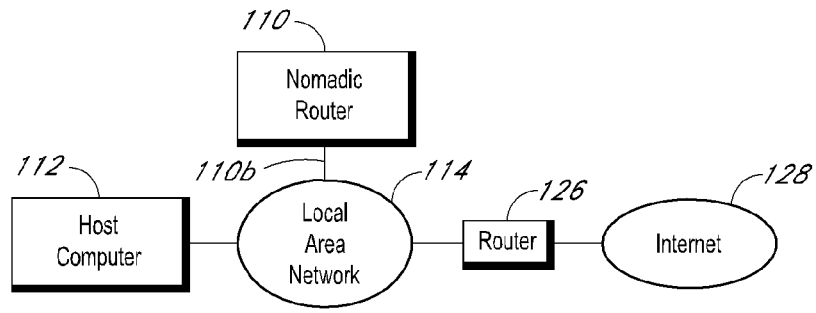
FIGS. 12A-D are diagrams illustrating host and network interface modes in which the nomadic router is able to operate.

Each nomadic router can have from one to many interfaces. If the router 110 is put into the network infrastructure, it doesn't have to be carried around with the mobile user. As shown in FIG. 12*a*, the nomadic router 110 is attached to a Local Area Network (LAN) of the network infrastructure which constitutes the communications device 114 through the system interface 110b. The LAN 114 is connected through a conventional router 126 to the internet 128. In this case, the host computer interface 110a of the nomadic router 110 is not needed since packets from the host computer 112 are received through the LAN 114.

Figure 12B:
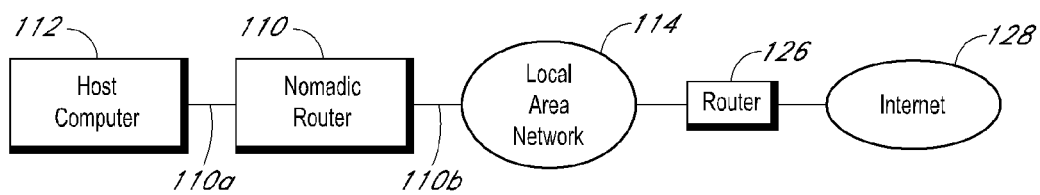

To provide a secure interface between the host computer 112 and network 114 to prevent host computers from being able to watch (sniff) packets on the network 114, the nomadic router 110 can have one interface to the host computer 112 (terminal interface 110a) and a second interface (110b) to the network 114 as shown in FIG. 12b, and provide filtering to which packets and retransmitted between the various interfaces thus providing a firewall type of security device but which operates internally on the network.

Figure 12C:
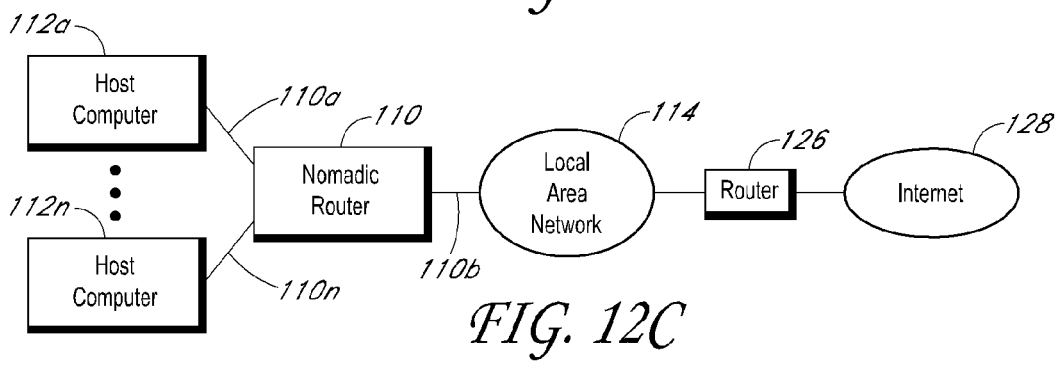
Figure 13:
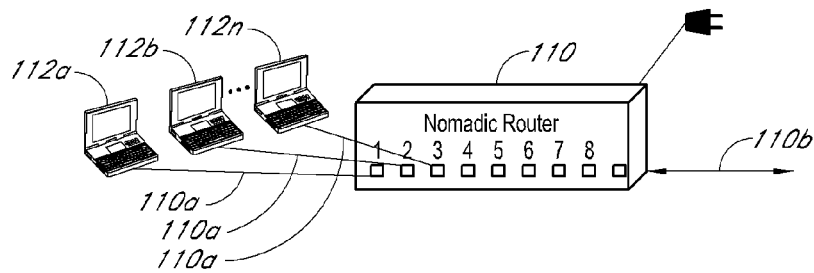
FIG. 13 is a simplified perspective view illustrating the nomadic router as implemented in a self-contained box which connects onto a local area network via a network interface port and has multiple ports to connect to host computers.

In order to support multiple host computers 112a, 112n with a single nomadic router 110, the nomadic router 110 may have multiple host interfaces 110a1, . . . , 110an as shown in FIG. 12c and in FIG. 13 and a network or system interface 110b.

Figure 12D:
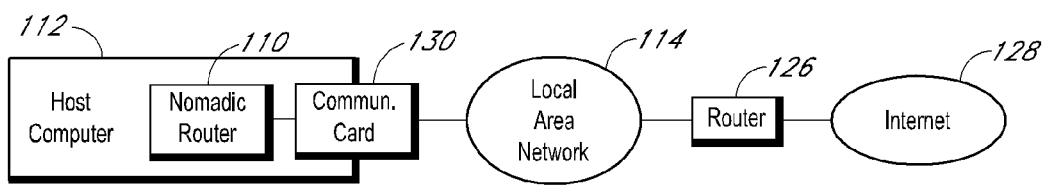

If the nomadic router is carried around by the mobile user, it can take the form of a PCMCIA card. In FIG. 12d, the nomadic router 110 is implemented as a PCMCIA card. The processing and translation capability is stored inside the card and the interface to the host computer 112 is through a PCMCIA BUS interface or communication card 130.

Figure 14:
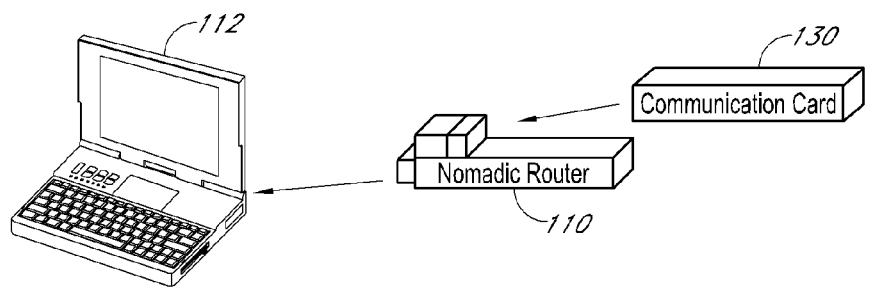
FIG. 14 is a simplified perspective view illustrating the nomadic router apparatus as implemented on a PCMCIA Type III card where the nomadic router plugs into the host computer's type II slot and the communication card device, of Type II, plugs directly into the nomadic router so both may be powered and stored in the portable host computer.

As shown in FIG. 14, the PCMCIA card can fit in a type III slot where there is a connector on the nomadic router 110 which accepts the communication card 130 (a type II PCMCIA card.) In this mode, the nomadic router doesn't not have to have the communication device specific components inside the PCMCIA card.

Figure 15:
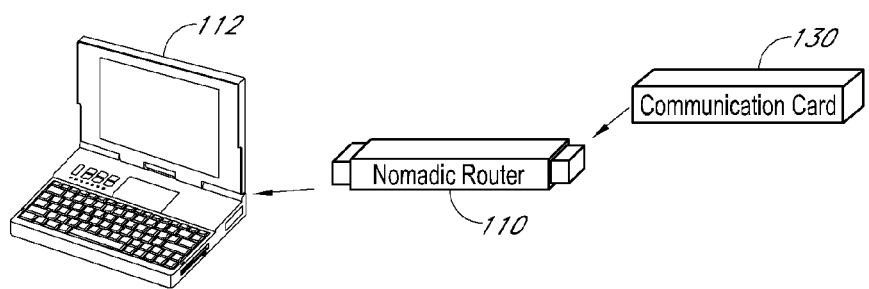
FIG. 15 is a simplified perspective view illustrating the nomadic router as implemented on a PCMCIA Type II card where the nomadic router plugs into the host computer via a type II interface slot and where the communication card device, Type II, plugs into the nomadic router type II card.

The nomadic router 110 can also take the form of a type II PCMCIA card. In this form, the communication device or card 130 plugs into the opposite end of the nomadic router card 110 as illustrated in FIG. 15.

Translation Operation of the Nomadic Router
Initialization and Self Configuration The nomadic router initialization and self configuration process provides the means by which the nomadic router is able to learn about the host computer and network so it knows what translation is necessary.

Host Learning

The nomadic router 110 is able to learn about how the host computer 112 is configured by looking at the content of the packets being sent from the host computer 112. Rather than the host computer 112 sending packets directly to the router 126 or other network device, which is what it is initially configured to do, the nomadic router 110 is able redirect all outbound packets from the host computer 112 to itself. This redirection can be accomplished in several ways as described below.

1. Proxy ARP Packet Interception and Host Reconfiguration

Figure 10:
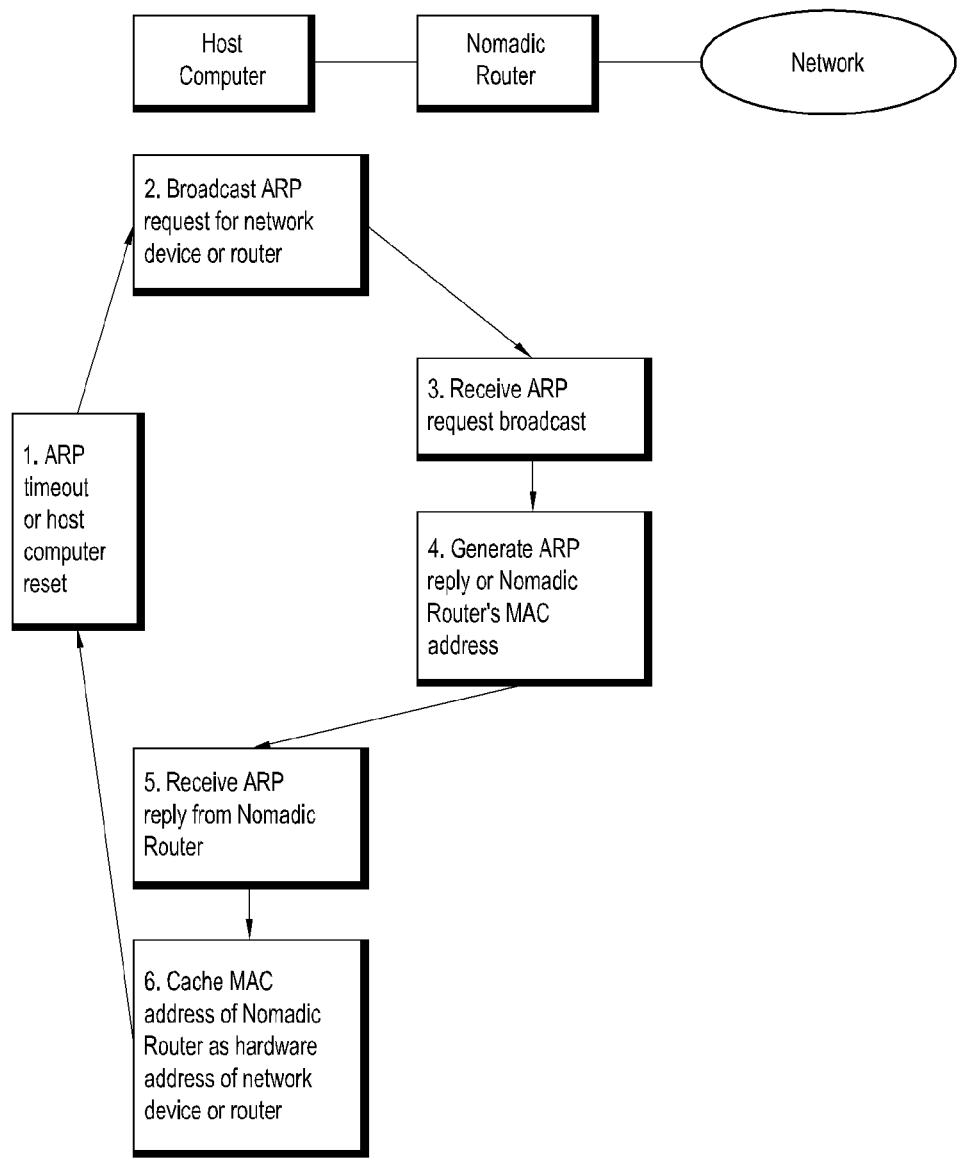
FIG. 10 is a flowchart illustrating the nomadic router's proxy ARP packet interception and host reconfiguration process.

Whenever a host computer 112 has an IP packet which it needs to send to a router 126 or other network device, it uses the Address Resolution Protocol (ARP) to obtain the link layer Media Access Control address (MAC address). As illustrated in FIG. 10, when the host computer 112 broadcasts and ARP request for the MAC address of a destination node, the nomadic router 110 receives this ARP request broadcast and responds with its MAC address (not that of the destination node).

When the host computer 112 receives this ARP reply from the nomadic router 110, which contains the MAC address of the nomadic router 110, the host computer 112 will cache this MAC address in the host computer 112 and send all packets destined for the configured router or network device to the nomadic router 110. The host computer 112 will think that the MAC address is that of the configured IP network device, but in reality, the nomadic router 110 is pretending (proxying) to be the device (its home gateway) that the host computer 112 expects to find.

The nomadic router 110 is also able to reconfigure and intercept return packets from a router or other network device using the same process.

2. Promiscuous Mode Packet Interception

Since the MAC address is cached in the host computer 112 for a short period of time, the host computer 112 will not send out a new ARP request to obtain the MAC address again unless a timeout period occurs or the cache is cleared such as when the computer 112 is restarted.

When a conventional network device receives or hears a packet with a MAC address which does not match its own, it will ignore or drop the packet. Since it is possible to rapidly switch from one network environment to another using a portable computer, the nomadic router 110 must be able to intercept packets even when the MAC address is not that of the nomadic router's home gateway or device.

This is accomplished by placing the nomadic router's network connection in promiscuous mode. In this mode, the network connection on the nomadic router accepts all packets being transmitted, on the communication link, not just ones being broadcasted or addressed specifically to it.

3. Dynamic Host Configuration Protocol (DHCP) Service

A host computer is able to utilize the DHCP service to obtain the configuration information rather than being manually configured. The host computer utilizing the DHCP service requires that a DHCP server be installed on the network segment to which it is currently attached. If the host computer 112 is utilizing this service and requests configuration information using DHCP, the nomadic router 110 will intercept these requests and respond with configuration information for the host computer 112 to use.

Network Learning

The nomadic router is able to learn about the network environment it is currently attached using several different methods as described below.

1. Dynamic Host Configuration Protocol (DHCP)

Whenever a different network connection is connected on the nomadic router, it will broadcast a DHCP request to obtain configuration information for the current network. If no DHCP service is available on the network, it will switch to another method to learn about the network configuration.

2. Router Information Packets

Routers on the network will periodically broadcast router information packets which are used to build routing tables and allow routers to adapt to changes in the network. The nomadic router 110 will listen on the network for these router information packets. When one is received, it will extract out the configuration information from these packets.

3. Passive Listening

By placing the nomadic router's network connection in promiscuous mode, where is receives all packets not just ones destined for it, it is able to examine all packets on the network to discover how the network is configured. It is also able to determine the IP addresses used on the local area network and which machines are routers by the final destination address not being the next hop address.

Using this method, the nomadic router 110 is passively able to learn how the network is configured and will elect to use an unused IP address. If that IP address does become used by another network device, it will switch over to another unused IP address.

4. Manual Configuration

The network configuration information can be manually configured in the nomadic router 110. This information can be set using an embedded web server, Simple Network Management Protocol (SNMP) tools, an application running on one of the computers in the network, or other suitable means. When manual configuration is used to set the network information, the nomadic router 110 will still learn about the host information automatically and provide all the translation capabilities so the host computers do not have to be aware of the correct network information of the LAN to which they are currently connected.

Packet Translation

The nomadic router's packet translation function provides a mapping between location and service dependent configurations used by the host computer 112 and that used by the network 114 to which it is currently attached. For outbound traffic from the host; computer 112 to the network 114, the translation function changes the content of the packet such as the source address, checksum, and application specific parameters, causing all packets sent out to the network 114 be directed back to the nomadic router 110 rather than to the host computer 112.

The inbound traffic from the network 114 arriving at the nomadic router 110, which is really for the host computer 112, is passed through the translation function so the host computer 112 thinks that the replies were sent directly to it. The host computer 112 will be completely unaware of all the translation being performed by the nomadic router 110.

Figure 11A:
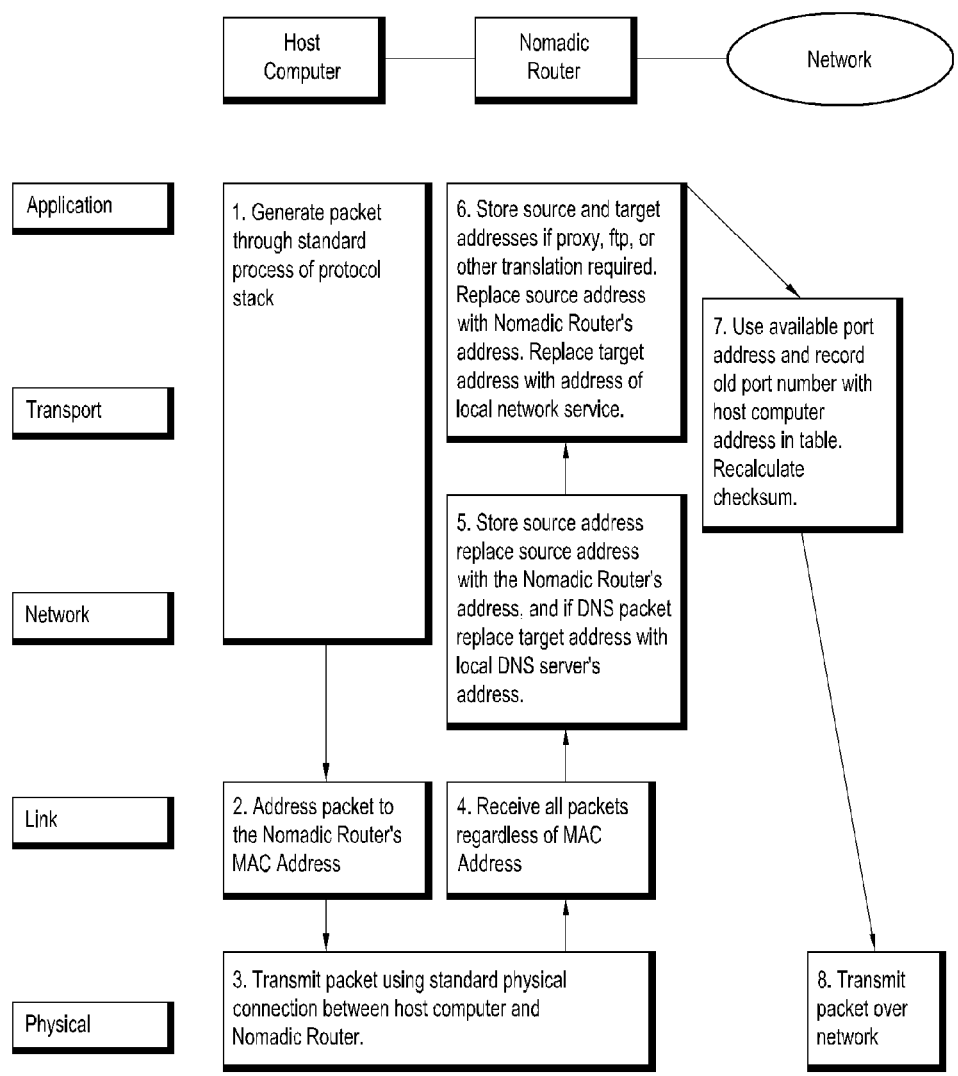
FIGS. 11A-B in combination constitute a flowchart illustrating the nomadic router's translation process which takes place in the host computer and nomadic router at various levels in the protocol stack.
Figure 11B:
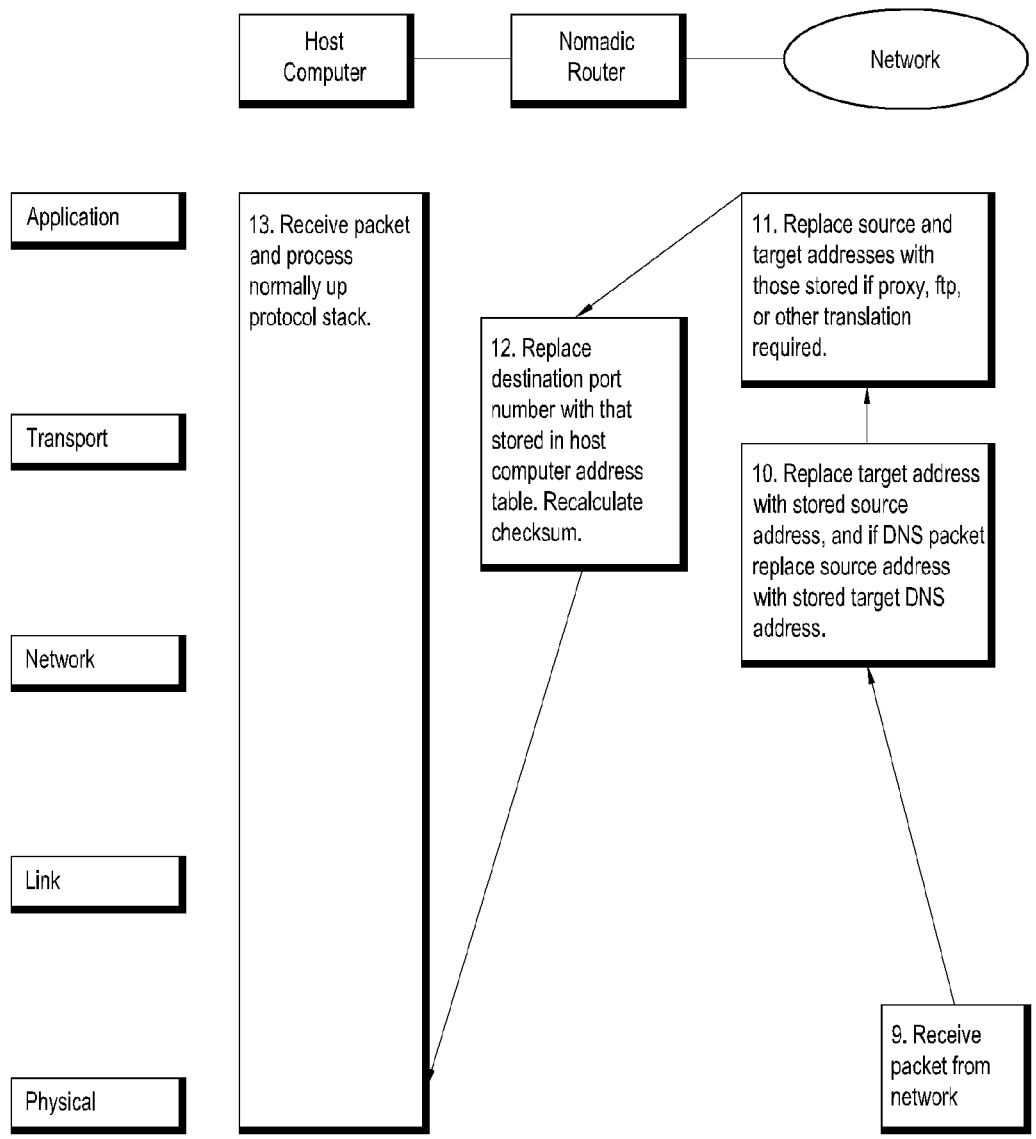

The translation functions works as illustrated in FIGS. 11a and 11b. In these figures, the operations performed in the OSI/ISO model application, transport, network, link and physical layers are illustrated in rows opposite the layer designations. The operations performed by the host computer 112, nomadic router 110 and network 114 are illustrated in columns below the device designations.

The host computer 112 will generate network packets using the current configuration stored in the host computer 112 using the standard protocol stack as shown in step 1. This configuration information is either manually configured in the host computer 112 or obtained using DHCP.

As shown in step 2, when the host computer 112 addresses the link level destination address, the address automatically obtained using the Proxy ARP packet interception routine described earlier, this will cause the host computer 112 to send the packet to the network address of its standard router or home gateway device, but using the link level address of the nomadic router 110.

In step 3, the packet is transmitted across the standard physical connection between the host computer 112 and nomadic router 110. As shown in step 4, the nomadic router 110 will receive the packet at the link level either due to the Proxy ARP function which reconfigured the host computer's MAC address, or the nomadic router 110 will have the link level in promiscuous mode which it will cause it to receive the packet even if destined to a different MAC address.

Once the packet is passed to the network layer, shown in step 5, the nomadic router translation function will modify the content of the packet to change the source address to that match of the nomadic router's address instead of the host computer's address. It will also translate other location dependent information such as the name of the local Domain Name Service (DNS) server. When translating the DNS packet, it will change the source address to that of the nomadic router's address and the destination address to that of a local DNS server.

Once the network layer translation is complete, the packet can be translated at the application and transport layers. The application layer is translated next, as shown in step 6, since the transport layer requires a pseudo network layer header which includes the source and destination addresses and the content from the application layer.

At the application layer translation, any addresses which describe the source address of the host computer, such as with FTP, are translated to be that of the nomadic router's address. Any application layer destination addresses, such as a local proxy server, are translated to match that of the server running on the current network.

Once this application translation is complete, the transport layer, as shown in step 7, can complete the checksum and any port number manipulation. The port number is manipulated if more than one host computer 112 is attached to the nomadic router 110. Each host computer 112 when it sends out a request using a specific port is translated to match an available inbound port on the nomadic router 110.

The port number assigned for use with each host computer 112 is stored in a table in the nomadic router 110 and is utilized with the reply packet described later. Finally the packet is sent out over the network 114 in step 8.

When a reply packet comes in from the network 114, as shown in step 9, the nomadic router 110 will receive the packet. In step 110, the nomadic router 110 will perform the reverse network layer translation to set the destination address to that of the host computer rather 112 than the nomadic router's address, and any source address to that replaced by the nomadic router 110 in step 5.

Once this network translation is complete, the packet is translated at the application layer, as shown in step 11, to change the destination address to that of the host computer 112 and the source address to the original destination address stored from step 6. In step 112, any port manipulation performed in step 7 is changed to the original setting and a new checksum is computed. Finally, as shown in step 13, the packet is sent to the host computer 112 which then processes the packet normally.

Options of the Nomadic Router

By way of motivation, many communication infrastructures are varied and fragmented, and this problem is likely to be exacerbated as more technologies are introduced. For example, high performance LANs, wireless services, cellular telephony, satellite, ubiquitous paging networks, all provide varying degrees of coverage, cost and bandwidth/delay characteristics.

Nomadic Intranet

The Nomadic Intranet provides all network, server type, services for users who which to dynamically create an ad hoc network. This is similar to the instant network nomadic router except the nomadic intranet is a single device with multiple ports into which laptop/devices can be plugged. The instant network nomadic router is distributed to (one per) each host device. The nomadic intranet not only provides ad hoc networking but can also provide services such as temporary file storage, protocol conversion, act as a print server, and provide other services described as part of the Basic nomadic router.

Fixed Nomadic Router

The Fixed nomadic router provides the same basic functionality and architecture as the portable nomadic router but is stored in one location. The fixed nomadic router acts as a surrogate or "Home Agent" for the user when he/she is away on travel. When the user wishes to register or utilize their host device elsewhere in the network, the portable nomadic router will register with the fixed nomadic router where it is temporarily attached to the network so information can be forwarded to the user's new location. The fixed nomadic router can also be used to house the master copy of the user's E-mail for the nomadic E-mail service, or files for the nomadic file synchronizer.

Mobile Virtual Private Network

The nomadic router provides the mapping between the location based IP address used in the internet today and the permanent user based address housed in the host CPU. This mapping is done without support or knowledge of such mapping by the host CPU or user. The Internet RFC 2002 Mobile IP protocol specifies the mapping between permanent and temporary IP addresses. The unique aspect of the nomadic router is that the Mobile IP protocols are not necessarily running in, or supported by, the host CPU but rather are internal to the nomadic router.

By implementing this protocol as part of the translation function in the nomadic router, the nomadic router can encapsulate packets from the host computer and transmit them back to the fixed nomadic router which are sent out (un-encapsulated) on the native (home) network. Replies from the home network are received by the fixed nomadic router and are encapsulated and sent back to the nomadic router. When packets are transmitted between the nomadic router and fixed nomadic router, the packets are encrypted and sent using the Internet Tunneling Protocol.

Since the nomadic router provides location independence and the fixed nomadic router forwards all packets from a corresponding host to the host computer via the nomadic router, any changes in the location, failure of a network link, or attachment point of the mobile host computer does not cause any open session to be lost. This session loss prevention is possible since the fixed nomadic router pretends to be the mobile host computer, and the nomadic router pretends to be the home network. The fixed nomadic router and nomadic router translation functions hide the link and network loss from the transport and application session.

Communication between users and networks or online services may be effectuated through ports, for example, located within hotel rooms or multi-dwelling units, or through conventional dial-up communications, such as through the use of telephone or cable modems. According to one aspect of the invention, users can be are redirected to a portal page, as described below. After being redirected to the portal page, the user is subjected to a AAA process. Based upon the AAA process, the user may be permitted transparent access to the destination network or may be redirected to a login page in order to gather additional information to identify the user.

Identifying the user is crucial in authorizing access to networks or online services, as such services are typically provided for a fee and may be customized based upon the user, user's location, or user's computer. As discussed below, the user's identification may be used to direct the user to a specific portal page, which can be a particular webpage. As such, the system of the present invention includes means for identifying a user based upon an attribute associated with the user that is contained within the packet transmitted from the user's computer. Attributes can include any data well known in the art for identifying the user, the user's location, and/or the user's computer. In general, identifying a user's computer that accesses a network can be done by a media access control (MAC) associated with the computer. Identifying a computer based upon a MAC address is well known to those of skill in the art, and will not be discussed in detail herein. Additionally, the attribute can be based upon a user name, ID, or according to one advantageous embodiment described below, a particular location, such as from a communications port in a hotel room. As such, the location of the user can be the identifiable attribute.

According to one embodiment of the present invention, after a user accesses the computer network using a computer in communication with the gateway device 12, as described above, the user is directed to a portal page. The portal page may be maintained by an ISP or an enterprise network, or by any entity maintaining a webpage on the Internet. According to one aspect of the invention, the portal page can be a webpage containing any information whatsoever, and can be created by the ISP, enterprise network administrator or user. The portal page can contain information specific to the user accessing the network, as discussed in detail below.

Regardless of whether a user accessing the computer network is authorized access to the network, the user is redirected to a portal page. After being redirected to a portal page, the gateway device of the present invention determines the authorization and access rights of the user based upon an Authentication, Authorization and Accounting method.

According to one aspect of the invention, a user may be identified and authorized access to the network or online services based upon attributes associated with the user, such as the user's location or the user's computer. When this occurs, the user can be forwarded to a portal page unique to that user. As described below, and also above, the user may be identified without being queried to input any identification information so that upon accessing the computer network the user is automatically directed to a generic portal page or a portal page established specifically for and unique to that user. According to another aspect of the invention, a user may be identified and authorized access based upon the user's identity after being redirected to the portal page. The user may have to enter a login name and password while at the portal page or after being directed to a login page so that the ISP or other entity maintaining the gateway device can identify the user. After entering identifying data, the user may be directed to a particular portal page, as in the first aspect described above. According to a third aspect of the invention, the user is not authorized access to the network. Where this occurs the user will be directed from the portal page to a login page where the user will have to input identification information, such as the user's name, address, credit card number, and other relevant data so that the user may be authorized to access the network. After the user enters sufficient login data to establish authorization, the user may be redirected to a portal page.

The redirection is accomplished by a Home Page Redirect (HPR) performed by the gateway device, a AAA server, or by a portal page redirect unit located internal to or external to the gateway device. To accomplish the redirection of a user to a portal page, HPR utilizes a Stack Address Translation (SAT) operation to direct the user to the portal page, which is preferably local to the gateway device so that the redirection will be efficient and fast. This is accomplished by redirecting the user to a protocol stack using network and port address translation to the portal server that can be internal to the computer network or gateway device. More specifically, the gateway device, AAA server or portal page redirect unit receives the user's HTTP request for a web page and sends back the HTTP response reversing the network and port address translation the portal server, essentially acting as a transparent 'go-between' to the user and portal server. It will be appreciated, however, that to receive the HTTP request the gateway device, AAA server or portal page redirect unit must initially open a Transmission Control Protocol (TCP) connection to a server in line with the user-requested Internet address.

According to one aspect of the present invention, when a user initially attempts to access a destination location, the gateway device, AAA server or portal page redirect unit receives this request and routes the traffic to a protocol stack on a temporary server, which can be local to the gateway device. This can occur where a user initially opens a web browser resident on the user's computer and attempts to access a destination address, such as an Internet site. The destination address can also include any address accessible via the network or an online service, and can include the portal page. The protocol stack can pretend to be the user-entered destination location long enough to complete a connection or 'handshake'. Thereafter, this protocol stack directs the user to the portal server, which can be local to the gateway device to facilitate higher speed communication. The redirection to the portal server can be accomplished by redirecting web pages only, rather than all traffic, including E-mails, FTPs, or any other traffic. Therefore, once authorized, if a user does not attempt to access a webpage through the user's Internet browser, the gateway device can forward the communication transparently to the user's requested destination without requiring the user to access the portal page. Furthermore, according to one aspect of the invention, specific user-input destination addresses may be authorized to pass through the gateway device without being redirected.

The portal page can also be specialized based on the user, user's location, user's computer, or any combination thereof. For example, assuming that the user has been authenticated and has authorization, the gateway device can present users with a portal page that identifies, among other things, the online services or other computer networks that are accessible via the gateway device. In addition, the portal page presented by the gateway device can provide information regarding the current parameters or settings that will govern the access provided to the particular user. As such, the gateway administrator can readily alter the parameters or other settings in order to tailor the service according to their particular application. Typically, changes in the parameters or other settings that will potentially utilize additional resources of the computer system will come at a cost, such that the gateway administrator will charge the user a higher rate for their service. For example, a user may elect to increase the transfer rate at which signals are transmitted across the computer network and pay a correspondingly higher price for the expedited service.

The portal page may include advertising tailored to the specific needs of the user. The gateway device would be capable of tailoring the material based upon user profiles in the network. The portal page may also incorporate surveys or links to surveys to provide the network provider with beneficial statistical data. As an ancillary benefit, the user who responds to the surveys may be rewarded with network access credit or upgraded quality. Additionally, the service provided could offer additional services to the user by way of the portal page or links to these services may be offered on the portal page. These services offered by the network service provider are not limited to the services related to the network connection. For example, a hotel may desire to offer the user in-room food service or a multi-unit dwelling may want to offer house cleaning service.

The portal page may also comprise information related to the status of the current network session. By way of example this information may include, current billing structure data, the category/level of service that the user has chosen, the bandwidth being provided to the user, the bytes of information currently sent or received, the current status of network connection(s) and the duration of the existing network connection(s). It is to be understood, by those skilled in the art to which this invention relates that all conceivable useful information relating to the current network session could be displayed to the user in a multitude of combinations as defined by the user and/or the gateway administrator. The gateway administrator will have the capability to dynamically change the information supplied in the portal page based on many factors, including the location of the user, the profile of the user and the chosen billing scheme and service level. The information provided in the portal page may prompt the user to adjust any number of specific parameters, such as the billing scheme, the routing, the level of service and/or other user-related parameters.

The portal page may be implemented with an object-oriented programming language such as Java developed by Sun Microsystems, Incorporated of Mountain View, Calif. The code that defines the portal page can be embodied within the gateway device, while the display monitor and the driver are located with the host computers that are in communication with the gateway device. The object oriented programming language that is used should be capable of creating executable content (i.e. self-running applications) that can be easily distributed through networking environments. The object oriented programming language should be capable of creating special programs, typically referred to as applets that can be incorporated in portal pages to make them interactive. In this invention the applets take the form of the portal pages. It should be noted that the chosen object-oriented programming language would require that a compatible web browser be implemented to interpret and run the portal page. It is also possible to implement the portal page using other programming languages, such as HTML, SGML and XML; however, these languages may not be able to provide all the dynamic capabilities that languages, such as Java provide.

By re-directing the user to the portal page the gateway administrator or network operator is provided the opportunity to present the user with updated information pertaining to the remote location (i.e. the hotel, the airport etc.). By way of example the portal page may provide for links to the corporate home page, a travel site on the Internet, an Internet search engine and a network provider home page. Additionally, the buttons or any other field within the portal page may include other types of information options, such as advertising fields or user-specific links or fields based upon data found in the user's profile or inputted by the user.

It will be appreciated that the portal page is not limited to supplying information related to the user's billing and service plans. It is also possible to configure the portal page to include information that is customized to the user or the location/site from which the user is remotely located. For example, the user may be located at a hotel for the purpose of attending a specific convention or conference either in the hotel or within the immediate vicinity of the hotel. The gateway device may have "learned" this information about the user through an initial log-on profile inquiry or the gateway administer may have inputted this information into a database.

The gateway device can store user profile information within a user-specific AAA database, as described below, or it can store and retrieve data from external databases. The gateway device can be configured to recognize these profiles and to customize the portal page accordingly. In the hotel scenario, the portal page may include a link for convention or conference services offered by the hotel.

In another example of location specific portal page data, the user may be remotely accessing the gateway device while located in a specific airport terminal. The gateway device will be configured so that it is capable of providing ready access to information related to that specific airport terminal, i.e. information pertaining to the current flights scheduled to depart and arrive that terminal, the retail services offered in that specific terminal, etc. In this manner, the portal page may include a link for terminal specific flight information and/or terminal specific retail services available to the user.

It will also be appreciated that the HPR may be configured so a user is redirected to a portal page upon specific default occurrences, such as a time out, or according to preset time. For example, the portal page may act as a screen-saver, where the user is redirected to a portal page after a given period of inactivity. These functions may be established by the ISP or enterprise network administrator.

Customization of the information comprising the portal page is not limited to the gateway administrator or the network operator. The user may also-be able to customize the information that is provided in the portal page. The user customization may be accomplished either directly by the user configuring the portal page manually or indirectly from the gateway device configuring the portal page in response to data found in the user-specific profile. In the manual embodiment the user may be asked to choose which information or type of information they would like supplied in the portal page for that specific network session. For instance, the user may require an alarm clock counter to insure an appointment is met or the user may require periodical updates of a specific stock quote. The information that a user customizes for the portal page may be network session specific, may be associated with the duration of a gateway subscription or may be stored in a user profile for an indefinite period of time. The gateway device's ability to communicate with numerous user databases provides the basis for storing user specific profiles for extended periods of time.

As explained above, the portal page presented to the user can be dependent upon an attribute associated with the user, such as the user's identification, the user's location, an address associated with the user's computer, or a combination thereof. The means in which a user is identified and access rights are determined is based upon an Authentication, Authorization and Accounting (AAA) method implemented by the AAA server.

One function of the AAA server is to identify the user in communication with the gateway device in a manner that is transparent to the user. That is, the user will not be required to reconfigure the computer or otherwise change the home network settings, and no additional configuration software will have to be added to the computer. According to one embodiment of the present invention, after a user is directed to a portal page, the AAA server can be accessed to authorize and authenticate the user. Therefore, upon accessing the network, the user may be forwarded to a generic portal page, and after the user may be authenticated, the user can be forwarded via HPR and SAT to a specialized portal page, as described above.

After receiving a request for access from a user, forwarding the user to a portal page, and identifying the user or location the AAA server then determines the access rights of the particular user. In addition to storing whether users have valid access rights, the user profile database can also include specialized access information particular to a specific location or user, such as the bandwidth of the user's access, or a portal page to which a user should be directed. For example, a user accessing the network from a penthouse may receive a higher access band rate than someone accessing the destination network from a typical hotel room. Additionally, a user profile can include historical data relating to a user's access to the network, including the amount of time a user has accessed the network. Such historical information can be used to determine any fees which may be charged to the user, or due from the user, for access. Specialized access information contained within the user profile may be established by the system administrator, or by the user who has purchased or otherwise established access to the network. For example, where a user is transparently accessing the gateway device from a hotel room, the hotel network administrator may enter user access information into the profile database based upon access rights associated with a room in the hotel. This can also be done automatically by the gateway device or a local management system, such as a hotel property management system, when the user checks into his or her room.

Assuming that a user does not have a subscription for access to the network, a login page enables new users to subscribe to the computer network so that they may subsequently obtain access to networks or online services transparently through the gateway device. The user may take steps to become authenticated so that the user's information may be recorded in the user profile database and the user is deemed valid. For example, a user may have to enter into a purchase agreement, requiring the user to enter a credit card number. If the user needs to purchase access, or if the system needs additional information about the user, the user is redirected from the portal page via HPR and SAT to a location, such as a login page, established to validate new users. SAT and HPR can intervene to direct the user to a webserver (external or internal) where the user has to login and identify themselves. Location-based information and authorization, as described in detail in U.S. Patent Application Ser. No. 60/161,093, incorporated elsewhere herein, can be sent to the portal page as part of this redirection process. This enables the portal page to be customized to include customized information, such as locale restaurant ads or train schedules.

Assuming that a user has not been authorized access to the network based upon location based identification or user input identification, the user must provide the gateway device with sufficient information to become authorized access. Where the user is not authorized access the user is forwarded via HPR and SAT from the portal page to a login page. The login page enables new users to subscribe to the computer network so that they may subsequently obtain access to networks or online services transparently through the gateway device. To direct the users to a login page the AAA server calls upon the HPR function. The HPR directs the user to the login page, and after the user has entered requisite information into the login page, the AAA server adds the new information to the customer profile database and can direct the user to the user's desired destination, such as an Internet address or can return the user to a portal page, depending upon the design of the system. Thus, new users can gain access to networks or online services without being predefined in the user profile database.

After receiving the user's login information, the AAA server will create a user profile utilizing this information so that the user will be able to obtain immediate access to the network next time the user logs in without being required to enter login information again. The AAA server can create a profile for the user in a locally stored user profile database, or can update the user profile in a database external to the gateway device. Regardless of the location of the user profile, the next time the user attempts to login the user's profile will be located in the user profile database, the user's access rights determined, and the user allowed transparent access to networks or services.

Dynamic Bandwidth Management on a Per Subscriber Basis in a Computer Network

A gateway device includes a bandwidth manager which enables the user/subscriber to initially set a maximum bandwidth service level at a particular billing rate and dynamically reset the maximum bandwidth with a corresponding change in the billing structure. The user/subscriber can independently set and reset the uplink and downlink bandwidths of their network access service. Thus, the user/subscriber can efficiently manage their network access according to the specific activity on the network.

In addition, the bandwidth manager provides active management of the delivery of data (also known as and referred to herein as traffic shaping) to increase throughput from the gateway device onto the network through a wide area network (WAN) link.

In order for a computer to function properly in a network environment, the computer must be appropriately configured. Among other things, this configuration process establishes the protocol and other parameters by which the computer transmits and receives data. In one common example, a plurality of computers is networked to create a local area network (LAN). In the LAN, each computer must be appropriately configured in order to exchange data over the network. Since most networks are customized to meet a unique set of requirements, computers that are part of different networks are generally configured in different manners in order to appropriately communicate with their respective networks.

While desktop computers generally remain a part of the same network for a substantial period of time, laptops or other portable computers are specifically designed to be transportable. As such, portable computers are connected to different networks at different times depending upon the location of the computer. In a common example in which the portable computer serves as an employee's desktop computer, the portable computer is configured to communicate with their employer's network, i.e., the enterprise network. When the employee travels, however, the portable computer may be connected to different networks that communicate in different manners. In this regard, the employee may connect the portable computer to the network maintained by an airport or by a hotel in order to access the enterprise network, the internet or some other on-line service. Since these other networks are configured somewhat differently, however, the portable computer must also be reconfigured in order to properly communicate with these other networks. Typically, this configuration is performed by the user each time that the portable computer is connected to a different network. As will be apparent, this repeated reconfiguration of the portable computer is not only quite time consuming, but is also prone to errors.

As described by U.S. patent application Ser. No. 08/816, 174 and U.S. Prov. Pat. App. No. 60/111,497, a universal subscriber gateway device has been developed by Nomadix, Incorporated of Santa Monica, Calif. The contents of both of these applications are incorporated herein by reference. The gateway device serves as an interface connecting the user/subscriber to a number of networks or other online services. For example, the gateway device can serve as a gateway to the Internet, the enterprise network, or other networks and/or on-line services. In addition to serving as a gateway, the gateway device automatically configures a computer to communicate with the new network in a manner that is transparent to the user/subscriber. In this regard, the gateway device will download the necessary protocols and other configuration parameters to the computer without any intervention by the user/subscriber and without loading any additional software on the user/subscriber's computer. Once the gateway device has appropriately configured the user/subscriber's computer, the computer can appropriately communicate via the new network, such as the network at a hotel or at an airport, in order to access other networks, such as the enterprise network, or other online services, such as the internet.

The computer user/subscriber, and more specifically the remote or laptop user, benefits from being able to access a myriad of computer networks without having to undergo the time-consuming and all-too-often daunting task of reconfiguring their host in accordance with network specific configurations. In this fashion, the gateway device is capable of providing more efficient network access to the user/subscriber. A gateway device is also instrumental in providing the user/subscriber broadband network access that can be tailored to the user/subscriber's needs. In many instances the remote user/subscriber is concerned with being able to acquire network access and levels of service in the most cost-effective manner. Correspondingly, the gateway device administrator desires the capability to be able to offer the user/subscriber numerous different services and billing rate options. By way of example, the remote user/subscriber in a hotel environment may desire a network subscription for the duration of their hotel stay while the user/subscriber in an airport may desire a network subscription for the duration of their layover or until their scheduled flight departs. Additionally, a user/subscriber may desire a certain level of service based on bandwidth concerns and the need for higher or lower data rate transfers. For example, the user/subscriber who is accessing a network for the purpose of viewing text may desire a lower bandwidth service level that meets their particular needs, however, another user/subscriber who is accessing a network for the purpose of downloading files or media-rich content may desire a higher bandwidth service level capable of transferring data at relatively higher speeds.

In today's fast paced computing and networking environment it is even more advantageous to provide these service and billing options dynamically, allowing the user/subscriber to change, for example, billing rates or bandwidth capacity while a network session is on going. This would allow the user/subscriber to be billed at one rate while downloading the data-intensive file or media-rich content while choosing a more cost-effective billing structure for the less data-intensive activities, such as electronic mail (e-mail). As yet another example, the user/subscriber may be sending and/or receiving data-intensive content which requires a certain minimum transfer rate in order to be effectively communicated at the receiving end, such as voiceover IF or video. In such cases, the user/subscriber may desire some guarantee of delivery of the data-intensive content at a relatively higher cost.

Additionally, the dynamic nature of this process would allow the user/subscriber to change service levels or billing rates without the need to exit the network and initiate a new log-on procedure. In effect, the user/subscriber benefits from having a more efficient and less time-consuming means of altering service levels and billing structure.

However, in current network implementations, bandwidth management is typically performed statically, at the time a new subscriber account is established. The new subscriber typically selects a service level and billing structure defining a particular transmission rate (i.e., bandwidth) when establishing the account, and is not afforded the option of changing their service level or billing structure dynamically. In a common example, the service provider configures the network to provide the new subscriber with the subscriber selected bandwidth service level, which typically involves service provider configuring hardware devices under the control of the service provider, such as a modem or access controller. The user/ subscriber is not allowed to dynamically change the bandwidth, but must contact the service provider and request a change in their configuration to allow a higher or lower transmission rate. In response to such a request, the service provider typically assigns a technician to manually implement the reconfiguration of the hardware device(s) and/or other devices or records. In some instances, the subscriber also may be required to reconfigure their computer to accommodate the changes in the bandwidth service level.

Therefore, an unsatisfied need exists in the industry for dynamic management of network access bandwidth, particularly when purchasing network access for a relatively short time, such as in an airport or hotel.

Summary

The present invention comprises a gateway device including a bandwidth manager which enables the user/subscriber to initially set a maximum bandwidth service level at a particular billing rate and dynamically reset the maximum bandwidth with a corresponding change in the billing structure. The user/subscriber can independently set and reset the uplink and downlink bandwidths of their network access service. Thus, the user/subscriber can efficiently manage their network access according to the specific activity on the network.

For example, a user/subscriber can select a relatively high maximum bandwidth for the downlink connection when accessing data-intensive content over the network, or a relatively low bandwidth for the downlink connection when accessing less data-intensive content over the network. The change in bandwidth service level is automatically made substantially instantaneously, and the user/subscriber begins receiving service at the new bandwidth and new billing rate. Likewise, the user/subscriber can increase or decrease the bandwidth of the uplink connection so the user/subscriber only purchases the amount of bandwidth appropriate for their network activity.

In addition, the bandwidth manager provides active management of the delivery of data (also known as and referred to herein as traffic shaping) to increase throughput from the gateway device onto the network through a wide area network (WAN) link.

This balances the load on the WAN link, thereby preventing dropped packets or longer delays. One technique in accordance with the present invention is by weighted fare queuing, which limits the traffic on the WAN link to what the WAN link can legitimately handle without overload. Lastly, the user/subscriber can purchase a service level that reserve a minimum percentage of the available bandwidth through the gateway device (symmetrically or asymmetrically) by paying additional service fees such that at least a portion of the available bandwidth is allocated to a particular subscriber, or to a particular type of data being sent/received by the user/subscriber. For instance, a user/subscriber may request higher prioritization for video data than for textual data coming in from the network to the user/subscriber, and the bandwidth manager would prioritize the delivery of the packets to the user/subscriber accordingly.

Description

For purposes of clarity, it is noted that that the maximum bandwidth requested when establishing a network access service represent merely a maximum transfer rate, not necessary the actual transfer rate obtained by the user/subscriber. In fact, the user/subscriber will often find that their transfer rate is well below that of their selected maximum rate due to network delays and congestion. Yet at other times, when the network resources are underused, the user/subscriber may obtain a transmission rate close to or at their selected maximum transfer rate.

Figure 16:
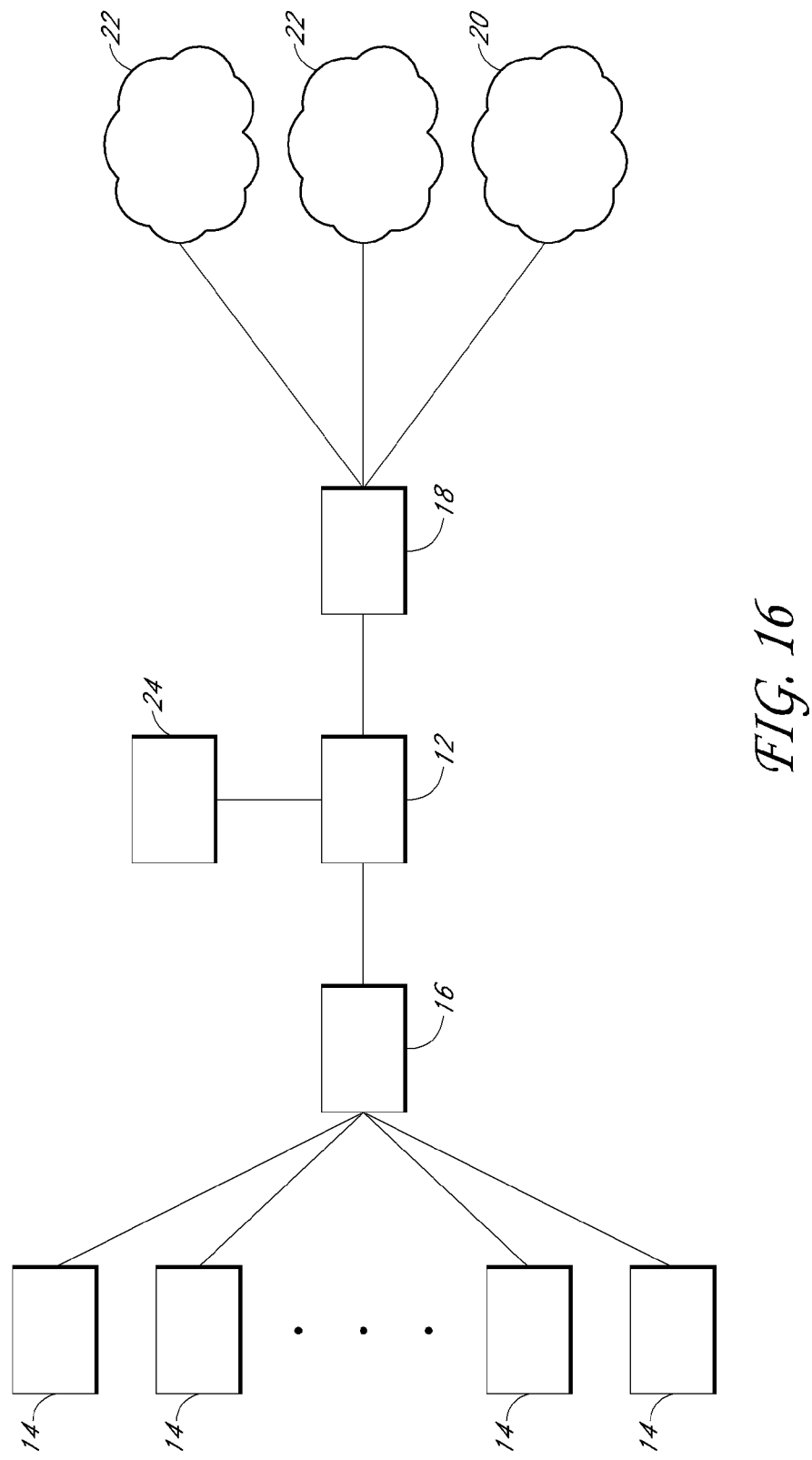
FIG. 16 is a block diagram of a computer system that includes a gateway device in accordance with an embodiment of the present invention for automatically configuring one or more computers to communicate the via the gateway device with other networks and/or other online services.

Referring now to FIG. 16, the computer system 10 that includes a gateway device 12 is depicted in block diagram form. The computer system typically includes a plurality of user/subscriber computers 14 that access the computer network in order to gain access to other networks or other online services. For example, the computers can be plugged into ports that are located in different rooms of a hotel, a multi-dwelling residence or an office building. Alternatively, the computers can be plugged into ports in an airport, an arena, or the like. The computer system also includes a gateway device in accordance with the present invention that provides an interface between the plurality of computers and the various networks or other online services. Most commonly, the gateway device is located near the computers at a relatively low position in the structure of the overall network (i.e., the gateway will be located within the hotel, multi-unit residence, airport, etc.). However, the gateway device can be located at a higher position in the overall network structure such as at a Point of Presence (PoP) of Network Operating Center (NOC), if so desired. Although the gateway device can be physically embodied in many different fashions, the gateway device typically includes a controller and a memory device in which software is stored that defines the operational characteristics of the gateway device. Alternatively, the gateway device can be embedded within another network device, such as the access controller or a router, or the software that defines the functioning of the gateway device can be stored on a PCM-CIA card that can be inserted into the computer in order to automatically reconfigure the computer to communicate with a different computer system.

The computer system 10 also typically includes an access controller 16 positioned between the computers 14 and the gateway device 12 for multiplexing the signals received from the plurality of computers onto a link to the gateway device. Depending upon the medium by which the computers are connected to the access controller, the access controller can be configured in different manners. For example, the access controller can be a digital subscriber line access module (DSLAM) for signals transmitted via regular telephone lines, a cable headend for signals transmitted via coaxial/optical fiber cables, a wireless access point (WAP) for signals transmitted via a wireless network, a CMPS, a switch or the like. As also shown in FIG. 16, the computer system typically includes one or more routers 18 and/or servers (not shown in FIG. 16) of a plurality of computer networks 20 or other online services 22. While the computer system is depicted to have a single router, the computer system can have a plurality of routers, switches, bridges, or the like that are arranged in some hierarchical fashion in order to appropriately route traffic to and from the various networks or other online services. In this regard, the gateway device typically establishes a link with one or more routers. The routers, in turn, establish links with the servers of other networks or other online service providers, such as internet service providers, based upon the subscriber's selection.

The gateway device 12 is specifically designed to configure computers 14 that log onto the computer network 10 in a manner that is transparent to the subscriber. In the typical computer network that employs dynamic host configuration protocol (DHCP) service, the DHCP server 24 will initially assign an IP address to a computer that is logging onto the computer network through communication with the gateway device. While illustrated as a separate device from the gateway device 12, the DHCP server 24 may be incorporated into the physical embodiment housing the gateway device. Upon opening their web browser or otherwise attempting to access an on-line service, the gateway device will direct the subscriber to enter their ID and password. The gateway device then determines if the subscriber is entitled to access the computer system, the level of access and/or the type of services to which the subscriber is entitled according to an Authentication, Authorization and Accounting (AAA) procedure that is described by U.S. patent application Ser. No. 08/816,174 and U.S. Provisional Application No. 60/111, 497. An AAA server, which is a database of subscriber records, may be remote to the gateway device or the Mi\ database may be incorporated into the physical embodiment housing the gateway device. Assuming that the subscriber has been authenticated and has authorization, the gateway device typically presents new subscribers with a home page or control panel that identifies, among other things, the online services or other computer networks that are accessible via the gateway device. In addition, the home page presented by the gateway device can provide information regarding the current parameters or settings that will govern the access provided to the particular subscriber. As such, the gateway administrator can readily alter the parameters or other settings in order to tailor the service according to their particular application. Typically, changes in the parameters or other settings that will potentially utilize additional resources of the computer system will come at a cost, such that the gateway administrator will charge the subscriber a higher rate for their service. For example, a subscriber may elect to increase the transfer rate (i.e., bytes per second, also referred to as bandwidth) at which signals are transmitted across the computer network and pay a correspondingly higher price for the expedited service.

The home page also permits the subscriber to select the computer network 20 or other online service 22 that the subscriber wishes to access. For example, the subscriber can access the enterprise network on which the computer is typically resident. Alternatively, the subscriber can access the internet or other on-line services. Once the subscriber elects to access a computer network or other online service, the gateway device establishes an appropriate links via one or more routers 18 to the desired computer network or online service.

Thereafter, the subscriber can communicate freely with the desired computer network 20 or other online service 22. In order to support this communication, the gateway device 12 generally performs a packet translation function that is transparent to the user/subscriber. In this regard, for outbound traffic from the computer 12 to the computer network or other on-line service, the gateway device changes attributes within the packet coming from the user/subscriber, such as the source address, checksum, and application specific parameters, to meet the criteria of the network to which the user/subscriber has accessed. In addition, the outgoing packet includes an attribute that will direct all incoming packets from the accessed network to be routed through the gateway device. In contrast, the inbound traffic from the computer network or other online service that is routed through the gateway device, undergoes a translation function at the gateway device so that the packets are properly formatted for the user/subscriber's host computer. In this manner, the packet translation process that takes place at the gateway device is transparent to the host, which appears to send and receive data directly from the accessed computer network. Additional information regarding the translation function is provided by U.S. patent application Ser. No. 08/816,714. By implementing the gateway device as an interface between the user/subscriber and the computer network or other online service, however, the user/subscriber will eliminate the need to reconfigure their computer 12 upon accessing subsequent networks.

In accordance with the present invention, the gateway device 12 includes a bandwidth manager which enables the user/subscribers at respective computers 14 to dynamically set and reset the bandwidth of their network access connection. The bandwidth manager can substantially instantaneously adjust the maximum bandwidth available to the user/subscriber without requiring the reconfiguration or reprogramming of a hardware device(s) such as a network modem or access controller, or the restart of an access session at the gateway device. In addition, the bandwidth manager further enables the user/subscriber to independently set the upstream (uplink to the network) and downstream (downlink from the network) maximum bandwidth. Accordingly, the user/subscriber can establish asymmetric bandwidths for upstream and downstream communications, which may be particularly useful if the user/subscriber's network activity involves a disproportionate amount of data being transferred in one direction (upstream or downstream). Depending on the bandwidth service level chosen by the user/subscriber, the user/subscriber is charged an appropriate service fee. This way, the user/subscriber does not pay for bandwidth that they are not using, and only has to pay for additional bandwidth when requested. In a preferred embodiment, the user/subscriber manages their bandwidth service level via pop-up control panels as disclosed and described in detail in U.S. Prov. Pat. App. No. 60/161,139, entitled "Pop-Up Control Panel Administered by a Network Gateway Device," incorporated elsewhere herein.

Figure 17A:
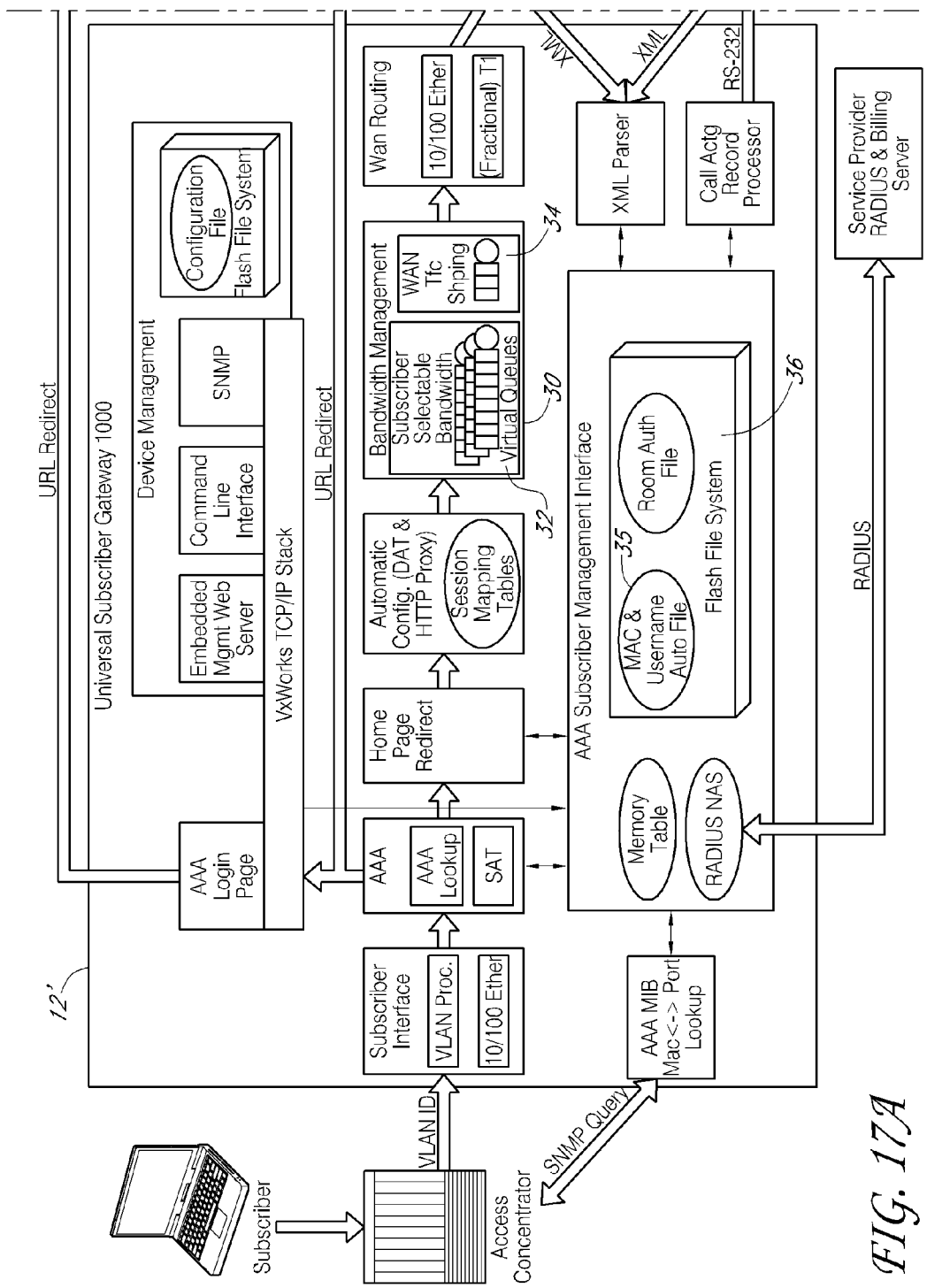
Figures 17, 17A:
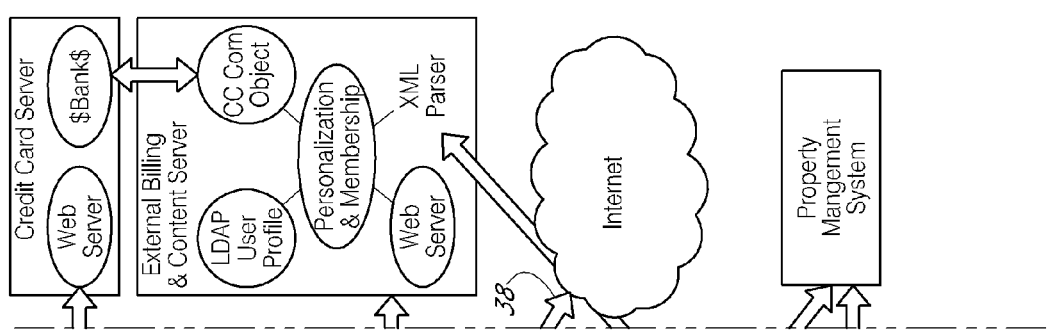

With reference to FIGS. 17A-B, a block diagram of an embodiment of the gateway device 12' in accordance with the present invention is illustrated. Of particular interest with regard to the present invention is the bandwidth management module 30 (also referred to herein as the bandwidth manager). The bandwidth manager 30 is implemented as a component of the protocol stack of the gateway device 12', as discussed in greater detail below with reference to FIG. 18. The bandwidth manager 30 processes the data packets (or datagram) passing through the gateway device 12' from the user/subscriber to the network and from the network to the user/subscriber. The bandwidth manager 30 comprises a subscriber selectable bandwidth mechanism 32 and a traffic shaping mechanism 34.

The subscriber selectable bandwidth mechanism 32 limits the upstream and downstream bandwidths on each virtual channel through the gateway device 12' to that which the respective user/subscribers selected. For each packet processed by the bandwidth manager, the subscriber selectable bandwidth mechanism 32 identifies the associated user/subscriber by the media access control (MAC) address within the packet. The subscriber selectable bandwidth mechanism 32 retrieves the authorization file 35 associated with that MAC address from a flash file system 36. The authorization file includes the user/subscriber profile, including the user/subscriber selected maximum bandwidth for uplink and downlink data transfer. The subscriber selectable bandwidth mechanism 32 then determines whether or not to reschedule the delivery of that packet at a later point in time in order to prevent the user/subscriber from achieving a bandwidth greater than that which the user/subscriber selected.

The subscriber selectable bandwidth mechanism 32 calculates the appropriate delay, if any, using the size (in bytes) of the current packet, and the size and relative time the last packet was delivered for the subscriber. For example, if the user/subscriber has paid for a downlink bandwidth of 100 kilobytes per second (kbps), and the gateway device 12' just delivered 50 kilobytes one-half a seconds ago, then a packet of up to 50 kilobytes would not be delayed, but a packet over 50 kilobytes would be delayed. The length of the delay would depend on the size of the packet. For example, following the 50 kilobyte packet delivered one-half seconds ago, a next packet of 150 kilobytes would be delayed 1.5 seconds (resulting in 200 kilobytes in two seconds=100 kbps), whereas a next packet of 80 kilobytes would be delayed 0.8 seconds (resulting in 130 kilobytes in 1.3 seconds=100 kbps).

If it is determined that the packet should be delayed, then the subscriber selectable bandwidth mechanism 32 places the packet in a virtual queues for later delivery. In a preferred embodiment of the present invention, the virtual queue is implemented by a ring buffer having 120 time slots (also referred to as ticks), each slot being $1/60$th of a second. Thus, the ring buffer can delay delivery of a packet up to two seconds. If the delay is to be more than two seconds, then the packet will be dropped. Accordingly, the packet is place in the appropriate timeslot so that the ultimate delivery of a packet will not produce a bandwidth greater than that selected and paid for by the user/subscriber. When the ring buffer pointer is pointing to the timeslot where the packet resides, the packet is transmitted out to the network or out to the user/subscriber, whichever the case may be. Each timeslot of the ring buffer is a link list of packets having a temporary relationship to the other timeslots according to the granularity of a ring buffer. While the ring buffer may have more than 120 timeslots in order to achieve greater accuracy, increasing the granularity produces increased overhead in a system.

If the user/subscriber wishes to dynamically change either their downlink or uplink bandwidths, such as via a pop-up control panel as discussed hereinbefore, then the new bandwidth(s) is substantially instantaneously recorded in the user/subscriber's authorization file. When the next packet having the MAC address of the user/subscriber is processed by the subscriber selectable bandwidth mechanism 32, the new bandwidth is retrieved from the authorization file and utilized by the subscriber selectable bandwidth mechanism 32 to determine if delivery of the packet should be delayed. Thus, the user/subscriber can dynamically change their bandwidth during an access session without requiring a reconfiguration of a component in the network. This allows the user/subscriber to cost effectively manage their network access service. It is note that the subscriber selectable bandwidth mechanism 32 does not guarantee a minimum bandwidth, but operates to limit the maximum bandwidth available to a user/subscriber according to the upstream and downstream bandwidths selected and paid for by the user/subscriber. In fact, the subscriber selectable bandwidth mechanism 32 may operate to make the user/subscriber's network access slower than it actually is as it queues packets associated with the user/subscriber.

The traffic shaping mechanism 34 of the bandwidth manager 30 functions to limit the number of packets transmitted on the link connecting the gateway device 12' to the networks. In the embodiment illustrated herein, that link is a wide area network (WAN) link 38. In particular, the WAN link 38 is a communications link of finite bandwidth capable of only transmitting a certain number of packets over a given period of time. Accordingly, in order to make most efficient the operation of the WAN link 38, it is desirable to limit the packets being transmitted over the WAN link 36 to that which the WAN link can handle without dropping packets. Accordingly, the traffic shaping mechanism 34 provides a virtual queue that operates in essentially the same as the virtual queues of the subscriber selectable bandwidth mechanism 32, with the result of preventing the WAN link 36 from becoming overloading. By queuing the packets for a short period of time before transmitting them when the WAN link 36 reaches its bandwidth capacity, the overall efficiency of the data transfers over the WAN link 36 improves because the packets are not dropped, therefore, do not need to be retransmitted. The traffic shaping mechanism 34 monitors the traffic over the WAN link 36, and when it appears to be close (slightly above or slightly below) to the bandwidth capacity of the link, then the traffic shaping mechanism 34 begins queuing the packets for short periods of time with the expectation that the packet volume will at some point drop so that the packet will not need to be queued for the time being. Thereby, the likelihood, or at least the number, of packets being dropped is minimized.

Another aspect of traffic management performed by the traffic shaping mechanism 34 is the prioritization of services provided to the users/subscribers. For example, in a preferred embodiment, each user/subscriber pays for a class of service which has associated with it a maximum bandwidth. Currently, those users/subscribers which request a relatively large bandwidth compared to another user/subscriber will have its packets given priority over the packets of the other user/subscriber at the point of being transmitted over the WAN link 36. This is achieved by queuing the packets of the other user/subscribers and not those with priority. This prioritization of the packets of one user/subscriber over that of another user/subscriber can be extended to numerous other implementations. For example, a user/subscriber may purchase a class of service which places a higher prioritization over a particular type of content, for instance, video data, audio data, etc. In such cases, the traffic shaping mechanism 34 looks into each packet to determine the user/subscriber associated with that packet based upon the MAC address, and by looking at the packet header and IP header to determined the content of the packet. Specifically, the packets including a protocol utilized to transmit audio content, for example, voiceover IP, may be given priority by the traffic shaping mechanism 34 if the associated user/subscriber paid for such a class of service. Other protocols/parameters on which priority can be based include SMTP, EDP, TCP, a specific IP address, etc. As before, such prioritization can be achieved by queuing packets on a per subscriber basis which do not include the content assigned priority.

Yet another example of the prioritization that can be performed by the traffic shaping mechanism 34 in accordance with the present invention is the reservation of a percentage or block of the available bandwidth for a particular user/subscriber. For example, by monitoring the throughput of the gateway device 12, the traffic shaping mechanism 34 can prioritize the packets of a specific user/subscriber that is paying for a specified percentage of the available bandwidth so that the packets of that user are transmitted at the appropriate rate so as to utilize the percentage of available bandwidth. These and other prioritization schemes for traffic shaping are often referred to in the industry as weighted fare queuing.

Figure 18:
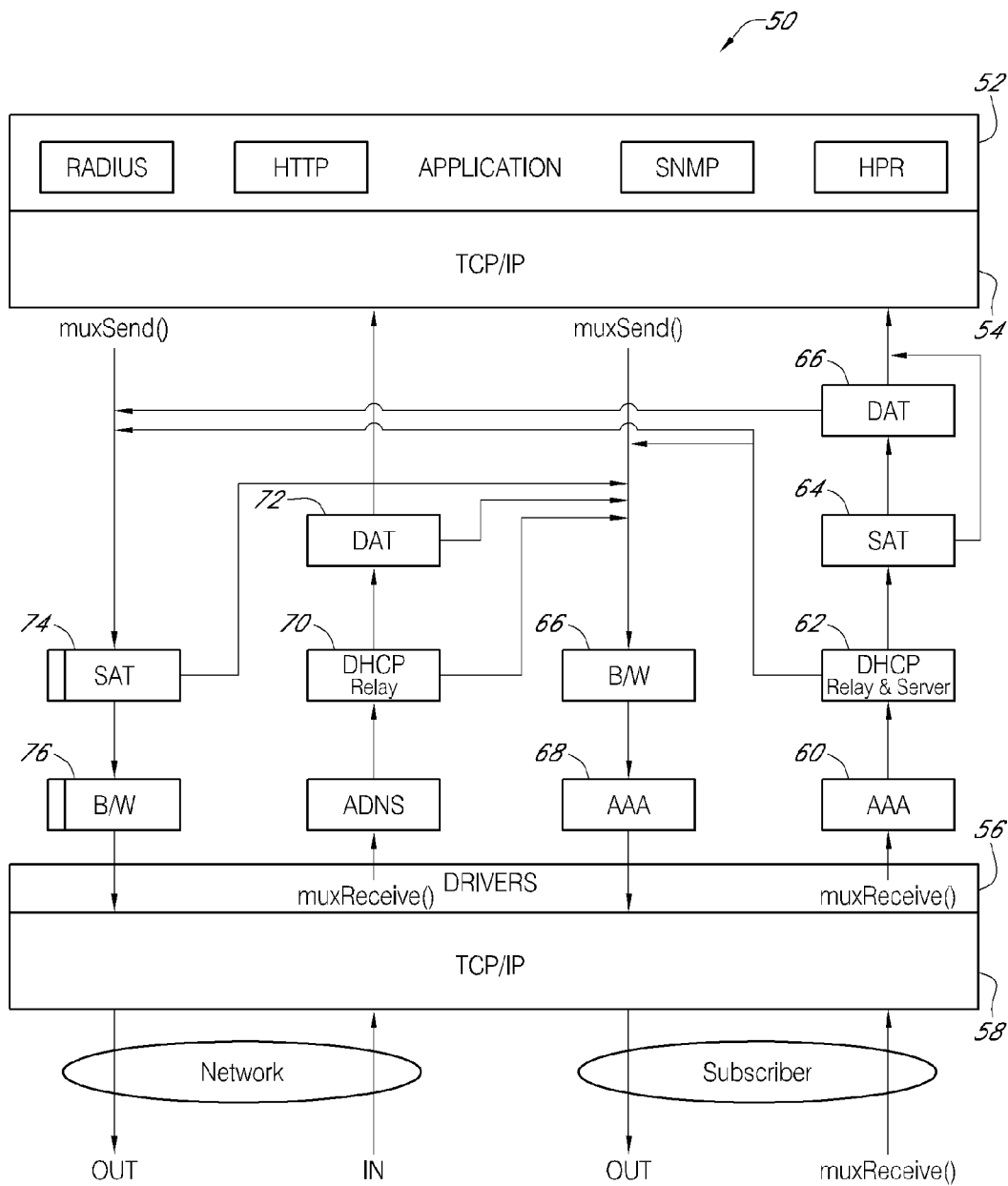
FIG. 18 is a schematic diagram illustrating the operation of the protocol stack, including the bandwidth manager, of a gateway device in accordance with an embodiment of the present invention.

With reference to FIG. 18, an exemplary protocol stack 50 in accordance with an embodiment of the present inventions illustrated, wherein the operation of the bandwidth manager 30 in processing packets is provided. It is noted however, that the protocol stack 50 is not intended to be complete but merely illustrated, and it is noted that particular layers and/or steps may be omitted for purposes or brevity. Generally, the protocol stack 50 comprises an application layer 52, a TCP/IP layer 54, drivers layer 56, and a multiplexer (MUX) layer 58. Between the TCP/IP layer 54 and the drivers layer 56, packets are processed in accordance with an embodiment of the bandwidth manager of the present invention. The interlayer processing performed between the TCP/IP layer 54 and the drivers layer 56 may be implemented by programming hooks, each of which is designated by a block and described hereafter.

Beginning with packets being received on the subscriber's side from the user/subscriber, a hook 60 is performed by the AAA module of the gateway device 12', wherein the packet is authenticated based upon the unique MAC address of the user/subscriber as stored in the authorization file. If the packet cannot be authenticated, then the packet is redirected to an internal AAA web server requiring the user/subscriber to login to the system. Next, at hook 62, a DHCP module of the gateway device 12' determines if the packet includes a request for an IP address. If so, then IP addresses from internal servers are passed to the outbound channel to the subscriber, whereas IP addresses from an external server are passed to the outbound channel to network. If an IP request is not located, then the packet is passed on to hook 64 where the SAT module redirects the packet to an internal AAA server if instructed to so by the AAA module at hook 60. Otherwise, the packet is passed on to hook 66 where the dynamic address translation (DAT) module performs the appropriate address translation and delivers the packet to the outbound channel to the network.

The packets being directed out to the subscriber are processed at hook 66 by the bandwidth manager in accordance with the present invention. In particular, the bandwidth manager retrieves the authorization file of the user/subscriber to which the packet is directed using the MAC address within the packet. Based on the bandwidth manager's historical knowledge of the size and time at which the last packet was delivered to the subscriber, the size of the current packet, and the maximum bandwidth purchased by the subscriber, the bandwidth manager makes the determination whether to send the packet to the next hook or to temporarily queue the packet to limit the bandwidth perceived by the user/subscriber. If it is determined that the packet should be delayed, the bandwidth manager reschedules the transmission of the packet at an appropriate time, up to the maximum delay of the ring buffer, which is two seconds in the preferred embodiment. If the required delay is greater than two seconds, then the packet is dropped and must be retransmitted by the sender. Once the packet has been flushed from the ring buffer, it is delivered to a hook 68 where it is processed by the AAA module. The AAA module may perform numerous functions at a hook 68, such as counting the total number of bytes, the total session time, etc. for the current session of each user/subscriber. The packet is then delivered from hook 68 to the drivers layer 56 where it is ultimately placed on the network for delivery to the intended user/subscriber.

On the inbound channel from the network, packets are processed at hook 70 by the DHCP module. The DHCP module processes the IP addresses as discussed herein before. The packets are subsequently processed by hook 72 by the DAT module, which sending the packets to a particular subscriber as addressed.

On the outbound channel to the network, packets are processed at hook 74 by the SAT module, which intercepts those packets from the internal AAA server which need to be redirected to a user/subscriber, and places those packets on the subscriber outbound channel. Next, at hook 76, the bandwidth manager performs similar limiting functions as described hereinbefore with reference to hook 66. In particular, on the network outbound channel, the bandwidth manager limits the uplink transmission rate as perceived by the user/subscriber. The limiting functions performed at hook 76 are substantially the same as those performed at hook 66, wherein the packets that are to be delayed in order to limit the bandwidth of a particular user/subscriber are queued for a calculated period of time before transmission out on to the network. In addition, the hook 76 performs the additional function of traffic shaping as described hereinbefore. In particular, the bandwidth manager performs additional monitoring of the packets being sent out over the network and knowing the capacity of the communications link to the network, prioritizes the various packets to provide appropriate bandwidths for the class of services of the respective users/subscribers.

Figure 19A:
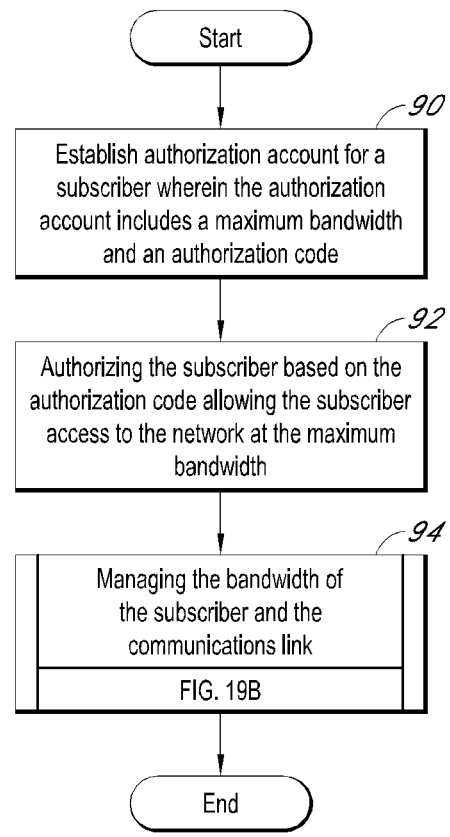
FIGS. 19A-B are related flowchart diagrams of a method for bandwidth management in accordance with an embodiment of the present invention.

With reference to FIG. 19A, a flow diagram of a method in accordance with an embodiment of the present invention for bandwidth management is illustrated. At block 90, a subscriber establishes an authorization account for accessing a computer network through a gateway device in accordance with the present invention, wherein the authorization account includes a maximum bandwidth value, preferably for the uplink and downlink connections, and an authorization code, such as a user name and password. At block 92, the subscriber logs into the gateway and is authorized based on the subscriber's authorization code. This establishes network access for the subscriber through the gateway device. Next, at block 94, the gateway device performs bandwidth management on packets passing through the gateway device to limit each subscriber's bandwidth to that which they selected and paid for, and to perform traffic shaping functions, as described in greater detail with the reference to FIG. 19B.

Figure 19B:
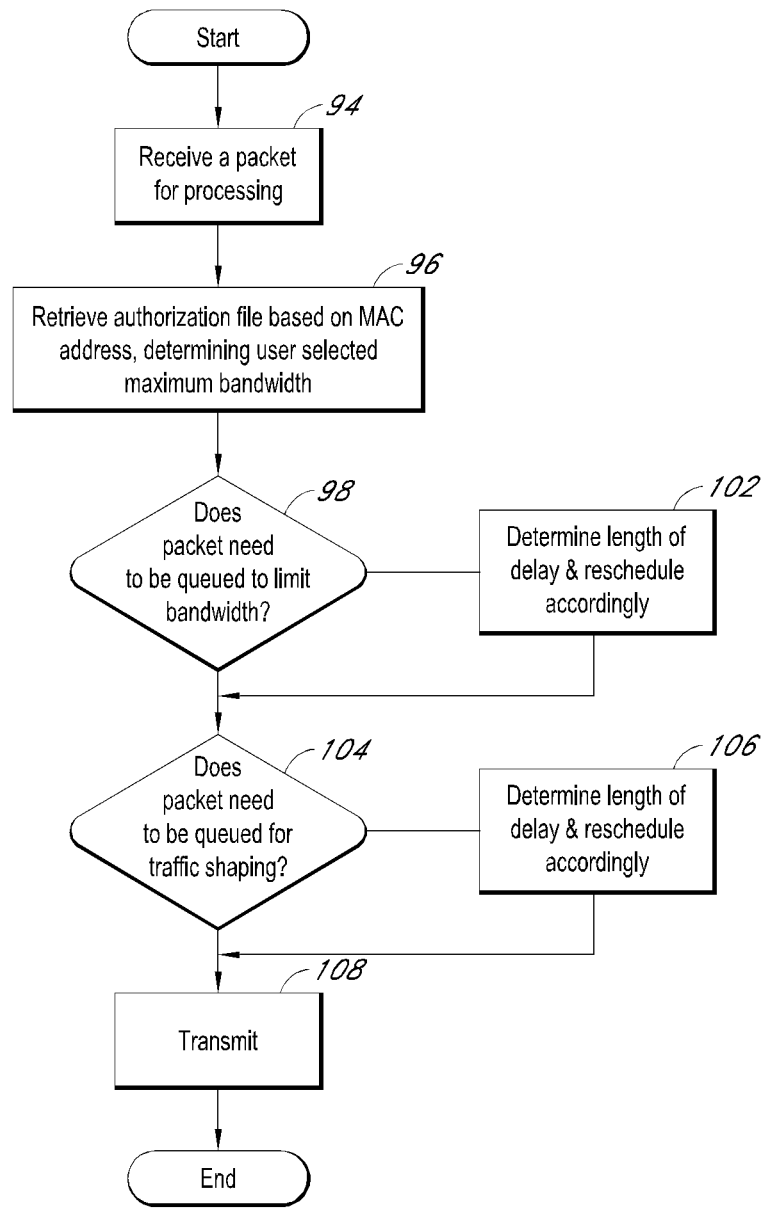

In FIG. 19B, the operation of an embodiment of the bandwidth manager on the packets being delivered upstream to the network is provided. In particular, at block 94, a new packet is received for processing. At block 96, the packet is processed by extracting the MAC address from the packet and retrieving the authorization file associated therewith, preferably from a hash table. Based on the maximum bandwidth chosen by the subscriber as determined from the authorization file, and the bandwidth manager's knowledge of the size of the current packet, the size and time of the previous packet of the subscriber which was processed by the bandwidth manager, it is determined if the packet needs to be queued for a period of time to ensure that the subscriber does not receive a bandwidth greater than that which the subscriber chose and paid for, as determined at decision block 98. If the packet should be delayed, then at block 102, the appropriate delay is calculated and the packet is placed in the appropriate timeslot of a ring buffer. When the pointer of the ring buffer addresses the timeslot in which the packet resides, then the packet is further processed by the traffic shaping mechanism of the bandwidth manager. In particular, at block 104, it is determined if the packet needs to be queued for traffic shaping purposes. If the packet needs to be queued, then it is determined at block 106 how long the packet should be delayed, and then the packet is placed in the appropriate timeslot of the ring buffer. When the pointer of the ring buffer addresses the timeslot where the packet resides, then the packet is transmitted over the network at block 108.

Figure 20:
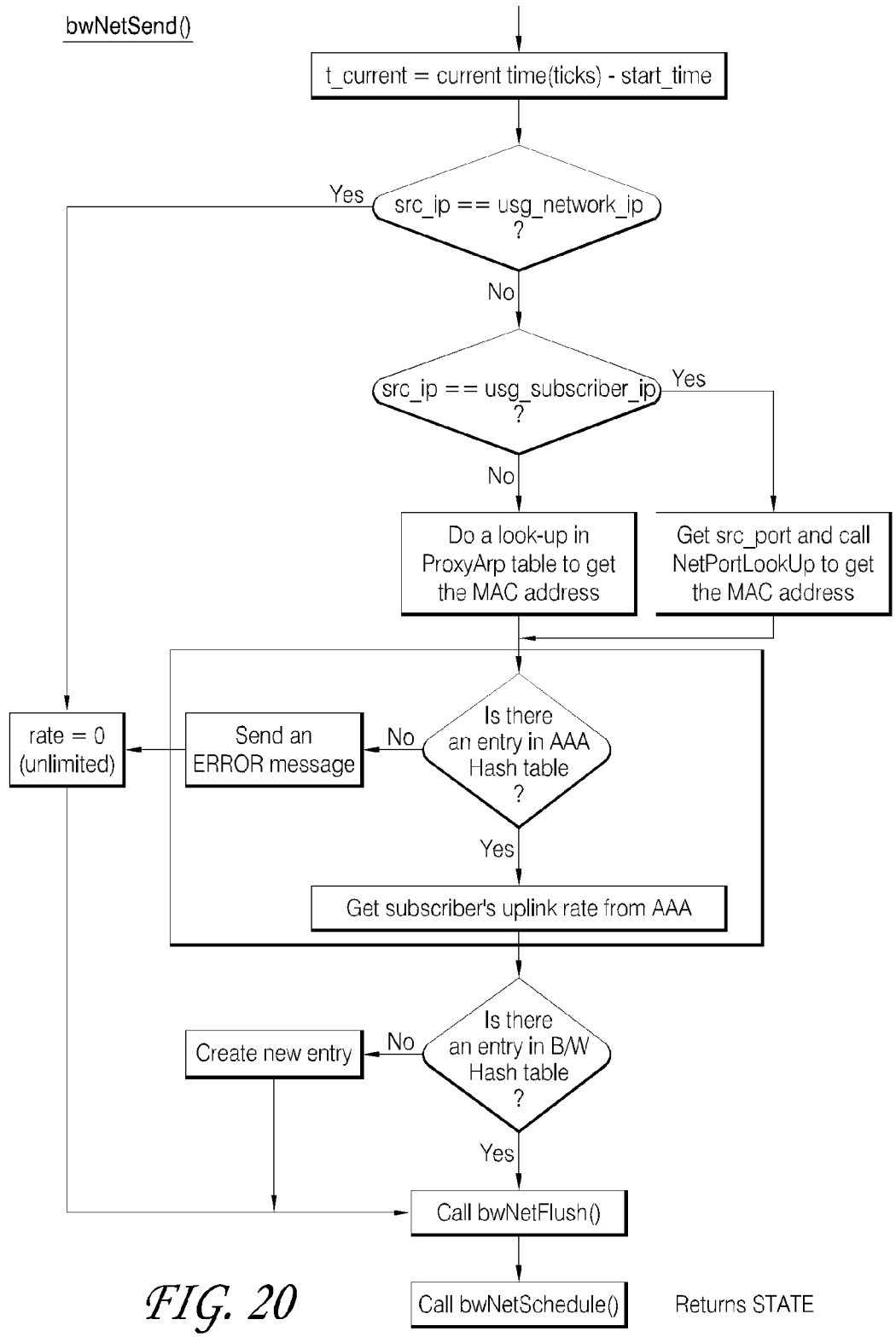
Figure 21:
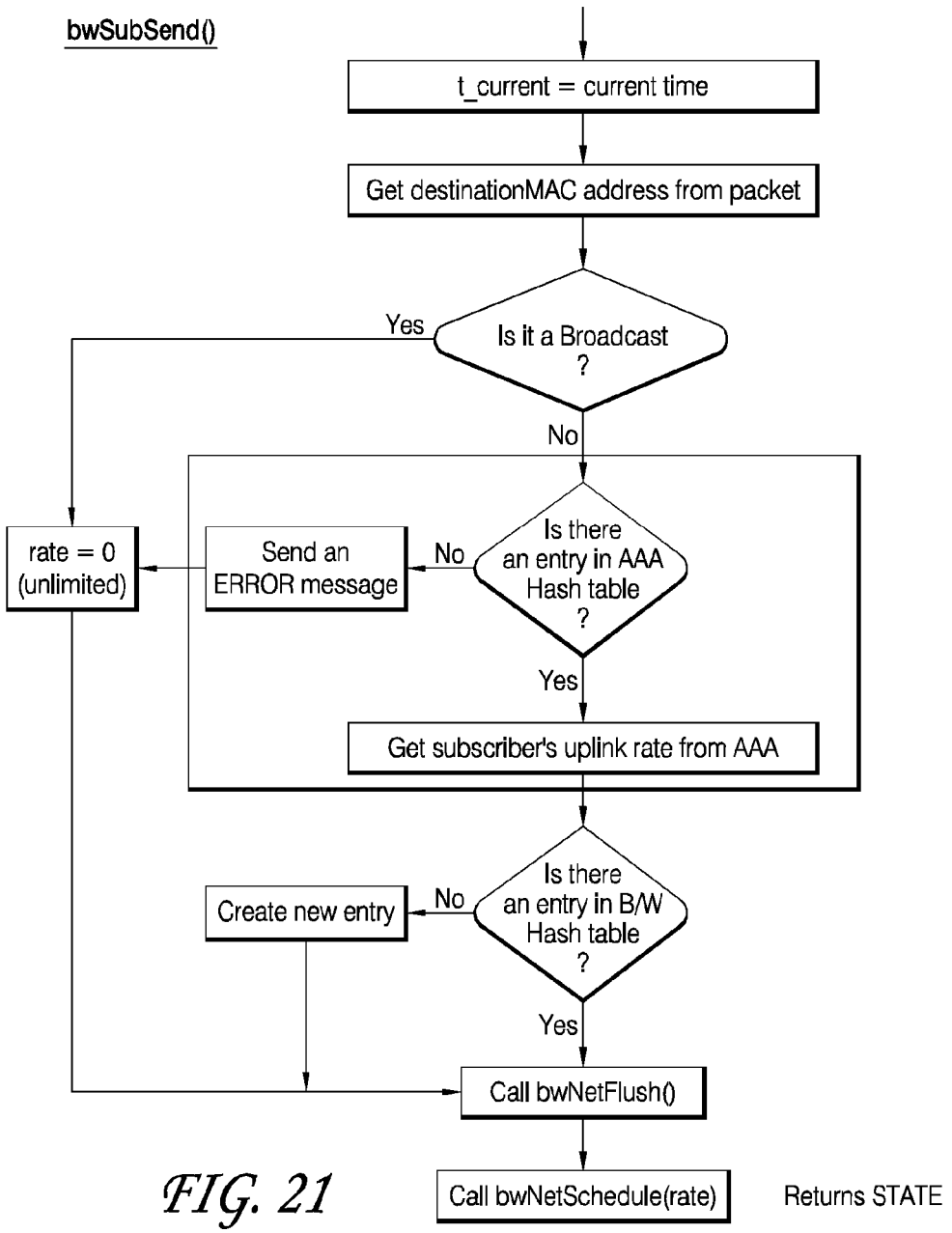
Figure 22:
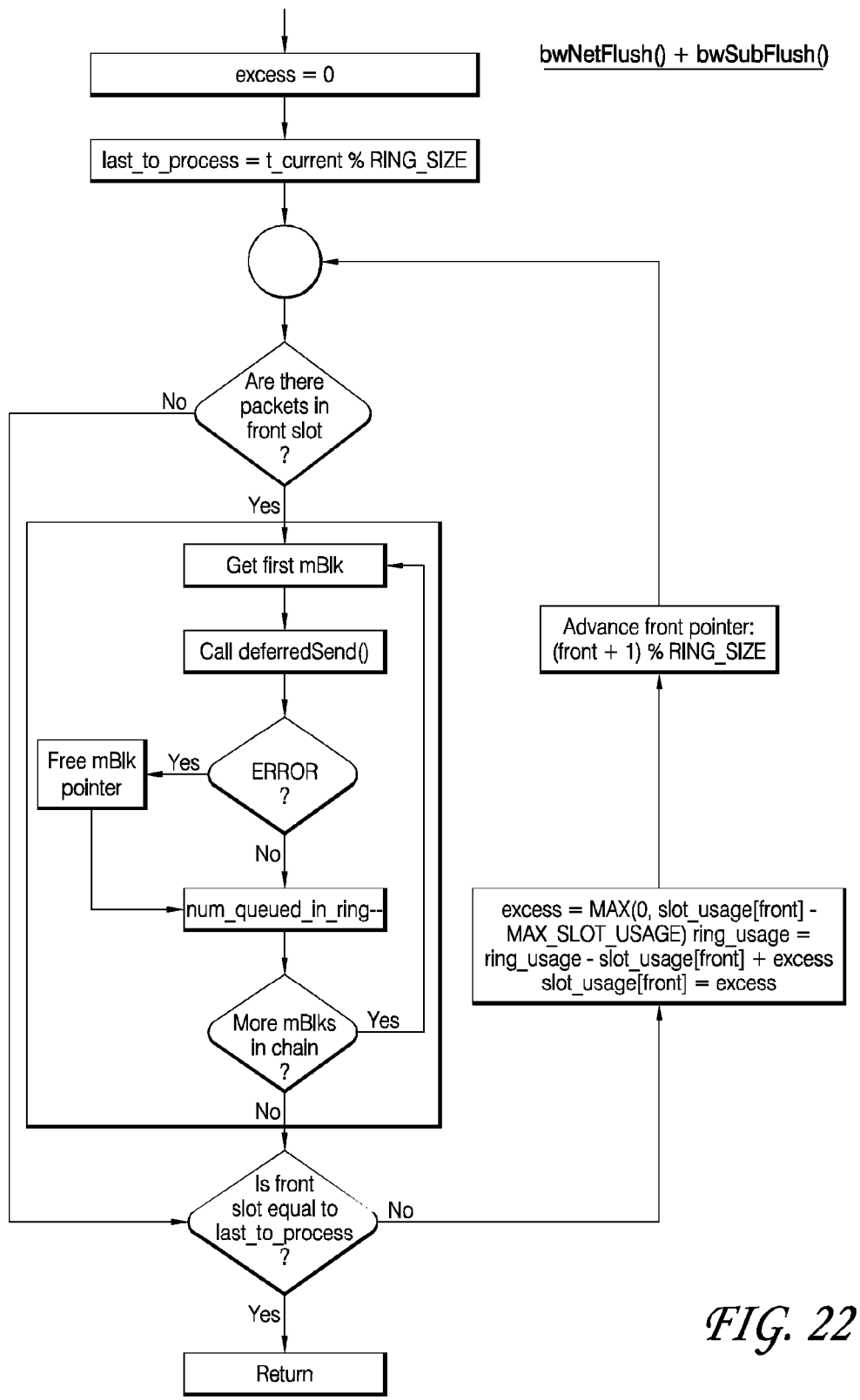
Figure 23:
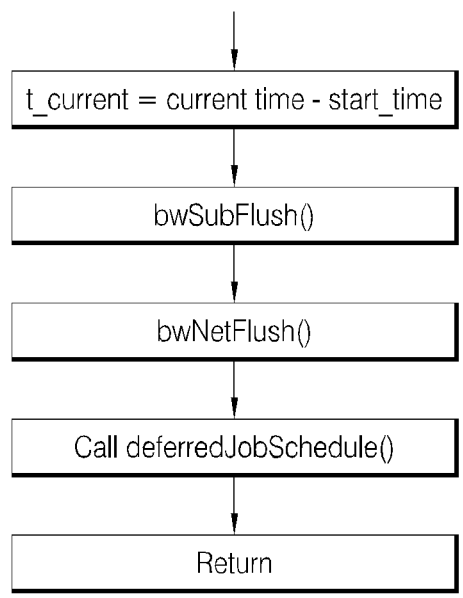
Figure 24A:
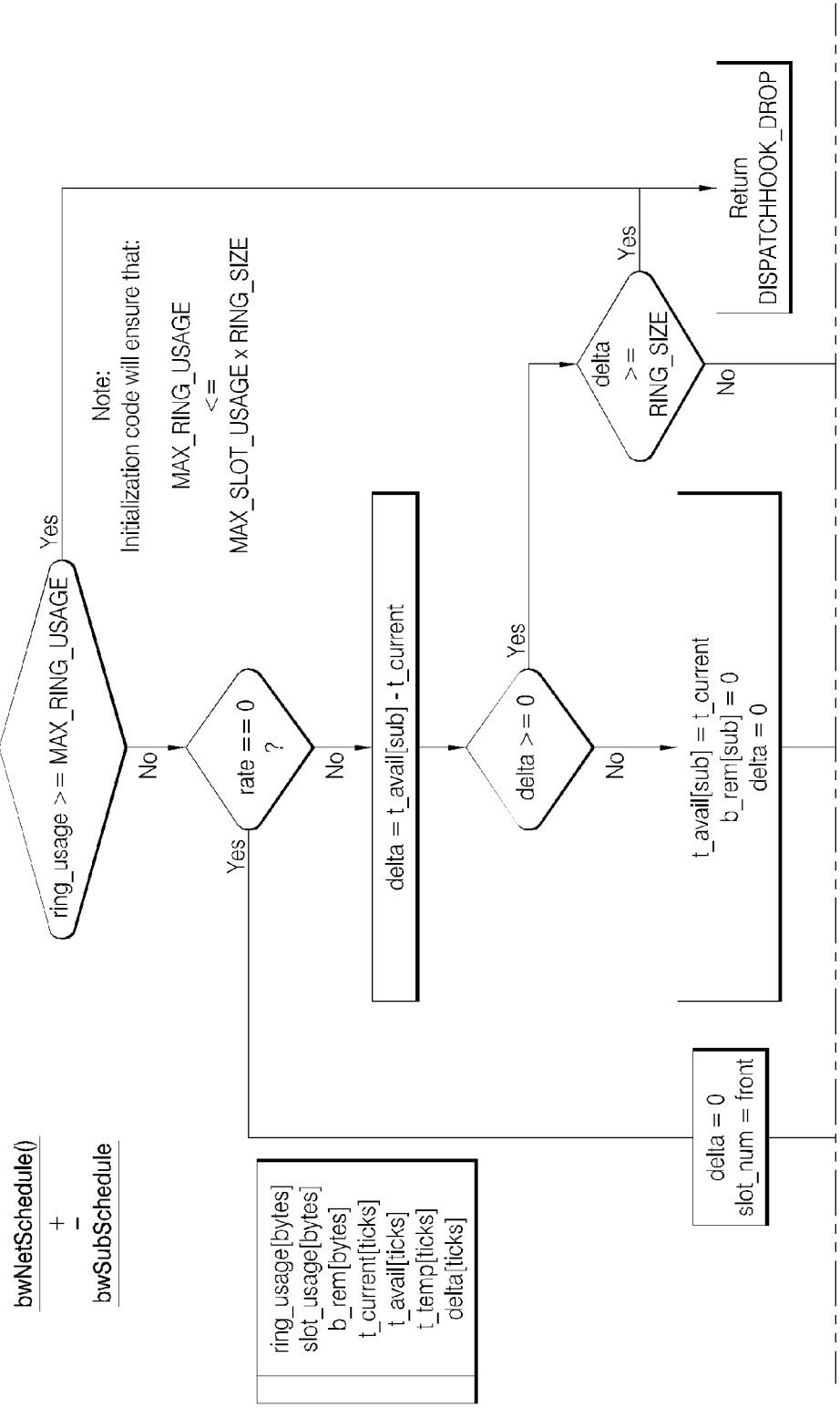
Figure 24B:
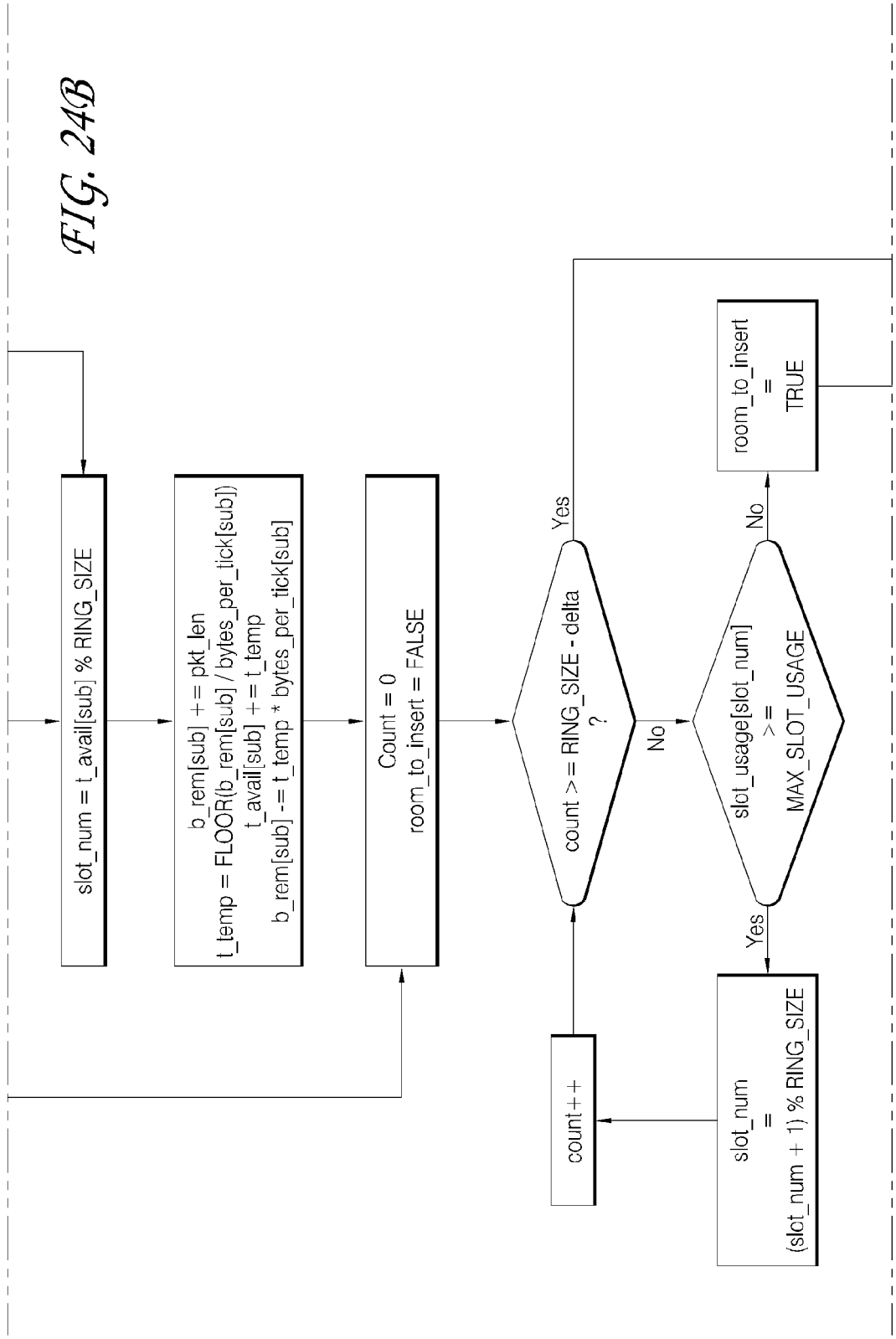

With reference to FIGS. 20-24, detailed flow diagrams of the operation of an embodiment of the bandwidth manager are provided. In particular, FIG. 20 provides a flowchart of the operation of the bandwidth manager in preparing to send a packet over the network. FIG. 21 is directed to the operation of the bandwidth manager in preparation for sending a packet to a subscriber. FIG. 22 is directed to the operation of sending a packet from the ring buffer to the network and/or the subscriber. FIG. 23 is directed to the operation of the bandwidth manager and sending a packet from the ring buffer to both the subscriber and the network. Lastly, FIGS. 24A-C are directed to the operation of the bandwidth manager in scheduling the appropriate delay for a packet that is ultimately to be sent to the network or to the subscriber.

Systems and Methods for Dynamically Creating Subscriber Tunnels by a Gateway Device in a Computer Network A gateway device for use in providing a subscriber access to a computer system is disclosed, and more particularly, a gateway device for dynamically creating and managing subscriber tunnels through the computer system (i.e., network), such as the Internet, from the gateway device to an enterprise network, such as a corporate network. The gateway device determines on a per packet basis whether a tunnel is required based upon the packet destination. If a tunnel is required, then the gateway device dynamically creates the tunnel without configuring the user/subscriber computer.

In order for a computer to function properly in a network environment, the computer must be appropriately configured. Among other things, this configuration process establishes the protocol and other parameters by which the computer transmits and receives data. In one common example, a plurality of computers is networked to create a local area network (LAN). In the LAN, each computer must be appropriately configured in order to exchange data over the network. Since most networks are customized to meet a unique set of requirements, computers that are part of different networks are generally configured in different manners in order to appropriately communicate with their respective networks.

While desktop computers generally remain a part of the same network for a substantial period of time, laptops or other portable computers are specifically designed to be transportable. As such, portable computers are connected to different networks at different times depending upon the location of the computer. In a common example in which the portable computer serves as an employee's desktop computer, the portable computer is configured to communicate with their employer's network, i.e., the enterprise network. When the employee travels, however, the portable computer may be connected to different networks that communicate in different manners. In this regard, the employee may connect the portable computer to the network maintained by an airport or by a hotel in order to access the enterprise network, the internet or some other on-line service. Since these other networks are configured somewhat differently, however, the portable computer must also be reconfigured in order to properly communicate with these other networks. Typically, this configuration is performed by the user/subscriber each time that the portable computer is connected to a different network. As will be apparent, this repeated reconfiguration of the portable computer is not only quite time consuming, but is also prone to errors. Further, the user/subscriber is often required to have specific software running on the portable computer in order to communicate with the enterprise network, though such communications may be in conflict with the network over which the portable computer must transfer data to reach the enterprise network.

As described by U.S. patent application Ser. No. 08/816, 174 and U.S. Prov. Pat. App. No. 60/111,497, a universal subscriber gateway device has been developed by Nomadix, Incorporated of Santa Monica, Calif. The contents of both of these applications are incorporated herein by reference. The gateway device serves as an interface connecting the user/subscriber to a number of networks or other online services. For example, the gateway device can serve as a gateway to the Internet, the enterprise network, or other networks and/or on-line services. In addition to serving as a gateway, the gateway device automatically configures a computer to communicate with the new network in a manner that is transparent to the user/subscriber. In this regard, the gateway device will download the necessary protocols and other configuration parameters to the computer without any intervention by the user/subscriber and without loading any additional software on the user/subscriber's computer. Once the gateway device has appropriately configured the user/subscriber's computer, the computer can appropriately communicate via the new network, such as the network at a hotel or at an airport, in order to access other networks, such as the enterprise network, or other online services, such as the internet.

The computer user/subscriber, and more specifically the remote or laptop user, benefits from being able to access a myriad of computer networks without having to undergo the time-consuming and all-too-often daunting task of reconfiguring their host in accordance with network specific configurations. In this fashion, the gateway device is capable of providing more efficient network access to the user/subscriber. A gateway device is also instrumental in providing the user/subscriber broadband network access that can be tailored to the user/subscriber's needs. In many instances the remote user/subscriber is concerned with being able to acquire network access to their home or enterprise network, which are most typically protected by a firewall. The firewall prevents unauthorized access to the enterprise network through a general internet connection, such as through an internet service provider. While some access is possible from outside the firewall, such as inbound electronic mail, corporate resources such as network databases and application programs are generally not made accessible to computers located outside the firewall unless the user/subscriber has an active account with a valid username and password combination.

However, as appreciated by those of ordinary skill in the art, different network protocols may be used within the Internet infrastructure and within an enterprise networks. For example, an Internet Protocol (IP) is typically used at the network protocol level to send data through the Internet. An enterprise network, on the other hand, may use anyone of a variety of network protocols including IP, IPX, Appletalk, etc. When a remote user attempts to access the enterprise network through the Internet, typically through an Internet service provider, the remote user is dynamically assigned an IP address. Thus, the remote user may be denied access by the firewall of the enterprise network because the IP address assigned by the Internet service provider is not one of the authorized addresses in the corporate network. In addition, the remote user may be forced by the Internet service provider to use an IP protocol incompatible with that of the enterprise network. If the IP protocol and the enterprise network protocol are incompatible, then the remote user may be prevented from accessing resources on the enterprise network.

In response to these and other problems associated with granting remote access to an enterprise network over the internet, several techniques have been developed for creating virtual private networks (VPN), wherein a remote node of a single network is interconnected using a publicly accessible communication medium. For example, there are a number of systems that enable user/subscribers to create virtual networks using the Internet as a medium for transporting data between the enterprise network and a remote user. These systems often times include encryption and other security mechanisms to ensure that only authorized users can access the virtual network, and that the data cannot be intercepted.

The common technique for constructing a VPN is by tunneling. Tunneling works by encapsulating or wrapping a packet or a message from one network protocol in the protocol of another. The encapsulated packet is transmitted over the network via the protocol of the wrapper. This method of packet transmission avoids protocol restrictions, and enables remote users to have seamless access to their enterprise network without any apparent effects from accessing their enterprise network over another network having a different protocol. Several relatively well known tunneling protocols include Microsoft's PPTP, Cisco's Layer Two Forwarding (L2F) protocol, and Redback's L2TP which is a hybrid of L2F and PPTP. While these and other tunneling techniques have some merit, no one single tunneling protocol provides for automated configuration without the need for special client-side (i.e., remote computer) software.

Therefore, an unsatisfied need exists in the industry for a system method that dynamically creates subscriber tunnels automatically and without special client-side software.

Summary

The present invention comprises a gateway device for use in providing a subscriber access to a computer system, and more particularly, for dynamically creating and managing subscriber tunnels through the computer system (i.e., network), such as the Internet, from the gateway device to an enterprise network, such as a corporate network. The present invention does not require special client-side software to be loaded on the remote computer of the subscriber, and does not require any manual configuration of the remote computer. Instead, the gateway device establishes a tunnel, whereby the gateway device operates as one end point and the enterprise network operates as the other end point. Rather than configuring and reconfiguring the remote computer each time a tunnel is created, the remote computer provides the gateway device with the appropriate profile information necessary to create a tunnel to a particular enterprise network during the setup of the account. Thereafter, the gateway device uses the profile information each time a tunnel is created for that user to that enterprise network. In essence, the gateway device takes the place of the remote computer as an end point of the tunnel, spoofing the enterprise network. The tunnel is created from the gateway device to the enterprise network is such that the enterprise network views the gateway device as though it were the remote computer. By allowing the gateway device to operate as the end point of the tunnel, the remote computer is not limited to a single tunnel per session, but may have numerous tunnels established simultaneously during a single session. The gateway device determines on a per packet basis whether a tunnel is required based upon the packet destination. If a tunnel is required, then the gateway device creates the tunnel and places the packets in the tunnel for delivery to the destination network.

Description

Referring now to FIG. 16, the computer system 10 that includes a gateway device 12 is depicted in block diagram form. The computer system typically includes a plurality of user/subscriber computers 14 that access the computer network in order to gain access to other networks or other online services. For example, the computers can be plugged into ports that are located in different rooms of a hotel, a multi-dwelling residence or an office building. Alternatively, the computers can be plugged into ports in an airport, an arena, or the like. The computer system also includes a gateway device in accordance with the present invention that provides an interface between the plurality of computers and the various networks or other online services. Most commonly, the gateway device is located near the computers at a relatively low position in the structure of the overall network. (i.e. the gateway will be located within the hotel, multi-unit residence, airport, etc.) However, the gateway device can be located at a higher position in the overall network structure such as at a Point of Presence (PoP) of Network Operating Center (NOC), if so desired. Although the gateway device can be physically embodied in many different fashions, the gateway device typically includes a controller and a memory device in which software is stored that defines the operational characteristics of the gateway device. Alternatively, the gateway device can be embedded within another network device, such as the access controller or a router, or the software that defines the functioning of the gateway device can be stored on a PCM-CIA card that can be inserted into the computer in order to automatically reconfigure the computer to communicate with a different computer system.

The computer system 10 also typically includes an access controller 16 positioned between the computers 14 and the gateway device 12 for multiplexing the signals received from the plurality of computers onto a link to the gateway device. Depending upon the medium by which the computers are connected to the access controller, the access controller can be configured in different manners. For example, the access controller can be a digital subscriber line access module (DSLAM) for signals transmitted via regular telephone lines, a cable headend for signals transmitted via coaxial/optical fiber cables, a wireless access point (WAP) for signals transmitted via a wireless network, a CMPS, a switch or the like. As also shown in FIG. 16, the computer system typically includes one or more routers 18 and/or servers (not shown in FIG. 16) of a plurality of computer networks 20 or other online services 22. While the computer system is depicted to have a single router, the computer system can have a plurality of routers, switches, bridges, or the like that are arranged in some hierarchical fashion in order to appropriately route traffic to and from the various networks or other online services. In this regard, the gateway device typically establishes a link with one or more routers. The routers, in turn, establish links with the servers of other networks or other online service providers, such as internet service providers, based upon the subscriber's selection.

The gateway device 12 is specifically designed to configure computers 14 that log onto the computer network 10 in a manner that is transparent to the subscriber. In the typical computer network that employs dynamic host configuration protocol (DHCP) service, the DHCP server 24 will initially assign an IP address to a computer that is logging onto the computer network through communication with the gateway device. While illustrated as a separate device from the gateway device 12, the DHCP server 24 may be incorporated into the physical embodiment housing the gateway device. Upon opening their web browser or otherwise attempting to access an on-line service, the gateway device will direct the subscriber to enter their ID and password. The gateway device then determines if the subscriber is entitled to access the computer system, the level of access and/or the type of services to which the subscriber is entitled according to an Authentication, Authorization and Accounting (AAA) procedure that is described by U.S. patent application Ser. No. 08/816,174 and U.S. Prov. Pat. App. No. 60/111,497, which are incorporated herein by reference.

An AAA server, which is a database of subscriber records, may be remote to the gateway device or the AAA database may be incorporated into the physical embodiment housing the gateway device. Assuming that the subscriber has been authenticated and has authorization, the gateway device typically presents new subscribers with a home page or control panel that identifies, among other things, the online services or other computer networks that are accessible via the gateway device. In addition, the home page presented by the gateway device can provide information regarding the current parameters or settings that will govern the access provided to the particular subscriber. As such, the gateway administrator can readily alter the parameters or other settings in order to tailor the service according to their particular application. Typically, changes in the parameters or other settings that will potentially utilize additional resources of the computer system will come at a cost, such that the gateway administrator will charge the subscriber a higher rate for their service.

The home page also permits the subscriber to select the computer network 20 or other online service 22 that the subscriber wishes to access. For example, the subscriber can access the enterprise network on which the computer is typically resident. Alternatively, the subscriber can access the internet or other on-line services. Once the subscriber elects to access a computer network or other online service, the gateway device establishes an appropriate links or tunnels to the desired computer network or online service, as discussed in detail below.

Thereafter, the subscriber can communicate freely with the desired computer network 20 or other online service 22. In order to support this communication, the gateway device 12 generally performs a packet translation function that is transparent to the user/subscriber. In this regard, for outbound traffic from the computer 12 to the computer network or other on-line service, the gateway device changes attributes within the packet coming from the user/subscriber, such as the source address, checksum, and application specific parameters, to meet the criteria of the network to which the user/subscriber has accessed. In addition, the outgoing packet includes an attribute that will direct all incoming packets from the accessed network to be routed through the gateway device. In contrast, the inbound traffic from the computer network or other online service that is routed through the gateway device, undergoes a translation function at the gateway device so that the packets are properly formatted for the user/subscriber's host computer. In this manner, the packet translation process that takes place at the gateway device is transparent to the host, which appears to send and receive data directly from the accessed computer network. Additional information regarding the translation function is provided by U.S. patent application Ser. No. 08/816,714. By implementing the gateway device as an interface between the user/subscriber and the computer network or other online service, however, the user/subscriber will eliminate the need to re-configure their computer 12 upon accessing subsequent networks.

Figure 25:
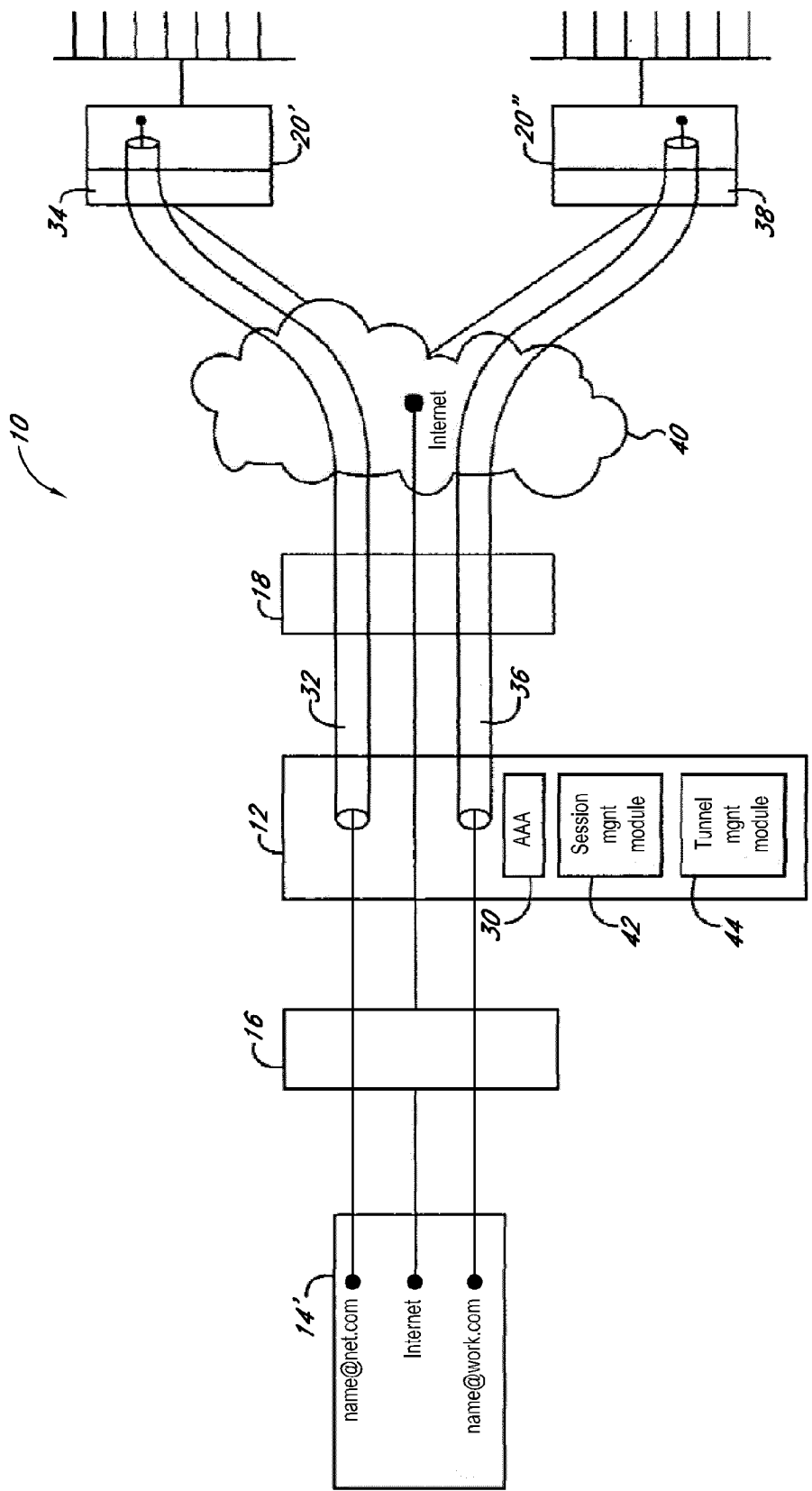
FIG. 25 is a block diagram showing two simultaneous tunnel sessions in accordance with an embodiment of the present invention.

A particularly advantageous feature of the gateway device 12 is the dynamic creation and management of tunnels in computer system 10, such as those illustrated in FIG. 25. The gateway device 12 provides automatic configuration of tunnels without the need for specialized client-side software on computer 14'. Further, the gateway device 12 enables a single user/subscriber to establish two or more tunnels simultaneously since the tunnels do not depend upon a particular configuration on the user/subscriber computer 14'.

A user/subscriber initially sets up an account with gateway device 12 via a web browser interface, wherein the user/subscriber enters various data, including that which is necessary for establishing connections to the networks and/or online services that the user/subscriber wishes to gain access. In addition, the user/subscriber enters establishes a user name and password for their account. The user/subscriber will be requested to enter authorization information (such as a user name, network access identifier, and password) for each network to establishment of a tunnel for access to that network. The information entered by the user/subscriber will be used to create a profile which will be stored in the authorization file in the AAA module 30 of the gateway device 12. The user/subscriber will be provided with the capability to add, delete and/or modify his or her profile, including the information for establishing tunnels. While the AAA module 30 is illustrated as an integral component of the gateway device 12, it is noted that the AAA module 30 may be disposed in a remote location, central to and accessible by a plurality of gateway devices, such as a regional or national chain of hotels.

At the beginning of a new network access session by the user/subscriber, the user/subscriber logs onto the gateway device 12 by entering his or her account user name and password. The user/subscriber can then select access to one or more of the networks and/or online services available through gateway device 12. For example, as illustrated in FIG. 25, the user/subscriber of computer 14' has simultaneously established access to three separate networks, two of which are being accessed through separate tunnels. A first tunnel 32 provides access to network 20'. The tunnel 32 was established when the user/subscriber requested access to enterprise network 20', typically from a web browser interface, which caused a setup notification packet to be sent from the user/subscriber computer 14' to the gateway device 12. The gateway device 12 identifies the packet as originating from the user/subscriber by cross-referencing the MAC address of the packet with the authorization files in the AAA module 30. By referencing the IP address in the packet with the profile of the user/subscriber (where the user/subscriber provided a list of networks for access via a tunnel), the gateway device 12 can determine if a tunnel is needed to provide the user/subscriber with access to the enterprise network 20'. If a tunnel is not needed, then the user/subscriber is provided with standard network access. However, if a tunnel is needed, the tunnel management module 44 of the gateway device 12 determines if a tunnel to the enterprise network 20' has already been established, and if so, places the packet in the existing tunnel. If a tunnel does not exist, then the tunnel management module 44 establishes a tunnel utilizing the profile information provided by the user/subscriber during account creation and/or subsequent modification. If the user/subscriber did not provide all the necessary information because, for example, concern over security of the information, the user/subscriber is presented with pop-up control panel requesting the missing information.

The tunnel management module 44 contacts the enterprise network 20' in order to establish access to the enterprise network 20', typically through a firewall 34 or other secure access server. Using the authorization information provided when the user/subscriber initially set up his or her account (e.g., such as a user name, network access identifier, and password), the gateway device 12 is given access to enterprise network 20', assuming the enterprise network 20' authenticates and accepts the connection. The resulting tunnel established by the tunnel management module 44 is between the gateway device 12 and the enterprise network 20' and may be implemented by any suitable tunneling protocol supported by the enterprise network 20', such as L2TP, PPPTP or PPPoE. From the server-side perspective of the enterprise network 20', the fact that the tunnel terminates at the gateway device 12 rather than at the user/subscriber computer 14' is undetectable. The gateway device 12 essentially spoofs the enterprise network 20' to believing that the tunnel extends all the way to an end point at the user/subscriber computer 14'. However, since the end point is at the gateway device 12 rather than the user/subscriber computer 14', multiple tunnels can be established simultaneously during a single session because the tunnels are not dependent upon the configuration of specific software at the user/subscriber computer 14'. In addition, the tunnel management module 44 of the gateway device 12 is able to dynamically create a tunnel on behalf of a user/subscriber utilizing the network log-on information provided by the user/subscriber. The session management module 42 manages the access sessions provided by the gateway device, recording information about the sessions as desired.

As illustrated in FIG. 25, a second tunnel 36 is established on behalf of the user/subscriber for providing access to the enterprise network 20" through firewall 38. The tunnel 36 can be established in substantially the same manner as described above with regard to tunnel 32. In addition, the user/subscriber may be given access to other networks and/or online services such as the worldwide web portion of the Internet 40.

As previously mentioned, the user/subscriber computer 14' does not require any specific client-side software for accessing the enterprise networks 20', 20", but only requires a suitable communication protocol for communicating with the gateway device 12, such as TCP/IP. Once established, the tunnels 32, 36 can receive packets in virtually any protocol and encapsulate them with the tunneling protocol utilized for the respective tunnels. The tunnels can be terminated by an express command of the enterprise network 20', 20" or the user/subscriber computer 14'. Alternatively, the tunnels may timeout if they are not utilized within a certain predetermined period of time.

Figure 26:
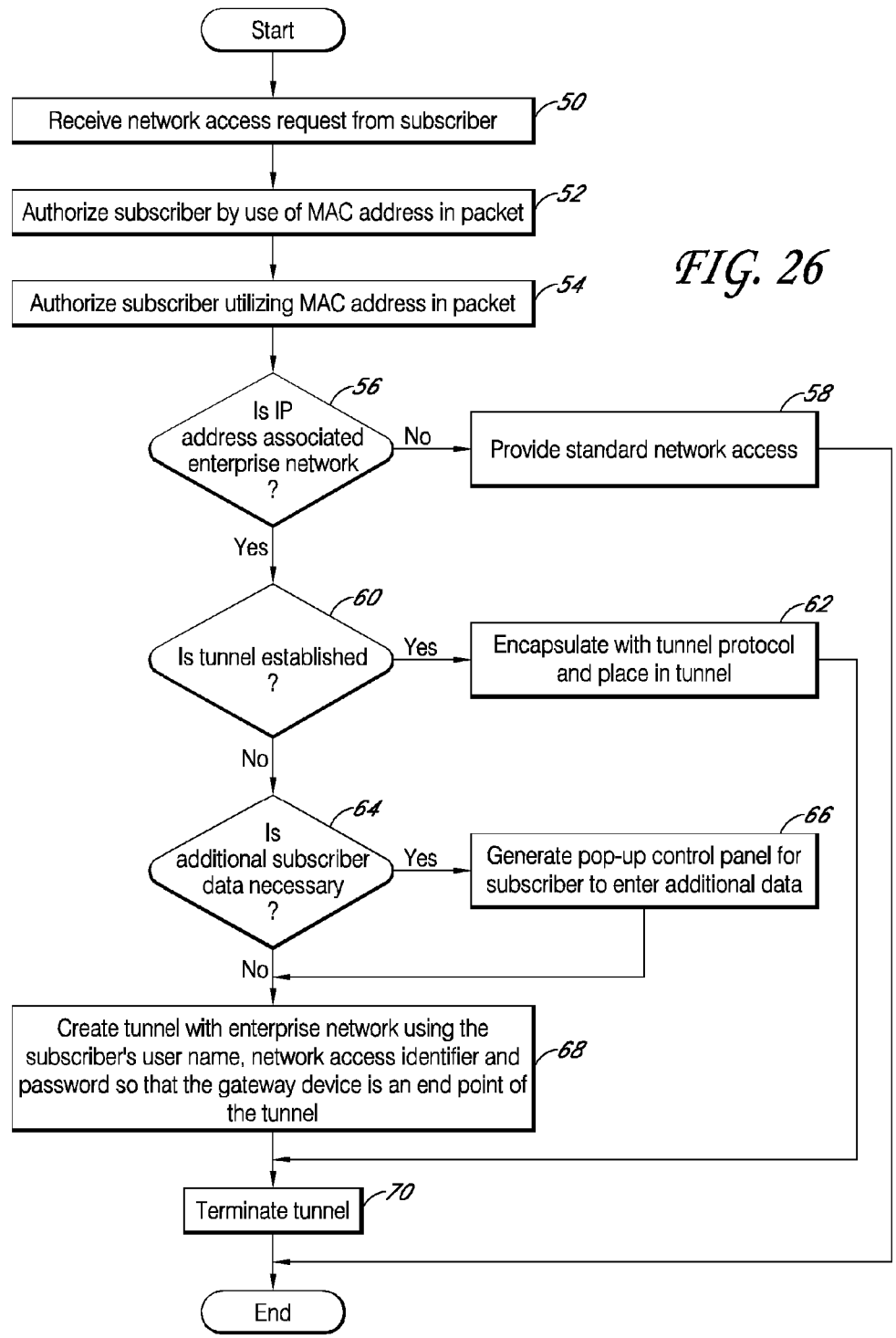
FIG. 26 is a flowchart diagram of a method for creating and managing tunnels in accordance with an embodiment of the present invention.

With reference to FIG. 26, a flowchart diagram of a methodology of tunnel management in accordance with the environment of the present invention is illustrated. At block 50, the gateway device receives a network access request from a user/subscriber. The user/subscriber is then authorized for network access utilizing the MAC address to look up the user/subscriber's profile in the AAA module, as indicated by block 52. A packet is then received form the user/subscriber, as indicated by block 54. It is then determined at block 56 if the destination IP address of the packet is associated with an enterprise network which requires a tunnel for access. If the destination IP address does not require a tunnel for access, then the user/subscriber is provided with standard network access, as indicated by block 58. If the destination IP address does require a tunnel, then it is determined at block 60 if a tunnel has already been established. If a tunnel has been established, then the packet is encapsulated using the tunnel protocol appropriate for that enterprise network, and then the encapsulated packet is placed in the tunnel for delivery to the enterprise network, as indicated by block 62. If it is determined at block 60 that a tunnel has not yet been established, then it is determined at block 64 if additional subscriber data is necessary to log into the enterprise network for establishing a tunnel between the enterprise network and the gateway device. If additional subscriber data is necessary, then a pop-up control panel is displayed to the user/subscriber for requesting the needed additional data from the user/subscriber, as indicated by block 66. If no additional data is needed or has already been obtained, then a tunnel is created with the enterprise network using the subscriber's network access identifier, user name and password so as to create a tunnel with the gateway device as one end point and the enterprise network as the other end point as indicated by block 68. Upon receipt of a termination command or the lapse of a period of non-use (i.e., timeout), the tunnel is terminated, as indicated block 70.

Figure 27:
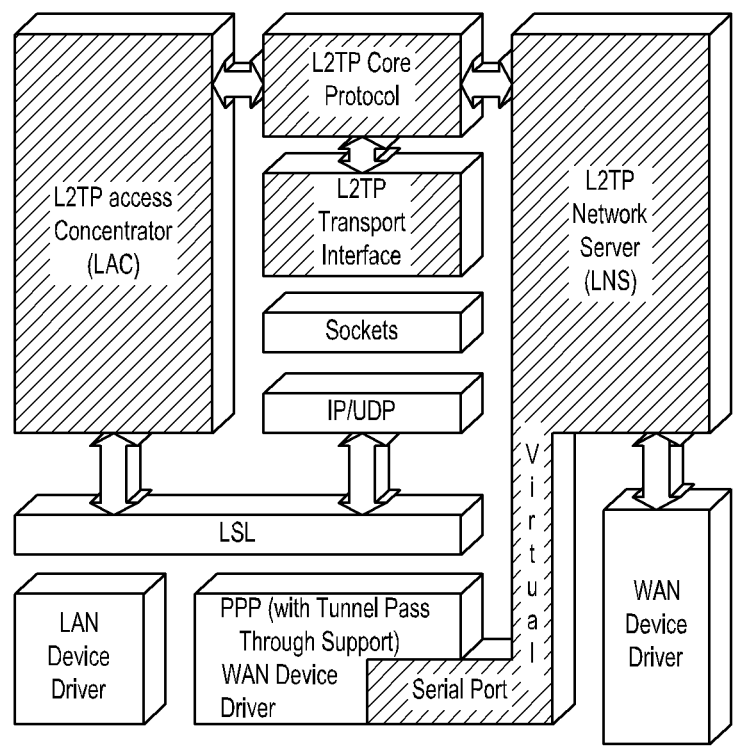
FIGS. 27-29 illustrate component configurations for the L2TP, PPTP, and PPPoE tunneling protocols, respectively.
Figure 28:
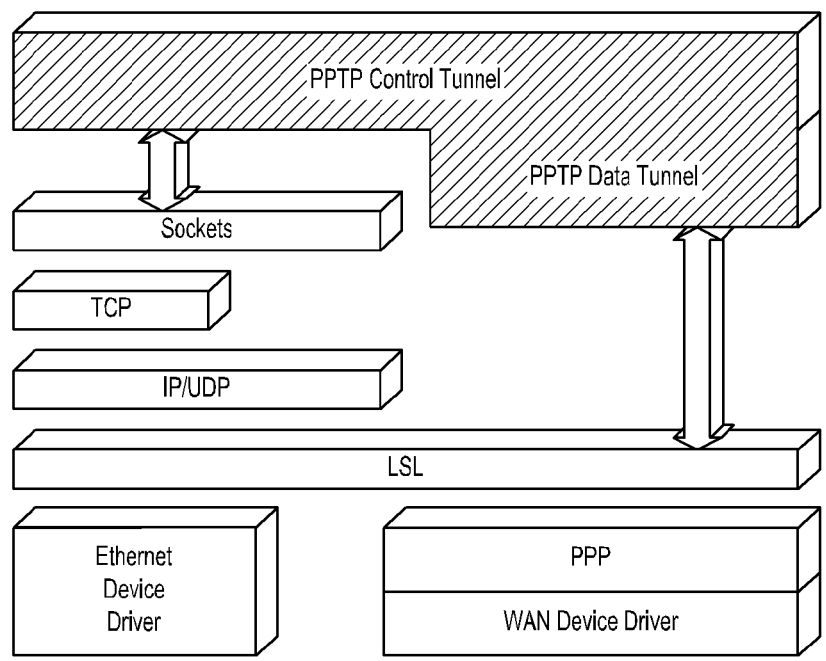
Figure 29:
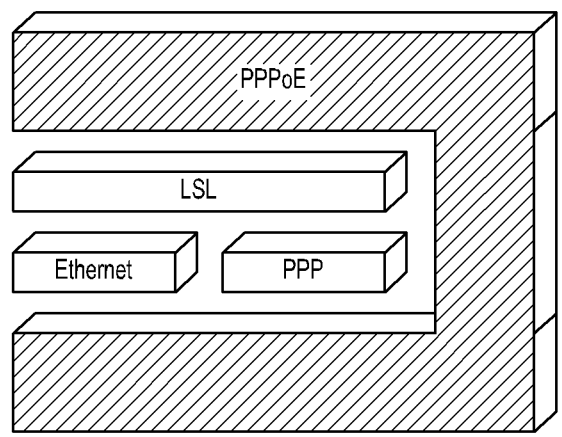
Figure 29:
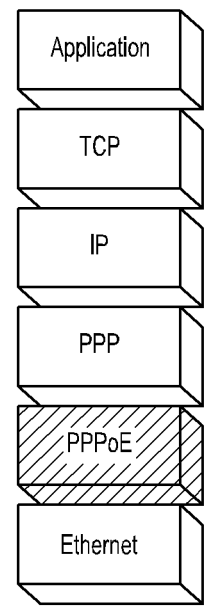

With reference to FIG. 27, a suitable configuration for an L2TP component for implementation by the gateway device 12 is illustrated. FIG. 28 illustrates a suitable configuration for a PPTP client component for implementation in the gateway device. Lastly, FIG. 29 illustrates a suitable configuration for a PPPoE component for implementation by the gateway device.

Pop-Up Control Panel for Use with a Network Gateway Device

A pop-up control panel is provided that is administered through a network gateway device. The gateway device is capable of transparently connecting the user/subscriber to multiple networks without the need to reconfigure the user's host computer. The pop-up control panel allows the gateway administrator to provide information to the user/subscriber. The types of information provided for in the pop-up control panel are infinite in scope. The pop-up control panel may include information relating to marketing, advertising, services offered and network session parameters and the like. In one embodiment the information provided for in the pop-up control panel may comprise network session specific data. The user/subscriber can then act on the data provided to dynamically change the features of a current network session. In one embodiment of the invention the pop-up control panel may include attribute fields including: identifying the network session(s) currently in-use, identifying the duration of network sessions currently in-use, identifying the bandwidth currently available for a specific network session and identifying the current amount of bytes received and/or sent for a specific network session. The gateway administrator will have the capability to dynamically change the information supplied in the pop-up control panel based on many factors, including the location of the user/subscriber, the profile of the user subscriber and the chosen billing scheme and service level. In another embodiment of the invention a method is provided for communicating to a network user data during an ongoing networking session. The method comprises the steps of establishing computer network access to a user's host through a gateway device interface, creating pop-up control panel packets at the gateway device, sending the pop-up control panel packets to the user's host, and generating a pop-up control panel on the monitor of the user's host that comprises data. The data will typically comprise user-specific data based upon a user's profile, the chosen billing scheme, the chosen service level or the location from which the user desires access.

In order for a computer to function properly in a network environment, the computer must be appropriately configured. Among other things, this configuration process establishes the protocol and other parameters by which the computer transmits and receives data. In one common example, a plurality of computers is networked to create a local area network (LAN). In the LAN, each computer must be appropriately configured in order to exchange data over the network. Since most networks are customized to meet a unique set of requirements, computers that are part of different networks are generally configured in different manners in order to appropriately communicate with their respective networks.

While desktop computers generally remain a part of the same network for a substantial period of time, laptops, handhelds, personal digital assistants (PDAs), cellphones or other portable computers (collectively "portable computers") are specifically designed to be transportable. As such, portable computers are connected to different networks at different times depending upon the location of the computer. In a common example in which the portable computer serves as an employee's desktop computer, the portable computer is configured to communicate with their employer's network, i.e., the enterprise network. When the employee travels, however, the portable computer may be connected to different networks that communicate in different manners. In this regard, the employee may connect the portable computer to the network maintained by an airport, a hotel, a cellular telephone network operator or any other locale in order to access the enterprise network, the Internet or some other on-line service. The portable computer is also commonly brought to the employee's residence where it is used to access various networks, such as, the enterprise network, a home network, the Internet and the like. Since these other networks are configured somewhat differently, however, the portable computer must also be reconfigured in order to properly communicate with these other networks. Typically, this configuration is performed by the user each time that the portable computer is connected to a different network. As will be apparent, this repeated reconfiguration of the portable computer is not only quite time consuming, but is also prone to errors. The reconfiguration procedure may even be beyond the capabilities of many users or in violation of their employer's IT policy.

As described by U.S. patent application Ser. No. 08/816, 174 and U.S. Prov. Pat. App. No. 60/111,497, a universal subscriber gateway device has been developed by Nomadix, L.L.C. of Westlake Village, Calif. The contents of both of these applications are expressly incorporated herein by reference. The gateway device serves as an interface connecting the user/subscriber to a number of networks or other online services. For example, the gateway device can serve as a gateway to the Internet, the enterprise network, or other networks and/or on-line services. In addition to serving as a gateway, the gateway device automatically adapts to a computer, in order that it may communicate with the new network in a manner that is transparent both to the user/subscriber and the new network. Once the gateway device has appropriately adapted to the user's computer, the computer can appropriately communicate via the new network, such as the network at a hotel, at home, at an airport, or any other location, in order to access other networks, such as the enterprise network, or other online services, such as the internet.

The portable computer user/subscriber, and more specifically the remote or laptop user, benefits from being able to access a myriad of computer networks without having to undergo the time-consuming and all-too-often daunting task of reconfiguring their host in accordance with network specific configurations. From another perspective, the network service provider benefits from avoiding "on-site" visits and/or technical support calls from the user who is unable to properly reconfigure the portable computer. In this fashion, the gateway device is capable of providing more efficient network access and network maintenance to the user/subscriber and the network operator.

A gateway device is also instrumental in providing the user/subscriber broadband network access that can be tailored to the user's needs. In many instances the remote user is concerned with being able to acquire network access and levels of service in the most cost-effective manner. Correspondingly, the gateway device administrator desires the capability to be able to offer the user/subscriber numerous different service, routing, and billing rate options. By way of example, the remote user in a hotel environment may desire a network subscription for the duration of their hotel stay while the user in an airport may desire a network subscription for the duration of their layover or until their scheduled flight departs. Additionally, a user may desire a certain level of service based on bandwidth concerns and the need for higher or lower data transfer rates. For example, the user/subscriber who is accessing a network for the purpose of viewing text may desire a lower bandwidth service level that meets their particular needs, however, another user/subscriber who is accessing a network for the purpose of downloading files may desire a higher bandwidth service level capable of transferring data at higher speeds.

Additionally, the network service provider benefits from being able to offer various service, routing and billing options to the user/subscriber. By offering service at varying speeds and pricing scales, the network service provider is able to minimize network congestion, i.e. not all user/subscribers are tied to one high speed (and high cost) service. Lessening network traffic is beneficial for attracting new subscribers and insuring that pre-existing subscribers maintain status quo. From an economic standpoint, differentiated service quality and usage based pricing will promote the use and deployment of broadband network access and enhance the revenue models of the network service providers. No longer will the user/subscriber be tied to a flat-rate billing scheme that offers a single level of service quality. Flat-rate pricing and single level service quality wastes resources, require light network users to subsidize heavy users, and hinders the dissemination of widespread use of broadband network access. Additionally, the ability to provide differentiated service quality and usage based pricing can be enhanced by providing these features on demand and dynamically throughout the user's network session. For a more detailed discussion of the need to provide differentiated quality of service and billing schemes to the broadband network environment see Richard J. Edell and Pravin P. Varaiya, "Providing Internet Access What We Learn From INDEX", INDEX project report #99-010W, Apr. 16, 1999, (http://www.INDEX.Berkeley.edu/reports/99-010W). That document is herein expressly incorporated by reference as if set forth fully herein.

In today's fast paced computing and networking environment it is even more advantageous to provide these service and billing options dynamically, allowing the user/subscriber to change, for example, billing rates, service routing or bandwidth capacity while a network session is on going. This would allow the user/subscriber to be billed at one rate while downloading the data-intensive file while choosing a more cost-effective billing structure for the less data-intensive activities. Additionally, the dynamic nature of this process would allow the user/subscriber to change service levels or billing rates without the need to exit the network and initiate a new log-on procedure. In effect, the user/subscriber benefits from having a more efficient and less time-consuming means of altering service levels and billing structure. For a more detailed discussion of dynamic bandwidth management see U.S. Provisional Application No. 60/161,182, entitled "Systems and Methods for Dynamic Bandwidth Management on a Per Subscriber Basis in a Computer Network," incorporated elsewhere herein.

In order to make the user/subscriber constantly aware that these diverse service and billing options exist the gateway device administrator needs to be able to provide the user/subscriber with real-time information pertaining to the network session(s) that the user currently has on-going. The gateway administrator would benefit from being able to provide the user/subscriber with constant or intermittent data related to the network sessions currently on-going, the duration of those sessions, the bandwidth currently being used, the number of bytes that have been transferred and any other information related to the current network session. In this manner, the user/subscriber has the capability to monitor and make the appropriate adjustments to the billing structure and/or service levels related to the network sessions that he or she currently has on going. The user/subscriber may choose to stop or shutdown connections (and thus billing) to those networks not currently being utilized. The user/subscriber may monitor the duration of the network session and determine that a longer subscription is necessary or the user may observe the bandwidth currently used and determine that the current application warrants an increase or decrease in bandwidth. The ability to provide this real-time information to the user is especially important in light of the fact that the typical, infrequent gateway device user will be unfamiliar with billing and service structure and, particularly, the capability to change these features on-the-fly.

From the perspective of the network service provider, the ability to offer flexible service quality, routing options and billing plans ultimately can lead to less overall network congestion. The current broadband standard of flat rate billing and one-dimensional service and routing options force the network service provider in to effectively transmitting all network data at maximum bandwidth. By lessening the congestion within the network, the service provider is able to accommodate more user/subscribers and provide those user/subscribers with a more effective network. The ability to lessen congestion is even more apparent if the network service provider can offer the user/subscriber the capability to make changes to the service quality, routing and billing structure while the network session is on going. Additionally, by offering differentiated quality of service, routing and billing the network service provider may be able to increase the volume of user/subscribers accessing the network.

Summary

The present invention comprises a user pop-up control panel that is administered through a gateway device. The gateway device is capable of transparently connecting the user/subscriber to multiple networks without the need to reconfigure the user's host computer. The pop-up control panel allows the gateway administrator to provide real-time, network session specific data to the user/subscriber. The user/subscriber can then act on the data provided to dynamically change the features of a current network session. Additionally, the pop-up control panel can provide for information or access to information through appropriate links. In many instances, the information provided or the links to information may be user-specific information. The basis or "know-how" for the user-specific data can be provided by the network service provider (i.e. user profiles in the network database) or through direct user inputs. The pop-up control panel provides the gateway administrator the capability to provide the user with all forms of information, for example, the pop-up control panel can provide for monitoring of the network session, or it can provide for marketing capabilities through advertising medium or it can provide the service provider with a means to poll or survey users. These examples of the types of information that a pop-up control panel may provide should not be construed as limiting. The pop-up control panel may be configured by the gateway administrator, network provider or user/subscriber to provide a wide variety of information.

In one embodiment of the invention a pop-up control panel is provided to a user/subscriber during a network session. The pop-up control panel may include information and links to information in response to configuration of the panel by the gateway administrator or the subscriber/user. In many instances, the information that is provided for in the pop-up control panel will be user-specific data assembled from user profiles in network databases or from direct user/subscriber inputs. The information that is provided to the user/subscriber via the pop-up control panel may include monitoring of the network session, polling/surveying the user/subscriber, user-tailored advertisements, or information on other services/features offered by the network provider.

In another embodiment of the present invention the pop-up control panel may include attributes such as, identifying the network session(s) currently in-use, identifying the duration of network sessions currently in use, identifying the bandwidth currently available for a specific network session and identifying the current amount of bytes received and/or sent for a specific network session. It is to be understood, by those skilled in the art to which this invention relates that all conceivable useful information relating to the current network session could be displayed to the user/subscriber in a multitude of combinations as defined by the user/subscriber and/or the gateway administrator. The gateway administrator will have the capability to dynamically change the information supplied in the pop-up control panel based on many factors, including the location of the user/subscriber, the profile of the user subscriber and the chosen billing scheme and service level.

In yet another embodiment of the present invention a method is provided for communicating to a network user data during an ongoing networking session. The method comprises of the steps of establishing computer network access to a user's host through a gateway device interface, communicating with databases associated with the gateway device to determine user-specific data, creating pop-up control panel packets at the gateway device having attribute data associated with the user-specific data, sending the pop-up control panel packets to the user's host, and generating a pop-up control panel on the monitor of the user's host that comprises data. The data will typically comprise data related to a user's profile, the chosen billing scheme, the chosen service level, the location from which the user desires access or any other information deemed pertinent by the gateway administrator or user/subscriber.

Description

Referring now to FIG. 16, the computer system 10 that includes a gateway device 12 is depicted in block diagram form. The computer system typically includes a plurality of computers 14 that access the computer network in order to gain access to other networks or other online services. For example, the computers can be plugged into ports that are located in different rooms of a hotel or a multi-dwelling residence. Alternatively, the computers can be plugged into ports in an airport, an arena, or the like. The computer system also includes a gateway device that provides an interface between the plurality of computers and the various networks or other online services. Most commonly, the gateway device is located near the computers at a relatively low position in the structure of the overall network. (i.e. the gateway will be located within the hotel, multi-unit residence, airport, etc.) However, the gateway device can be located at a higher position in the overall network structure such as at a Point of Presence (PoP) of Network Operating Center (NOC), if so desired. Although the gateway device can be physically embodied in many different fashions, the gateway device typically includes a controller and a memory device in which software is stored that defines the operational characteristics of the gateway device. Alternatively, the gateway device can be embedded within another network device, such as the access controller or a router, or the software that defines the functioning of the gateway device can be stored on a PCMCIA card that can be inserted into the computer in order to automatically reconfigure the computer to communicate with a different computer system.

The computer system 10 also typically includes an access controller 16 positioned between the computers 14 and the gateway device 12 for multiplexing the signals received from the plurality of computers onto a link to the gateway device.

Depending upon the medium by which the computers are connected to the access controller, the access controller can be configured in different manners. For example, the access controller can be a digital subscriber line access module (DSLAM) for signals transmitted via regular telephone lines, a cable head end for signals transmitted via coaxial cables, a wireless access point (WAP) for signals transmitted via a wireless network, a cable modem termination system (CMTS), a switch or the like. As also shown in FIG. 16, the computer system typically includes one or more routers 18 and/or servers (not shown in FIG. 16) of a plurality of computer networks 20 or other online services 22. While the computer system is depicted to have a single router, the computer system can have a plurality of routers, switches, bridges, or the like that are arranged in some hierarchical fashion in order to appropriately route traffic to and from the various networks or other online services. In this regard, the gateway device typically establishes a link with one or more routers. The routers, in turn, establish links with the servers of other networks or other online service providers, such as internet service providers, based upon the subscriber's selection.

The gateway device 12 is specifically designed to adapt to the configuration of each of the computers 14 that log onto the computer network 10 in a manner that is transparent to the subscriber and the computer network. In the typical computer network that employs dynamic host configuration protocol (DHCP) service, an IP address is assigned to the computer that is logging onto the computer network through communication with the gateway device. The DHCP service can be provided by an external DHCP server 24 or it can be provided by an internal DHCP server located within the gateway device. Upon opening their web browser or otherwise attempting to access an on-line service, the gateway device will direct the subscriber to enter some form of an identifier such as their ID and password. In an alternate embodiment of the device, it is anticipated that the gateway device will be able to automatically detect this information upon connection of the computer to the network or any attempt to log in. The gateway device then determines if the subscriber is entitled to access the computer system, the level of access and/or the type of services to which the subscriber is entitled according to an Authentication, Authorization and Accounting (AAA) procedure that is described by U.S. patent application Ser. No. 08/816,174 and U.S. Provisional Application No. 60/111,497. An AAA server, which is a database of subscriber records, may be remote to the gateway device or the AAA database may be incorporated into the physical embodiment housing the gateway device. Assuming that the subscriber has been authenticated and has authorization, the gateway device typically presents new subscribers with a home page or control panel that identifies, among other things, the online services or other computer networks that are accessible via the gateway device. In addition, the home page presented by the gateway device can provide information regarding the current parameters or settings that will govern the access provided to the particular subscriber. As such, the gateway administrator can readily alter the parameters or other settings in order to tailor the service according to their particular application. Typically, changes in the parameters or other settings that will potentially utilize additional resources of the computer system will come at a cost, such that the gateway administrator will charge the subscriber a higher rate for their service. For example, a subscriber may elect to increase the transfer rate at which signals are transmitted across the computer network and pay a correspondingly higher price for the expedited service.

The home page also permits the subscriber to select the computer network 20 or other online services 22 that the subscriber wishes to access. For example, the subscriber can access the enterprise network on which the computer is typically resident. Alternatively, the subscriber can access the internet or other on-line services. Once the subscriber elects to access a computer network or other online service, the gateway device establishes an appropriate links via one or more routers 18 to the desired computer network or online service.

Thereafter, the subscriber can communicate freely with the desired computer network 20 or other online service 22. In order to support this communication, the gateway device 12 generally performs a packet translation function that is transparent to the user/subscriber and the network. In this regard, for outbound traffic from the computer 12 to the computer network or other on-line service, the gateway device changes attributes within the packet coming from the user/subscriber, such as the source address, checksum, and application specific parameters, to meet the criteria of the network to which the user/subscriber has accessed. In addition, the outgoing packet includes an attribute that will direct all incoming packets from the accessed network to be routed through the gateway device. In contrast, the inbound traffic from the computer network or other online service that is routed through the gateway device, undergoes a translation function at the gateway device so that the packets are properly formatted for the user/subscriber's host computer. In this manner, the packet translation process that takes place at the gateway device is transparent to the host, which appears to send and receive data directly from the accessed computer network. Additional information regarding the translation function is provided by U.S. patent application Ser. No. 08/816,714. By implementing the gateway device as an interface between the user/subscriber and the computer network or other online service, however, the user/subscriber will eliminate the need to re-configure their computer 12 upon accessing subsequent networks.

In one embodiment of the present invention, the gateway device implements a pop-up control panel. Once the user/subscriber has gained access to one or more networks through the gateway device, the pop-up control panel is communicated to the host computer from the gateway device and provides the user/subscriber with information. The information that is provided to the user/subscriber in the pop-up control panel may include information of various types, forms and content. The information that is provided for in the pop-up control panel may be static information or dynamic information. The information provided in the pop-up control panel may be user specific, site specific or gateway device specific. In the user-specific model the data may be based on information found in network databases or information provided by the user/subscriber. By way of example, the information provided for in the pop-up control panel may be for network monitoring purposes, for marketing purposes or any other conceivable purpose that the gateway administrator or user/subscriber deems appropriate.

Within the realm of marketing, the pop-up control panel may include advertising tailored to the specific needs of the user/subscriber. The gateway device would be capable of tailoring the material based upon user profiles in the network. The pop-up control panel may also incorporate surveys or links to surveys to provide the network provider with beneficial statistical data. As an ancillary benefit, the user/subscriber who responds to the surveys may be rewarded with network access credit or upgraded quality. Additionally, the service provided could offer additional services to the user/ subscriber by way of the pop-up control panel or links to these services may be offered on the pop-up control panel. These services offered by the network service provider are not limited to the services related to the network connection. For example, a hotel may desire to offer the user/subscriber in-room food service or a multi-unit dwelling may want to offer house cleaning service.

The pop-up control panel may also comprise information related to the status of the current network session. By way of example this information may include, current billing structure data, the category/level of service that the user/subscriber has chosen, the bandwidth being provided to the user, the bytes of information currently sent or received, the current status of network connection(s) and the duration of the existing network connection(s). It is to be understood, by those skilled in the art to which this invention relates that all conceivable useful information relating to the current network session could be displayed to the user/subscriber in a multitude of combinations as defined by the user/subscriber and/or the gateway administrator. The gateway administrator will have the capability to dynamically change the information supplied in the pop-up control panel based on many factors, including the location of the user/subscriber, the profile of the user subscriber and the chosen billing scheme and service level. The information provided in the pop-up control panel may prompt the user/subscriber to return to the provisioning page to adjust any number of specific parameters, such as the billing scheme, the routing, the level of service and/or other user-related parameters.

The pop-up control panel may be implemented with an object-oriented programming language such as Java developed by Sun Microsystems, Incorporated of Mountain View, Calif. The code that defines the pop-up control panel is embodied within the gateway device, while the display monitor and the driver are located with the host computer's that are in communication with the gateway device. The object oriented programming language that is used should be capable of creating executable content (i.e. self-running applications) that can be easily distributed through networking environments. The object oriented programming language should be capable of creating special programs, typically referred to as applets that can be incorporated in web pages to make them interactive. In this invention the applets take the form of the pop-up control panels. It should be noted that the chosen object-oriented programming language would require that a compatible web browser be implemented to interpret and run the pop-up control panel. It is also possible to implement the pop-up control panel using other programming languages, such as HTML, SGML and XML; however, these languages may not be able to provide all the dynamic capabilities that languages, such as Java provide.

The gateway administrator or the user/subscriber may have control over how frequently a pop-up control panel is invoked by the gateway device so that it appears on the monitor of the user/subscriber. Typically the gateway device will be configured to invoke an initial pop-up control panel to the user/subscriber's host a short period of time after the user has gained access to a network service provided by the gateway administrator. Additionally, the pop-up control panel may be invoked automatically in response to predetermined conditions. An example being, invoking the pop-up control panel in response to the user/subscriber's imminent subscription expiration. The pop-up control panel may also be generated and controlled by the user/subscriber. The user subscriber can choose to have the pop-up control panel visual throughout the network session or the pop-up control can be minimized or deleted. It is also possible for the gateway administer to configure the pop-up control panel so that it can not be deleted or the user/subscriber can be rewarded (e.g. additional access time) for maintaining a visible pop-up control throughout the network session.

The pop-up control panel is configured to send heartbeat packets back to the gateway device at predetermined specified intervals to let the gateway know that the user/subscriber still has an active, pop-up control panel in use or at the user's disposal. If the gateway device does not receive a heartbeat from the host after a predetermined period of time, it will assume that the user has deleted the pop-up control panel or the pop-up control panel has otherwise failed. In the instance where a heartbeat is not received by the gateway device after a predetermined time period, the gateway device will re-send a new updated pop-up control panel to the user/subscriber. Through the use of these "heartbeats" the gateway device will be able to insure that the user/subscriber always has ready access to the user-related information provided by the pop-up control panel. The user/subscriber will also have the capability to locate the pop-up control panel anywhere within the viewable area of the computer monitor. The physical embodiment of the pop-up control panel can be modified in an infinite number of ways to suit either the user or the gateway administrator. For example, the panel size, color, graphics, location, form of read out (digital vs. analog), language, scales (e.g. metric vs. U.S.) can all be varied, as well as the rate at which information is provided.

It should be noted that the pop-up control panel will only be actively sent from the gateway device if the user/subscriber is accessing a network provided service, such as broadband Internet access, that is provided by the gateway administrator. If the user chooses to stop using the network service, such as broadband Internet access, they can close the application and the pop-up control panel will correspondingly be inactive. The gateway device recognizes that the network provided service has been disabled and stops sending pop-up control panel packets to the host. Upon the user/subscriber re-activating the network provided service the gateway device will recognize the need to send a new pop-up control panel and begin recognizing "heartbeats" coming from the pop-up control panel.

FIGS. 30-34 are depictions of various examples of pop-up control panels providing for network session data. These pop-up control panels are shown by way of example to illustrate the various user specific information that the pop-up control panels may contain. These pop-up control panels are typically associated with a specific billing and/or service level plan. The gateway administrator or the network operator may choose to offer any or all of these billing and/or service options. The pop-up control panel that will be sent to the user/subscriber's computer may be tailored to reflect the user data that is pertinent to the chosen and available billing methods and/or service levels.

Figure 30:
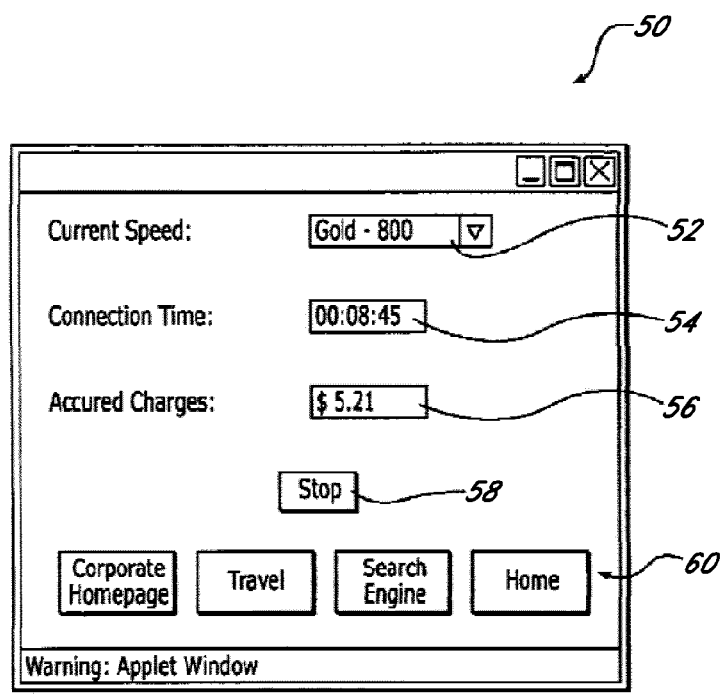
FIGS. 30-34 are illustrations of various examples of pop-up control panels, in accordance with an embodiment of the present invention.

FIG. 30 shows a pop-up control panel 50, that includes the current chosen connection speed (i.e. bandwidth) 52, an elapsed time counter 54, a current charges accrued counter 56 and a start/stop button 58. The attribute fields in this pop-up control panel are typically used if the gateway administrator or network operators offer a billing plan based on the bandwidth that the user selects, commonly referred to as a "pay-per-use" method of billing. For example, the gateway administrator or network operators may structure billing at $0.10 per minute for 200 Kbps bandwidth, $0.20 per minute for 400 Kbps bandwidth and $0.35 per minute for 800 Kbps per minute bandwidth. If the user chooses 200 Kpbs at $0.10 per minute, then the initial pop-up control panel will identify 200 Kpbs as the current bandwidth along with the elapsed time that the user has been connected to the accessed network and a running total of the charges that have been incurred. If the user/subscriber desires to change the bandwidth setting, they can click on the box containing the current bandwidth and are re-directed to a service provisioning screen to choose an alternative billing method.

The start/stop buttons 58 allow the user the benefit of stopping the charges to an account (i.e. temporarily disabling the network) without closing the user's web browser. A user/subscriber can activate the stop button and be re-directed back to the home page or portal page. From the user/subscriber standpoint the ability to momentarily disable the network and stop incurring charges is a cost-effective form of networking. From the gateway administrator or network operator standpoint the momentary network stoppage means the user will be directed back to the portal or home page. By re-directing the user back to the portal or home page the gateway administrator or network operator is provided the opportunity to present the user/subscriber with updated information pertaining to the remote location (i.e. the hotel, the airport etc.). When the user desires to re-establish network connection the user may activate the start button on the pop-up control panel and charges will again incur. The start/stop buttons may be implemented at the discretion of the gateway administrator or network operator and most of the billing plans and service plans will provide for the option of presenting the start/stop button feature within the pop-up control panel. Additionally, the pop-up control panel may comprise a timer (not shown in FIGS. 30-34) that alerts the user/subscriber that a subscription is about to expire.

Additional pop-up control panel fields are provided in the form of click-on buttons 60 located, in this instance, near the bottom of the pop-up panel. By way of example the buttons shown in FIG. 30 provide for links to the a corporate home page, a travel site on the Internet, an Internet search Engine and a network provider home page. Those of ordinary skill in the art will note that the additional fields within the pop-up panel may encompass infinite possibilities for links, services and information. Additionally, the buttons or any other field within the pop-up control panel may include other types of information options, such as advertising fields or user-specific links or fields based upon data found in the user's profile or inputted by the user/subscriber.

Figure 31:
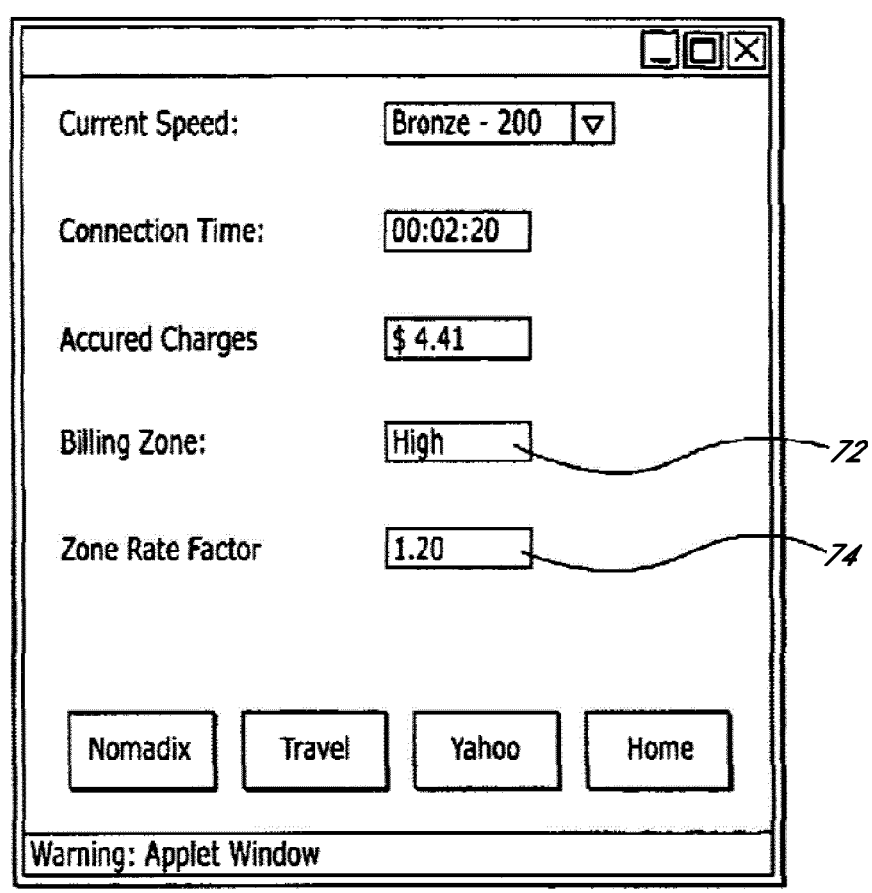

FIG. 31 depicts a pop-up control panel 70 having the additional attribute fields of billing zone 72 and rate factor 74. The gateway administrator or network operators may choose to charge a premium for access during peak usage periods. These periods, or zones, will typically be defined by the hours in the day or the days of the week (i.e. weekday versus weekend day). For example network usage during the 9 am to 5 pm period may be billed at a rate factor of 1.25, while network usage during the 5 pm to 9 am period may be billed at a rate factor of 1.0. Thus, the pop-up control panel will include the billing zone that the user/subscriber currently occupies, as well as the rate factor that is tied to the specific billing zone. The user/subscriber will have been made aware of billing zones and rate factors when the initial service provisioning screen was presented during the log-on and billing process.

Figure 32:
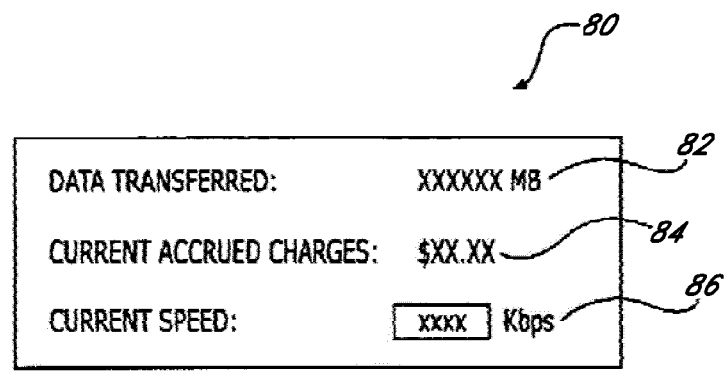

FIG. 32 illustrates a pop-up control panel 80 that includes the current data transferred counter 82, current charges accrued counter 84, and current connection speed 86. The attribute fields in this pop-up control panel are typically used if the gateway administrator or network operators offer a billing plan based on the quantity of data that is transferred, typically both sent and received data, commonly referred to as a "bitmeter" method of billing. For example, the gateway administrator or network operator may choose to charge user/subscribers the flat rate of $1.00 per megabyte of data transmitted. If the user/subscriber desires to change the bandwidth setting, they can click-on the box containing the current bandwidth and are re-directed to a service provisioning screen to choose an alternative bandwidth. The start/stop buttons, not shown in FIG. 32, may also be implemented in this pop-up control panel.

Figure 33:
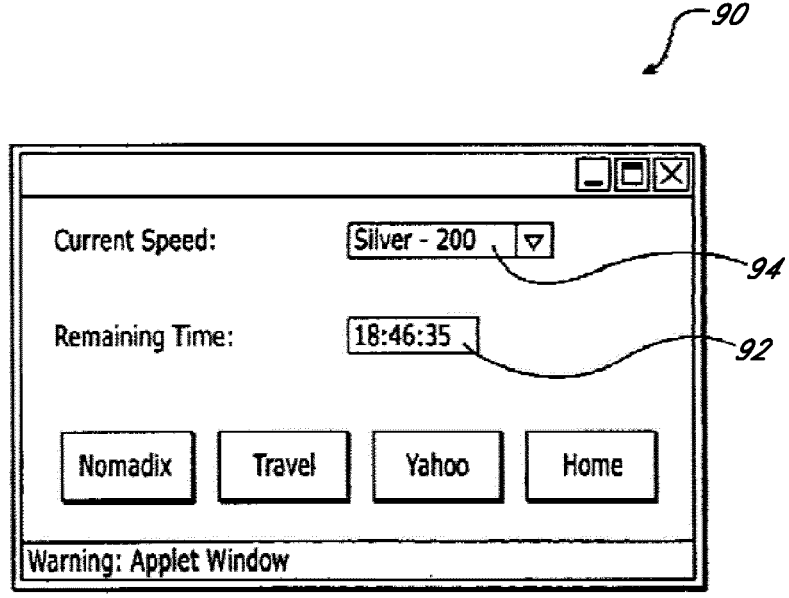

FIG. 33 shows a pop-up control panel 90 that includes a time remaining counter 92 and a current connection speed 94. The attribute fields in this pop-up control panel are typically used if the gateway administrator or network operators offer a billing plan based on a specific level of service (i.e. desired bandwidth) for a specific period of time, commonly referred to as an "expiration time" method of billing. In this billing and service scheme, the user/subscriber may choose different pricing schemes based on the level of service (i.e. desired bandwidth) and the duration of their subscription. For example, the user may be offered a 1, 2, 4, 8 or 24 hour Subscription with the option to operate at a 200, 400 or 800 Kpbs bandwidth. If the user/subscriber desires to change the duration of the subscription or the level of service, it may be possible to click-on the box containing the remaining time or current bandwidth, be re-directed to a service provisioning screen and choose an alternate service plan offering a higher level of service or a longer subscription period. The start/stop buttons will not typically be employed in the "expiration time" method because the subscription has a specific time duration.

Figure 34:
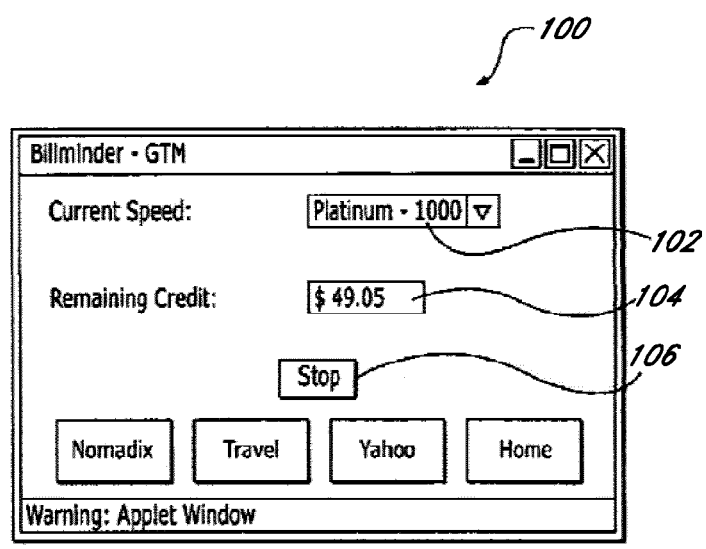

FIG. 34 illustrates a pop-up control panel 100 that includes current connection speed 102, a remaining credit counter 104 and a start/stop button 106. The attribute fields in this pop-up control panel are typically used if the gateway administrator or network operator offers a billing plan based on pre-purchasing a desired amount of network "credit". In this type of billing scheme the user/subscriber will be offered various bandwidth options, each of which is tied to specified costs per minute of use. The user will then purchase a "block" of network access, for example $20.00 of network use. The block of network access will then allow the user to choose the bandwidth of the connection. If the user chooses a slow connection speed they will deplete their "block" of network access more slowly than if they choose a higher connection speed. By clicking on the bandwidth connection field within the pop-up control panel the user/subscriber will be re-directed to the service provisioning page to change the bandwidth to accommodate a higher or lower connection speed. The start/stop button may also be implemented in this pop-up control panel.

The pop-up control panel is not limited to supplying information related to the user/subscriber's billing and service plans. It is also possible to configure the pop-up control panel to include information that is customized to the user/subscriber or the location/site from which the user is remotely located. For example, the user may be located at a hotel for the purpose of attending a specific convention or conference either in the hotel or within the immediate vicinity of the hotel. The gateway device may have "learned" this information about the user/subscriber through an initial logon profile inquiry or the gateway administer may have inputted this information into a database. The gateway device can store profile information within the user-specific AAA database or it can store and retrieve data from external databases. The gateway device can be configured to recognize these profiles and to customize the pop-up control panel accordingly. In the hotel scenario, the pop-up control panel may include a link for convention or conference services offered by the hotel.

In another example of location specific pop-up control panel data, the user subscriber may be remotely accessing the gateway device while located in a specific airport terminal. The gateway device will be configured so that it is capable of providing ready access to information related to that specific airport terminal, i.e. information pertaining to the current flights scheduled to depart and arrive at that terminal, the retail services offered in that specific terminal, etc. In this manner, the pop-up control panel may include a link for terminal specific flight information and/or terminal specific retail services available to the user/subscriber.

Customization of the information comprising the pop-up control panel is not limited to the gateway administrator or the network operator. The user/subscriber may also be able to customize the information that is provided in the pop-up control panel. The user/subscriber customization may be accomplished either directly by the user configuring the pop-up control panel manually or indirectly from the gateway device configuring the pop-up control panel in response to data found in the user-specific profile. In the manual embodiment the user/subscriber may be asked to choose which information or type of information they would like supplied in the popup for that specific network session. For instance, the user may require an alarm clock counter to insure an appointment is met or the user may require periodical updates of a specific stock quote. The information that a user customizes for the popup control panel may be network session specific, may be associated with the duration of a gateway subscription or may be stored in a user/subscriber profile for an indefinite period of time. The gateway device's ability to communicate with numerous user databases provides the basis for storing user specific profiles for extended periods of time.

Figure 35:
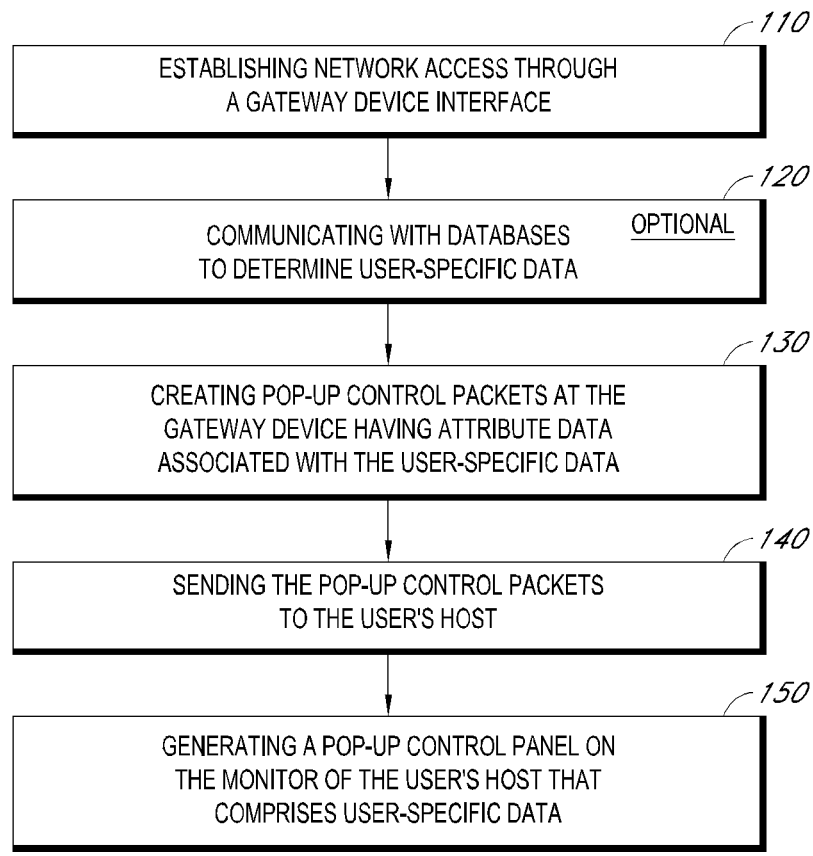
FIG. 35 is a flowchart diagram of a method for communicating to a network user data during an ongoing network session, in accordance with an embodiment of the present invention.

FIG. 35 shows a flow diagram of a method for providing a network user with a pop-up control panel that incorporates data in accordance with an embodiment of the present invention. At step 110, the user establishes network access through a gateway device interface that is in communication with the user's host and desired network. Communication between the user's host and the gateway device can be accomplished though a conventional telephone/modem connection, a digital subscriber line (DSL), cable hook-up, wireless communication or any other suitable communication technique. Establishing access to the desired network will typically involve an authorization and authentication process and in some instances choosing a desired billing scheme and service level as offered by the gateway administrator or network operator. Once the user has established the network service connection and a tunnel has been opened to facilitate an open communication line between the user's host and the network, the gateway device, at optional step 120, communicates with various databases to assemble user-specific data. These databases may be internal databases located within the gateway device or external databases located within the infrastructure of the composite network. The user-specific data that the gateway device assembles may comprise billing scheme related data, service level data, user profile data, remote-site related data or any other data that is related to the user or the location from which the user is located during the networking session.

At step 130, the gateway device creates pop-up control packets that have attributed data related to the information that will be conveyed in the pop-up control panel. These packets are typically written to accommodate standard Internet Protocol (IP). At step 140, the packets are sent to the user's host and at step 150 a pop-up control panel is generated on the monitor of the user's host that includes information. In many instances, the information that is provided for in the pop-up control window will be user-specific information conveyed from a network user profile or directly input by the user/subscriber.

Transparent Computer Access and Communication with a Service Provider Network Using a Network Gateway Device A system and method for enabling a transparent communication between a computer and a service provider network. The system and method includes a computer and a network gateway device in communication with the computer, wherein the network gateway device connects the computer to a computer network. The network gateway device also receives user data representative of a user attempting to access the computer network. The system and method further includes a service provider network in communication with said network gateway device. The service provider network, such as an ISP network, includes an authentication server in communication with the network gateway device and having a database comprising user profiles representing users authorized to access said computer network. The authentication server compares the user data representative of a user attempting to access the computer network to the user profiles representing users authorized to access the computer network to determine if the user attempting to access the computer network can access the computer network. The system and method can further include an accounting system for maintaining historical data concerning use of said service provider network.

In order for a computer to function properly in a network environment, the computer must be appropriately configured. Among other things, this configuration process establishes the protocol and other parameters by which the computer transmits and receives data. In one common example, a plurality of computers is networked to create a local area network (LAN). In the LAN, each computer must be appropriately configured in order to exchange data over the network. Since most networks are customized to meet a unique set of requirements, computers that are part of different networks are generally configured in different manners in order to appropriately communicate with their respective networks.

While desktop computers generally remain a part of the same network for a substantial period of time, laptops, handhelds, personal digital assistants (PDAs), cellphones or other portable computers (collectively "portable computers") are specifically designed to be transportable. As such, portable computers are connected to different networks at different times depending upon the location of the computer. In a common example in which the portable computer serves as an employee's desktop computer, the portable computer is configured to communicate with their employer's network, i.e., the enterprise network. When the employee travels, however, the portable computer may be connected to different networks that communicate in different manners. In this regard, the employee may connect the portable computer to the network maintained by an airport, a hotel, a cellular telephone network operator or any other locale in order to access the enterprise network, the Internet or some other on-line service. The portable computer is also commonly brought to the employee's residence where it is used to access various networks, such as, the enterprise network, a home network, the Internet and the like. Since these other networks are configured somewhat differently, however, the portable computer must also be reconfigured in order to properly communicate with these other networks. Typically, this configuration is performed by the user each time that the portable computer is connected to a different network. As will be apparent, this repeated reconfiguration of the portable computer is not only quite time consuming, but is also prone to errors. The reconfiguration procedure may even be beyond the capabilities of many users or in violation of their employer's IT policy.

As described by U.S. patent application Ser. No. 08/816,174 and U.S. Prov. Pat. App. No. 60/111,497, a universal subscriber gateway device has been developed by Nomadix, L.L.C. of Westlake Village, Calif. The contents of both of these applications are incorporated herein by reference. The gateway device serves as an interface connecting the user/subscriber to a number of networks or other online services. For example, the gateway device can serve as a gateway to the Internet, the enterprise network, or other networks and/or on-line services. In addition to serving as a gateway, the gateway device automatically adapts to a computer, in order that it may communicate with the new network in a manner that is transparent both to the user/subscriber and the new network. Once the gateway device has appropriately adapted to the user's computer, the computer can appropriately communicate via the new network, such as the network at a hotel, at home, at an airport, or any other location, in order to access other networks, such as the enterprise network, or other online services, such as the internet.

The portable computer user/subscriber, and more specifically the remote or laptop user, benefits from being able to access a myriad of computer networks without having to undergo the time-consuming and all-too-often daunting task of reconfiguring their host in accordance with network specific configurations. From another perspective, the network service provider benefits from avoiding "on-site" visits and/or technical support calls from the user who is unable to properly reconfigure the portable computer. In this fashion, the gateway device is capable of providing more efficient network access and network maintenance to the user/subscriber and the network operator. A gateway device is also instrumental in providing the user/subscriber broadband network access that can be tailored to the user's needs.

Along with the daunting task of reconfiguring their computer, computer users desiring fast and remote internet access often must deal with internet service providers (ISPs) which provide Internet access to both individuals and network systems. In conventional dial-up network systems, in order for a user to connect to on-line services, and more specifically, the Internet, the user must install client side software onto the user's computer. Client side software is typically provided by ISP with whom the user has subscribed for internet access, and enables the client to configure his or her computer to communicate with that ISP. After installation of the ISP's client side software the user must establish an account with the ISP for internet access. Typically, a user subscribes to an ISP, such as America Online™, Mindspring™ Earthlink™, Compuserve™ or the like, by contracting directly with the ISP for Internet access. Usually, the user pays for such Internet access on a monthly fixed fee basis. Regardless of the user's location, the user may dial up an access number provided by the ISP and obtain Internet access. The connection is often achieved via a modem communicating over a telephone line.

Likewise, in order for a computer network to communicate with the internet, the computer network must be connected to an ISP or like entity providing Internet access. One common example of such a connection is where an employer enterprise network is connected to a ISP via a high bandwidth connection. In such a case, the employer has contracted for internet service with an ISP or the like. In this regard, the user's employer has likely absorbed the costs of the internet connection, such that the connection costs are not billed directly to the user employee. The user's computer, typically a desktop computer, is configured to enable Internet access through the enterprise network. However, as noted above, while desktop computers generally remain a part of the same network for a substantial period of time, laptops, handhelds, personal digital assistants (PDAs), cellphones or other portable computers (collectively "portable computers") are specifically designed to be transportable. As such, portable computers are connected to different networks at different times depending upon the location of the computer.

In order for a gateway device located on a computer network to serve as an interface and connect users to the Internet, the computer network must be connected to an ISP or like entity providing the computer network with Internet access. However, unlike the enterprise network example, above, when a user connects to the Internet via a gateway device, the user will likely pay for the service as a user would pay for conventional home dial-up internet access. For example, where a user is staying as a guest at a hotel which maintains a network and a subscriber gateway, the hotel will not likely absorb the costs of the internet access. In fact, the hotel may wish to premium bill the guest for Internet access to obtain a profit from the hotel's network service. With the convenience provided by the gateway device, users will likely yield to such payments for the convenience of fast, immediate and easy internet access.

Therefore, what is needed is a method in which remote users can obtain internet access through local networks while obviating the need for inconvenient, time consuming and restrictive subscription contracts with ISPs. Users do not want to reconfigure their computers to accommodate various networks which they may only utilize once, and also do not want to spend the time to install client-side software on their computers so that they can obtain Internet access. At the same time, network providers, such as those at hotels, want to be able to provide users internet access, while passing the costs for such service directly to the users. Therefore, what is needed is a system and method utilizing the gateway device in which a user can transparently connect to an ISP thereby obtaining Internet access without requiring client side software and a subscription agreement with an ISP.

Summary

The present invention enables computer users to connect to a network through a gateway device that automatically adapts the users' computers such that the users can communicate via the gateway device with other networks, on-line service and the internet, without necessitating that the user subscribe to an internet service provider (ISP), install internet service provider software, or otherwise be aware that any Internet connection is enabled and/or managed by an ISP. Therefore, the user's relationship with the ISP, on-line services, and other networks is transparent. That is, the system of the present invention automatically communicates with networks and service providers to enable users complete plug and play remote access to networks and the internet without reconfiguring or adding software to the users' computers.

According to one aspect of the invention, there is provided a system for enabling a transparent communication between a computer and a service provider network. The system includes a computer and a network gateway device in communication with the computer, wherein the network gateway device connects the computer to a computer network. The network gateway device also receives user data representative of a user attempting to access the computer network. The system further includes a service provider network in communication with said network gateway device. The service provider network, such as a ISP network, includes an authentication server in communication with the network gateway device and having a database comprising user profiles representing users authorized to access said computer network. The authentication server compares the user data representative of a user attempting to access the computer network to the user profiles representing users authorized to access the computer network to determine if the user attempting to access the computer network can access the computer network. The system can further comprise an accounting system for maintaining historical data concerning use of said service provider network.

According to another embodiment of the invention, a method for enabling transparent communication between a computer and a service provider network is provided, comprising allowing a computer operator to access a computer network via a network gateway device and collecting data corresponding to a customer's identity in the network gateway device. The method also includes reconfiguring the data to one of the predetermined data formats which may be received by an authentication server located within a service provider network. Furthermore, the method includes transmitting the reconfigured data to the authentication server, wherein the authentication server compares the reconfigured data to user profiles stored within the authentication server to determine if the computer operator can access the service provider network.

Description

First, a computer system and gateway device according to one embodiment of the present invention will be described, for connecting a user to a number of networks or other online services. The gateway device automatically adapts to a computer, in order that it may communicate with networks in a manner that is transparent both to the user/subscriber and the networks. The gateway device can serve as a gateway to the Internet, enterprise network, other networks and/or on-line services. Secondly, an authentication, authorization and accounting system utilizing the gateway device in communication with an authentication server and accounting system will be described. It will be appreciated that the present invention allows users transparent access to computer networks, the Internet or other on-line services without requiring the users to subscribe to an ISP. Furthermore, the present invention allows users to pay for select services and suspends billing when a user is no longer actively using the computer system.

Computer System and Gateway Device of the Present Invention

Figure 36:
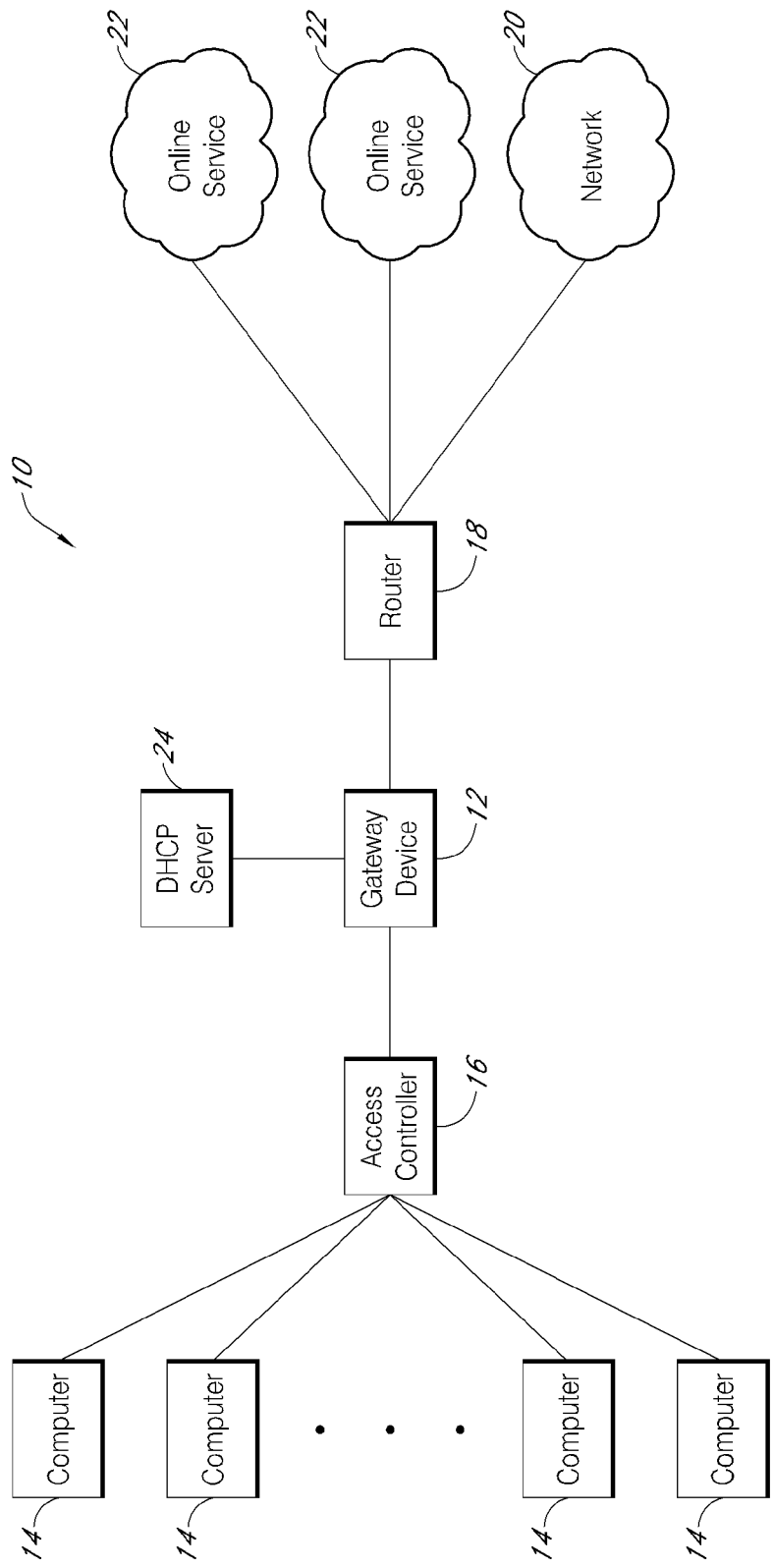
FIG. 36 is a block diagram of a computer system that includes a gateway device for automatically configuring one or more computers to communicate via the gateway device with other networks or other online services, according to one embodiment of the present invention.

Referring now to FIG. 36, the computer system 10 that includes a gateway device 12 is depicted in block diagram form. The computer system 10 typically includes a plurality of computers 14 that access a computer network in order to gain access to networks 20 or other online services 22. For example, the computers 14 can be plugged into ports that are located in different rooms of a hotel or a multi-dwelling unit. Alternatively, the computers 14 can be plugged into ports in an airport, an arena, or the like. The gateway device 12 provides an interface between the plurality of computers 14 and the various networks 20 or other online services 22.

Most commonly, the gateway device 12 is located near the computers 14 at a relatively low position in the overall network (i.e., the gateway will be located within the hotel, multi-unit residence, airport, etc.). However, the gateway device 12 can be located at a higher position in the system by being located closer to the various networks 20 or other online services 22, if so desired. Although the gateway device 12 can be physically embodied in many different fashions, the gateway device 12 typically includes a controller and a memory device in which software is stored that defines the operational characteristics of the gateway device 12. Alternatively, the gateway device 12 can be embedded within another network device, such as an access controller 16 or a router 18. Moreover, the software that defines the functioning of the gateway device 12 can be stored on a PCMCIA card that can be inserted into a computer of the plurality of computers 14 in order to automatically reconfigure the computer to communicate with a different computer system, such as the networks 20 and online services 22.

The computer system 10 typically includes an access controller 16 positioned between the computers 14 and the gateway device 12 for multiplexing the signals received from the plurality of computers onto a link to the gateway device 12. Depending upon the medium by which the computers 14 are connected to the access controller, the access controller 16 can be configured in different manners. For example, the access controller can be a digital subscriber line access module (DSLAM) for signals transmitted via regular telephone lines, a cable head end for signals transmitted via coaxial cables, a wireless access point (WAP) for signals transmitted via a wireless network, a CMPS, a switch or the like. As also shown in FIG. 36, the computer system 10 typically includes one or more routers 18 and/or servers (not shown in FIG. 36) of a plurality of computer networks 20 or other online services 22. While the computer system 10 is depicted to have a single router, the computer system 10 can have a plurality of routers, switches, bridges, or the like that are arranged in some hierarchical fashion in order to appropriately route traffic to and from the various networks 20 or other online services 22. In this regard, the gateway device 12 typically establishes a link with one or more routers. The routers, in turn, establish links with the servers of other networks or other online service providers, such as internet service providers, based upon the subscriber's selection. It will be appreciated by one of ordinary skill in the art that one or more devices illustrated in FIG. 36 may be combinable. For example, although not shown, the router 18 may be located entirely within the gateway device 12.

The gateway device 12 is specifically designed to configure computers 14 that log onto the computer network in a manner that is transparent to the subscriber. In the typical computer network that employs dynamic host configuration protocol (DHCP) service, the DHCP server 24 will initially assign an IP address to a computer that is logging onto the computer network. Upon opening their web browser or otherwise attempting to access an on-line service, the gateway device 12 will direct the subscriber to enter their ID and password. The gateway device 12 then determines if the subscriber is entitled to access the computer system, the level of access and/or the type of services to which the subscriber is entitled according to an authentication, authorization and accounting procedure that is described by U.S. patent application Ser. No. 08/816,174 and U.S. Provisional Application No. 60/111,497. Assuming that the subscriber has been authenticated and has authorization, the gateway device 12 typically presents new subscribers with a home page or control panel that identifies, among other things, the online services or other computer networks that are accessible via the gateway device 12. In addition, the home page presented by the gateway device 12 can provide information regarding the current parameters or settings that will govern the access provided to the particular subscriber. As such, the operator can readily alter the parameters or other settings in order to tailor the service according to their particular application. Typically, changes in the parameters or other settings that will potentially utilize additional resources of the computer system will come at a cost, such that the gateway device 12 will charge the subscriber a higher rate for their service. For example, a subscriber may elect to increase the transfer rate at which signals are transmitted across the computer network and pay a correspondingly higher price for the expedited service.

The home page also permits the subscriber to select the computer network 20 or other online service 22 that the subscriber wishes to access. For example, the subscriber can access the enterprise network on which the computer is typically resident. Alternatively, the subscriber can access the internet or other on-line services. Once the subscriber elects to access a computer network or other online service, the gateway device 12 establishes the appropriate links via one or more routers 18 to the desired computer network or online service.

Thereafter, the subscriber can communicate freely with the desired computer network 20 or other online service 22. In order to support this communication, the gateway device 14 generally performs a packet translation function that is transparent to the subscriber. In this regard, for outbound traffic from the computer 12 to the computer network or other on-line service, the gateway device 12 changes the content of the packet, such as the source address, checksum, and application specific parameters, such that all outgoing packets will be directed back to the gateway device 12 rather than to the computer. In contrast, the inbound traffic from the computer network or other online service that arrives at the gateway device 12, which is really intended for the computer, is passed through the translation function so the packets eventually delivered to the computer appear to have been sent directly to the computer. As such, the computer will be completely unaware of the translation being performed by the gateway device. Additional information regarding the translation function is provided by U.S. patent application Ser. No. 08/816,714. By utilizing the gateway device 12 to communicate with the computer network or other online service, however, the subscriber will never have had to configure their computer 12 since the gateway device automatically configures the computer in a manner that is transparent to the subscriber.

Figure 37:
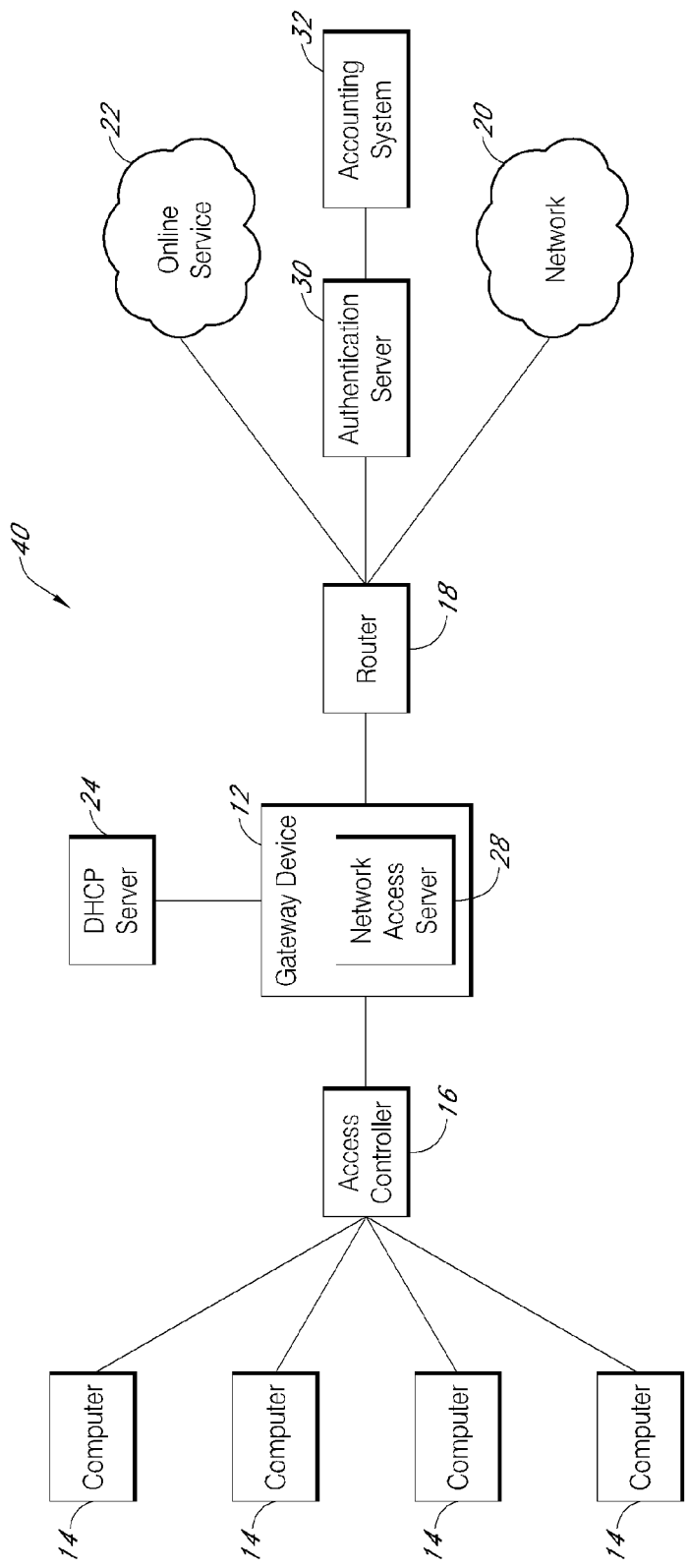
FIG. 37 is a block diagram of a gateway device in communication with an authentication server and accounting system for authenticating, authorizing and accounting user/subscriber usage of a computer network, according to one embodiment of the present invention.

Authentication, Authorization and Accounting Enabled by the Gateway Device in Communication with an Authentication Server and Accounting System FIG. 37 is a block diagram of a computer system 40 according to the present invention, including a gateway device 12 in communication with an authentication server and accounting system for authenticating, authorizing and accounting user's use of a network. The computer system 40 is essentially identical to the computer system 10 shown in FIG. 36, except that the gateway device 12 includes a network access server 28, and is in communication, through the router 18, with an authentication server 30 and an accounting system 32. Because the system 40 comprises similar components to the system illustrated in FIG. 36, it will be appreciated that the systems can be implemented in like manners with like components. Furthermore, additional embodiments of the present invention discussed with respect to FIG. 36 may be implemented in the system 40 shown in FIG. 37.

As stated above with respect to FIG. 36, a user establishes network access through the gateway device 12 that is in communication with the user's host (such as a computer 14) and the desired network, on-line service or computer system. Communication between the user's host and the gateway device 12 can be accomplished though a conventional telephone/modem connection, a digital subscriber line (DSL), cable hook-up, wireless communication or any other suitable communication technique. Establishing access to the gateway device 12 will typically involve a process in which a user must enter their identity and a password, and in some instances a desired billing scheme and service level as offered by the gateway administrator or network operator (information hereinafter collectively referred to as user data). Additionally, the user data can include information such as a user's social security number and a credit card number. Thereafter, upon connection with the gateway device 12 via any of the communication techniques noted above, the network access server (NAS) 28, located within the gateway device 12, receives the user data. Upon receiving user data representing the identity of a user attempting to access the network, a primary function of the NAS 28 is to grant or deny the user access to the network.

Although the NAS 28 grants and denies access to users, the NAS 28 does not determine whether each user is allowed to connect to the network and, if so, what type of connection should be established. Rather, these determinations are made by the authentication server 30. Upon receiving user data the NAS 28 reconfigures the data such that the data will be in the proper format to be received by the authentication server 30, which is discussed in detail below. In addition to reconfiguring the user data, the NAS 28 can also encrypt the user data such that the user identity and password will be protected during transmission to the authentication server 30. After reconfiguration, and optionally, encryption, the NAS 28 transmits the data to the authentication server 30 with a query to request that the authentication server 30 authenticate the user.

The authentication server 30 stores user profiles corresponding to users authorized to access the network. The user profiles typically include user identifications, passwords, access authorization, billing, and other pertinent user information. The authentication server 30 compares stored user profiles with the user data received from the gateway device 12 to determine if the user should be granted access to the network. As such, the authentication server 30 generally comprises a database and data storage means. According to one embodiment of the invention, the authentication server 30 is maintained by an ISP. In this embodiment, the user profiles stored by the authentication server 30 establish those users that can obtain Internet access via the ISP network. The ISP edits user profiles within the authentication server 30 to reflect those users who may become authorized or unauthorized to access the network.

For example, the ISP may only register user profiles in the authentication database after users have been identified by the ISP and necessary billing information, such as addresses, credit card numbers, have been submitted. If the ISP has not posted a user profile in the authentication server 30 at the time of authentication, the user will not be permitted access to the network. If this occurs, the user may be asked to submit profile information to the ISP so that the ISP can add the user's profile to the authentication server 30. Furthermore, this may also be done the first time a user attempts to access the gateway device 12. The information may be entered by the user with the aid of a pop-up control panel or user interface, which can open when the user initially connects to the gateway device 12. As will be discussed below, the gateway device can request user information and forward it to the ISP such that the user does not know an ISP is receiving the information.

The authentication server 30 is preferably outside of the network, although it may be located within the network. For example, the location of the authentication server 30 may be such that the NAS 28 communicates with the authentication server 30 via internet protocol. Therefore, it will be appreciated that the authentication server 30 may be located at any internet address and stored on any computer accessible via internet protocol. Locating the authentication server 30 outside of the network provides a number of advantages. First, the administrative burden on the network is alleviated because the network does not have to set up and maintain separate authentication databases on each network or gateway device. This is especially important because each gateway device 12 allows a finite number of users to access the network, so that multiple gateway devices may be required. Secondly, administering and maintaining one consolidated database of authentication data is easier than multiple smaller databases.

Referring again to the authentication method of the system illustrated in FIG. 37, after reconfiguration, the NAS 28 transmits user data to the authentication server 30 with a query to request that the authentication server 30 authenticate the user. The authentication server 30 receives the user data and then compares the received user data to user profiles stored within its database. The database may comprise programmable storage means located on a conventional personal computer, mainframe computer, or another suitable storage device known in the art. Additionally, the means for comparing the received data to the data within the database can comprise any software, such as an executable software program, which can compare data. For example, the authentication server may store user profiles on a hard drive of a personal computer, and the means for comparing the received user data to the user profiles resident on the computer can include computer software, such as Microsoft Excel (Microsoft Excel is a trademark of Microsoft Corporation, Redmond, Wash.). According to another embodiment of the invention, the authentication server 30 can comprise a remote authentication dial-in user service (RADIUS), which is a well known authentication and accounting system used by a number of network service providers (NSPs).

If the authentication server 30 determines that the user data matches a user profile located within its database, and that the user is authorized to access the network, the authentication server informs the NAS 28 that the user should be allowed to access the network. Once the user has established the network service connection and a tunnel has been opened to facilitate an open communication line between the user's host and the network, the gateway device 12 can communicate with the authentication server 30 to assemble user-specific data. The user-specific data that the gateway device 12 assembles may comprise billing scheme related data, service level data, user profile data, remote-site related data or any other data that is related to the user or the location from which the user is located during the networking session. As such, the authentication server 30 can transmit to the gateway device 12 any requisite information relating to the user's access rights and use of the network. For example, according to one aspect of the invention, data included within the authentication server 30 may comprise the baud rate (or bandwidth) at which the user is to receive data from the ISP. At the same time or shortly after the authentication server 30 indicates the user may access the network, the authentication server 30 can notify the gateway device 12 of the baud rate at which the user is to receive data. Such information may be important where a user can select, for example, to pay higher connection fees to receive higher bandwidth. As yet another illustrative example, the authentication server 30 could indicate that the user is only allowed access for 1 hour, after which the user should be disconnected from the network by the gateway device 12.

Upon authorizing a user for access to the network, the authorization server 30 can also register an accounting start. Similarly, when the user logs off the system, the gateway device 12 sends an accounting stop to the authentication server 30. Using this data, the time between the accounting start and accounting stop may be tallied such that the user's total connection time may be computed. Such information is valuable where the user is being charged by an increment of time, such as an hour. A billing package could then tally up a user's total on-line time for a period, such as each month, and could charge the user correspondingly. However, networks and ISPs often may charge a set rate for a specific duration of time (i.e., flat rate pricing), such as a month, regardless how much time is being spent accessing the network. As such, accounting stops and starts may not be required for billing purposes. However, accounting starts and stops may generally be recorded by the network provider or ISP for usage statistics.

Additionally, the ISP would benefit from being able to track subscriber's use of the ISP to establish bills, historical reports, and other relevant information. The accounting system 32, in communication with the authentication server 30, provides these functions. The accounting system 32 downloads historical data from the authentication server 30 in a real time basis or after a specific interval of time has elapsed. Preferably, the accounting system 32 can retain such data in an easily accessible and manipulatable format such that the ISP can produce reports representative of any desired type of historical data. For example, to project future use of the ISP, the accounting system 32 should produce reports indicating how many users accessed the internet at a certain time periods and from a certain locale. Moreover, where the ISP provides alternative access to users, such as charging for faster connections (i.e., higher baud rate) for additional fees, the ISP may wish to analyze historical data using the accounting system 32 to best meet future customer demands. Such data may relate to network sessions currently on-going, the duration of those sessions, the bandwidth currently being used, the number of bytes that have been transferred and any other pertinent information. The accounting system 32 may be implemented using well known programs, such as Eclipse Internet Billing System, Kenan Broadband Internet Billing Software (manufactured by Lucent Technologies), or TRU RADIUS Accountant.

The gateway administrator or the network operator may choose to offer any or all of these billing and/or service options. A pop-up control panel can be sent to the user/subscriber's computer to reflect the data that is pertinent to the chosen and available billing methods and/or service levels. The control panel can include start and stop buttons which allow a user the benefit of stopping the charges to an account (i.e. temporarily disabling the network) without closing the user's web browser. A user/subscriber can activate the stop button and be re-directed back to the home page or portal page. From the user/subscriber standpoint the ability to momentarily disable the network and stop incurring charges is a cost-effective form of networking. From the gateway administrator or network operator standpoint the momentary network stoppage means the user will be directed back to the portal or home page. By re-directing the user back to the portal or home page the gateway administrator or network operator is provided the opportunity to present the user/subscriber with updated information pertaining to the remote location (i.e. the hotel, the airport etc.). When the user desires to re-establish network connection the user may activate the start button on the pop-up control panel and charges will again incur. The start/stop buttons may be implemented at the discretion of the gateway administrator or network operator and most of the billing plans and service plans will provide for the option of presenting the start/stop button feature within the pop-up control panel. However, where a subscriber has paid for access of a specific time duration, the start/stop buttons will not typically be employed.

Enabling Network Gateway Devices to Communicate with Management Systems to Facilitate Subscriber Management A system and method for enabling a management system to communicate with a network gateway device to automatically bill a computer operator for access to a computer network, such as a local network. The system includes a computer, and a network gateway device in communication with the computer for connecting the computer to a computer network, wherein the network gateway device maintains data representative of the computer operator's access to the computer network and wherein the network gateway device reconfigures the data. The system also includes a management system connected to said network gateway device for automatically billing the computer operator based upon usage of the computer network, wherein the management system is configured to communicate according to at least one predetermined protocol. The network gateway device reconfigures the data to meet one of the predetermined protocols supported by the management system, and the management system receives the data reconfigured by the network gateway device and utilizes the data reconfigured by the network gateway device for automatic billing purposes. The method for enabling a management system to communicate with a network gateway device to automatically bill a customer for network access includes allowing a computer operator to access a computer network via a network gateway device, collecting data corresponding to a customer's local network access in the network gateway device, storing the data in the network gateway device, reconfiguring the data to a predetermined data format received from a management system, and transmitting the reconfigured data to the management system.

In order for a computer to function properly, the computer must be appropriately configured. Among other things, this configuration process establishes the protocol and other parameters by which the computer transmits and receives data. In one common example, a plurality of computers is networked to create a local area network (LAN). In the LAN, each computer must be appropriately configured in order to exchange data over the network. Since most networks are customized to meet a unique set of requirements, computers that are part of different networks are generally configured in different manners in order to appropriately communicate with their respective networks.

While desktop computers generally remain a part of the same network for a substantial period of time, laptops or other portable computers are specifically designed to be transportable. As such, portable computers are connected to different networks at different times depending upon the location of the computer. In a common example in which the portable computer serves as an employee's desktop computer, the portable computer is configured to communicate with their employer's network, i.e., the enterprise network. When the employee travels, however, the portable computer may be connected to different networks that communicate in different manners. In this regard, the employee may connect the portable computer to the network maintained by an airport or by a hotel in order to access the enterprise network, the internet or some other on-line service. Since these other networks are configured somewhat differently, however, the portable computer must also be reconfigured in order to properly communicate with these other networks. Typically, this configuration is performed by the user each time that the portable computer is connected to a different network. As will be apparent, this repeated reconfiguration of the portable computer is not only quite time consuming, but is also prone to errors.

As described by U.S. patent application Ser. No. 08/816,174 and U.S. Prov. Pat. App. No. 60/111,497, a universal subscriber gateway has been developed by Nomadix, Inc. of Santa Monica, Calif. The contents of both of these applications are incorporated herein by reference. The gateway device serves as a gateway to a number of networks or other online services. For example, the gateway device can serve as a gateway to the internet, the enterprise network, or other on-line services. In addition to serving as a gateway, the gateway device automatically configures a computer to communicate with the new network in a manner that is transparent to the user. In this regard, the gateway device will download the necessary protocols and other parameters to the computer without any intervention by the operator and without loading any additional software on the computer.

Because high speed access to enterprise networks, the internet and on-line services is a desirable commodity, like long distance telephone service, costs associated with the service are typically passed on to the remote user/subscriber. Therefore, in many instances the remote user/subscriber is concerned with being able to acquire network access and service in the most cost efficient and convenient manner. In this regard, subscriber remote service concerns parallel those concerns of customers utilizing internet service providers for conventional telephone line dial-up internet access. In both cases, computer operators typically want inexpensive, flexible and customer friendly service options. Correspondingly, the gateway device administrator desires the capability to be able to offer the user/subscriber numerous and different service and billing rate options, like those available in conventional dial-up internet access. For example, the remote user in a hotel environment may desire a subscription for only a day, or for the duration of their stay at the hotel. The user/subscriber may be charged on an hourly rate, a daily rate, a weekly rate, or at any other interval. Such flexible plans offer cost savings to consumers and are an attractive incentive to lure customers into buying access time to the enterprise network, online services or the internet.

Unlike conventional dial-up internet access, however, gateway devices permit remote users to access various computer networks and on-line services without having a prior service contract or an ongoing relationship with the service provider. Therefore, unlike conventional dial up access plans, which can bill subscribers on a set monthly schedule, gateway devices make recouping remote access charges more challenging. This is especially true for nomadic users, who may utilize a remote connection to a network only once before relocating. Once the traveler has moved onward, the network provider may have difficulty in collecting any unpaid service charges. Furthermore, billing of nomadic users is another hurdle to fast and easy access to the enterprise network, on-line services and the internet. The benefits of remote plug and play access therefore may be overshadowed by time consuming payment methods. For example, where a computer operator is required to complete an onerous billing procedure to pre-purchase local network time or to pay for the network use after each session, the computer operator may decide not to use the network.

Thus, any convenience provided by the computer network is superseded by the inconvenient billing method. Gateway device administrators also desire convenient methods in which to bill users/subscribers. Because the gateway device enables subscribers immediate plug and play connections to computer networks, such as hotel or airport networks, the computer network provider and/or service provider of the high speed network would like to quickly and immediately bill the users/subscribers. This billing should be able to easily track a user/subscriber's usage of the network so as to recoup costs for the network hardware and network connection. Furthermore, such billing should be automated such that system administrators do not need to individually bill each remote user.

Therefore, it is desirable for customers, network providers and service providers to implement automatic billing through the computer network so that users may be billed automatically. Such automatic billing of remote and nomadic users would benefit customers by facilitating fast and easy access, and also would benefit network providers who could appropriately charge customers for obtaining remote access.

Summary

The present invention relates generally to a network gateway device and, more particularly, to network gateway devices communicating with management systems, such as hotel property management systems, to facilitate subscriber management. The connection of the users to the system can be transparent for billing purposes, although the computer network may also provide services to the users through the management system.

According to one embodiment of the invention, there is provided a system for enabling a management system to communicate with a network gateway device on order to automatically bill a computer operator for access to a computer network such as a local network. The system includes a computer, and a network gateway device in communication with the computer for connecting the computer to a computer network and for maintaining data representative of the computer operator's access to the computer network. The system also includes a management system connected to the network gateway device that is designed to automatically bill the computer operator based upon their access to the computer network. The management system is also designed to communicate with a third party device according to at least one predetermined protocol. According to the present invention, the gateway device is therefore designed to supply billing data using one of the predetermined protocols supported by the management system. As such, the management system receives the billing data supplied by the network gateway device and utilizes the data for automatic billing purposes.

Furthermore, in the system for enabling a management system to communicate with a network gateway device to automatically bill a computer operator for access to a computer network, the management system can be located within the computer network. Additionally, the system can include a translator in communication with the gateway device and management system for receiving the data supplied by the network gateway device. The translator can further reconfigured the supplied billing data received from the network gateway device, and can transmit the further reconfigured data to the management system. The data representative of the computer operator's access to the computer network can include data representative of the computer operator's location, access time, date which access was obtained, billing rate, and other pertinent information.

According to another embodiment of the invention, a method for enabling a management system to communicate with a network gateway device in order to automatically bill a customer for access to a computer network, such as a local network, is provided. The method comprises allowing a network administrator to access a computer network via a network gateway device, and collecting data corresponding to a customer's local network access in the network gateway device. Furthermore, the method of the present invention comprises storing the data in the network gateway device, reconfiguring the data to one of the predetermined data formats which may be received by a management system, and transmitting the reconfigured data to the management system.

The ability to bill customers for service automatically and track customers without system intervention allows the local network service provisioning to be done economically and efficiently. This invention provides an incentive for hotels, airports, and other computer networks to provide network connections to users because the computer network has a captive customer base. Furthermore, automatic billing can enable usage-based billing for network access and services, which is desirable to customers. Finally, automatic billing can reduce the risk of network use by an unauthorized user.

Description

Referring now to FIG. 36, the computer system 10 that includes a gateway device 12 is depicted in block diagram form. The computer system 10 typically includes a plurality of computers 14 that access a computer network in order to gain access to networks 20 or other online services 22. For example, the computers 14 can be plugged into ports that are located in different rooms of a hotel or a multi-dwelling unit. Alternatively, the computers 14 can be plugged into ports in an airport, an arena, or the like. The gateway device 12 provides an interface between the plurality of computers 14 and the various networks 20 or other online services 22.

Most commonly, the gateway device 12 is located near the computers 14 at a relatively low position in the overall network (i.e., the gateway will be located within the hotel, multi-unit residence, airport, etc.). However, the gateway device 12 can be located at a higher position in the system by being located closer to the various networks 20 or other online services 22, if so desired. Although the gateway device 12 can be physically embodied in many different fashions, the gateway device 12 typically includes a controller and a memory device in which software is stored that defines the operational characteristics of the gateway device 12. Alternatively, the gateway device 12 can be embedded within another network device, such as an access controller 16 or a router 18. Moreover, the software that defines the functioning of the gateway device 12 can be stored on a PCMCIA card that can be inserted into a computer of the plurality of computers 14 in order to automatically reconfigure the computer to communicate with a different computer system, such as the networks 20 and online services 22.

The computer system 10 typically includes an access controller 16 positioned between the computers 14 and the gateway device 12 for multiplexing the signals received from the plurality of computers onto a link to the gateway device 12. Depending upon the medium by which the computers 14 are connected to the access controller, the access controller 16 can be configured in different manners. For example, the access controller can be a digital subscriber line access module (DSLAM) for signals transmitted via regular telephone lines, a cable head end for signals transmitted via coaxial cables, a wireless access point (WAP) for signals transmitted via a wireless network, a CMPS, a switch or the like. As also shown in FIG. 36, the computer system 10 typically includes one or more routers 18 and/or servers (not shown in FIG. 36) of a plurality of computer networks 20 or other online services 22. While the computer system 10 is depicted to have a single router, the computer system 10 can have a plurality of routers, switches, bridges, or the like that are arranged in some hierarchical fashion in order to appropriately route traffic to and from the various networks 20 or other online services 22. In this regard, the gateway device 12 typically establishes a link with one or more routers. The routers, in turn, establish links with the servers of other networks or other online service providers, such as internet service providers, based upon the subscriber's selection. It will be appreciated by one of ordinary skill in the art that one or more devices illustrated in FIG. 36 may be combinable. For example, although not shown, the router 18 may be located entirely within the gateway device 12.

The gateway device 12 is specifically designed to allow computers to log onto the computer network in a manner that is transparent to the subscriber. In the typical computer network that employs dynamic host configuration protocol (DHCP) service, the DHCP server 24 will initially assign an IP address to a computer that is logging onto the computer network. Upon opening their web browser or otherwise attempting to access an on-line service, the gateway device 12 will direct the subscriber to enter their ID and password. The gateway device 12 then determines if the subscriber is entitled to access the computer system, the level of access and/or the type of services to which the subscriber is entitled according to an authentication, authorization and accounting procedure that is described by U.S. patent application Ser. No. 08/816,174 and U.S. Provisional Application No. 60/111,497. Assuming that the subscriber has been authenticated and has authorization, the gateway device 12 typically presents new subscribers with a home page or control panel that identifies, among other things, the online services or other computer networks that are accessible via the gateway device 12. In addition, the home page presented by the gateway device 12 can provide information regarding the current parameters or settings that will govern the access provided to the particular subscriber. As such, the operator can readily alter the parameters or other settings in order to tailor the service according to their particular application. Typically, changes in the parameters or other settings that will potentially utilize additional resources of the computer system will come at a cost, such that the gateway device 12 will charge the subscriber a higher rate for their service. For example, a subscriber may elect to increase the transfer rate at which signals are transmitted across the computer network and pay a correspondingly higher price for the expedited service.

The home page also permits the subscriber to select the computer network 20 or other online service 22 that the subscriber wishes to access. For example, the subscriber can access the enterprise network on which the computer is typically resident. Alternatively, the subscriber can access the internet or other on-line services. Once the subscriber elects to access a computer network or other online service, the gateway device 12 establishes the appropriate links via one or more routers 18 to the desired computer network or online service.

Thereafter, the subscriber can communicate freely with the desired computer network 20 or other online service 22. In order to support this communication, the gateway device 14 generally performs a packet translation function that is transparent to the subscriber. In this regard, for outbound traffic from the computer 12 to the computer network or other on-line service, the gateway device 12 changes the content of the packet, such as the source address, checksum, and application specific parameters, such that all outgoing packets will be directed back to the gateway device 12 rather than to the computer. In contrast, the inbound traffic from the computer network or other online service that arrives at the gateway device 12, which is really intended for the computer, is passed through the translation function so the packets eventually delivered to the computer appear to have been sent directly to the computer. As such, the computer will be completely unaware of the translation being performed by the gateway device. Additional information regarding the translation function is provided by U.S. patent application Ser. No. 08/816,714. By utilizing the gateway device 12 to communicate with the computer network or other online service, however, the subscriber will never have had to configure their computer 12 since the gateway device automatically adopts the computer in a manner that is transparent to the subscriber.

Figure 38:
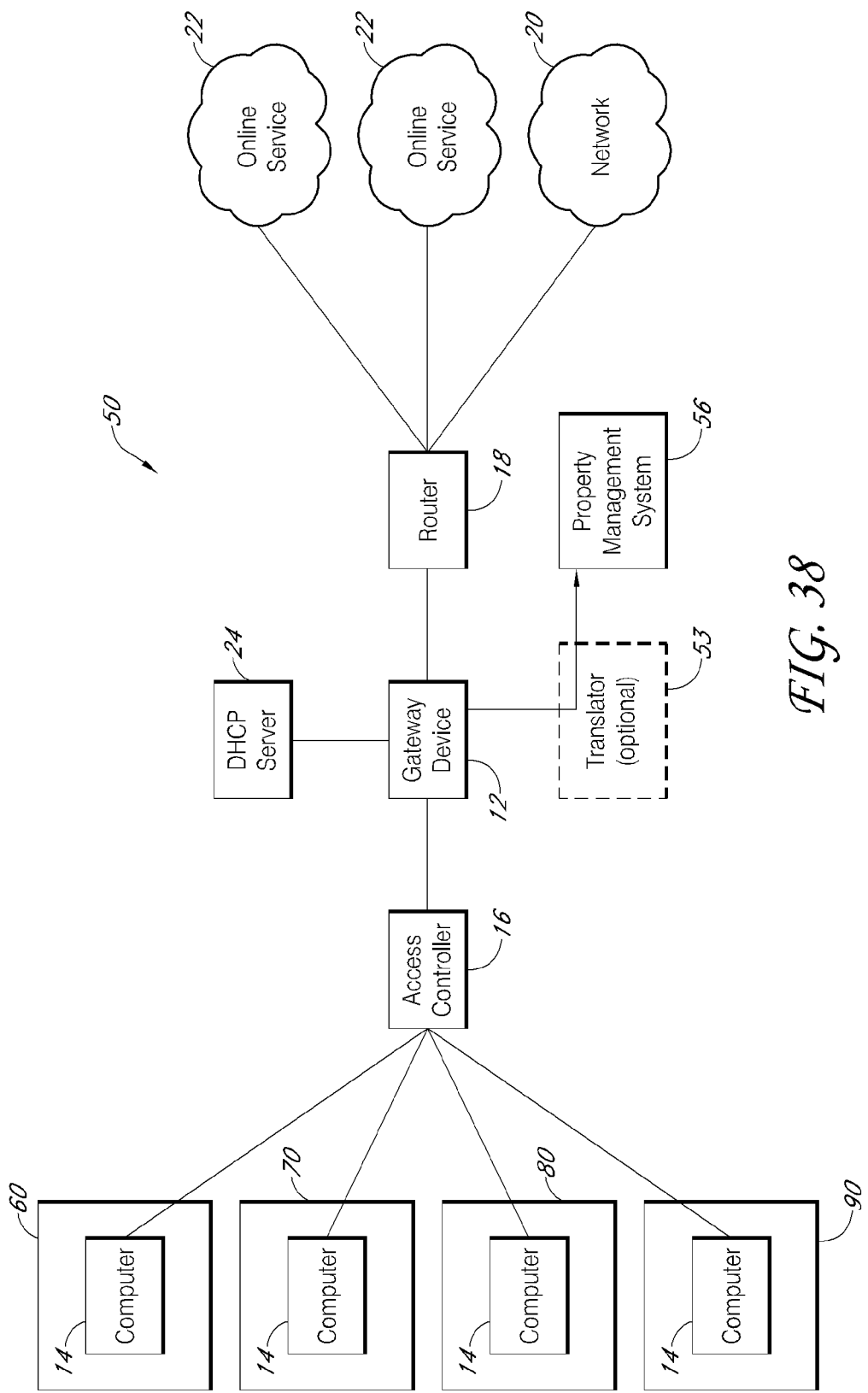
FIG. 38 shows a block diagram of the computer system of FIG. 16, implemented in a hotel computer system, according to one embodiment of the invention.

FIG. 38 shows a block diagram of the computer system 10 of FIG. 36, implemented in a hotel computer system 50, according to one embodiment of the present invention. It will be appreciated by those of skill in the art that the embodiment shown in FIG. 38 is for illustrative purposes, and that the computer system 10 may be implemented with respect to computer networks established in airports, arenas, apartment complexes, office buildings or the like. The hotel computer system 50 is essentially identical to the computer system 10 shown in FIG. 38, except that the gateway device 12 is also connected to a property management system 56. The gateway device 12 may be connected to the property management system 56 through a translator 53, which is illustrated with phantom lines because the translator 53 is an optional component in the hotel computer system 50, as will be explained in detail below. Because the hotel computer system 50 comprises similar components to the system illustrated in FIG. 36, it will be appreciated that the systems can be implemented in like manners with like components. Furthermore, additional embodiments of the present invention discussed with respect to FIG. 36 may be implemented in the system 50 shown in FIG. 38.

As shown in FIG. 38, each of the plurality of computers 14 is located in a different hotel room 60, 70, 80 and 90 to allow multiple guests to access the hotel's computer network. The computers 14 are connected to the access controller 16 through a communications port in each room using a communications device such as a DSL modem, an ethernet card, a coaxial cable, or another well known communication device. Most preferably, the connection between the computers 14 and the access controller 16 is a high speed connection, so that the computers 14 can receive data as fast as the gateway device 12 can forward the data. The data transmitted from the gateway device 12 to the computers may originate from any devices located within the computer network or any devices in communication with the computer network, such as the internet. As with any multiple link communication system, the rate at which data is received by the computers 14 will be no higher than the slowest baud rate over any link in the system.

The gateway device 50 is in direct communication with the management system 56. Management systems may include any well known computer based systems implemented in hotels, airports, arenas or other venues to manage operations. In the embodiment of FIG. 38, the management system is a property management system located within a hotel. Typical hotel property management systems automate operations such as room reservations, room assignments, guest check-in and check-out, and other front desk activities. Furthermore, typical hotel property management systems can maintain a log of telephone calls and telephone charges for each guest room, and can be in communication with the internet to facilitate on-line reservations. Such management systems are typically implemented through the use of one or more conventional computers that are interconnected to form a network. The management system 56 shown in FIG. 38 is illustrative of one such system. As will be appreciated by those of skill in the art, the management system can be located within, and in direct communication with, the computer network.

In the embodiment of FIG. 38, the gateway device 50 is in communication with the property management system 56 such that each user/subscriber's access and connection to the hotel network via the gateway device 12 can be easily monitored by the property management system 56. Preferably, the gateway device 12 is connected to the property management system 56 through a serial port interface. The connection may operate at a variety of baud rates, although 2400 or 9600 bits per second are typical. The main purpose for the connection is to allow the hotel to bill each specific user/subscriber for their use and connection to the hotel's network, and to automatically bill such use directly to the room from which access was obtained. The property management system 56 can monitor and record information such as the identity of the user, the room from which the user obtained access, the amount of time that the user utilized the network, the cost of each network access, the time, date and duration of the network access, and other additional information. As a result, the present invention offers user/subscribers of a computer network convenient payment plans in which a user does not have to pre-pay for network access or physically pay each time the network is accessed.

As will be appreciated by those of skill in the art, the information passed from the gateway device 12 can be, in most respects, identical to information received by the property management system 56 from a private branch telephone system (PBX), which are commonly utilized in hotels. PBX systems allow room to room, local and long distance telephone calls to be made by guests, and are typically connected to hotel property management systems to facilitate billing of hotel guests based upon the room in which the call is made. Charges for such use can then be paid by the guest upon checkout, automatically billed to the guest's credit card or automatically billed to the guest with room charges.

As can be appreciated with reference to FIG. 38, the property management system 56 can be in communication with additional devices other than the computer gateway system 10 of the present invention. As noted above, the property management system 56 can be directly connected to a PBX, which is, in turn, connected to each telephone located in every hotel room. Additionally, although not illustrated, the property management system 56 can be connected to additional third party components, such as pay per view television, credit card authorization systems and point of sale systems. These connections may be through serial ports, modem communications, or through other well known communication means. Such connections allow the management system to function as a fully integrated system, which allows customers to use a variety of hotel resources, while transparently being billed for each transaction.

Through the property management systems, a user/subscriber's account may be billed directly to that user's hotel bill. For example, where the management system receives data representing a computer operator's access to the local system, the management system can automatically bill the operator through the use of a credit card authorization system in communication with the property management system. In this manner, the customer's payment can be fast, easy, automated and transparent to the user.

Traditional hotel property management systems are configured to communicate with various third party systems, such as point of sale systems, PBX systems, pay per view systems, and credit card authorization servers, as noted above. Hotel property management systems are generally configured to receive such communications because these third party systems are typically used in the vast majority of hotels. To receive data from each of these third party systems, management systems typically include software for communicating with the third party systems based upon the data protocol and data structure implemented by the management system. The software allows data from third party systems to be received and reconfigured, if necessary, so that the data is in a format appropriate to be utilized by the management system 56. However, because typical management systems that are currently deployed are not designed to receive data from a gateway device 12, the gateway device 12 is preferably designed to interface with the management system 56 without requiring additional programming of the management system software.

The gateway device 12 of the present invention formats data such that the data has the same data protocol and data structure as that of a third party service, such as a PBX, that the management system 56 is already designed to receive. The management system 56 is adapted to communicate using different protocols, through technology known as COM objects. Thus, the gateway device 12 can masquerade as a PBX or another third party system. The gateway device 12 receives a data record corresponding to an individual user/subscriber's use of the computer system, including the user/subscriber's location (room number), access time, and additional information, as discussed above. The gateway device 12 stores this information and modifies the data record to fit the proper format required by the property management system vendor. Although the format of the data is changed, no data is changed in the modification. The reconfigured data is then transmitted to the management system 56. This data can be in a call accounting record (CAR) and low level protocol (LLC) format, data formats typical of third party systems such as PBXs. Such formats are well known to those of skill in the art of property management system design.

Because management systems can differ, each system utilizing different user interfaces, variables, and operating systems, the gateway device should communicate data to the property management system 56 using data formats acceptable to a large number of management systems. In this manner, the gateway device 12 may be compatible with a majority of property management systems. For example, the gateway device 12 may be preconfigured to operate with the most popular management systems and formats, such as Micros Fidelio (manufactured by MICROS Systems, Inc., Beltsville, Md.), HOBIC, AutoClerk (manufactured by AutoClerk, Inc., Lafayette, Calif.), and other well known systems and formats.

However, there are many different management system standards, none of which are universal and implemented in all property management systems. As a result, although the gateway device 12 can configure data to conform to a large number of differing management systems, the gateway device 12 may not be able to conform to some systems. As a result, a translator 53 may be optionally used to manipulate the data output by the gateway device 12 in such a manner as to allow the data to be utilized by the property management system 56. In one embodiment, the translator may comprise a Lodging Link II device (LL) (manufactured by Protocol Technologies, Inc., Scottsdale, Ariz.) to convert incoming data from the gateway device 12 to data acceptable to the property management system device, such as UHALL protocol. Additionally, the translator may also be connected to one or more devices or systems in communication with the property management system, such as the pay per view system or credit card authorization system, to format data output by any system or component having data protocols which differ from those of the management system 56.

Because data may be transferred to the management system in a CAR format, data typically within such format must be altered to accurately reflect the computer network service being provided to the user/subscriber. For example, in PBX systems, CAR format usually includes the phone number to which a telephone call is being made. However, when a user/subscriber is obtaining access to the hotel network via the gateway device 12, no telephone number is dialed or called. Therefore, when possible, data within the CAR format (i.e., telephone record), such as telephone numbers, may be replaced with a descriptive record that indicates some other data that the property management systems wish to track or record. On the other hand, where the CAR records cannot be replaced, a bogus field, such as a bogus telephone number, may be included so that the property management system receives the entire record it is programmed to receive. Thereafter, the bogus number is not utilized by the management system 56. Additional problems may also exist, for example, where the management system 56 is not devised to support the non-numeric ASCII characters typically transmitted by the gateway device 12. In this situation, the gateway device can be configured to replace the ASCII characters with numeral designations.

Once the data transmitted by the gateway device is received by the property management system 56, the property management system can display the data using a management system interface. Preferably, the data may be displayed in an easily readable and printable form to allow a user/subscriber to view a summary of access information. Additionally, the data should be accessible to the user/subscriber's accounting record. In this manner, charges due to network access may be automatically placed on a customer's pre-existing bill, such as a hotel bill. Where access is obtained at another location, such as at an airport, the airport system manager (i.e., equivalent to the hotel property management system in the above example) may automatically bill the customer, can automatically charge the customer's credit card, or can add the charges to an account which the customer maintains. In this regard, while the property management system 56 has primarily been described in conjunction with a hotel computer network, the property management system can be utilized in a variety of other applications in which a user/subscriber obtains access to a computer network or other on-line service via a gateway device.

Location-Based Identification and Authorization for Use with a Gateway Device

A method and apparatus for implementing location-based identification and authorization in a computer network having a gateway device. In one embodiment of the present invention a method for implementing location-based identification and authorization in a computer network comprises establishing a network connection between a host and a network, sending out network packets from the host through a port, receiving the network packets at an access controller, tagging the network packets at the access controller with a port identifier that corresponds to a media access control (MAC) address, receiving the tagged network packet at a gateway device; and incorporating the port identifier into a database in communication with the gateway device. In one embodiment of the invention the access controller and the gateway device communicate port numbers by assigning VLAN (Virtual Local Area Network) identifiers to the ports. In another embodiment of the present invention a method for implementing location-based identification and authorization in a computer network includes establishing a network connection between a host and a network, sending out network packets from the host through a port, receiving the network packets at a gateway device, sending a port identifying query to an access controller in response to receiving the network packets, receiving the port identifying query at an access controller, sending a port identifying response query back to the gateway device, and incorporating a port identifier into a database in communication with the gateway device. In one embodiment of the invention the gateway device and the access controller have corresponding agents configured to send and respond to queries. For example the gateway device and access controller may incorporate an SNMP agent to communicate via queries. In another embodiment of the invention a gateway apparatus is defined that is capable of communicating with an access controller to determine the port identity corresponding to the received MAC address. The gateway device is then able to use the location-based identities to structure billing schemes and manage the overall network that the service provider has established.

In order for a computer to function properly in a network environment, the computer must be appropriately configured. Among other things, this configuration process establishes the protocol and other parameters by which the computer transmits and receives data. In one common example, a plurality of computers are networked to create a local area network (LAN). In the LAN, each computer must be appropriately configured in order to exchange data over the network. Since most networks are customized to meet a unique set of requirements, computers that are part of different networks are generally configured in different manners in order to appropriately communicate with their respective networks.

While desktop computers generally remain a part of the same network for a substantial period of time, laptops, handhelds, personal digital assistants (PDAs), cellphones or other portable computers (collectively "portable computers") are specifically designed to be transportable. As such, portable computers are connected to different networks at different times depending upon the location of the computer. In a common example in which the portable computer serves as an employee's desktop computer, the portable computer is configured to communicate with their employer's network, i.e., the enterprise network. When the employee travels, however, the portable computer may be connected to different networks that communicate in different manners. In this regard, the employee may connect the portable computer to the network maintained by an airport, a hotel, a cellular telephone network operator or any other locale in order to access the enterprise network, the Internet or some other on-line service. The portable computer is also commonly brought to the employee's residence where it is used to access various networks, such as, the enterprise network, a home network, the Internet and the like. Since these other networks are configured somewhat differently, however, the portable computer must also be reconfigured in order to properly communicate with these other networks. Typically, this configuration is performed by the user each time that the portable computer is connected to a different network. As will be apparent, this repeated reconfiguration of the portable computer is not only quite time consuming, but is also prone to errors. The reconfiguration procedure may even be beyond the capabilities of many users or in violation of their employer's IT policy.

As described by U.S. patent application Ser. No. 08/816,174 and U.S. Prov. Pat. App. No. 60/111,497, a universal subscriber gateway device has been developed by Nomadix, L.L.C. of Westlake Village, Calif. The contents of both of these applications are expressly incorporated herein by reference. The gateway device serves as an interface connecting the user/subscriber to a number of networks or other online services. For example, the gateway device can serve as a gateway to the Internet, the enterprise network, or other networks and/or on-line services. In addition to serving as a gateway, the gateway device automatically adapts to a computer, in order that it may communicate with the new network in a manner that is transparent both to the user/subscriber and the new network. Once the gateway device has appropriately adapted to the user's computer, the computer can appropriately communicate via the new network, such as the network at a hotel, at home, at an airport, or any other location, in order to access other networks, such as the enterprise network, or other online services, such as the internet.

The portable computer user/subscriber, and more specifically the remote or laptop user, benefits from being able to access a myriad of computer networks without having to undergo the time-consuming and all-too-often daunting task of reconfiguring their host in accordance with network specific configurations. From another perspective, the network service provider benefits from avoiding "on-site" visits and/or technical support calls from the user who is unable to properly reconfigure the portable computer. In this fashion, the gateway device is capable of providing more efficient network access and network maintenance to the user/subscriber and the network operator.

Gateway devices are typically used to provide network access to the remote portable computer user, such as users in hotels, airports and other locations where the remote portable computer user may reside. Additionally, gateway devices have found wide-spread use in multi-resident dwellings as a means of providing the residents an intranet that networks the residents, broadband Internet access and the capability to adapt to the variances of the resident's individual enterprise network needs. With the advent of even smaller portable computing devices, such as handhelds, PDAs, and the like, the locations where these users may reside becomes almost limitless. Someday we can envision wireless communications technology providing the capability to offer networking to airplane passengers and granting access to the network environment through gateway devices.

In most of the remote user applications and the multi-resident dwelling applications, the gateway administrator (i.e. the network service provider) is not so much concerned with "who" the user/subscriber is, but rather, "where" the user resides or is located. Location based information is imperative to the network service provider who desires to manage and bill subscribers based on where they are physically located rather than who they are or what host they may choose to use. For example, in the hotel scenario, the network service provider is more concerned with knowing that Room 301 has a seven day network subscription than knowing who the individual users are that are residing in Room 301. In this manner, the gateway administrator is able to provide Room 301, as opposed to individual residents in Room 310, with an identifier and an authenticator. The gateway administrator or network provider relies on this information for ensuring accurate subscriber billing. Additionally, the gateway administrator may benefit from location-based identification and authorization in the area of network management. For instance, by classifying within the network databases according to location the gateway device is able to provide network options to subscribers based upon where they are located. By way of example, if the gateway device has "learned" through location identification that Room 301 is a suite, thereby affording its customers additional service privileges, the gateway device can provide these additional service privileges without the need to query the user/subscriber regarding suite status. The same type of location classification can be beneficial in the multiple-resident dwelling example (i.e. a specially classified building or wing), in the airport example (i.e. a specially designated network port area for first class travelers) or in any other network application that uses a gateway device to provide network access and network adaptation.

Summary

The present invention comprises a method and apparatus for implementing location-based identification and authorization in a computer network having a gateway device.

In one embodiment of the present invention a method for implementing location-based identification and authorization in a computer network comprises establishing a network connection between a host and a network, sending out network packets from the host through a port, receiving the network packets at an access controller, tagging the network packets at the access controller with a port identifier that corresponds to a media access control (MAC) address, receiving the tagged network packet at a gateway device; and incorporating the port identifier into a database in communication with the gateway device. In one embodiment of the invention the access controller and the gateway device tag and communicate port numbers by assigning VLAN (Virtual Local Area Network) identifiers to the ports.

In another embodiment of the present invention a method for implementing location-based identification and authorization in a computer network includes establishing a network connection between a host and a network, sending out network packets from the host through a port, receiving the network packets at a gateway device, sending a port identifying query to an access controller in response to receiving the network packets, receiving the port identifying query at an access controller, sending a port identifying response query back to the gateway device, and incorporating a port identifier into a database in communication with the gateway device. In one embodiment of the invention the gateway device and the access controller have corresponding agents configured to send and respond to queries. For example the gateway device and access controller may incorporate an SNMP agent to communicate via queries.

In another embodiment of the invention a gateway apparatus is defined that is capable of communicating with an access controller to determine the port identity corresponding to the received MAC address. The gateway device is then able to use the location-based identities to structure billing schemes and manage the overall network that the service provider has established.

Disclosure

Referring now to FIG. 16, the computer system 10 that includes a gateway device 12 is depicted in block diagram form. The computer system typically includes a plurality of computers 14 that access the computer network in order to gain access to other networks or other online services. For example, the computers can be plugged into ports that are located in different rooms of a hotel or a multi-dwelling residence. Alternatively, the computers can be plugged into ports in an airport, an arena, or the like. The computer system also includes a gateway device that provides an interface between the plurality of computers and the various networks or other online services. Most commonly, the gateway device is located near the computers at a relatively low position in the structure of the overall network. (i.e. the gateway device will be located within the hotel, multi-unit residence, airport, etc.) However, the gateway device can be located at a higher position in the overall network structure such as at a Point of Presence (PoP) or a Network Operating Center (NOC), if so desired. Although the gateway device can be physically embodied in many different fashions, the gateway device typically includes a controller and a memory device in which software is stored that defines the operational characteristics of the gateway device. Alternatively, the gateway device can be embedded within another network device, such as the access controller or a router, or the software that defines the functioning of the gateway device can be stored on a PCM-CIA card that can be inserted into the computer in order to automatically reconfigure the computer to communicate with a different computer system.

The computer system 10 also typically includes an access controller 16 positioned between the computers 14 and the gateway device 12 for multiplexing the signals received from the plurality of computers onto a link to the gateway device. Depending upon the medium by which the computers are connected to the access controller, the access controller can be configured in different manners. For example, the access controller can be a digital subscriber line access module (DSLAM) for signals transmitted via regular telephone lines, a cable head end for signals transmitted via coaxial cables, a wireless access point (WAP) for signals transmitted via a wireless network, a cable modem termination system (CMTS), a switch or the like. As also shown in FIG. 16, the computer system typically includes one or more routers 18 and/or servers (not shown in FIG. 16) in communication with a plurality of computer networks 20 or other online service 22. While the computer system is depicted to have a single router, the computer system will typically have a plurality of routers, switches, bridges, or the like that are arranged in some hierarchical fashion in order to appropriately route traffic to and from the various networks or other online services. In this regard, the gateway device typically establishes a link with one or more routers. The routers, in turn, establish links with the servers of other networks or other online service providers, such as internet service providers, based upon the subscriber's selection.

The gateway device 12 is specifically designed to adapt to the configuration of each of the computers 14 that log onto the computer network 10 in a manner that is transparent to the subscriber and the computer network. In the typical computer network that employs dynamic host configuration protocol (DHCP) service, an IP address is assigned to the computer that is logging onto the computer network through communication with the gateway device. The DHCP service can be provided by an external DHCP server 24 or it can be provided by an internal DHCP server located within the gateway device. Upon opening their web browser or otherwise attempting to access an on-line service, the gateway device will direct the subscriber to enter some form of an identifier such as their ID and password. In an alternate embodiment of the device, it is anticipated that the gateway device will be able to automatically detect this information upon connection of the computer to the network or any attempt to log in. The gateway device then determines if the subscriber is entitled to access the computer system, the level of access and/or the type of services to which the subscriber is entitled according to an Authentication, Authorization and Accounting (AAA) procedure that is described by U.S. patent application Ser. No. 08/816,174 and U.S. Provisional Application No. 60/111,497. An AAA server, which is a database of subscriber records, may be remote to the gateway device or the AAA database may be incorporated into the physical embodiment housing the gateway device. Assuming that the subscriber has been authenticated and has authorization, the gateway device typically presents new subscribers with a home page or control panel that identifies, among other things, the online services or other computer networks that are accessible via the gateway device. In addition, the home page presented by the gateway device can provide information regarding the current parameters or settings that will govern the access provided to the particular subscriber. As such, the gateway administrator can readily alter the parameters or other settings in order to tailor the service according to their particular application. Typically, changes in the parameters or other settings that will potentially utilize additional resources of the computer system will come at a cost, such that the gateway administrator will charge the subscriber a higher rate for their service. For example, a subscriber may elect to increase the transfer rate at which signals are transmitted across the computer network and pay a correspondingly higher price for the expedited service.

The home page also permits the subscriber to select the computer network 20 or other online services 22 that the subscriber wishes to access. For example, the subscriber can access the enterprise network on which the computer is typically resident. Alternatively, the subscriber can access the internet or other on-line services. Once the subscriber elects to access a computer network or other online service, the gateway device establishes an appropriate links via one or more routers 18 to the desired computer network or online service.

Thereafter, the subscriber can communicate freely with the desired computer network 20 or other online service 22. In order to support this communication, the gateway device 12 generally performs a packet translation function that is transparent to the user/subscriber and the network. In this regard, for outbound traffic from the computer 12 to the computer network or other on-line service, the gateway device changes attributes within the packet coming from the user/subscriber, such as the source address, checksum, and application specific parameters, to meet the criteria of the network to which the user/subscriber has accessed. In addition, the outgoing packet includes an attribute that will direct all incoming packets from the accessed network to be routed through the gateway device. In contrast, the inbound traffic from the computer network or other online service that is routed through the gateway device, undergoes a translation function at the gateway device so that the packets are properly formatted for the user/subscriber's host computer. In this manner, the packet translation process that takes place at the gateway device is transparent to the host, which appears to send and receive data directly from the accessed computer network. Additional information regarding the translation function is provided by U.S. patent application Ser. No. 08/816,714. By implementing the gateway device as an interface between the user/subscriber and the computer network or other online service, however, the user/subscriber will eliminate the need to re-configure their computer 12 upon accessing subsequent networks.

In one embodiment of the present invention, the gateway device implements location-based identification and authorization. Location based identification and authorization allows the gateway device to grant network access to a specific location (e.g. a hotel room, a specific apartment address, etc.) rather than a specific user or host residing at the location. Basing identification and authorization on location, as opposed to user or host, allows the gateway administrator (i.e. network service provider) to manage the network according to user locations and to provide for a billing scheme according to user locations. For an example of a network management system that utilizes location based management in a gateway device environment see U.S. Prov. Pat. App. No. 60/160,973 entitled "Systems and Methods for Enabling Network Gateway Devices to Communicate with Management Systems to Facilitate Subscriber Management," incorporated elsewhere herein.

In one embodiment of the present invention location-based identification and authorization embodies the use of VLAN (Virtual Local Area Network) tagging. While VLAN is by definition, Virtual Local Area Network, in the context we are concerned with VLAN is the IEEE-standard protocol 802.1 Q used to implement VLAN. VLAN technology is well known in the art and has been used to create virtual networks by employing VLAN processors between network interfaces to logically bridge networks together. VLAN works on the concept of tracking ports by tagging the IP packet with an identifier. By using VLAN technology, the gateway device can provision subscriber access to the network on a localized port basis. For example, in a multi-resident dwelling environment, a network service provider may want to provision Internet access to individual units or apartments; each unit is assigned a VLAN ID (a port-location tag). In this example, a resident within the unit can choose to subscribe to the service and the gateway device will then allow Internet access from the resident's unit, regardless of which host or who the user is within the unit. Typically, hosts are granted network access via a MAC (Media Access Control) address that connects the device to a shared network medium. The use of VLAN tagging overrides the MAC address identification and authorization process.

VLAN ports can be "tagged" at any level, for example, a specific room in a hotel or an apartment building can be assigned a tag, or a floor within a building, a wing within a building or the building itself may be assigned an individual tag. Alternatively, multiple ports may be tagged to a single room. The gateway device uses a port-location authorization table to manage the assigned ports and ensure accurate billing for services used by a particular port.

Figure 39:
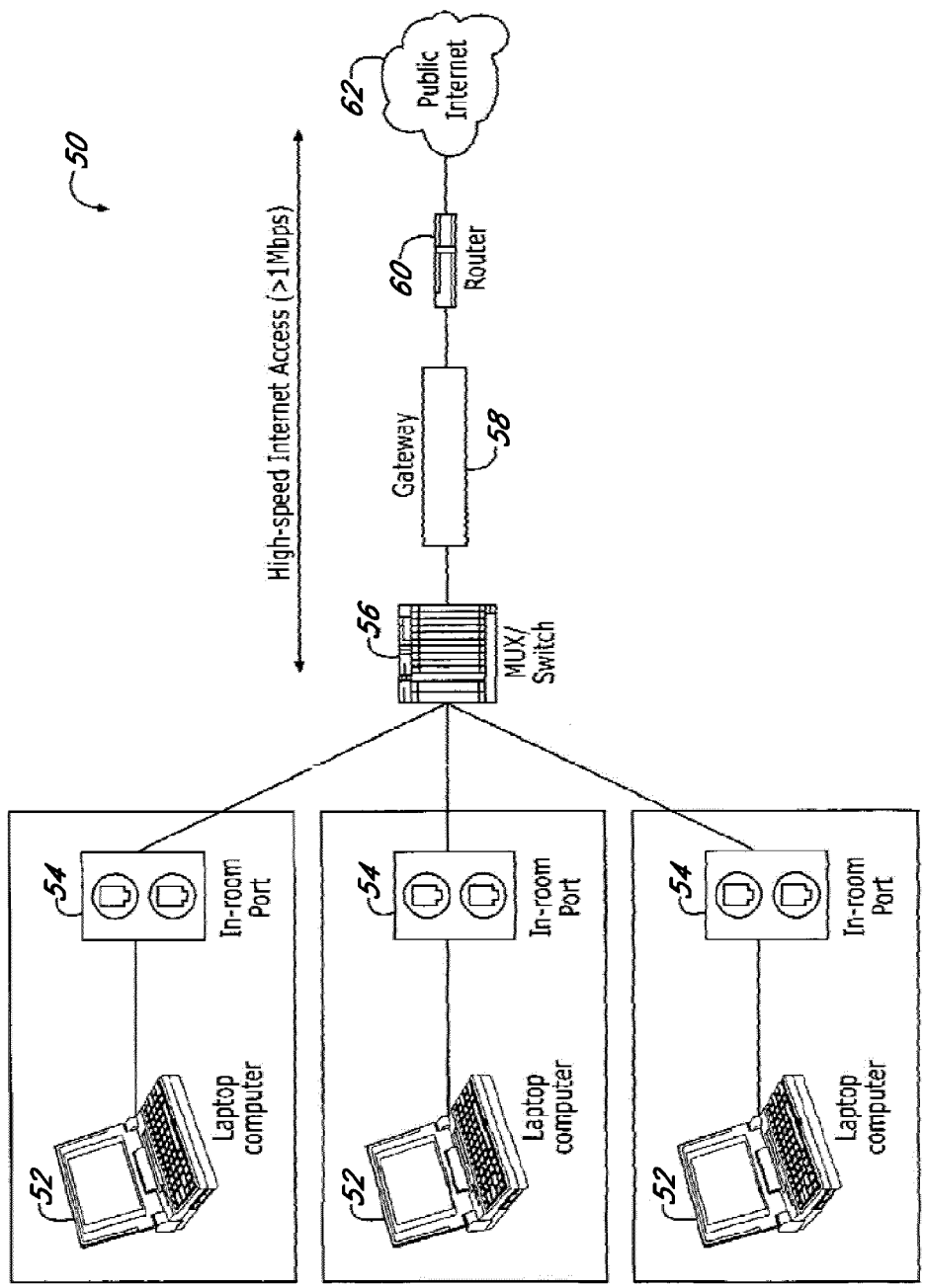
FIG. 39 is a block diagram of a simplified computer network configured so as to allow for location-based identification and authorization, in accordance with an embodiment of the present invention.

FIG. 39 illustrates a simplified network 50 configured so as to allow for location-based identification and authorization supported by VLAN tagging. A series of portable computers/hosts 52 are located within separate entities. The separate entities may include apartment units, hotel rooms, airport kiosks, retail outlets or the like. The user (not shown in FIG. 39) connects to the network service provider via a port 54 in the room. A modem (not shown in FIG. 16), either internal within the hosts or external, may be required to provide access to the network service provider. The medium used to establish the connection may include standard telephone dial-in, cable, CAT5 high quality cable, DSL (Digital Switch Line), wireless or any other applicable connection medium.

Once the host establishes connections it begins sending out standard Ethernet IP (Internet Protocol) packets. An access concentrator 56 initially receives the ETHERNET IP packets. The access concentrator serves as a switch that multiplexes signals received from numerous ports and sends them out one output port. Depending upon the medium by which the hosts are networked to the access controller, the access controller can be configured in different manners. For example, the access controller can be a digital subscriber line access module (DSLAM) for signals transmitted via regular telephone lines, a cable head end for signals transmitted via coaxial cables, a wireless access point (WAP) for signals transmitted via a wireless network, a cable modem termination system (CMTS), a switch or the like. For VLAN tagging to be implemented the access controller must be able to support VLAN technology. If the access controller does not support VLAN tagging then location-based identification and authentication may be implemented by the alternative SNMP (Simple Network Management Protocol) query embodiment of the present invention that is discussed in detail infra. An example of an access controller that will support VLAN tagging in a standard telephone medium environment is an Expresso GS System, available from Tut Systems, Incorporated of Pleasant Hill, Calif.

In the VLAN tagging embodiment once the access controller receives the Ethernet IP packet it knows what host sent it (from the MAC address header) but it does not know where the host is located. The access controller through the use of a VLAN processor has the capability to "know" from what port each packet arrives. It then re-configures the packet by adding a header between the Ethernet and IP packet according to the 802.1 Q IEEE VLAN protocol, identifying the port number and the host. These packets are then forwarded via the single output to the gateway device 58. The gateway device removes the port information and records the data in a connection table. The connection table tracks port numbers by MAC address of all incoming packets routed from the access controller. Once the port number is removed the VLAN portion is stripped from the packet header and the packet is forwarded on to a router 60 and subsequently the Internet 62 or another network in the system. It should be noted that in this embodiment the only two devices that communicate with the VLAN protocol are the access controller and the gateway device. The host devices are generally incapable of communicating in VLAN and the downstream network components (routers, switches, bridges, etc.) are inconsequential in this regard.

Figure 40:
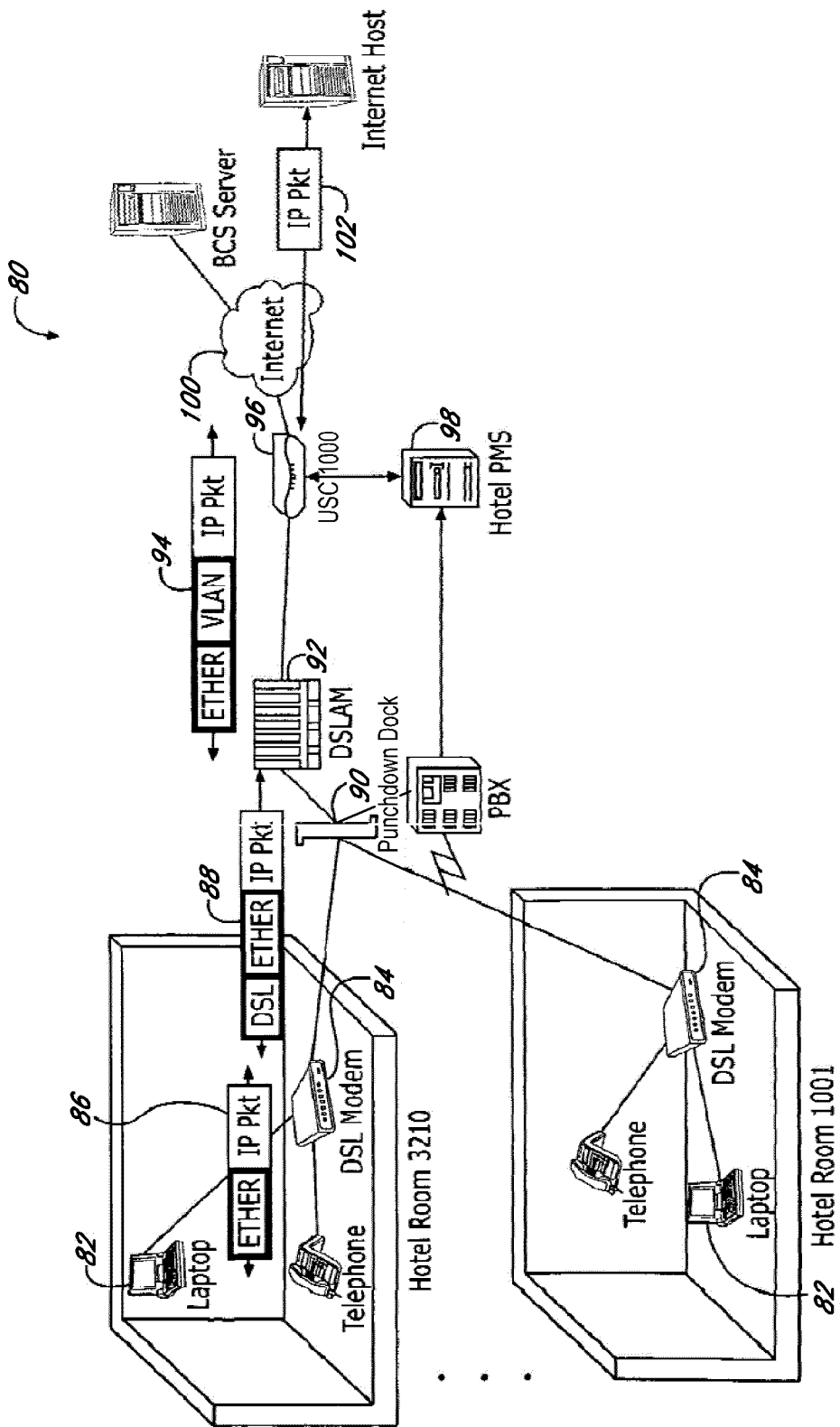
FIG. 40 is a block diagram of a computer network using DSL as the communication medium and implementing VLAN tagging to incorporate location-based identification and authorization, in accordance with an embodiment of the present invention.

FIG. 40 is a block diagram that illustrates a network configuration using DSL as the communication medium and VLAN tagging as a means of incorporating location-based identification and authorization. This networking configuration is shown by way of example, other communication medium, such as cable, wireless or the like, may also be used to configure a network using VLAN tagging to incorporate location-based identification. The network 80 includes hosts 82, typically portable computers and in this illustration conventional laptop computers. The hosts in this example are located in individual hotel rooms, however the hosts could be located in other entities, such as apartment units, office rooms, airport kiosks or the like. The hosts access the network via a digital switch line (DSL) modem 84. Once a communication link is established the hosts send out standard Ethernet IP packets 86 to communicate data within the network. At the DSL modem a DSL header is attached to the packets, resulting in the DSL/Ethernet/IP packet 88. The DSL header serves to identify the DSL modem or the port. The packets are then routed through a connection point, shown in this example as punchdown block 90, before they are received by an access controller 92.

Figure 41:
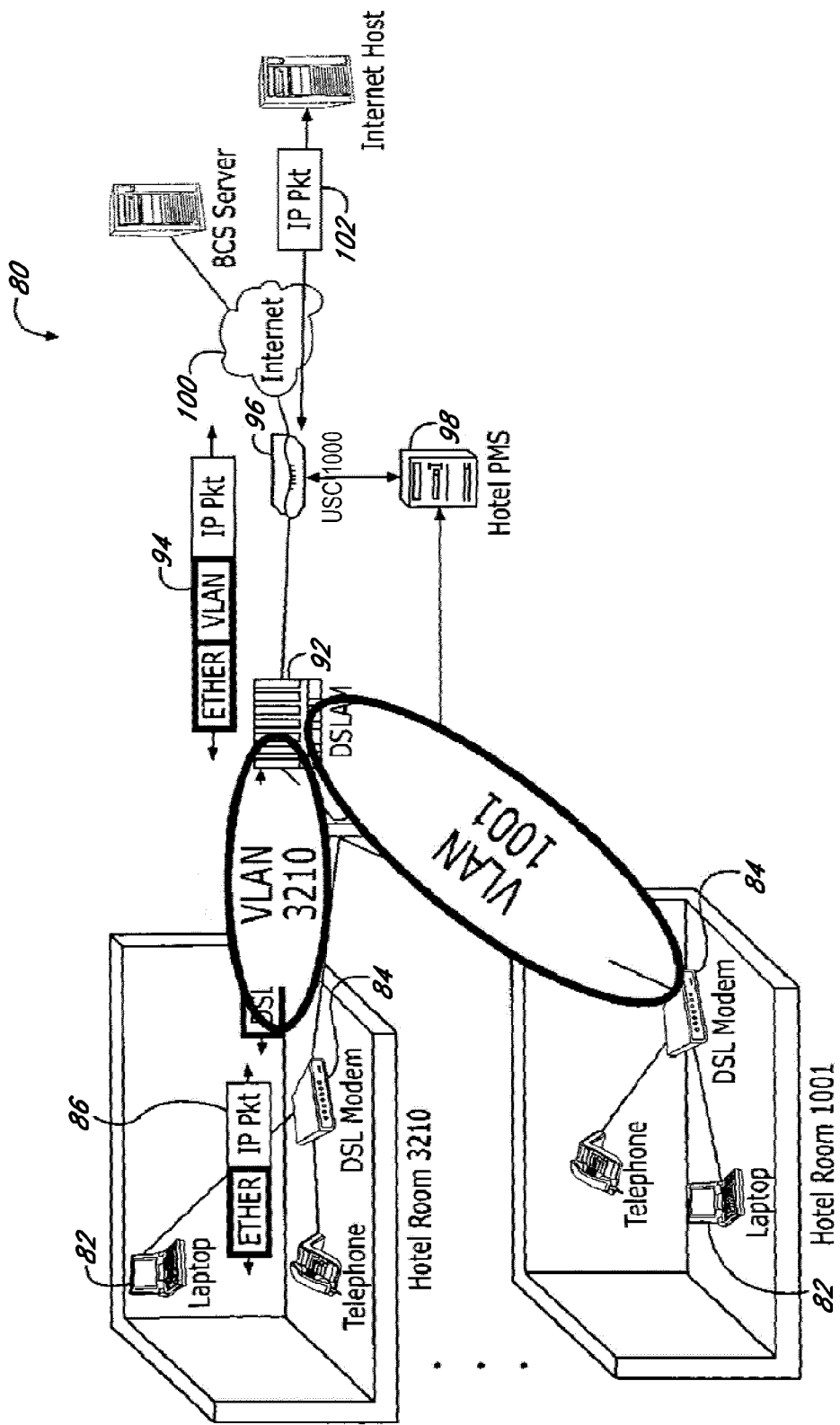
FIG. 41 is a block diagram of a computer network highlighting the unique VLAN identification feature of VLAN tagging, in accordance with an embodiment of the present invention.

In this embodiment the access controller is a DSLAM that is capable of communicating in VLAN (IEEE 802.1 Q). The access controller determines the port from which the packet was sent and assigns an appropriate VLAN identification number to the packet based upon the port from which it was sent. As shown in FIG. 41 each port, in this example each hotel room has a unique VLAN ID. For example, hotel room 3210 may be assigned VLAN ID 3210 and hotel room 1001 may be assigned VLAN ID 1001. A VLAN header is added to the packet, resulting in the Ethernet over VLAN over IP packet 94 shown in FIG. 40. These packets are then communicated to the gateway device 96 where the VLAN portion of the header is removed and the VLAN ID is referenced to a specific port within a communications table database associated with the gateway device. In turn, the gateway device may use this location-based identification and authorization for network management purposes, such as the Hotel PMS system 98 shown in FIG. 40. After the gateway device has logged the port related information the packets are communicated forward to other networks, such as the Internet 100. In this instance the packets are communicated as standard IP packets 102.

It should be noted that the gateway device will require configuration upon initial installation to accommodate location-based identification and authorization. If VLAN tagging is to be the basis for location-based identification the gateway device must be configured to allow for this communication to occur. A gateway administrator will need to configure the gateway so that VLAN ID's are assigned to individual entities or ports (i.e. room numbers, apartment units, etc.). Port location assignments can be added, updated or deleted according to gateway administrator commands. Adding a port-assignment to the gateway device database may involve assigning a port number, assigning a location to the port number and a conditional state for this port-location. Conditional states may be associated with billing schemes. For instance port-locations may be assigned a "no charge" state, a "charge for use" state or a "blocked" state.

Figure 42:
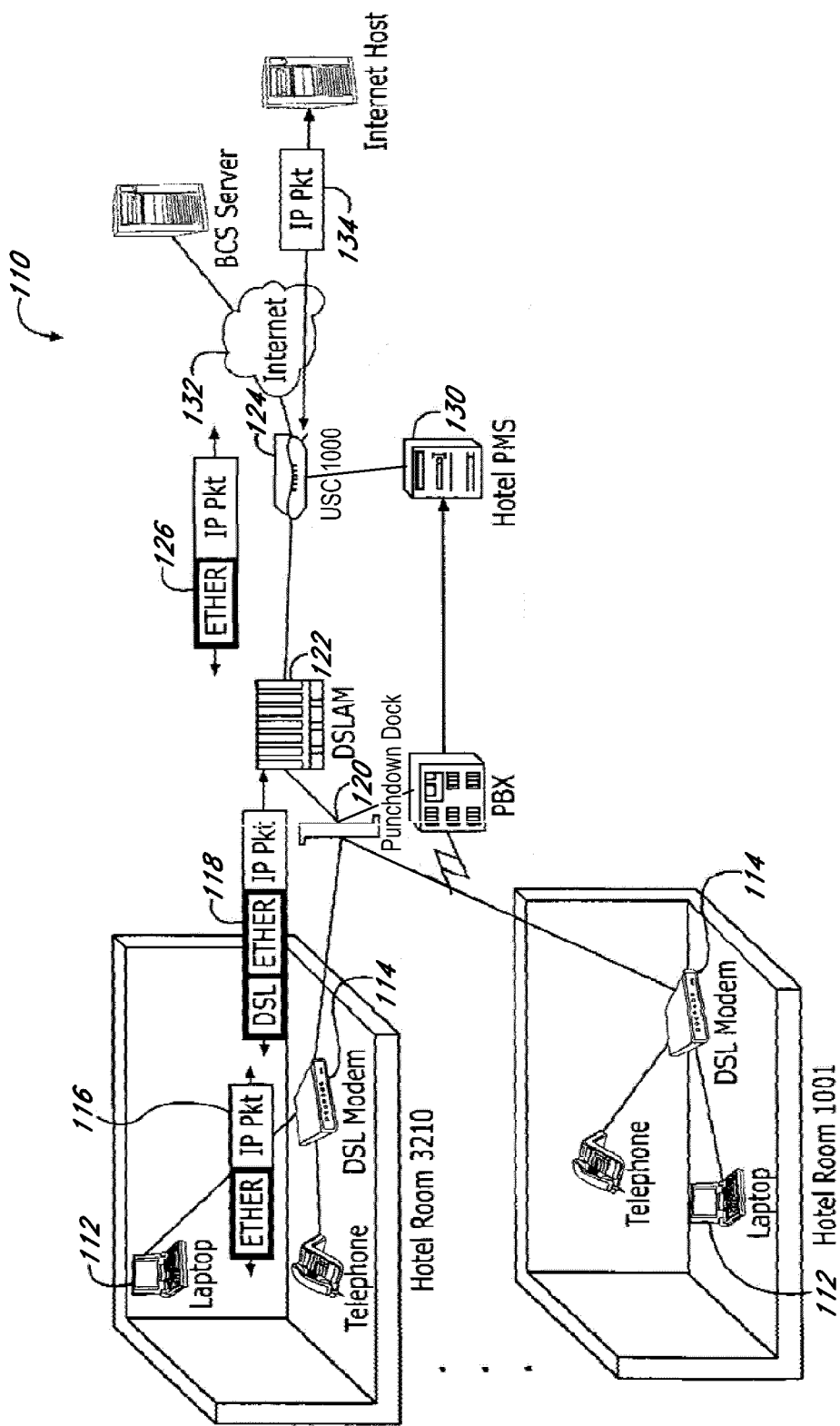
FIG. 42 is a block diagram of a computer network using DSL as the communication medium and implementing SNMP querying to incorporate location-based identification and authorization, in accordance with an embodiment of the present invention.

In another embodiment of the present invention location-based identification and authorization is implemented using SNMP (Simple Network Management Protocol) queries. The SNMP query embodiment is typically used if the access controller does not support the VLAN protocol. FIG. 42 is a block diagram that illustrates a network configuration using DSL as the communication medium and VLAN tagging as a means of incorporating location-based identification and authorization. This networking configuration is shown by way of example, other communication medium, such as cable, wireless or the like, may also be used to configure a network using VLAN tagging to incorporate location-based identification. The network 110 includes hosts 112, typically portable computers and in this illustration conventional laptop computers. The hosts in this example are located in individual hotel rooms, however the hosts could be located in other entities, such as apartment units, office rooms, airport kiosks or the like. The hosts access the network via a digital switch line (DSL) modem 114. Once a communication link is established the hosts send out standard Ethernet IP packets 116 to communicate data within the network. At the DSL modem a DSL header is attached to the packets, resulting in the DSL/Ethernet/IP packet 118. The DSL header serves to identify the DSL modem (i.e. the port). The packets are then routed through a connection point, shown in this example as punchdown block 120, before they are received by an access controller 122.

Figure 43:
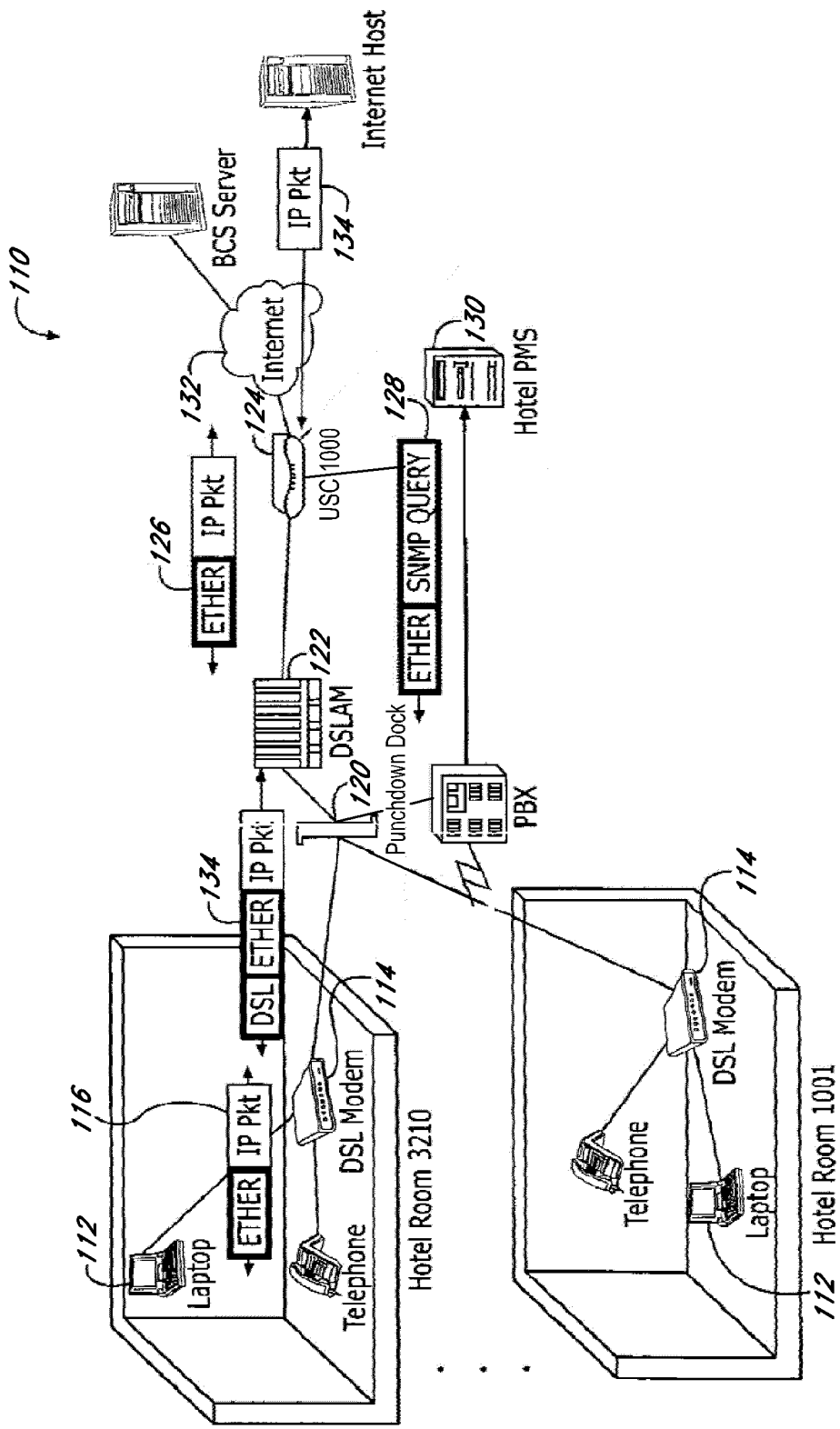
FIG. 43 is a block diagram of a computer network using DSL as the communication medium and implementing SNMP querying to incorporate location-based identification and authorization highlighting the use of SNMP queries, in accordance with an embodiment of the present invention.

In this application, since the access controller does not implement VLAN Tagging, the packets communicated between the access controller and the gateway device 124 are standard Ethernet IP packets 126. The Ethernet IP packets that are received by the gateway device are devoid of any information related to location (i.e. ports). As shown in FIG. 43, the gateway device must be configured to send out SNMP query packets 128 back to the access controller asking the controller from which port did this packet (i.e. this MAC address) come from. The access controller, which as a minimum must have/comprise a database that ties MAC addresses to ports, is then able to reply to the query with a response that ties the MAC address of the packet to a port number. The access control responds by sending an Ethernet/SNMP packet back to the gateway device identifying the port number. The gateway removes the port number and associated MAC address from the SNMP header and tables the information in an appropriate communications table database associated with the gateway device. In turn, the gateway device may use this location-based identification and authorization for network management purposes, such as the Hotel PMS system 130 shown in FIGS. 42 and 43. Once the database has proper port number to Mac address mapping for any specific location, the gateway device will no longer be required to send out SNMP queries to the access controller. In this manner, the SNMP query procedure is typically only required to be performed once for any given port. After the gateway device has logged the port related information into the database the packets are communicated forward to other networks, such as the Internet 132. In this instance the packets are communicated as standard IP packets 134.

It should be noted that in the SNMP query embodiment the gateway device and the access controller must be SNMP compatible. Both the gateway device and the access controller must be configured with the SNMP agent to receive, send and act upon SNMP queries.

Figure 44:
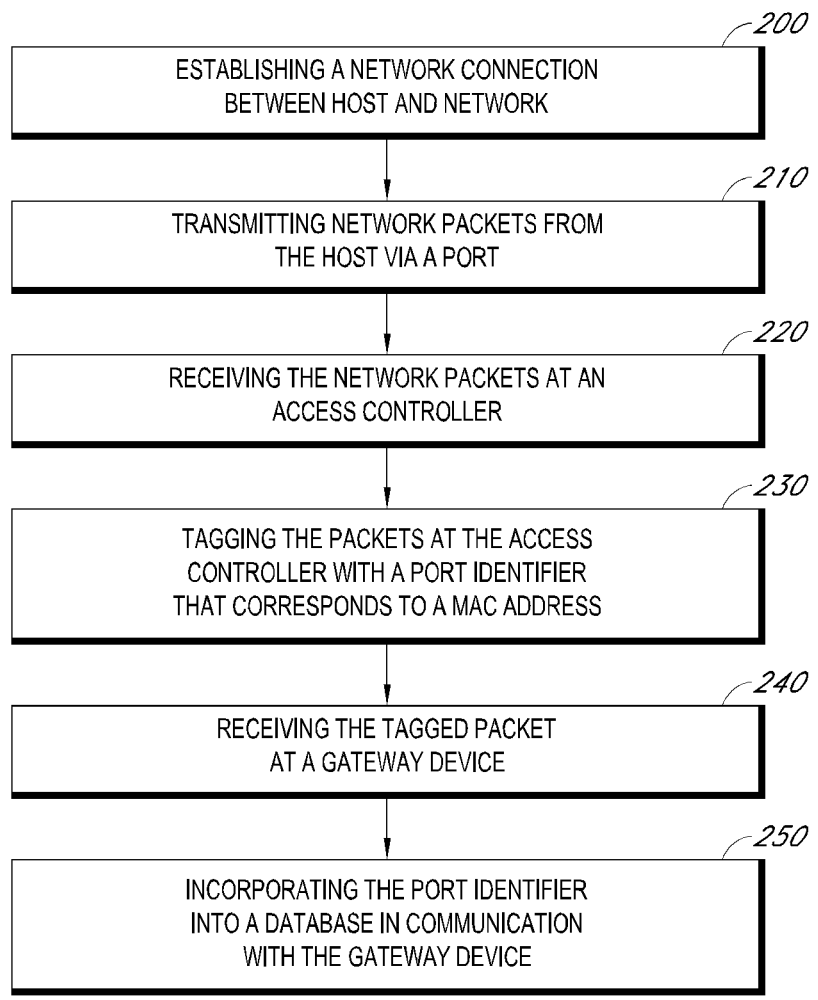
FIG. 44 is a flow chart diagram of a method for location-based identification and authorization in a computer network implementing a gateway device, in accordance with an embodiment of the present invention.

In accordance with an embodiment of the present invention, a method for implementing location-based identification and authorization in a computer network is shown in the flow chart diagram of FIG. 44. At step 200, a network connection is established between a host and a network. The communication medium that may be used to establish the connection includes telephone line, DSL, conventional cable, CAT5 cable, wireless and the like. At step 210, the host sends network packets to the network via a connection port and at step 220 the network packets are received at an access controller. The access controller may comprise a digital subscriber line access module (DSLAM) for signals transmitted via regular telephone lines, a cable head end for signals transmitted via coaxial cables, a wireless access point (WAP) for signals transmitted via a wireless network, a cable modem termination system (CMTS), a switch or the like. The access controller will be configured with an agent that allows for port identification. For example, the access controller may be configured with a VLAN agent or another similar agent.

At step 230, the access controller tags the network packet with a port identifier that corresponds to the media access control (MAC) address. The tagging of the network packet is typically performed using VLAN technology. Each port in the network service provider's entity is configured as a virtual LAN and therefore, each port has its own VLAN identifier. At step 240, the tagged packet is received at a gateway device where the port identifying information is removed from the packet header. At step 250 the port identifier is incorporated into a database that is in communication with the gateway device. Once the location-based data, in this instance the port identifier, is incorporated into the database it can be called upon for billing schemes and for use in overall network management systems.

Figure 45:
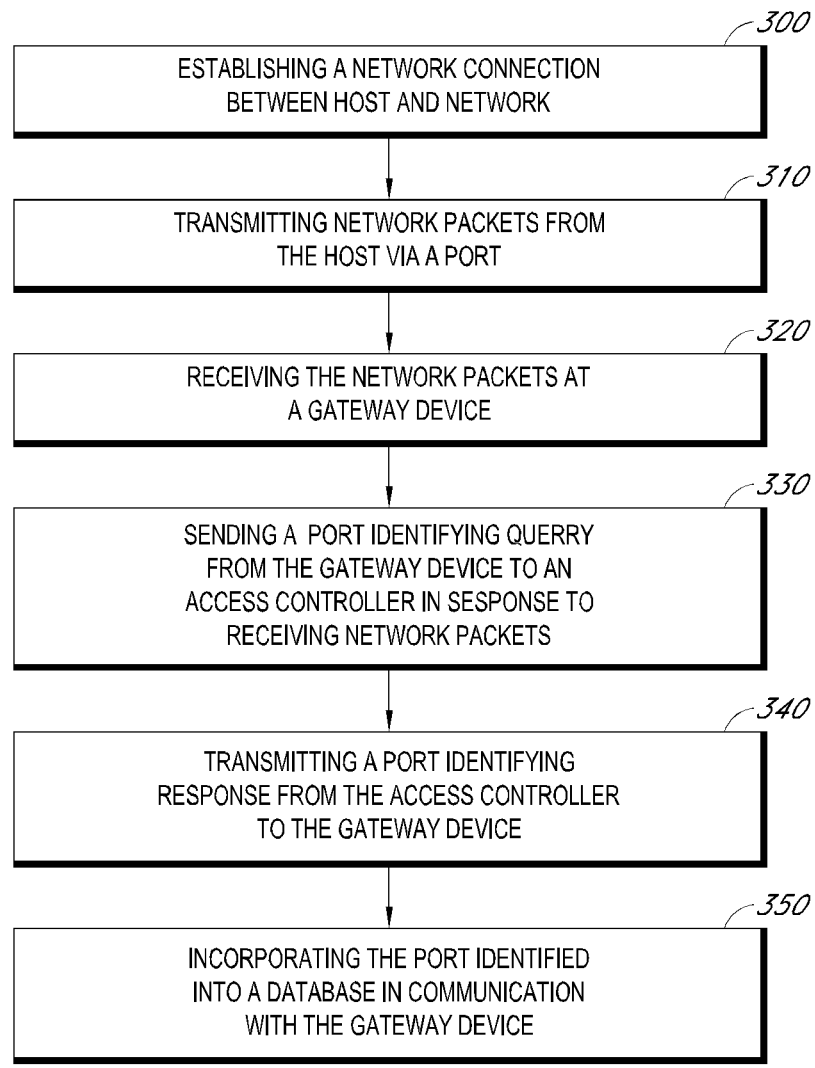
FIG. 45 is a flow chart diagram of a method for location-based identification and authorization in a computer network implementing a gateway device, in accordance with an embodiment of the present invention.

In accordance with another embodiment of the present invention, a method for implementing location-based identification and authorization in a computer network is shown in the flow chart diagram of FIG. 45. At step 300, a network connection is established between a host and a network. The communication medium that may be used to establish the connection includes telephone line, DSL, conventional cable, CAT5 cable, wireless and the like. At step 310, the host sends network packets to the network via a connection port and at step 320 the network packets are received at a gateway device.

The gateway device is typically configured with an agent that is capable of generating queries to other network devices. For example the gateway device may be configured with a SNMP agent that is capable of generating SNMP queries or another similar agent may be used. At step 330 the gateway device sends a port identifying query to an access controller in response to receiving the network packets. The access controller may comprise a digital subscriber line access module (DSLAM) for signals transmitted via regular telephone lines, a cable head end for signals transmitted via coaxial cables, a wireless access point (WAP) for signals transmitted via a wireless network, a cable modem termination system (CMTS), a switch or the like. Characteristically, the access controller will have an agent capable of responding to the queries sent by the gateway device. For example, the access controller may be configured with a SNMP agent that is capable of generating SNMP responses, or another similar agent corresponding to the agent used in the gateway device may also be used. Additionally, the access controller is configured so as to track port identity versus MAC address of incoming packet traffic.

At step 340, the access controller sends a port identifying response back to the gateway device and at step 350 the port identifying is incorporated into a data base that is in communication with the gateway device. Once the location-based data, in this instance the port identifier, is incorporated into the database it can be called upon for billing schemes and for use in overall network management systems.

The method and apparatus of the present invention provide a gateway device to identify and authenticate usage based on the location as opposed to the user or the device. In this manner the gateway device can administer billing schemes and network management (i.e. quality of service, billing maintenance, etc.) based upon the physical entity; the hotel room, the apartment unit, the airport kiosk, etc. where the user is located. This provides more options to the network service provider in terms of billing and network management.

Gateway Device Having an XML Interface and Associated Method

A gateway device and associated method are provided that facilitate communications with external devices by utilizing a uniform communications format. The gateway device includes a subscriber interface for adapting to a subscriber computer that is connected to the gateway device. The subscriber interface facilitates communications between the subscriber computer and at least one network or on-line service without requiring the subscriber computer to be reconfigured. The gateway device also includes an XML interface for communicating with an external device via a series of XML commands and responses. The XML commands and responses can relate to a variety of matters, including various subscriber management matters. Typically, the XML interface includes a parser front end, a parser section and a building section for appropriately handling XML commands that are received by the gateway device and for sending appropriate responses. The gateway device can also include an internal web server for communicating with both the XML interface and the internet to thereby facilitate XML-based communications between the gateway device and external devices connected to the internet.

In order for a computer to function properly in a network environment, the computer must be appropriately configured. Among other things, this configuration process establishes the protocol and other parameters by which the computer transmits and receives data. In one common example, a plurality of computers are networked to create a local area network (LAN). In the LAN, each computer must be appropriately configured in order to exchange data over the network. Since most networks are customized to meet a unique set of requirements, computers that are part of different networks are generally configured in different manners in order to appropriately communicate with their respective networks.

While desktop computers generally remain a part of the same network for a substantial period of time, laptops, handhelds, personal digital assistants (PDAs), cellphones or other portable computers (collectively "portable computers") are specifically designed to be transportable. As such, portable computers are connected to different networks at different times depending upon the location of the computer. In a common example in which the portable computer serves as an employee's desktop computer, the portable computer is configured to communicate with their employer's network, i.e., the enterprise network. When the employee travels, however, the portable computer may be connected to different networks that communicate in different manners. In this regard, the employee may connect the portable computer to the network maintained by an airport, a hotel, a cellular telephone network operator or any other locale in order to access the enterprise network, the Internet or some other on-line service. The portable computer is also commonly brought to the employee's residence where it is used to access various networks, such as, the enterprise network, a home network, the Internet and the like. Since these other networks are configured somewhat differently, however, the portable computer must also be reconfigured in order to properly communicate with these other networks. Typically, this configuration is performed by the user each time that the portable computer is connected to a different network. As will be apparent, this repeated reconfiguration of the portable computer is not only quite time consuming, but is also prone to errors. The reconfiguration procedure may even be beyond the capabilities of many users or in violation of their employer's IT policy.

As described by U.S. patent application Ser. No. 08/816, 174 and U.S. Prov. Pat. App. No. 60/111,497, a universal subscriber gateway device has been developed by Nomadix, L.L.C. of Westlake Village, Calif. The contents of both of these applications are incorporated herein by reference. The gateway device serves as an interface connecting the user/subscriber to a number of networks or other online services. For example, the gateway device can serve as a gateway to the Internet, the enterprise network, or other networks and/or on-line services. In addition to serving as a gateway, the gateway device automatically adapts to a computer, in order that it may communicate with the new network in a manner that is transparent both to the user/subscriber and the new network. Once the gateway device has appropriately adapted to the user's computer, the computer can appropriately communicate via the new network, such as the network at a hotel, at home, at an airport, or any other location, in order to access other networks, such as the enterprise network, or other online services, such as the internet.

The portable computer user/subscriber and, more specifically, the remote or laptop user, benefits from being able to access a myriad of computer networks without having to undergo the time-consuming and all-too-often daunting task of reconfiguring their host in accordance with network specific configurations. From another perspective, the network service provider benefits from avoiding "on-site" visits and/or technical support calls from the user who is unable to properly re-configure the portable computer. In this fashion, the gateway device is capable of providing more efficient network access and network maintenance to the user/subscriber and the network operator. A gateway device is also instrumental in providing the user/subscriber broadband network access that can be tailored to the user's needs.

Gateway devices must therefore communicate with a variety of external devices. For example, gateway devices typically communicate with billing and content servers which present customizable billing options and content pages for every subscriber of the gateway device. With respect to content, billing and content servers can present different log-on screens and pricing to a subscriber based upon the location from which the subscriber accesses the network. For example, a subscriber in a suite may be presented with a different log-on screen and pricing options than a subscriber in a regular room or a conference room. Additionally, billing and content servers can present subscribers with customized web content based upon the location from which the subscriber accesses the network. For example, different fire escape route maps can be presented to the subscriber based upon the room location from which the subscriber accesses the network. Additionally, guests in suites may have access to different web content than subscribers residing in a standard room. With respect to billing, billing and content servers typically interface with a credit card authorization server in order to obtain credit card information and authorization regarding the various subscribers. Depending upon the billing arrangement of a particular subscriber, the billing and content server can communicate directly with the credit card authorization service in order to appropriately charge the subscriber's credit card account for the various services that the subscriber accesses via the gateway device. Alternatively, the billing and content server can communicate via the gateway device with a property management system, such as the property management system of a hotel, in order to appropriately charge the subscriber's account for the various services that the subscriber accesses via the gateway device. Billing and content servers can also perform other functions, such as distributing email based upon mailing lists configured according to subscriber-specific information. Billing and content servers can also maintain and update membership records, such as frequent users clubs or frequent visitors clubs.

As briefly mentioned above, gateway devices may also communicate with a management system, such as the property management system maintained by a hotel or the like. The functions performed by a management system typically vary based upon the installation and application. For example, typical hotel property management systems automate operations such as room reservations, room assignments, guest check-in and check-out, and other front desk activities. Furthermore, typical hotel property management systems can maintain a log of telephone calls and telephone charges for each guest room, and can be in communication with the Internet to facilitate on-line reservations. As described in U.S. Prov. Pat. App. No. 60/170,973, entitled "Systems And Methods For Enabling Network Gateway Devices To Communicate With Management Systems To Facilitate Subscriber Management," incorporated elsewhere herein, gateway devices oftentimes communicate with property management systems, such as in instances in which the subscriber's access to various networks or on-line services is to be charged to their account that is administered by the property management system.

As will be explained in more detail hereinbelow, upon requesting access to a particular computer system or on-line service, the gateway device typically determines if the subscriber is entitled to access the computer system, the level of access and/or the type of services to which the subscriber is entitled according to an Authentication, Authorization, and Accounting (AAA) procedure that is described by U.S. patent application Ser. No. 08/816,174 and U.S. Prov. Pat. App. No. 60/111,497. An AAA server, which is a database of subscriber records, may be remote to the gateway device or the AAA database may be incorporated into the physical embodiment housing the gateway device. As such, in instances in which the AAA server is remote to the gateway device, the gateway device must also frequently communicate with the AAA server.

In addition to the external devices described above with which the gateway device frequently communicates, gateway devices may also communicate with a wide variety of other external devices depending upon the application. Unfortunately, communications with any of these external devices may be limited due to the particular format in which the external devices are designed to transmit and receive information. Since the external devices are typically designed by a number of different vendors, each of which may prefer a different format for communications, this problem is compounded by the lack of uniformity in the format with which the external devices communicate. In this regard, one external device may be designed to communicate according to one format, while another external device may be required to communicate according to another format. Since the subscriber gateway may be required to communicate with a variety of different external devices, the gateway device would seemingly have to communicate with each external device according to the particular format that is acceptable to the external device. This requirement can quickly prove cumbersome to the design, implementation and efficient operation of a gateway device since it will be forced to communicate according to a number of different formats. While this requirement is a current concern for the efficient utilization of gateway devices that must communicate with multiple external devices, this concern is expected to grow as the variety of applications in which gateway devices are employed increases and the number of different types of external devices with which the gateway device must communicate also grows.

Summary

According to the present invention, a gateway device and associated method are therefore provided that facilitate communications with external devices by utilizing a uniform communications format. As such, the gateway device is not required to communicate with each external device according to a unique format defined by the respective external device. Accordingly, the gateway device and associated method of the present invention improve communications between the gateway device and various external devices, such as a billing and content servers, property management systems, external AAA servers and the like.

According to one aspect of the present invention, a gateway device is provided that includes a subscriber interface for adapting to a subscriber computer that is connected to the gateway device. The subscriber interface facilitates communications between the subscriber computer and at least one network or on-line service without requiring the subscriber computer to be reconfigured. According to the present invention, the gateway device also includes an XML interface for communicating with an external device via a series of XML commands and responses. The XML commands and responses can relate to a variety of matters, including various subscriber management matters. Typically, the XML interface includes a parser front end, a parser section and a building section for appropriately handling XML commands that are received by the gateway device and for sending appropriate responses. The gateway device of the present invention can also include an internal web server for communicating with both the XML interface and the internet to thereby facilitate XML-based communications between the gateway device and external devices connected to the internet.

The present invention also provides a method for communicating between the gateway device and external device via the internet. According to this aspect of the present invention, an XML command is initially received at the gateway device from the external device, such as the billing and content server. The XML command is then parsed, and the parsed XML command is passed to a respective application program, such as the AAA server for performing the requested function, such as a subscriber management function. Upon completion of the requested function, the application program issues a response that is received by the gateway device and that is then included within an XML response transmitted from the gateway device to the external device.

As such, the gateway device and associated method of the present invention facilitate communications between the gateway device and a variety of external devices, such as external billing and content servers, property management systems and external AAA servers. In this regard, the gateway device can communicate with each of these various external devices in a uniform manner via a series of XML commands and responses, thereby dramatically reducing, if not eliminating, the instances in which the gateway device would have to communicate with an external device according to the unique format established by the external device. As a result, the design, implementation and operation of the gateway device should be considerably simplified.

Description

Figure 46:
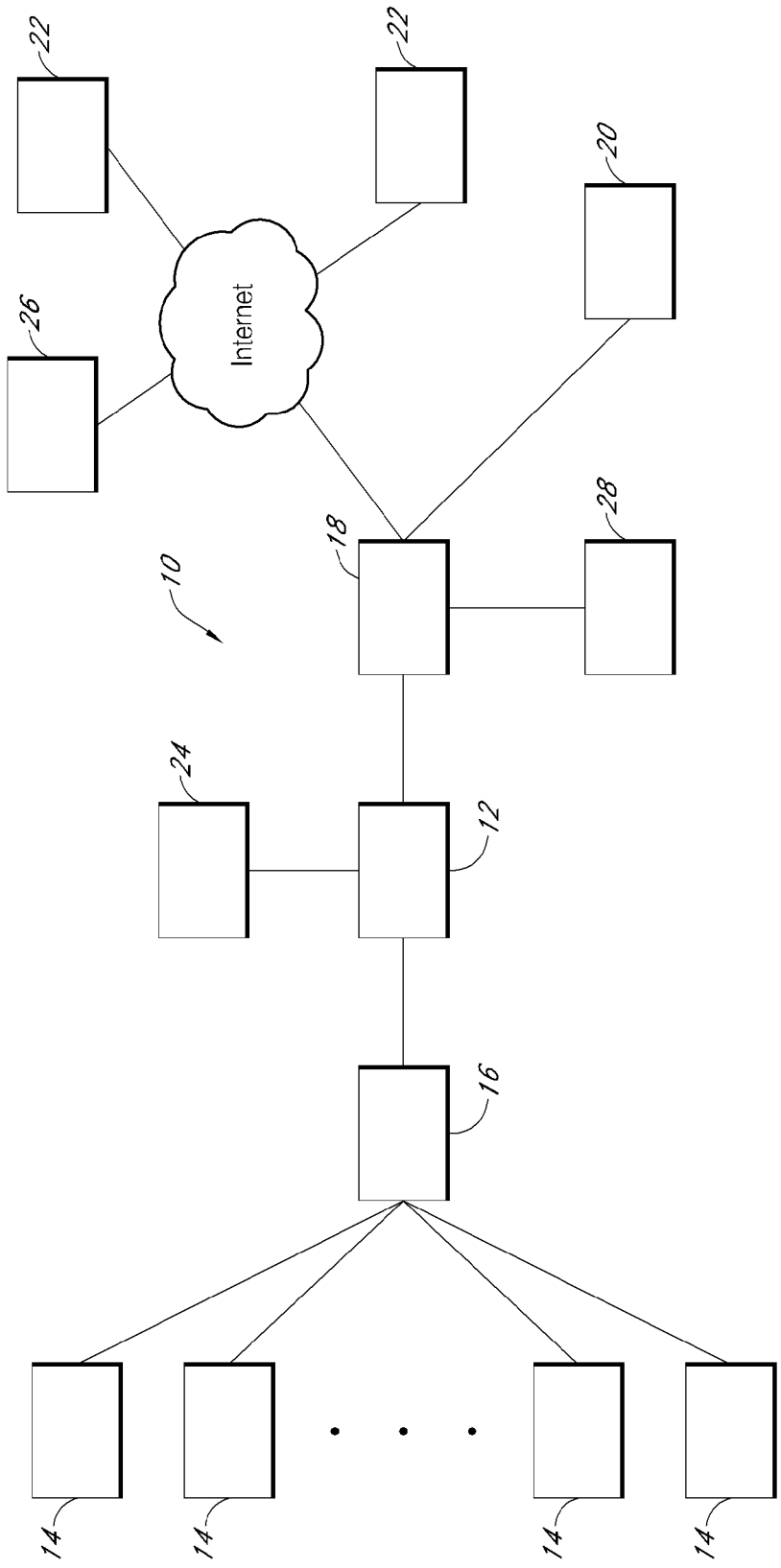
FIG. 46 is a block diagram of a computer system that includes a gateway device for facilitating communications between one or more computers and various other networks or on-line services in a manner that is transparent to both the user/subscribers and the network administrators and internet service providers.

Referring now to FIG. 46, the computer system 10 that includes a gateway device 12 is depicted in block diagram form. The computer system typically includes a plurality of computers 14 that access the computer network in order to gain access to other networks or other online services. For example, the computers can be plugged into ports that are located in different rooms of a hotel or a multi-dwelling residence. Alternatively, the computers can be plugged into ports in an airport, an arena, or the like. The computer system also includes a gateway device that provides an interface between the plurality of computers and the various networks or other online services. Most commonly, the gateway device is located near the computers at a relatively low position in the structure of the overall network. (i.e. the gateway will be located within the hotel, multi-unit residence, airport, etc.) However, the gateway device can be located at a higher position in the overall network structure such as at a Point of Presence (PoP) of Network Operating Center (NOC), if so desired. Although the gateway device can be physically embodied in many different fashions, the gateway device typically includes a controller and a memory device in which software is stored that defines the operational characteristics of the gateway device. Alternatively, the gateway device can be embedded within another network device, such as the access controller or a router, or the software that defines the functioning of the gateway device can be stored on a PCM-CIA card that can be inserted into the computer in order to automatically reconfigure the computer to communicate with a different computer system.

The computer system 10 also typically includes an access controller 16 positioned between the computers 14 and the gateway device 12 for multiplexing the signals received from the plurality of computers onto a link to the gateway device. Depending upon the medium by which the computers are connected to the access controller, the access controller can be configured in different manners. For example, the access controller can be a digital subscriber line access module (DSLAM) for signals transmitted via regular telephone lines, a cable head end for signals transmitted via coaxial cables, a wireless access point (WAP) for signals transmitted via a wireless network, a cable modem termination system (CMPS), a switch or the like. As also shown in FIG. 46, the computer system typically includes one or more routers 18 and/or servers (not shown in FIG. 46) of a plurality of computer networks 20 or other online services provided by internet service providers 22 that are connected to the gateway device via the internet. While the computer system is depicted to have a single router, the computer system can have a plurality of routers, switches, bridges, or the like that are arranged in some hierarchical fashion in order to appropriately route traffic to and from the various networks or other online services. In this regard, the gateway device typically establishes a link with one or more routers. The routers, in turn, establish links with the servers of other networks or other online service providers, such as internet service providers, based upon the subscriber's selection.

The gateway device 12 is specifically designed to adapt to the configuration of each of the computers 14 that log onto the computer network 10 in a manner that is transparent to the subscriber and the computer network. In the typical computer network that employs dynamic host configuration protocol (DHCP) service, an IP address is assigned to the computer that is logging onto the computer network through communication with the gateway device. The DHCP service can be provided by an external DHCP server 24 or it can be provided by an internal DHCP server located within the gateway device. Upon opening their web browser or otherwise attempting to access an on-line service, the gateway device will direct the subscriber to enter some form of an identifier such as their ID and password. In an alternate embodiment of the device, it is anticipated that the gateway device will be able to automatically detect this information upon connection of the computer to the network or any attempt to log in. The gateway device then determines if the subscriber is entitled to access the computer system, the level of access and/or the type of services to which the subscriber is entitled according to an Authentication, Authorization and Accounting (AAA) procedure that is described by U.S. patent application Ser. No. 08/816,174 and U.S. Provisional Application No. 60/111,497. An AAA server, which is a database of subscriber records, may be remote to the gateway device or the AAA database may be incorporated into the physical embodiment housing the gateway device. Assuming that the subscriber has been authenticated and has authorization, the gateway device typically presents new subscribers with a home page or control panel that identifies, among other things, the online services or other computer networks that are accessible via the gateway device. In addition, the home page presented by the gateway device can provide information regarding the current parameters or settings that will govern the access provided to the particular subscriber. As such, the gateway administrator can readily alter the parameters or other settings in order to tailor the service according to their particular application. Typically, changes in the parameters or other settings that will potentially utilize additional resources of the computer system will come at a cost, such that the gateway administrator will charge the subscriber a higher rate for their service. For example, a subscriber may elect to increase the transfer rate at which signals are transmitted across the computer network and pay a correspondingly higher price for the expedited service.

The home page also permits the subscriber to select the computer network 20 or other online services 22 that the subscriber wishes to access. For example, the subscriber can access the enterprise network on which the computer is typically resident. Alternatively, the subscriber can access the internet or other on-line services. Once the subscriber elects to access a computer network or other online service, the gateway device establishes an appropriate links via one or more routers 18 to the desired computer network or online service.

Thereafter, the subscriber can communicate freely with the desired computer network 20 or other online service 22. In order to support this communication, the gateway device 12 generally performs a packet translation function that is transparent to the user/subscriber and the network. In this regard, for outbound traffic from the computer 14 to the computer network or other on-line service, the gateway device changes attributes within the packet coming from the user/subscriber, such as the source address, checksum, and application specific parameters, to meet the criteria of the network to which the user/subscriber has accessed. In addition, the outgoing packet includes an attribute that will direct all incoming packets from the accessed network to be routed through the gateway device. In contrast, the inbound traffic from the computer network or other online service that is routed through the gateway device, undergoes a translation function at the gateway device so that the packets are properly formatted for the user/subscriber's host computer. In this manner, the packet translation process that takes place at the gateway device is transparent to the host, which appears to send and receive data directly from the accessed computer network. Additional information regarding the translation function is provided by U.S. patent application Ser. No. 08/816,714. By implementing the gateway device as an interface between the user/subscriber and the computer network or other online service, however, the user/subscriber will eliminate the need to re-configure their computer 12 upon accessing subsequent networks.

Figure 47:
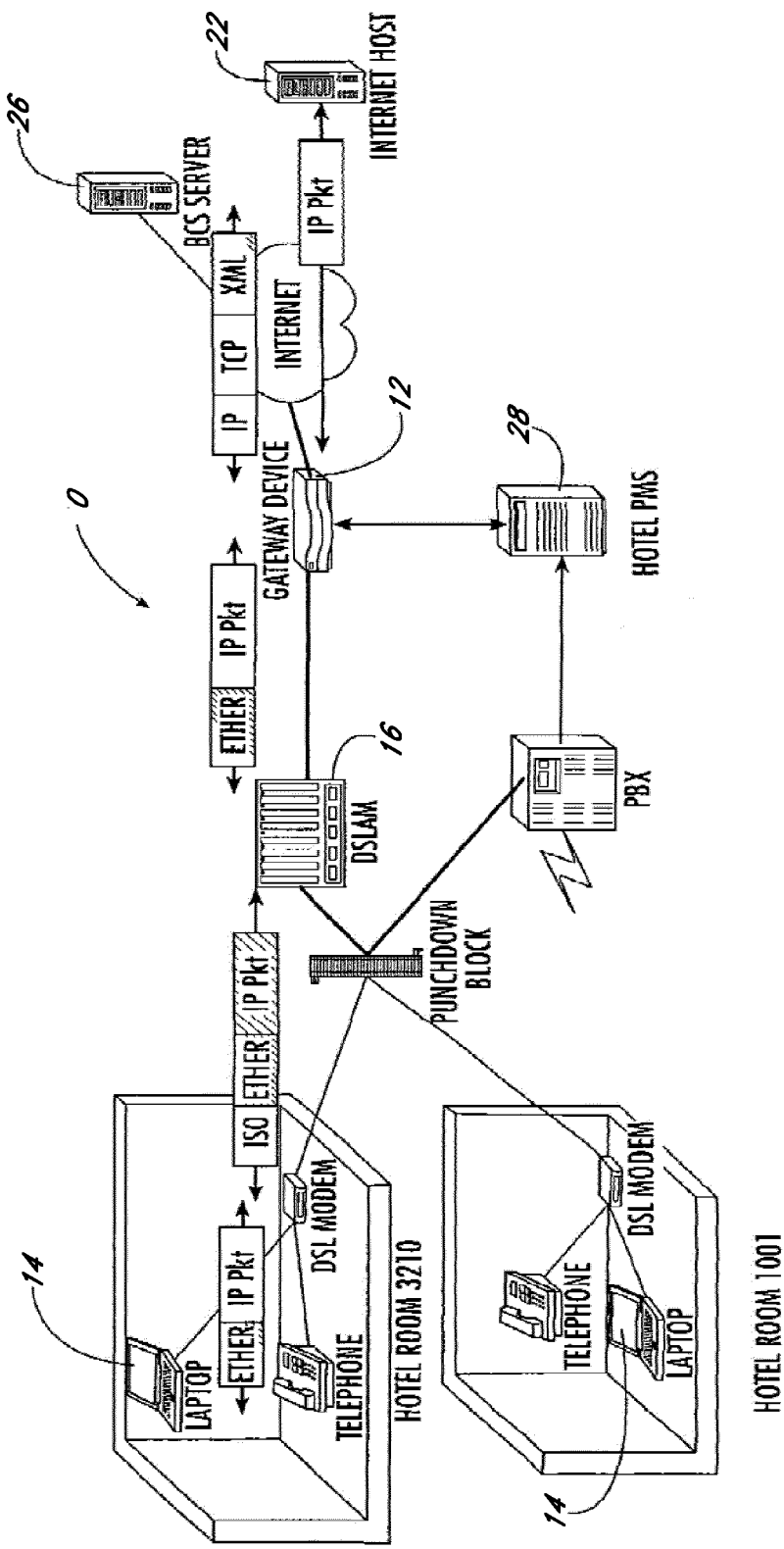
FIG. 47 is a block diagram illustrating the format and protocol of messages transmitted to and from a gateway device according to one embodiment of the present invention, including messages transmitted between the gateway device and a billing and content server.

As described above, gateway devices 14 must typically communicate with a variety of external devices. For example, gateway devices typically communicate with billing and content servers 26 as depicted in FIGS. 46 and 47. As also described above, billing and content servers present customized billing options and content pages for every subscriber of a gateway device. As such, gateway devices must communicate on a frequent basis with the billing and content server.

As depicted in FIGS. 46 and 47, the gateway device 12 also typically communicates with a management system 28, such as the property management of a hotel or the like. While the functions performed by property management systems vary based upon the installation and the application, typical hotel property management systems automate operations such as room reservations, room assignments, guest check-in and check-out and other front desk activities as described above. In addition, typical hotel property management systems can maintain a log of telephone calls and telephone charges for application to the bill for each guest room. Accordingly, the gateway device of the present invention can communicate with a property management system in order to place charges for the various services that a subscriber accessed via the gateway device upon the appropriate bill that is maintained by the property management system.

Moreover, while the AAA functionality is typically physically embodied within the gateway device 12, the gateway device can be configured to communicate with external AAA servers in order to authenticate a subscriber, to obtain authorization for the services requested by the subscriber and to appropriately account for their usage. In addition, gateway devices may communicate with a wide variety of other external devices, particularly as gateway devices are deployed in new applications or installations.

In order to avoid the overhead associated with communicating with each of these external devices according to the unique format in which the external device is designed to communicate, the gateway device 12 of the present invention communicates with the external devices with a series of commands and responses formatted according to the extensible markup language (XML). As known to those skilled in the art, XML is defined as an application profile of the standard generalized markup language (SGML) that is defined by ISO 8879. While SGML has been the standard, vendor-independent technique to maintain repositories of structured documentation for more than a decade, SGML is not well suited to serving documents over the world wide web. While XML is designed to enable the use of SGML on the world wide web, XML is not a single, predefined markup language. Instead, XML allows the system designer to design their own markup. In this regard, a predefined markup language, such as hypertext markup language (HTML), defines one manner in which to describe information in one specific class of documents. In contrast, XML allows the system designer to define its own customized markup languages for different classes of documents. As such, XML specifies neither semantics nor a tag set. However, XML provides a facility to define tags and the structural relationships between them. See XML specification 1.0 for further details regarding XML.

As such, the gateway device 12 of the present invention utilizes XML to communicate with a variety of external devices, including the billing and content server 26 and the property management system 28. In addition, in instances in which the AAA functionality resides in an external AAA server, the gateway device can also communicate with the external AAA server via XML. In particular, the gateway device is designed to communicate according to a set of XML commands and XML responses. Since the XML format is not specific to any particular external device, the gateway device can advantageously communicate with a variety of external devices via a common format, i.e., XML, and need not format messages differently based upon the format with which the external device is otherwise designed to communicate.

Figure 48:
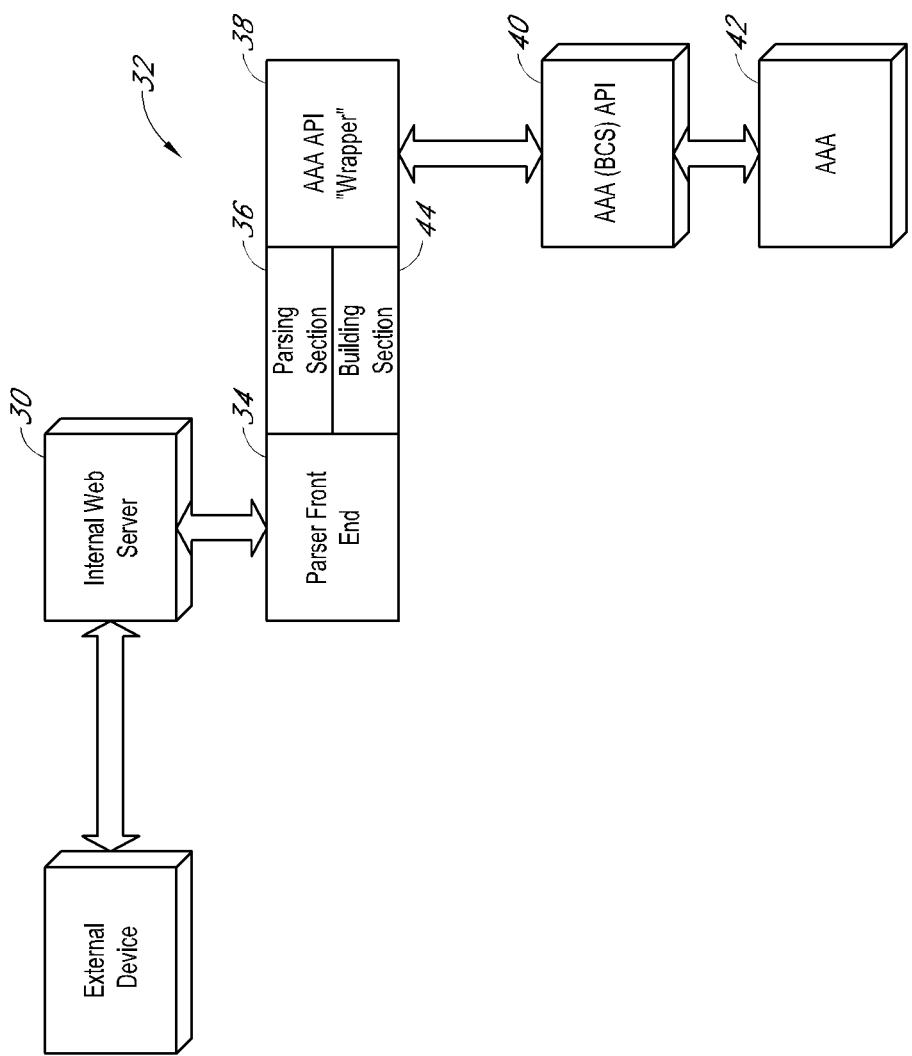
FIG. 48 is a block diagram illustrating an XML interface of a gateway device according to one embodiment of the present invention, as well as the various devices with which the XML interface communicates.

As depicted in FIG. 48, the gateway device 12 typically includes an internal web server 30, also known as a goahead server, that processes HTTP streams that are received from external devices. In instances in which the external device and the gateway device will communicate via the XML protocol, the HTTP string will have XML as the content type, while the content itself will consist of tags, attributes and data. As known to those skilled in the art, tags serve as field identifiers and attributes contain the values of input parameters that are used as record keys or search arguments, i.e., a MAC address. In addition, data elements are values that are to be stored in the tables and authorization files of the gateway device. Data is also returned in response streams sent by the gateway device to the external devices.

Figure 49:
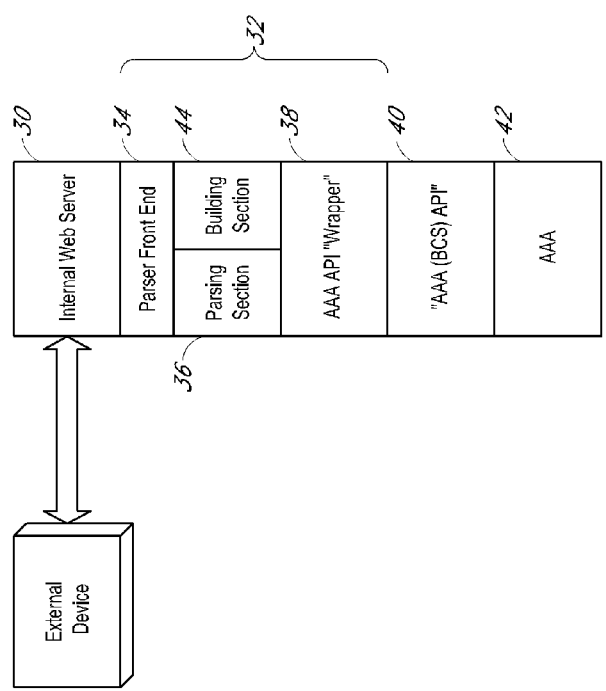
FIG. 49 is a stack representation of the XML interface of FIG. 48 as well as the various devices with which the XML interface communicates so as to illustrate the relative hierarchy between the respective devices.

In order to handle XML commands that are received from an external device, the gateway device 12 includes an XML interface, also known as an XML parser 32, that is compliant with the world wide web consortium (W3C) standards to validate the XML command strings and the attributes and data derived from an XML query string. As depicted in FIG. 48, an XML interface typically includes a parser front end 34 that invokes the core of a parser and determines the type of operation being requested. For example, in one common embodiment, the gateway device will receive an XML command from the billing and content server 26 requesting a specific AAA operation. As such, the following description of the XML interface as well as accompanying FIGS. 48 and 49 will be in terms of XML commands from the billing and content server requesting an AAA operation. However, the XML interface can facilitate XML-based communications between a wide variety of other devices without departing from the spirit and scope of the present invention. In this regard, the only requirement is that the external device has an XML interface, i.e., an XML parser, and be adapted to support the same XML command protocol as the gateway device. One example of an XML protocol for communications between a gateway device and a billing and content server is provided below, although other XML command protocols can be established without departing from the spirit and scope of the present invention.

The XML interface 32 of the gateway device 12 also includes a parser section 36 to handle elements as they are parsed from the XML stream. In this regard, parsed elements are organized into separate parameters that are passed to the requested application, such as the AAA server, via an appropriate application program interface (API). As shown in FIG. 48, the sets of parameters that are to be passed to the requested application are typically nested inside or wrapped within a record structure having an appropriate protocol as indicated by block 38 designated as the API "wrapper", that also provides any necessary translation of data elements, e.g. those that need to be converted from string format to some numeric format for internal processing reasons. Once properly wrapped, the sets of parameters are passed via the appropriate API 40 to the requested application, such as the AAA 42. The requested application then responds to the request and provides the requested data via the API to the XML interface of the gateway device.

The gateway device 12 therefore also includes a building section 44 that prepares responses to requests received by the gateway device. In this regard, the building section of the XML interface 32 assembles the results returned by the requested application into a new XML string that will be part of the HTTP response stream returned to the external device via a component such as the aforementioned goahead server. With respect to a HTTP response stream sent back to a billing and content server 26 via the world wide web, the HTTP response stream is typically nested inside a TCP/IP packet in order to be appropriately transmitted and received by the billing and content server. See, for example, FIG. 47 that depicts the relative protocols and formats for signals transmitted between different elements of the overall computer system 10. However, other protocols can be utilized without departing from the spirit and scope of the present invention.

A response that is returned by the gateway device 12 can be one of two types.

First, a standard "OK" response can be returned that typically includes the data, if any, requested by the external device. Alternatively, an error response can be returned that typically consists of a numeric error code and a textual description of the error. In either instance, the XML interface 32 generally creates a standard header consisting of the status, such as "OK" or "ERROR", the ID of the gateway device and the gateway device's IP address. This response is then placed onto the world wide web by the internal web server 30 of the gateway device for delivery to the external device.

While the XML interface 32 of the gateway device 12 of the present invention will be primarily described hereinafter in conjunction with XML commands received by the gateway device from an external device, followed by XML responses sent by the gateway device to the external device, the gateway device of the present invention can be constructed so as to initiate XML-based communications by issuing XML commands to various external devices and awaiting appropriate responses. In addition, while the gateway device including an XML interface will primarily be described in conjunction with communications involving an external billing and content server 26 that requests information from the AAA server, the gateway device can establish XML-based communications with other external devices, such as a property management system 28 or, in instances in which the AAA server is external to the gateway device, with the AAA server itself. In any of these instances, the gateway device is able to communicate with the external device or server according to a common protocol, i.e., XML, without having to communicate with each external device in the format unique to the respective external device. As such, the only requirement of the external device is that the external device has an XML interface and be adapted to support the same XML command protocol as the gateway device.

While various XML command protocols can be established depending upon the external device and the nature of the communication between the external device and the gateway device 12, one command protocol established between an external billing and content server 26 and a gateway device is hereinafter provided by way of example and not by way of limitation. In this example, the billing and content server sends XML commands to the gateway device which, in turn, responds to the billing and content server. In one example, the XML commands transmitted by the billing and content server to the gateway device are sent using an HTTP form POST in which the information is placed in packets sent after the HTTP header. In this example, the command text will generally follow the following format:

<USG COMMAND="(command)" [(attr) ="(attr_data)"]>
    <(tag_n) [tag_n_attr = "(tag_n_attr_data)"]>(data_n)</(tag_n)>
</USG> where:
(command) is a gateway device command;
(attr) is an optional attribute associated with a command;
(attr_data) is the data associated with the optional attribute tag;
(tag_n) is a data name tag used for specifying command parameter names;
(tag_n_attr) is an optional attribute name tag;
(tag_n_attr_data) is optional attribute data, and
(data_n) is the data associated with a data name tag.

In addition, the typical XML response from the gateway device 12 to a billing and content server 28 following receipt of an XML command from the billing and content server is typically formatted as follows:

| | |
|---|---|
| HTTP/1.1 200 OK: | (specifies request understood) |
| Server: UI 3A4B6D | (use the gateway device ID as the server name) |
| Date: Fri, 23 Jul 1999 00:09:55 GMT | (current date/time) |
| Content-Type: text/xml | (specifies XML content) |
| Last-Modified: Fri, 23 Jul 1999 00:09:55 GMT | (current date/time) |
| Content-Length: 560 | (size of message body in characters) (this must be a blank line) |
| (series of XML tag/data pairs) | (end of message body) |

In this regard, while the series of XML tag/data pairs referenced in the above exemplary XML response format will depend upon the particular command as described below, one series of XML tag/data pairs typically follow the following format:

<USG RESULT="(RESULTCODE)" ID=" (UI)" IP= "(USG_IP_ADDR)">
    [<ERROR_NUM>(error number)</ERROR_NUM>]
    [<ERROR_DESC>(error description)</ERROR DESC>]
    <tag_n) [tag_n_attr = "tag_n_attr_data"]>(data_n)</(tag_n)>
</USG> where:
(RESULTCODE) is either "OK" or "ERROR";
(UI) is the gateway device ID;
(USG_IP_ADDR) is the IP address of the gateway device;
(tag_n) is a data name tag;
(tag_n_attr) is an optional attribute name tag;
(tag_n_attr_data) is optional attribute data; and
(data_n) is the data associated with a data name tag.

As indicated, all XML responses returned following an XML command will contain error information. In this regard, the attribute RESULT will be assigned either "OK" or "ERROR". If an error did occur, two additional tag/data pairs will be added as part of the response form, namely, error_num and error_desc. The error number data will contain an integer number representing the error that occurred, while the error description data will be a readable textual description of the error.

While a variety of commands and responses can be established based upon the foregoing XML command and response formats, examples of several particular commands that could be issued by a billing and content server 26 to the gateway device 12, requesting either room administration or user administration, are provided below. The resulting responses provided by the gateway device are also provided. However, the following commands and responses are for purposes of illustration only and should not be construed as limitations of the type of XML commands and responses that can be formulated.

Regarding room administration, the billing and content server 28 can issue an XML command to set the access mode of a specified room that includes the following command, command attribute, command attribute data, and tag/data pair:

| | |
|---|---|
| Command: | "ROOM_SET_ACCESS" |
| Command attr: | "ROOM_NUMBER" |
| Command attr_data: | Room number (8 char. max string) |
| tag_1: | "ACCESS_MODE" |
| data_1: | "ROOM_OPEN," "ROOM_CHARGE," or "ROOM_BLOCK" |

In response, the gateway device 12 would typically issue a standard XML response indicating that the command was received and implemented appropriately or that an error occurred.

Also with respect to room administration, a billing and content server 26 can issue a command querying the gateway device 12 regarding the access mode of a specified room. In this regard, the query room status command could include the following command, command attribute, and command attribute data:

| | |
|---|---|
| Command: | "ROOM_QUERY_ACCESS" |
| Command attr: | "ROOM_NUMBER" |
| Command attr_data: | Room number (8 char. max string) |

In response, the gateway device 12 could return a standard response, including the following tags and data in which the room access mode is selected from one of "room_open", "room_charge" or the "room_block":

| | |
|---|---|
| tag_1 = "ROOM_NUMBER" | |
| data_1 = (room number) | |
| tag_2 = "ACCESS_MODE" | |
| data_2 = (room access mode) | |

With respect to user administration, the billing and content server 26 can issue a command to add or update a user that has been authorized for access and should now be added to the MAC authorization table, that is, a memory table maintained by the gateway device 12. In this regard, the XML command to add/update a user typically includes the following command, command attribute, command attribute data, and tag/data pair:

| | |
|---|---|
| Command: | "USER_ADD" |
| Command attr: | "MAC_ADDR" |
| Command attr_data: | user MAC address (string) |
| tag_1: | "USER_NAME" |
| data_1: | (user name) |
| tag_2: | "PASSWORD" |
| tag_2_attr: | "ENCRYPT" |
| tag_2_attr_data: | "TRUE" or "FALSE" |
| data_2: | (user password) |
| tag_3: | "EXPIRY_TIME" |
| tag_3_attr: | "UNITS" |
| tag_3_attr_data: | "SECONDS," "HOURS," "DAYS" |
| data_3: | (number of expiry units) |
| tag_4: | "ROOM_NUMBER" |
| data_4: | (user's room number) |
| tag_5: | "PAYMENT_METHOD" |
| data_5: | "RADIUS," "PMS," "CREDIT_CARD," or "ROOM_OPEN" |
| tag_6: | "CONFIRMATION" |
| data_6: | (confirmation code/ID) |
| tag_7: | "PAYMENT" |
| data_7: | (amount paid for access) |

In response, the gateway device 12 would typically issue a standard XML response indicating that the command was received and processed appropriately or that an error occurred.

The billing and content server 26 can also issue an XML command to delete a user who is identified by either a MAC address or a user name. In this regard, the delete user command typically includes the following command, tag and data:

| | |
|---|---|
| Command: | "USER_DELETE" |
| tag_1: | "USER" |
| tag_I_attr: | "ID_TYPE" |
| tag___attr_data: | "MAC_ADDR," or "USER_NAME" |
| data_1: | if ID_TYPE = "MAC_ADDR" then (user MAC address) |
| | if ID_TYPE = "USER_NAME" then (user name) |

In response, the gateway device 12 would typically issue a standard XML response indicating that the command was received and processed appropriately or that an error occurred.

The billing and content server 26 can also query the gateway device 12 for the current user data by issuing an XML command that includes the following command, tag and data:

| | |
|---|---|
| Command: | "USER_QUERY" |
| tag_1: | "USER" |
| tag_I_attr: | "ID_TYPE" |
| tag_I_attr_data: | "MAC_ADDR," or "USER_NAME" |
| data_1: " | " if ID_TYPE = "MAC_ADDR" then (user MAC address) |
| | if ID_TYPE = "USER_NAME" then (user name) |

In response, the gateway device 12 typically uses a standard XML response with the following tags/data pairs:

| | |
|---|---|
| tag_1: | = "MAC_ADDR" |
| data_1: | = (user MAC address) |
| tag_2: | = "USER_NAME" |
| data_2: | = (user name) |
| tag_3: | = "PASSWORD" |
| data_3: | = (user password) |
| tag_4: | = "EXPIRY_TIME" |
| tag_4_attr: | = "UNITS" |
| tag_4_attr_data: | = "SECONDS," "HOURS," "DAYS" |

| | |
|---|---|
| data_4: | = (number of expiry units) |
| tag_5: | = "ROOM_NUMBER" |
| data_5: | = (user's room number) |
| tag_6: | = "PAYMENT METHOD" |
| data_6: | = "RADIUS," "PMS," "CREDIT_CARD," "ROOM" |
| tag_7: | = "DATA_VOLUME" |
| data_7: | = (data transferred by user in Kbytes) |

The billing and content server 26 can also issue a command to check a user's identity, as specified by a MAC address, against the authorization tables maintained by the gateway device 12 or the associated AAA server. If the user is found either in the MAC or room authorization table, VALID_USER is returned along with the user authorization method, such as RADIUS, PMS, credit card or room (in instances in which the room is opened up for free internet access). If the user was not found in the MAC or room authorization tables, INVALID_USER will be returned. In any event, the XML command issued by the billing and content server typically includes the following command, command attribute and command attribute data:

| | |
|---|---|
| Command: | "USER_AUTHORIZE" |
| Command attr: | "MAC_ADDR" |
| Command attr_data: | user MAC address (string) |

In response, the gateway device 12 typically issues a standard XML response indicating that the command was received and processed appropriately or that an error occurred, and that includes the following tag and data pairs:

| | |
|---|---|
| tag_1: | = "STATUS" |
| data_1: | = "VALID_USER" or "INVALID_USER" |
| tag_2: | = "PAYMENT_METHOD" |
| data_2: | = "RADIUS," "PMS," "CREDIT_CARD," or "ROOM" |

The billing and content server 26 can also issue an XML command requesting user authorization and payment. If the authorization method that the user has selected is RADIUS, then the gateway device 12 will establish communication with the RADIUS server, authenticate the user, charge the user's account, and return the result of the authorization to the billing and content server. If the authorization method chosen by the user is PMS, the gateway device will establish communication with the PMS 28, authenticate the user, have an access fee added to the user's room bill, and return the result of the authorization to the billing and content server. In either event, the XML command issued by the billing and content server to request user authorization payment includes the following command, command attribute, command attribute data and tag and data pairs:

| | |
|---|---|
| Command: | "USER_PAYMENT" |
| Command attr: | "PAYMENT_METHOD" |
| Command attr_data: | "RADIUS" or "PMS" |
| tag_1: | "USER_NAME" |
| data_1: | (user name) |
| tag_2: | "PASSWORD" |
| tag_2_attr: | "ENCRYPT" |
| tag_2_attr_data: | "TRUE" or "FALSE" |
| data_2: | (user password) |
| tag_3: | "EXPIRY_TIME" - only if "METHOD=PMS" |
| tag_3_attr: | "UNITS" |
| tag_3_attr_data: | "SECOND", "HOURS", "DAYS" |
| data_3: | (number of expiry units) - only if METHOD="PMS" |
| tag_4: | "ROOM_NUMBER" |
| data_4: | (user's room number) |
| tag_5: | "PAYMENT" - only if METHOD="PMS" |
| data_5: | (amount charged for access) - only if METHOD="PMS" |

In response, the gateway device 12 issues a standard XML response indicating that the command was received and processed appropriately or that an error occurred, and that includes the following tag and data:

| | |
|---|---|
| tag_1: | = "CONFIRMATION" |
| data_1: | = (confirmation number/ID) |

The billing and content server 26 can also issue an XML command in instances in which a user makes an e-commerce or special service purchase that is to be charged, such as to the user's bill via the property management system 28. In this regard, the billing and content server issues an XML command that includes the following command, command attribute, command attribute data and tag and data pairs.

| | |
|---|---|
| Command: | "USER_PURCHASE" |
| Command attr: | "ROOM_NUMBER" |
| Command attr_data: | (room number) |
| tag_1: | "ITEM_CODE" |
| data_1: | (item code) |
| tag_2: | "ITEM_DESCRIPTION" |
| data_2: | (description of purchase) |
| tag_3: | "ITEM_AMOUNT" |
| data_3: | (amount of item with out tax) |
| tag_4: | "ITEM_TAX" |
| data_4: | (tax charged on item) |
| tag_5: | "ITEM_TOTAL" |
| data_5: | (total amount charged including tax) |

In response, the gateway device will issue a standard XML response indicating that the command was received and processed appropriately or that an error occurred.

Finally, the billing and content server 26 can issue an XML command in order to update cache memory by changing the status of an entry in the memory authorization table, as identified by the MAC address, from "pending" to "authorized". In this regard, the XML command can include the following command, command attribute, command attribute date and tag and data pair:

| | |
|---|---|
| Command: | "CACHE_UPDATE" |
| Command attr: | "MAC_ADDR" |
| Command attr_data: | user MAC address (string) |
| tag_1: | "PAYMENT_METHOD" |
| data_1: | "RADIUS," "PMS," "CREDIT_CARD," or "ROOM_OPEN" |

In response, the gateway device will issue a standard XML response indicating that the command was received and processed appropriately or that an error occurred.

While the foregoing XML commands and XML responses that would flow between a billing and content server 26 and a gateway device 12 have been provided by way of example in order to illustrate one particular application of the XML interface 32 or XML parser of a gateway device, the gateway device that includes an XML interface according to the present invention can be employed to communicate with the billing and content server according to a wide variety of other commands and responses. In addition, a gateway device that includes an XML interface can also be employed to communicate with a wide variety of other external devices, including a property management system 28, an external AAA server, or other external devices. In addition, the gateway device can be configured to issue the XML commands and to receive XML responses if necessary for the particular application. In any event, a gateway device that includes an XML interface facilitates communication between the gateway device and various external devices in a uniform manner, thereby avoiding having to communicate with each of the external devices according to a unique format established by the vendor of the external device. As a result, the design, implementation operation of the gateway device is greatly simplified.

Automatic User Tracking & Security in Networks

Dynamic Host Configuration Protocol (DHCP)

Dynamic Host Configuration Protocol (DHCP) was developed as a means of network administrators to assign TCP/IP configuration parameters automatically to the client computers in their networks. Because DHCP relieves network administrators of the time-consuming task of manually configuring each computer on the network, it has been well received and is currently used in 40 to 60 percent of enterprise networks today.

DHCP was designed to assign IP settings to any user joining a network, without any user authentication, from a predefined range of IP addresses. Since DHCP assigns IP addresses indiscriminately (without, for example, manually entering a MAC address for a lease reservation), it does not allow for the tracking of individual end-users. This can make tracing and diagnosing network problems very difficult for the NSP.

DHCP in the Network Service Provider Network

Under this scenario, each NSP deploys its own DHCP server to perform network configuration tasks. Any DHCP client can obtain the necessary network configuration settings to gain network access from a DHCP server (unless manual reservations are employed). Thus, if a DHCP approach is employed by the NSP, each user must be authenticated or the NSP will not be able to deny access to an unauthorized user. DHCP can also create problems with user traceability. Since clients are given an IP address from a pool of available addresses, the network administrator does not know who is using each IP address.

The traceability issue can be solved by binding MAC addresses to permanent DHCP leases (e.g., manual reservations). Several cable NSPs are using this approach. This, however, requires the NSP to manually track each user's MAC address. This approach forces the user to call a customer service representative at the NSP with his new MAC address each time he changes computers or network interface cards (NIC). This process of tracking MAC addresses requires manual intervention and is burdensome for the NSP; it is not a scalable solution for millions of subscribers.

The DHCP approach generally leads to either lengthy customer support calls or worse, on-site visits to the subscribers' homes to set configuration parameters. This process is not complete once the initial customer configuration has been established. The configuration process must be repeated each time the subscriber changes or upgrades his computer or network interface card. This places a substantial and costly customer support burden on the NSP trying to roll out residential broadband service.

Summary

In accordance with the present invention, automatic user tracking and security is provided by detecting a unique indicator of the user attempting to access the network, such as the MAC address, and then translating subsequent packets received from that user in accordance with data stored in a server.

In one embodiment of the present invention, the first time a subscriber accesses his residential network, the Nomadix solution has the ability to redirect that user to a sign-in page on his browser. Nomadix refers herein to the assignee of the present invention. Then, our adaptive networking technology creates a database that automatically records the user's MAC address once an existing customer database or security server (such as RADIUS or TACACS) authenticates the user. The Nomadix databases have been built to easily integrate with these subscriber access systems. Like a router, the Nomadix technology continues to track the IP and MAC settings for each user on the network, eliminating the need for further sign-ins. This allows the NSP to trace network problems and track usage.

In addition, the underlying dynamic NAT approach used to translate static IP addresses can create an additional layer of security for subscribers, since their private IP information never gets transmitted over the public IP.

Description

Figure 50A:
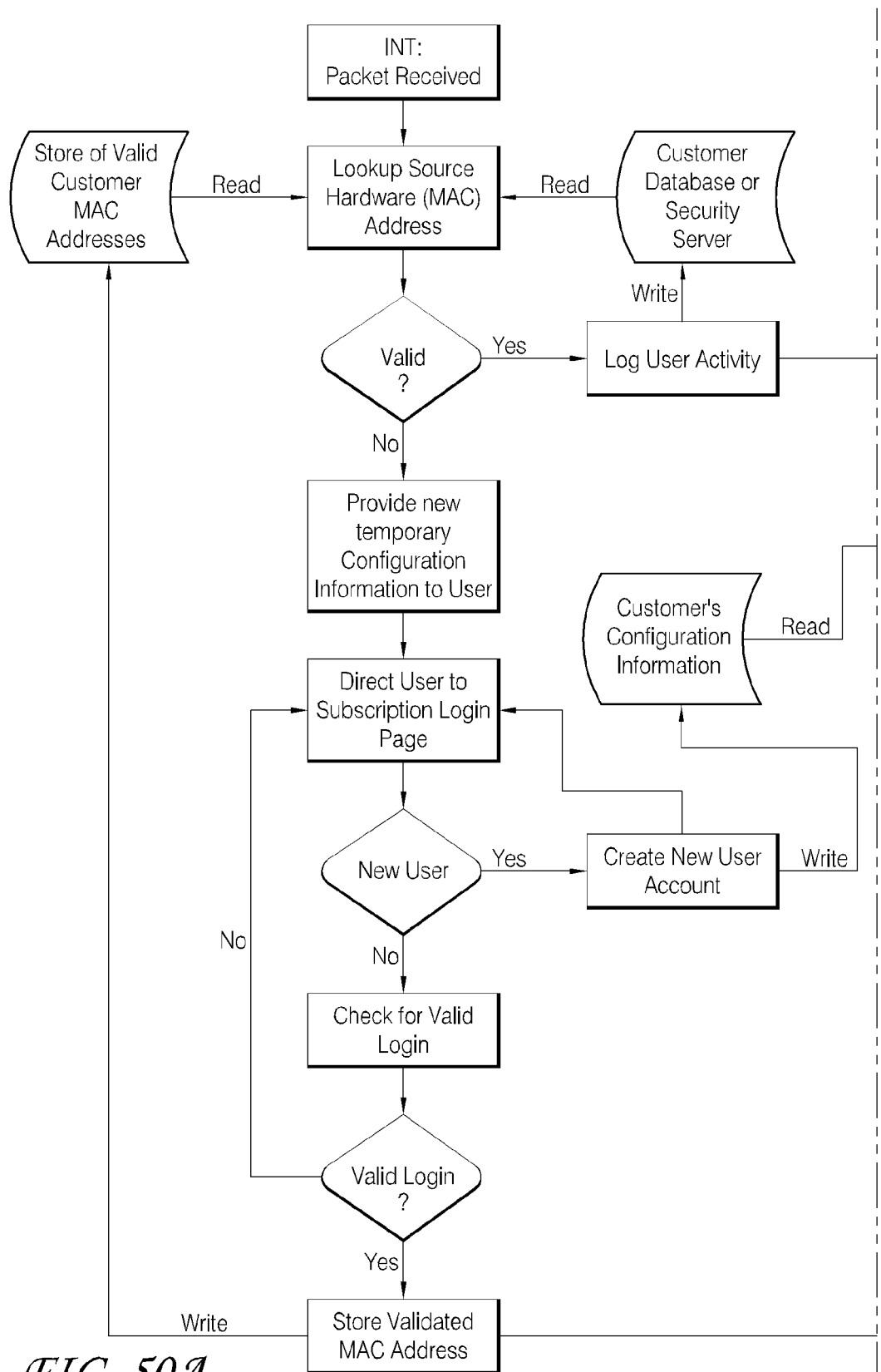
FIGS. 50A-B are a flow chart diagram of the automatic user tracking and security technology of the present invention.
Figures 50, 50B:
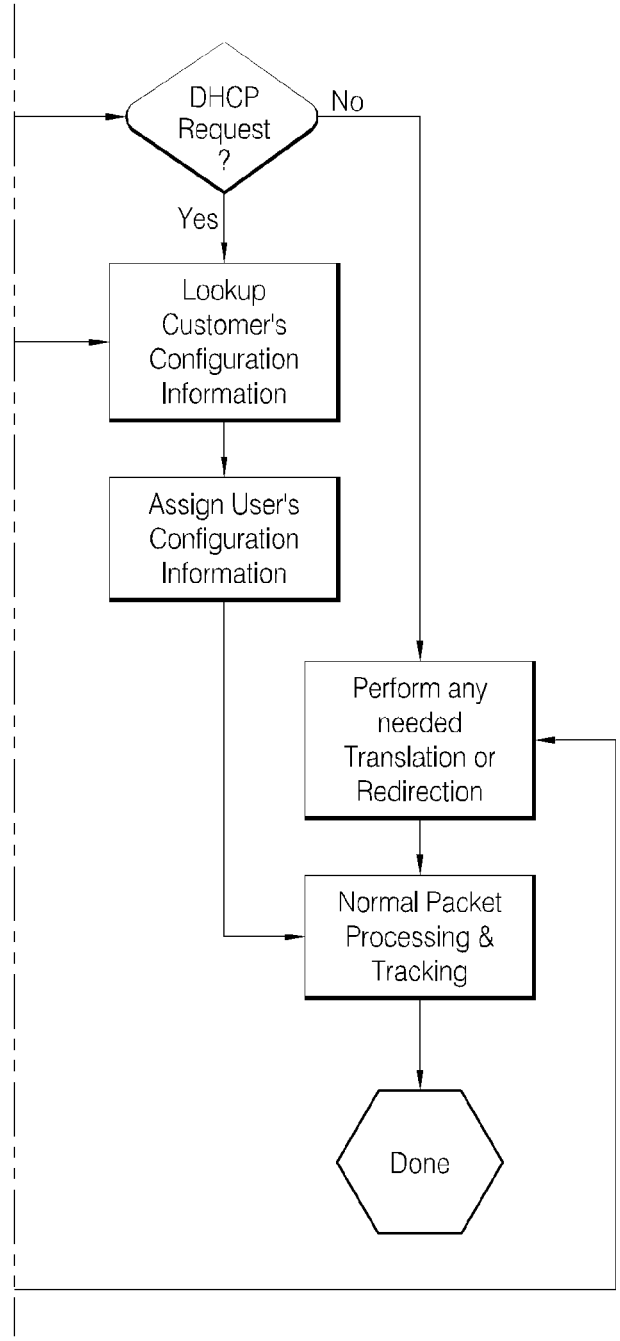
Figure 51:
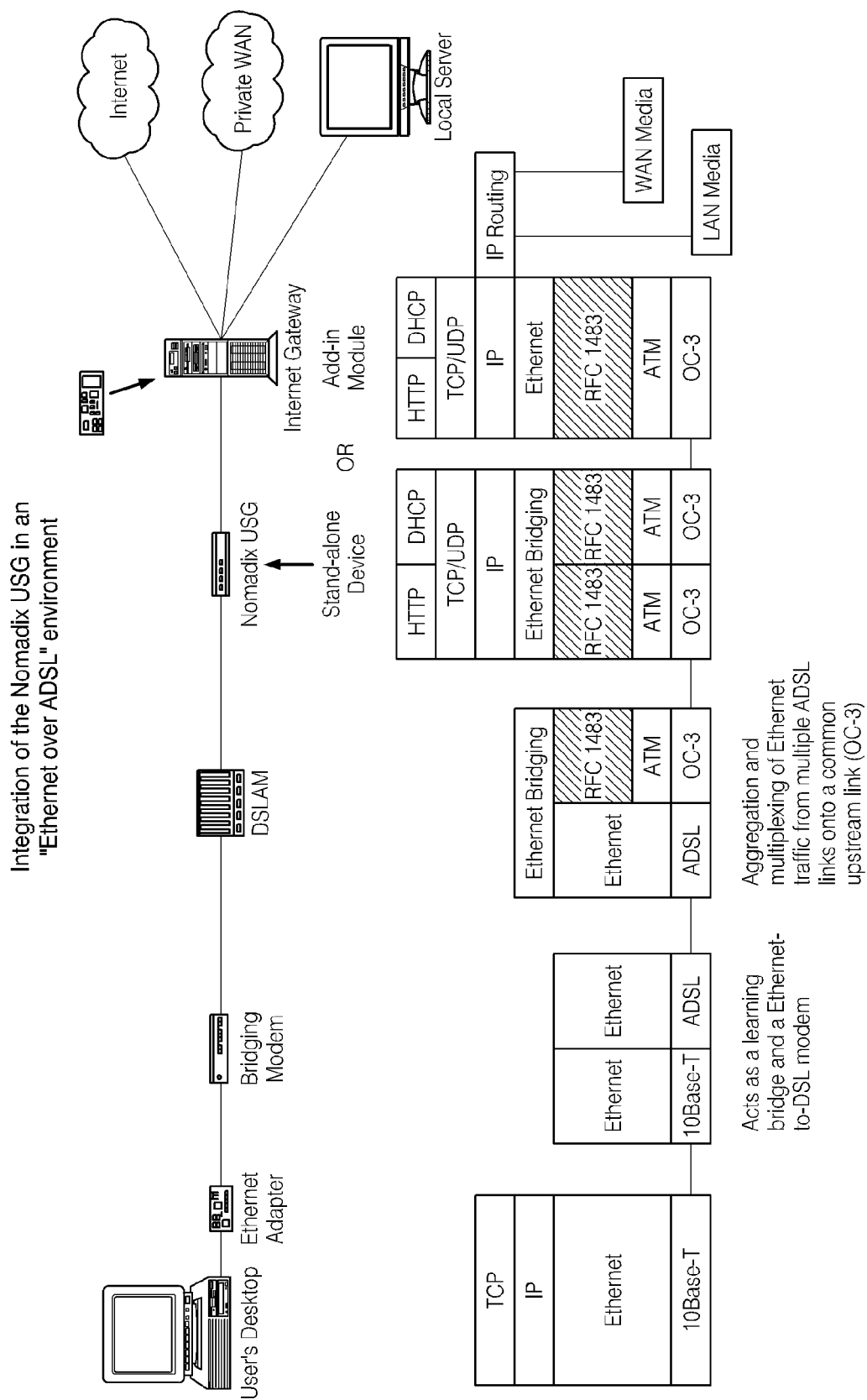
FIG. 51 is a block diagram of the integration of the USG of the present invention in an Ethernet over ADSL environment.
Figure 52:
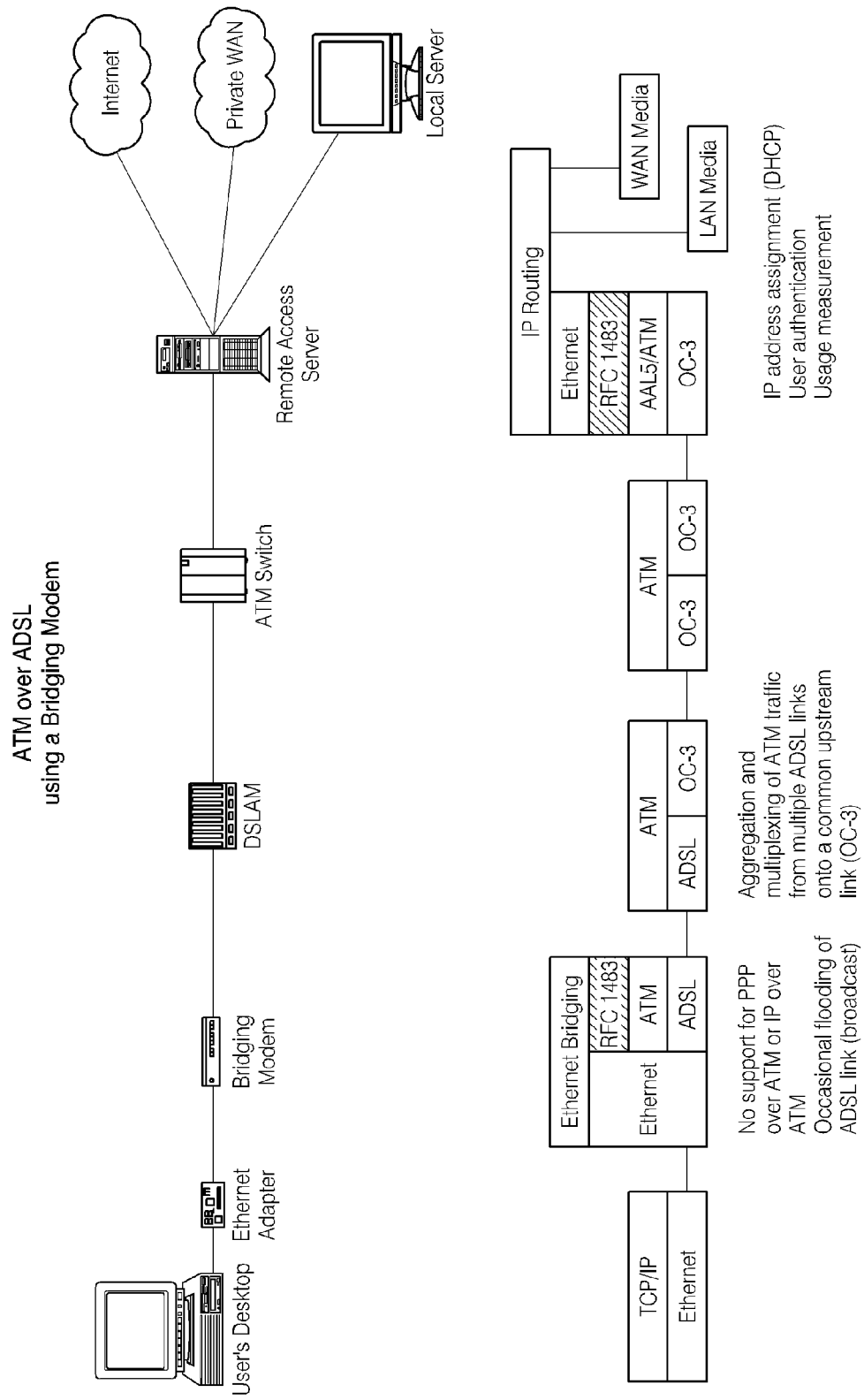
FIG. 52 is a block diagram illustration of ATM over ADSL using a Bridging Modem.
Figure 53:
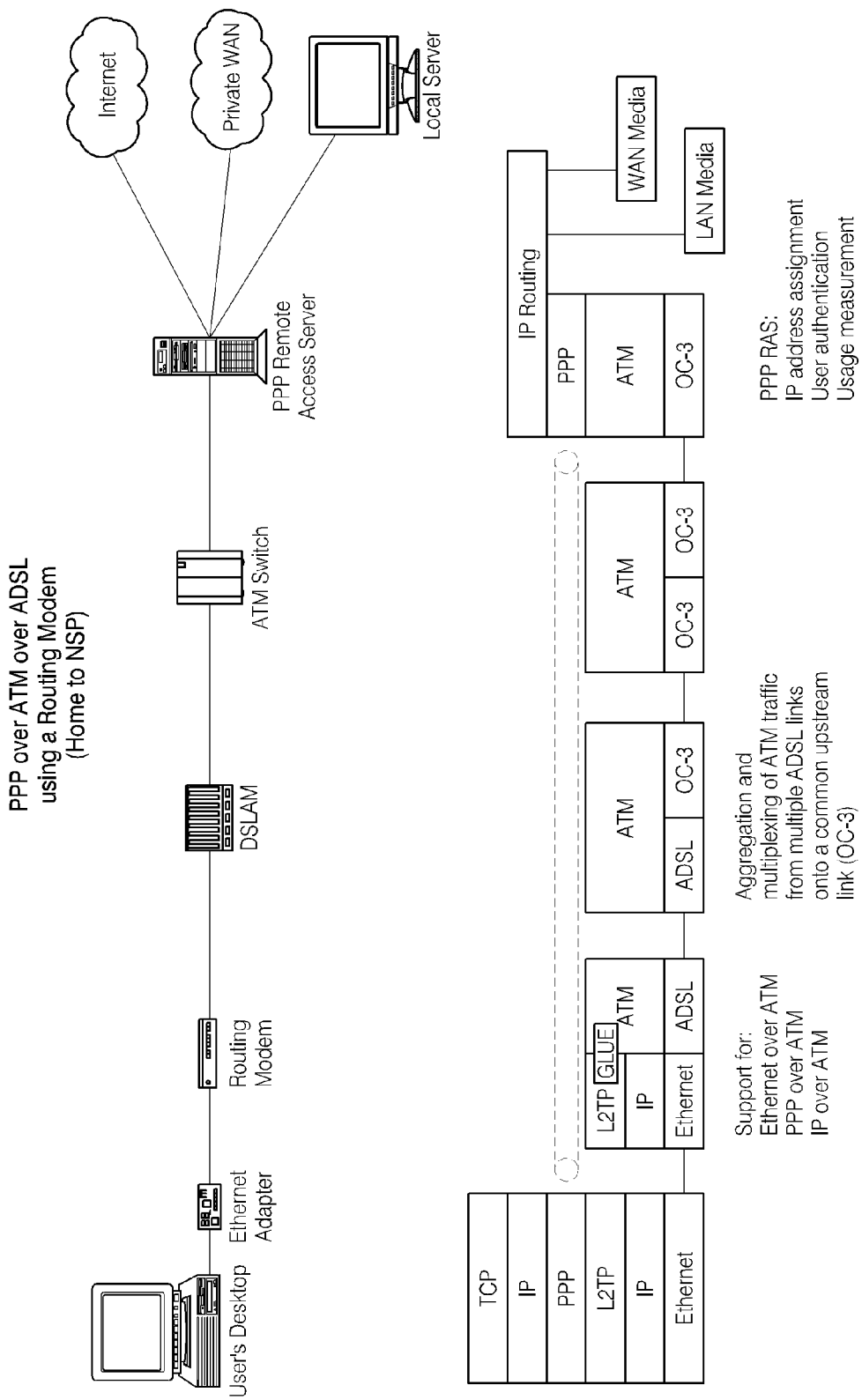
FIG. 53 is a block diagram illustration of PPP over ATM over ADSL using a Routing Modem from a home User to the NSP.
Figure 54:
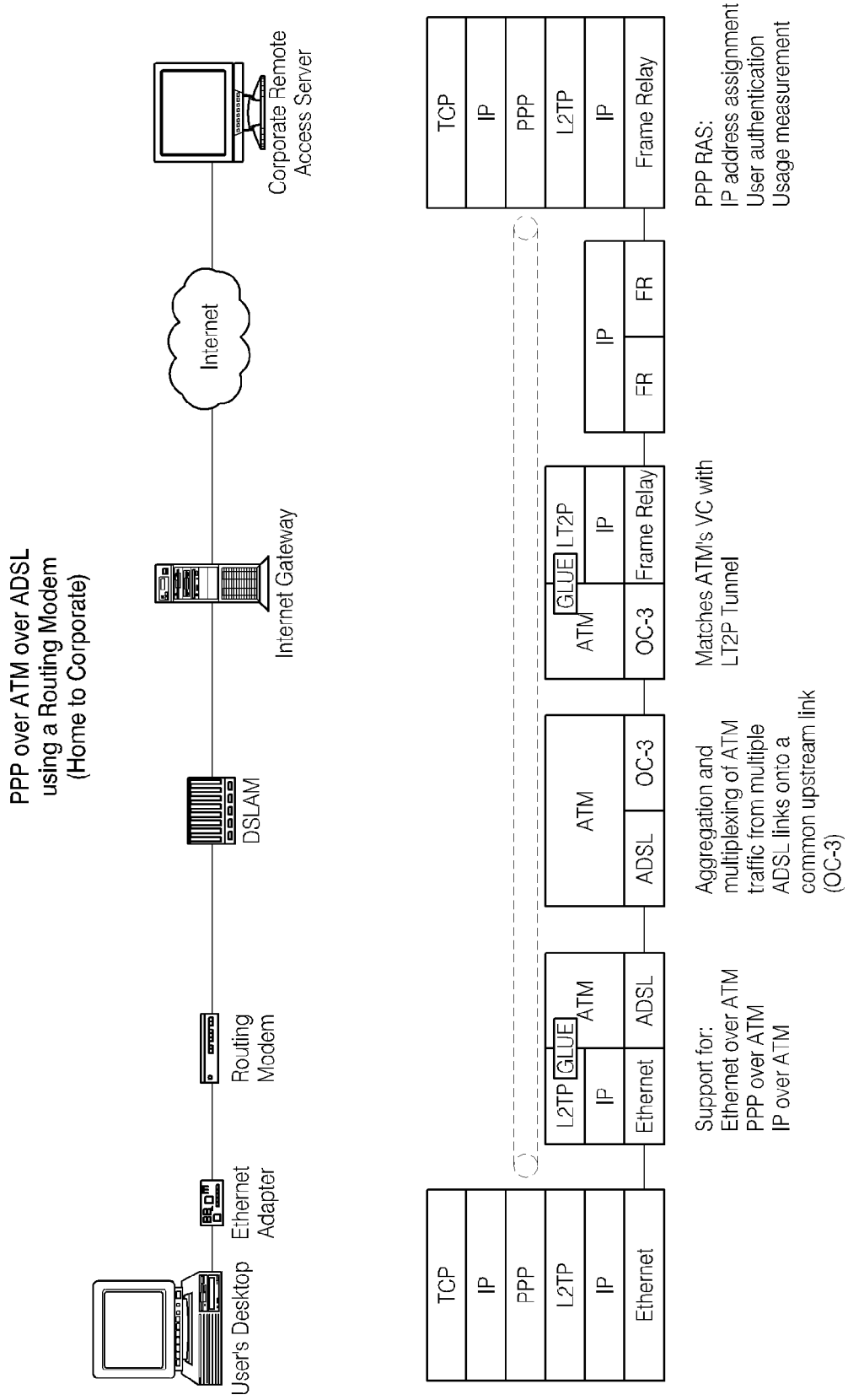
FIG. 54 is a block diagram illustration of PPP over ATM over ADSL using a Routing Modem from a home User to a corporate server.
Figure 55:
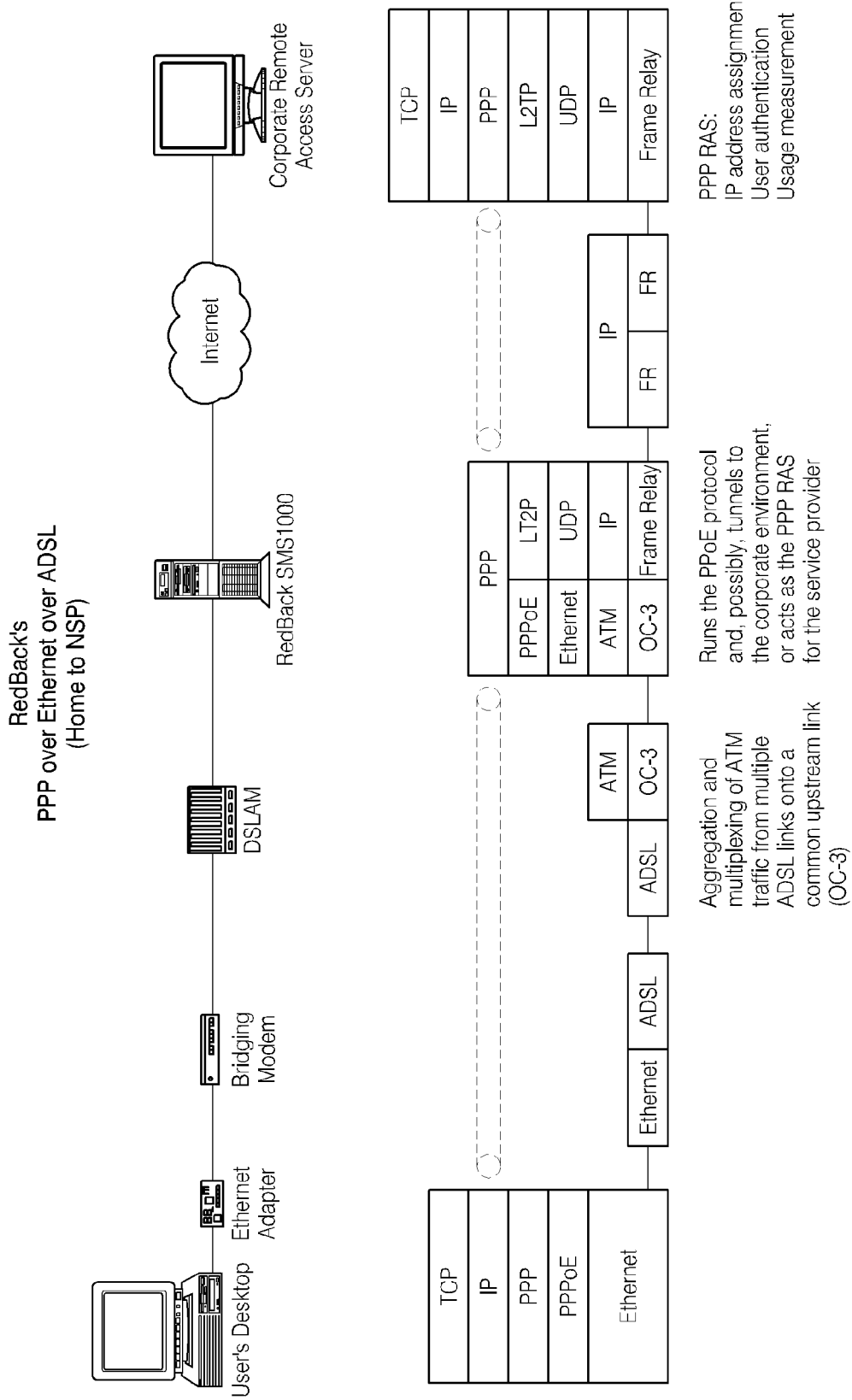
FIG. 55 is a block diagram illustration of PPP over Ethernet over ADSL using RedBack technology from a home User to the NSP.
Figure 56:
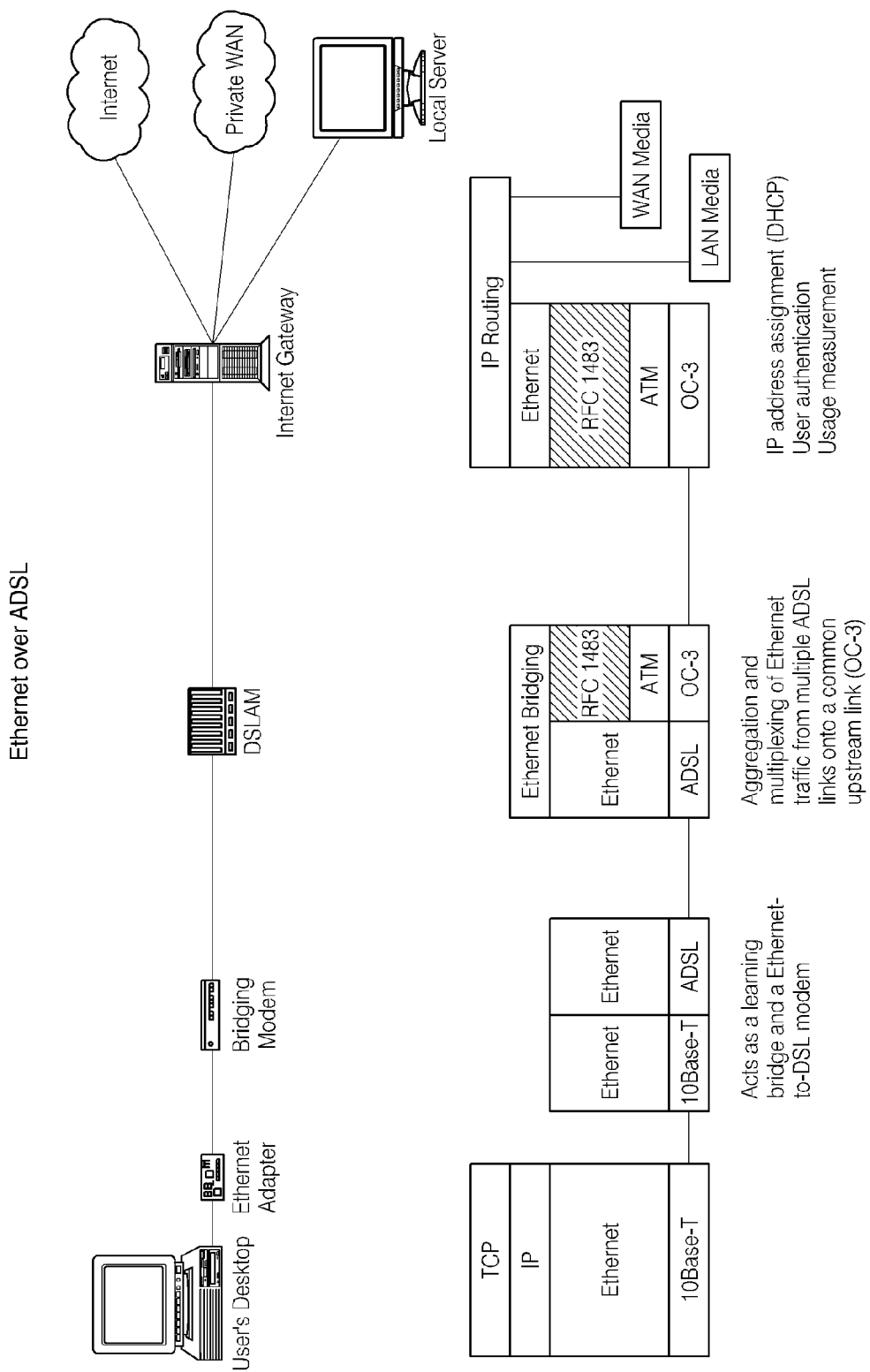
FIG. 56 is a block diagram illustration of Ethernet over ADSL from a user to an Internet Gateway.

Referring now generally to all attachments and figures, and in particular to FIG. 50, when a packet is received, the MAC address within the packet is compared to the store of valid customer MAC address. If the packet is from a valid MAC address, the user activity is logged. A dynamic host configuration protocol (DHCP) is processed by looking up the customer's configuration from a previously prepared database and assigning the User's configuration to the packet which is then processed in the normal manner. If no DHCP request is made, the packet is translated or redirected as required before normal processing.

If the received packet does not include a valid MAC address, temporary new configuration information is provided to the User who is then directed to a Subscription login page to create a new account. The User's customer configuration is then written into a data base for later lookup in response to a DCHP request. A non-new User goes through a login validation after which the MAC address is stored for later look up.

Referring now to FIGS. 12A-D, the above described secure DHCP technique can be provided in an alternate embodiment of the Nomadic Router (NR) as shown and described herein. Whenever a computer generates a packet on the network and it is received from the NR as shown in FIG. 11A step 4, the packet will be checked to see if it is coming from a validated MAC address as shown in FIG. 50. If the valid packet is a DHCP request then option 3 of the Host Learning Section herein is used, otherwise interception and address translation is performed as option 1 or 2 of the Host Learning section herein.

One embodiment for performing the step of providing any needed translation or redirection, as specified in FIG. 50, is described in steps 5, 6, and 7 of FIG. 11A. Similarly, the step of Normal Packet Processing and Tracking is performed in step 8 of FIG. 11A.

Authorizing, Authenticating and Accounting Users Having Transparent Computer Access to a Network Using a Gateway Device A system and method for authorizing, authenticating and accounting users having transparent access to a destination network, wherein the users otherwise have access to a home network through home network settings resident on the user's computers, and wherein the users can access the destination network without altering the home network settings and without installing software on the user's computer. The system includes a gateway device for receiving a request from a user for access to the destination network, and means for identifying an attribute associated with the user based upon a packet received by the gateway device, wherein the packet is transmitted from the user's computer, and wherein the user's computer is configured for accessing the home network. The system also includes a user profile database comprising stored access information and in communication with the gateway device, wherein access information corresponding to the user is identified by the attribute associated with the user. Furthermore, the system includes an Authentication, Authorization and Accounting (AAA) server where the AAA server determines if user is entitled to access the destination network based upon the access information stored within the user profile database. The method of the invention includes receiving at a gateway device a request from a user for access to the destination network, identifying an attribute associated with the user based upon a packet received by the gateway device, wherein the packet is transmitted from the user's computer, and wherein the user computer remains configured for accessing the home network, and wherein no additional configuration software need be installed on the user computer. A user profile corresponding to the user and stored in a user profile database is accessed, where the user profile is accessed based upon the attribute associated with the user, and determination is made based upon the user profile as to whether the user is entitled to access the destination network.

In order for a computer to function properly in a network environment, the computer must be appropriately configured. Among other things, this configuration process establishes the protocol and other parameters by which the computer transmits and receives data. In one common example, a plurality of computers is networked to create a local area network (LAN). In the LAN, each computer must be appropriately configured in order to exchange data over the network. Since most networks are customized to meet a unique set of requirements, computers that are part of different networks are generally configured in different manners in order to appropriately communicate with their respective networks.

While desktop computers generally remain a part the same network for a substantial period of time, laptops, handhelds, personal digital assistants (PDAs), cellphones or other portable computers (collectively "portable computers") are specifically designed to be transportable. As such, portable computers are connected to different networks at different times depending upon the location of the computer. In a common example in which the portable computer serves as an employee's desktop computer, the portable computer is configured to communicate with their employer's network, i.e., the enterprise network. When the employee travels, however, the portable computer may be connected to different networks that communicate in different manners. In this regard, the employee may connect the portable computer to the network maintained by an airport, a hotel, a cellular telephone network operator or any other locale in order to access the enterprise network, the Internet or some other on-line service. The portable computer is also commonly brought to the employee's residence where it is used to access various networks, such as, the enterprise network, a home network, the Internet and the like. Since these other networks are configured somewhat differently, however, the portable computer must also be reconfigured in order to properly communicate with these other networks. Typically, this configuration is performed by the user each time that the portable computer is connected to a different network. As will be apparent, this repeated reconfiguration of the portable computer is not only quite time consuming, but is also prone to errors. The reconfiguration procedure may even be beyond the capabilities of many users or in violation of their employer's IT policy. Accordingly, special software must also typically be loaded onto the user's computer to support reconfiguration.

As described by U.S. patent application Ser. No. 08/816,174 and U.S. Prov. Pat. Apps. Nos. 60/111,497, 60/160,973, 60/161,189, 60/161,139, 60/160,890 and 60/161,182, a universal subscriber gateway device has been developed by Nomadix, Inc. of Westlake Village, Calif. The contents of these applications are incorporated herein by reference. The gateway device serves as an interface connecting the user to a number of networks or other online services. For example, the gateway device can serve as a gateway to the Internet, the enterprise network, or other networks and/or on-line services. In addition to serving as a gateway, the gateway device automatically adapts to a computer, in order that it may communicate with the new network in a manner that is transparent both to the user and the new network. Once the gateway device has appropriately adapted to the user's computer, the computer can appropriately communicate via the new network, such as the network at a hotel, at home, at an airport, or any other location, in order to access other networks, such as the enterprise network, or other online services, such as the Internet.

The portable computer user, and more specifically the remote or laptop user, benefits from being able to access a myriad of computer networks without having to undergo the time-consuming and all-too-often daunting task of reconfiguring their host computer in accordance with network specific configurations. In addition, no additional software need be loaded onto the computer prior to connection to the other network. From another perspective, the network service provider benefits from avoiding "on-site" visits and/or technical support calls from the user who is unable to properly re-configure the portable computer. In this fashion, the gateway device is capable of providing more efficient network access and network maintenance to the user and the network operator.

Gateway devices are typically used to provide network access to the remote portable computer user, such as users in hotels, airports and other locations where the remote portable computer user may reside. Additionally, gateway devices have found wide-spread use in multi-resident dwellings as a means of providing the residents an intranet that networks the residents, broadband Internet access and the capability to adapt to the variances of the resident's individual enterprise networks. With the advent of even smaller portable computing devices, such as handhelds, PDAs, and the like, the locations where these users may reside becomes almost limitless.

User access to computer networks has been traditionally based upon the identity of the computer or computer user rather than the location of the accessing computer. For example, in conventional dial up modem access to computer networks, such as the Internet, a user must typically enter identification information such as the user's name and password. This user input information is then compared to a database of user profiles to determine if the user should be granted access. The database may also indicate the type of access and other related information, such as fees due. For example, where a subscriber to an Internet Service Provider (ISP) has purchased Internet access, a user profile database may contain information which not only enables the user to be authenticated, but tracks the user's access for accounting purposes, such as maintaining a history of the user's access time on the network.

However, where the location-based access is established, access to the network cannot be based upon an individual user or computer, as multiple persons can obtain access from a given location, possibly utilizing different computers. Moreover, requiring each user to enter identification information for access overrides any convenience offered by simple, transparent location-based access to computer networks. Transparent network access is also impeded where access is not based upon location-based identification, but rather based upon user input identification information, where the gateway device enables a user to access networks based upon the user's computer settings. For instance, if a user's computer is configured to access a home network, identifying the computer may require the computer to be reconfigured.

Typical network access servers typically allow access to a server based upon a user's information, such as a user name. Authentication was typically done via a user name and password, which is an all or nothing approach. In other words, a user is either allowed access or denied access to a network. Therefore, users cannot be dynamically authorized access to a network such that the user's access and authorization to particular networks or sites can be determined and varied based upon attributes associated with the user, user's location, or packets received from the user's computer.

What is needed is an AAA method and system that allows users dynamic access based upon any number of variables, such as a user's location, a user name or password, a user's location. It would be advantageous for a user to be authorized access based on these variables. Furthermore, it would be advantageous for users to have flexible access to particular sites or services based upon these attributes. Therefore, an ISP or enterprise network can selectively permit access to users, and permit the user.

Therefore, an Authentication, Authorization and Accounting method and system would be desirable which enables a user transparent access to a computer network employing a gateway device, where the computer network can dynamically and selectively authorize a network access. Furthermore, authentication and access rights can be transparently based upon the location from which access is requested, or based upon another attribute associated with the user's computer so that the user is not required to be queried for information and no additional configuration software need be loaded on the user's computer. Moreover, if the user is queried for access information, the user's data should be stored such that subsequent attempts to access the network do not require the user to establish authorization.

Summary

The present invention comprises a method and system for selectively implementing and enforcing Authentication, Authorization and Accounting (AAA). The authentication capability can be based upon multiple methods. First, AAA can be done based upon where the traffic is originating, such as a location, computer, circuit, or user. Secondly, the authentication and authorization capability can be based upon the type of services the user is attempting to access, such as a destination address. This can be a destination port or Internet address, a TCP port, a network. Third, AAA can be based upon the content type or protocol being transmitted. For example, each packet can be filtered through the selective AAA process, so that a user can be authorized access to a particular location. Each time the user attempts to access a different location, the user is subject to the AAA, so the user may be prevented access from a particular site the AAA method deems inaccessible to the user based upon the user's authorization. Alternatively, the AAA method according to the present invention allows users to connect directly to a specific site, such as credit card or billing servers which collect billing information, which can indicate that the user has paid, so that the user is thereafter authorized access to networks. Additionally, a user's authorization can depend upon a specific time, so that the user can be kicked off a network at a specific time, after a specific time has elapsed, or according to other dynamic information determined by the network provider.

According to one embodiment of the invention, a method for transparently authorizing, authenticating and accounting users having access to a destination network is disclosed, wherein the users otherwise have access to a home network through home network settings resident on the users' computers, and wherein the users can access the destination network without altering the home network settings. The method includes receiving at a gateway device a request from a user for access to the destination network and identifying an attribute associated with the user based upon a packet received by the gateway device, wherein the packet is transmitted from the user's computer, wherein the user computer remains configured for accessing the home network, and wherein no additional configuration software need be installed on the user computer. The method also includes accessing a user profile corresponding to the user and stored in a user profile database, where the user profile is accessed based upon the attribute associated with the user, and determining if the user is entitled to access the destination network based upon the user profile.

According to one aspect of the invention, a location identifier is assigned to the location from which the request for access to the destination network is transmitted, where the location identifier is the attribute associated with the user. Thus, the packets received by the gateway device indicate the locations from which the requests were transmitted. The location identifier may be a virtual local area network (VLAN) ID assigned to the location from which the request for access was transmitted.

Furthermore, according to one aspect of the method of the present invention, the user profile database can be updated when new users access the destination network such that the user can be quickly authorized access once identified by a user name or password. Additionally, a historical log of user access to the destination network may be maintained in respective user profiles so that the system can accurately bill users for access to the destination network.

According to the method of the present invention, determining if the user is entitled to access the destination network can include denying the user access where the user's profile indicates that the user is denied access. However, the user may be directed to a login page in instances which the user's profile is not located within the user profile database.

According to another embodiment of the invention, a system for authorizing, authenticating and accounting users having transparent access to a destination network is disclosed, where the users otherwise have access to a home network through home network settings resident on the users' computers, and wherein the users can access the destination network without altering the home network settings. The system includes a gateway device for receiving a request from a user for access to the destination network, and means for identifying an attribute associated with the user based upon a packet received by the gateway device, wherein the packet is transmitted from the user's computer, wherein the user's computer is configured for accessing the home network, and wherein no additional configuration software need be installed on the user computer. The system also includes a user profile database comprising stored access information that is in communication with the gateway device, wherein access information corresponding to the user is identified by the attribute associated with the user, and an Authentication, Authorization and Accounting (AAA) server in communication with the gateway device and user profile database, where the AAA server determines if user is entitled to access the destination network based upon the access information stored within the user profile database.

According to one aspect of the invention, the means for identifying can be provided by an access concentrator in communication with the gateway device. Furthermore, the packet transmitted to the gateway device can include a VLAN ID, a circuit ID, or a media access control (MAC) address for identifying the location from which the request for access was transmitted.

The user profile database includes a plurality of user profiles, wherein each respective user profile of the plurality of user profiles contains access information, and where each respective user profile contains historical data relating to the duration of destination network access for use in determining the charges due for the destination network access. Additionally, the user profile database can be located within the AAA server. The AAA server, can, in turn, be located within the gateway device.

The Authentication, Authorization and Accounting method and system according to the present invention enables users transparent access to a computer network employing a gateway device, where the computer network can authenticate and authorize access rights based upon the location from which access is requested, or based upon another attribute associated with the user in a manner transparent to the user. In this regard, the method and system of the present invention permit Authentication, Authorization and Accounting without requiring the user to reconfigure their computer and without requiring additional configuration software to be loaded upon the user's computer.

Description

Referring now to FIG. 36, a computer system 10 including a gateway device 12 is depicted in block diagram form. The computer system 10 typically includes a plurality of computers 14 that access a computer network in order to gain access to networks 20 or other online services 22. For example, the computers 14 can be plugged into ports that are located in different rooms of a hotel, business, or a multi-dwelling unit. Alternatively, the computers 14 can be plugged into ports in an airport, an arena, or the like. The gateway device 12 provides an interface between the plurality of computers 14 and the various networks 20 or other online services 22. One embodiment of a gateway device has been described by the aforementioned U.S. patent application Ser. No. 08/816,174.

Most commonly, the gateway device 12 is located near the computers 14 at a relatively low position in the overall network (i.e., the gateway device 12 will be located within the hotel, multi-unit residence, airport, etc.). However, the gateway device 12 can be located at a higher position in the system by being located closer to the various networks 20 or other online services 22, if so desired. Although the gateway device 12 can be physically embodied in many different fashions, the gateway device 12 typically includes a controller and a memory device in which software is stored that defines the operational characteristics of the gateway device 12. Alternatively, the gateway device 12 can be embedded within another network device, such as an access concentrator 16 or a router 18. For example, the gateway device 12 could be located at a network operating center or could be located before or after a router 18 in the computer network. Moreover, the software that defines the functioning of the gateway device 12 can be stored on a PCMCIA card that can be inserted into a computer of the plurality of computers 14 in order to automatically reconfigure the computer to communicate with a different computer system, such as the networks 20 and online services 22.

The computer system 10 typically includes an access concentrator 16 positioned between the computers 14 and the gateway device 12 for multiplexing the signals received from the plurality of computers onto a link to the gateway device 12. Depending upon the medium by which the computers 14 are connected to the access concentrator, the access concentrator 16 can be configured in different manners. For example, the access concentrator can be a digital subscriber line access multiplexer (DSLAM) for signals transmitted via regular telephone lines, a cable head end for signals transmitted via coaxial cables, a wireless access point (WAP) for signals transmitted via a wireless network, a cable modem termination shelf (CMTS), a switch or the like. As also shown in FIG. 36, the computer system 10 typically includes one or more routers 18 and/or servers (not shown in FIG. 36) to control or direct traffic to and from a plurality of computer networks 20 or other online services 22. While the computer system 10 is depicted to have a single router, the computer system 10 can have a plurality of routers, switches, bridges, or the like that are arranged in some hierarchical fashion in order to appropriately route traffic to and from the various networks 20 or online services 22. In this regard, the gateway device 12 typically establishes a link with one or more routers. The routers, in turn, establish links with the servers of other networks or other online service providers, such as internet service providers, based upon the user's selection. It will be appreciated by one of ordinary skill in the art that one or more devices illustrated in FIG. 36 may be combinable. For example, although not shown, the router 18 may be located entirely within the gateway device 12.

Communication between users and networks or online services may be effectuated through ports, for example, located within hotel rooms or multi-dwelling units, or through conventional dial-up communications, such as through the use of telephone or cable modems. According to one aspect of the invention, users can be/are redirected to portal page, as described below. After being redirected to the portal page, the user is subjected to a AAA process. Based upon the AAA process, the user may be permitted transparent access to the destination network or may be redirected to a login page in order to gather additional information to identify the user.

Identifying the user is crucial in authorizing access to networks or online services, as such services are typically provided for a fee and may be customized based upon the user, user's location, or user's computer. As such, the system of the present invention includes means for identifying a user based upon an attribute associated with the user that is contained within the packet transmitted from the user's computer. Attributes can include information such as the source, destination and type of traffic. In general, identifying a user's computer that accesses the network can be done by a MAC address associated with the user's computer. Identifying a user accessing a network based upon a MAC address is well known to those of skill in the art, and will not be discussed in detail herein. Additionally, the attribute can be based upon a user name and ID, or according to one advantageous embodiment, a particular location, such as from a communications port in a hotel room. Such location-based identification in computer systems employing VLAN tagging and those not employing VLAN tagging according to the present invention will first be described. However, it should be appreciated that location based authorization is just one method of identifying a user which may be authenticated, authorized and accounted according to the present invention. As stated above, a user's computer can be identified based on a MAC address associated with the computer. A user can also be identified based upon a username and password. Additionally, a user can be identified according to a combination of these attributes.

The authentication capability can be based upon multiple methods. First, AAA can be done based upon where the traffic is originating, such as a location, computer, circuit, or user. Secondly, the authentication and authorization capability can be based upon the type of services the user is attempting to access, such as a destination address. This can be a destination port or Internet address, a TCP port, a network. Third, AAA can be based upon the content type or protocol being transmitted. For example, each packet can be filtered through the selective AAA process, so that a user can be authorized access to a particular location. Each time the user attempts to access a different location, the user is subject to the AAA, so the user may be prevented access from a particular site the AAA method deems accessible to the user based upon the user's authorization. Alternatively, the AAA method according to the present invention allows users to connect directly to a specific site, such as credit card or billing servers which collect billing information, which can indicate that the user has paid, so that the user is thereafter authorized access to networks. Additionally, a user's authorization can depend upon a specific time, so that the user can be kicked off a network at a specific time, after a specific time has elapsed, or according to other dynamic information determined by the network provider.

Therefore, AAA can be based upon the source, destination, and type of traffic. Upon receiving a packet, the AAA module will look at various parameters such as the link layer information, such as the circuit, source MAC address, VLAN tag, circuit ID, along with network information such as source IP addresses, source port. This source information is stored into a AAA subscriber table. Secondly, information is gathered about the destination, such as the destination IP addresses, destination port, to determine what type of authentication is needed to access particular services. Third the packet is interrogated to receive information such as the protocol type, port or the packet type to determine what type of authentication is required for a packet to be authorized for network access. Once this information is gathered, a matching of the authentication requirements versus the authorization is applied. If there is a match, the packet is forwarded and allowed access. If this match fails, the subscriber information for that packet is set as pending for authorization. Pending for authorization packets require further authentication and authorization before being allowed to access the system. Authorization can be determined based upon the attributes determined by the packet, or if not matched, the user will have to provide authentication, which can be described in the HPR patent, U.S. Pat. No. 6,636,894, issued Oct. 21, 2003, filed Dec. 8, 1999, entitled "Systems and Methods For Redirecting Users Having Transparent Computer Access To A Network Using A Gateway Device Having Redirection Capability," incorporated elsewhere herein.

For example, once the gateway device identifies the location from which access is requested, such as from a specific port of a hotel room, the gateway device can then determine the access rights of the user at that specific location. It should be appreciated that as an alternative to location-based identification the gateway device may identify a user or a user's computer based upon attributes other than location. For example, the gateway device may receive a MAC address identifying a particular user's computer (for example, a user in communication with the gateway device through a conventional modem), as is well known in the art, although the embodiments described herein will refer primarily to location-based identification as described above. Additionally, a user can be identified by the gateway device based upon a user ID and password which the user can input in response to a query for such information. This is discussed below and in U.S. Pat. No. 6,636,894, issued Oct. 21, 2003, in the name of inventor Short et al., entitled "Systems and Methods for Redirecting Users Having Transparent Computer Access to a Network Using a Gateway Device Having Redirection Capability," incorporated elsewhere herein. In addition, a user staying in a particular hotel room may be authorized access based upon the user's location. Alternatively, the user can be authorized access to the network and online services based upon the user's identification, or the user's computer, regardless where the user is obtaining access. Furthermore, access may be associated with a combination of attributes. For example, a user may be authorized access to a network where the user has input the user's identification and has accessed the network from a particular room. Such a requirement could prevent unauthorized users also staying in a particular room from obtaining network access.

Regardless of the means in which access is obtained and an attribute associated with the user is identified, access rights of users are determined according to an AAA method implemented by a AAA server. According to one embodiment of the present invention, the AAA server is located entirely within the gateway device. Alternatively, the AAA server can also be located external to the gateway device.

One function of the AAA server is to identify the user in communication with the gateway device in a manner that is transparent to the user. That is, the user will not be required to reconfigure the computer or otherwise change the home network settings, and no additional configuration software will have to be added to the computer. After a packet is received by the gateway device, as described in detail above, information contained within the packet is stored within a subscription table. The subscription table is a database of user information. In particular, the subscription table can maintain any information or attribute known about a user, including a circuit ID or MAC address, such that a particular user or user location can be identified upon accessing the computer system. After a packet is received, and attributes associated with a user are obtained, information corresponding to the packet is received from the subscription table. It will be appreciated by those of skill in the art that the packet may identify the location of the port from which access is obtained based upon location-based authorization, as described above, or a specific computer based upon a MAC address, as is well known in the art. Regardless of connection means however, any attribute or anything known about the user or location of the traffic, can be stored in the subscriber table. The subscription table and information stored therein may be stored in a computer readable storage medium, as well known in the art, that is either disposed within the gateway device or external.

After receiving a request for access from a user and identifying the user or location through the use of the subscription table, the AAA server then determines the access rights of the particular user. What is done with the user depends upon information contained in the user's profile. Profiles of all users (i.e., identified by MAC address or by location or by some other attribute) are stored in a user profile database, which may be located internal to or external to the gateway device. It will be appreciated by those of skill in the art that although the user profile database is discussed herein as being separate and distinct from the subscription table, the two databases may be combined into one database containing both user subscription data as well as user profile data.

The user's profile can contain information that is based upon the user or the user's location (as established by location-based identification), and generally includes information concerning the access rights of a user or location. For example, the user profile database may establish that a user with a given MAC address has purchased access, or that a given circuit ID has free access or unlimited access. Guests in a particular room or rooms of a hotel, for example, suites and penthouses, may receive free unlimited internet access. Therefore, access rights can be available contingent upon the user's location (e.g., room) or location status (e.g., suite). In this event, no further identification is required, as the location from which the users are requesting access is known to the gateway device and stored in the subscription table.

In addition to storing whether users have valid access rights, the user profile database can also include specialized access information particular to a specific location or user, such as the bandwidth of the user's access, or a homepage to which a user should be directed. For example, a user accessing the network from a penthouse may receive a higher access band rate than someone accessing the destination network from a typical hotel room. Additionally, a user profile can include historical data relating to a user's access to the network, including the amount of time a user has accessed the network. Such historical information can be used to determine any fees which may be charged to the user, or due from the user, for access. Specialized access information contained within the user profile may be established by the system administrator, or by the user who has purchased or otherwise established access to the network. For example, where a user is transparently accessing the gateway device from a hotel room, the hotel network administrator may enter user access information into the profile database based upon access rights associated with a room in the hotel. This can also be done automatically by the gateway device or a local management system, such as a hotel property management system, when the user checks into his or her room. Additionally, the user may establish the information to be contained within the profile database upon first accessing the gateway device, as will be described in detail below. For instance, a new user may be directed to enter their credit card number to obtain access to the system. Whereas the subscription table initially identifies the user and maintains location information, the user profile database includes information concerning the details of the user's access privileges, as well as any specialized information for each user.

As noted above, user profile database can be maintained within the gateway device, or it can be located external to the gateway device. For example, where a hotel wishes to establish transparent network access for customers from hotel rooms, the hotel may maintain the profile database locally within the gateway device. Alternatively, if external to the gateway device, the profile database can contain the same information and be accessed by the gateway device to ascertain user's access rights. According to one embodiment of the invention, the profile database can be maintained outside of the gateway device by an internet service provider.

Upon receiving the location of a port or identity of a user transparently communicating with the gateway device, the AAA server compares the identification information contained within the packet to user profile information stored within the user profile database. This comparison may be accomplished using a computer having an operating system and software therein for comparing identification information in the received packet to records stored within the user profile database. Where users are not identified automatically based upon their location, the users may be required to identify themselves using a login and ID, so that their identification can be compared to user profiles stored within the user profile database. In an alternative embodiment of the present invention, the AAA server could query the user's computer, and more specifically, the user's browser, to obtain identification information stored therein so that the AAA server does not have to query a user for user information, thereby further making the AAA process of the present invention transparent to the user.

The user profile database may comprise programmable storage means located on a conventional personal computer, mainframe computer, or another suitable storage device known in the art. Additionally, the means for comparing the received data to the data within the database can comprise any software, such as an executable software program, which can compare data. For example, the AAA server may store user profiles on a hard drive of a personal computer, and the means for comparing the received user data to the user profiles resident on the computer can include computer software, such as Microsoft Excel (Microsoft Excel is a trademark of Microsoft Corporation, Redmond, Wash.). According to another embodiment of the invention, the AAA server can comprise a remote authentication dial-in user service (RADIUS), which is a well known authentication and accounting system used by a number of network service providers (NSPs).

Once a user's profile has been determined by access to the user's profile in the user database, three possible actions can result. Specifically, once a user's profile has been retrieved the AAA server may determine a user to have access, to be pending or in progress, or to not have access.

First, a user is deemed valid (i.e., to have access) where the user's profile in the user profile database states so. If a user is determined to be valid, the user's traffic can be allowed to proceed out of the gateway device from the portal page to the networks or online services the user wishes to access, or the user may be redirected to a portal page, typically, a more user-specific portal page, as described in U.S. Pat. No. 6,636,894, entitled "Systems and Methods For Redirecting Users Having Transparent Computer Access To A Network Using A Gateway Device Having Redirection Capability", incorporated elsewhere herein, prior to being allowed access to the destination network. For example, a user may be automatically forwarded to a user-input destination address, such as an Internet address, for example, where a user has free access associated with the user's hotel room. Alternatively, this may occur where the user has already purchased access and the user has not exhausted available access time.

If the second scenario occurs, in which the user is deemed pending or "in progress," the user may take steps to become authenticated so that the user's information may be recorded in the user profile database and the user is deemed valid. For example, a user may have to enter into a purchase agreement, requiring the user to enter a credit card number. If the user needs to purchase access, or if the system needs additional information about the user, the user can be redirected from the portal page via Home Page Redirect (HPR) and Stack Address Translation (SAT) to a location, such as a login page, established to validate new users. SAT and HPR can intervene to direct the user to a web server (external or internal) where the user has to login and identify themselves. This process is described in detail below and in more detail in the Redirecting Application.

According to one illustrative example, a user profile database is maintained by an ISP which may be associated with the computer network for providing internet service to those users on the network. Although unlimited access could be granted to users based on their location or MAC address, access may also be limited based on the access for which a user has paid. For example, the user profile database may route a user to a login page, where the user must enter user data, such as a user id and password. In this embodiment, a network access server (NAS) 28, located within the gateway device 12, can receive user data. Upon receiving user data representing the identity of a user attempting to access the network, a primary function of the NAS 28 is to grant or deny the user access to the network.

Although the NAS 28 grants and denies access to users, the NAS 28 does not determine whether each user is allowed to connect to the network and, if so, what type of connection should be established. Rather, these determinations are made by the AAA server 30, illustrated as exterior to the gateway device in FIG. 6, and described in detail above. Upon receiving user data the NAS 28 can, if necessary, reconfigure the data such that the data will be in the proper format to be received by the AAA server 30. In addition to reconfiguring the user data, the NAS 28 can also encrypt the user data such that the user identity and password will be protected during transmission to the AAA server 30. After reconfiguration, and optionally, encryption, the NAS 28 transmits the data to the AAA server 30 with a query to request that the AAA server 30 authenticate the user.

The AAA server 30 stores user profiles corresponding to users authorized to access the network. The user profiles typically include user identifications, passwords, access authorization, billing, and other pertinent user information. The AAA server 30 compares stored user profiles with the user data received from the gateway device 12 to determine if the user should be granted access to the network. As such, the AAA server 30 generally comprises a database and data storage means. According to one embodiment of the invention, the AAA server 30 is maintained by an ISP. In this embodiment, the user profiles stored by the AAA server 30 establish those users that can obtain Internet access via the ISP network. The ISP edits user profiles within the AAA server 30 to reflect those users who may become authorized or unauthorized to access the network.

Continuing with the illustrative example, the ISP may only register user profiles in the authentication database after users have been identified by the ISP and necessary billing information, such as addresses and credit card numbers, have been submitted. If the ISP has not posted a user profile in the AAA server 30 at the time of authentication, the user will not be permitted access to the network. If this occurs, the user may be asked to submit profile information to the ISP so that the ISP can add the user's profile to the AAA server 30. Furthermore, this may also be done the first time a user attempts to access the gateway device 12. The information may be entered by the user with the aid of webpage, a pop-up control panel or user interface, which can open when the user initially connects to the gateway device 12, as effectuated by HPR and SAT. As will be discussed below, the gateway device can request user information and forward it to the ISP such that the user does not know an ISP is receiving the information.

Figure 6:
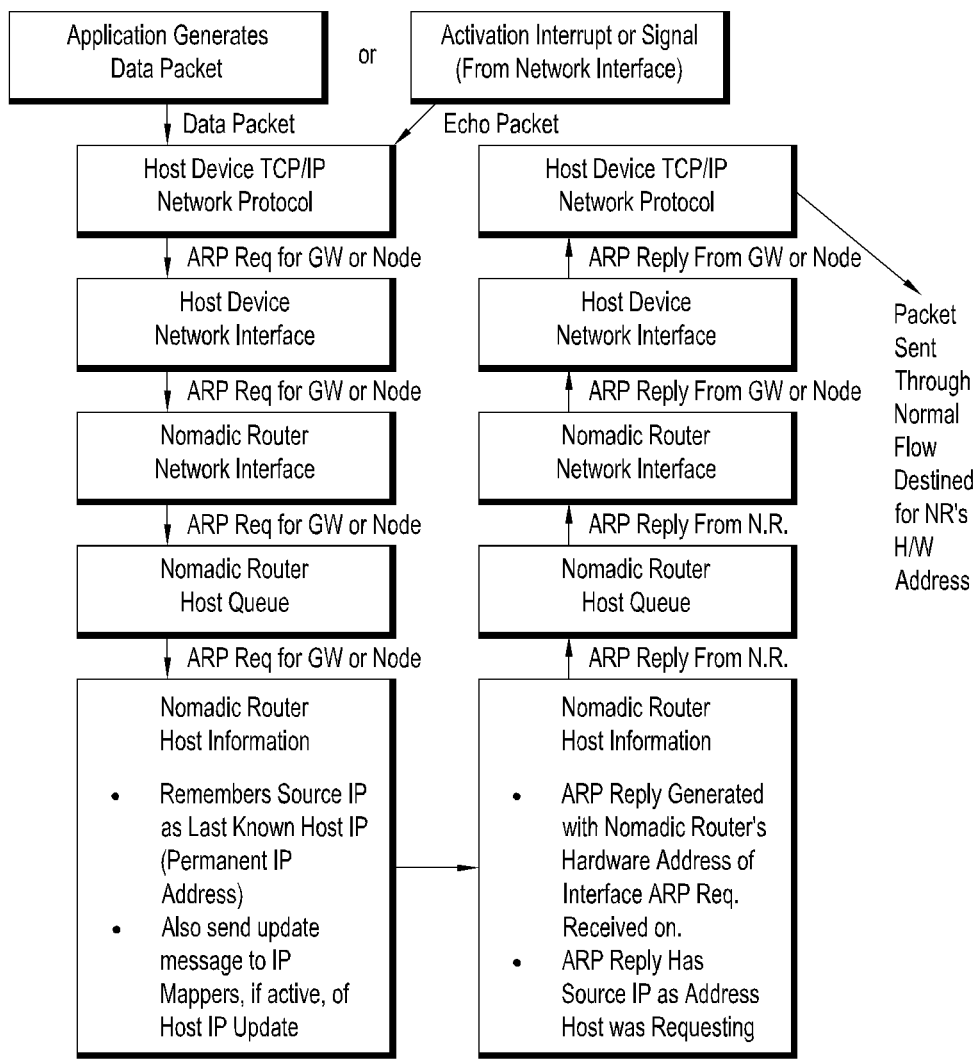
FIG. 6 is a flowchart illustrating the router's automatic adaptation to the host device when the first data packet from the host is sent to the attached router or when an activation interrupt or signal is received.

In the embodiment shown in FIG. 6, the AAA server 30 is located outside of the gateway device, although it may alternatively be located within the gateway device. For example, the location of the AAA server 30 may be such that the NAS 28 communicates with the AAA server 30 via internet protocol. Therefore, it will be appreciated that the AAA server 30 may be located at any internet address and stored on any computer accessible via internet protocol. Locating the AAA server 30 outside of the network can provide a number of advantages. First, the administrative burden on the network is alleviated because the network does not have to set up and maintain separate authentication databases on each network or gateway device. This is especially important because each gateway device 12 allows a finite number of users to access the network, so that multiple gateway devices may be required. Secondly, administering and maintaining one consolidated database of authentication data is easier than multiple smaller databases.

Referring again to the illustrative AAA example, after any requisite reconfiguration, the NAS 28 can transmit user data to the AAA server 30 with a query to request that the AAA server 30 authenticate the user. The AAA server 30 receives the user data and then compares the received user data to user profiles stored within its database. Where a customer is not identified by location, establishing access to the gateway device will typically involve a process in which a user must enter their identity and a password, and in some instances a desired billing scheme and service level as offered by the gateway administrator or network operator (information hereinafter collectively referred to as user data). Additionally, the user data can include information such as a user's social security number and a credit card number. As described briefly above and in more detail below, the gateway device can direct the user to a web page that requests desired data. However, where the customer is identified by location, the customer may only have to choose connection options, such as fixed fee or pay-per-use access, or a particular baud rate where the user can pay a premium for a higher speed connection, as the identity of the user may be known based upon location, and the user's payment information may already be known, such as where access is obtained via a port in a hotel room.

Assuming that a user has been deemed pending or "in progress," the gateway device typically presents users with a login page that enables new users to subscribe to the computer network so that they may subsequently obtain transparent access to networks or online services transparently through the gateway device. To direct the users to a login page the AAA server calls upon a HPR function. The HPR directs the user to the login page, and after the user has entered requisite information into the login page, the AAA server adds the new information to the customer profile database and can direct the user to the user's desired destination, such as an Internet address, or a portal page created by the network provider or users. Thus, new users can gain access to networks or online services without being predefined in the user profile database.

Because the gateway device is transparent to the user, the user communicates with the gateway device without the user's knowledge. This transparent communication results in a plug and play capability which enables a user to plug a computer into a port and directly access the internet or another online service without reconfiguring his or her computer from the home network settings resident on the computer and without requiring additional software to be loaded on the user computer. Therefore, the functions of the AAA server, and of HPR can be completely transparent to the user. For example, utilizing the system and method of the present invention, a user who has not purchased network access, and does not receive free network access, can plug into a port of the computer network and request connection to an Internet address through the user's Internet browser. After being directed to a portal page, the AAA server, unbeknownst to the user, identifies this user as pending (i.e., no information for that user has been identified in the user profile database), and calls upon the HPR function to send the user from the portal page to a login page which is different from the destination address initially entered by the user. Specifically, the HPR function as well as the SAT, discussed below, are performed by the AAA server and/or gateway device.

To achieve this redirection, HPR utilizes a SAT operation to direct the user from a portal page to a new destination at which a login page is presented, which is preferably local to the gateway device so that the redirection will be efficient and fast. This is accomplished by redirecting the user to a protocol stack using network and port address translation to the portal server that can be internal to the computer network or gateway device. More specifically, the AAA server receives the user's Hyper Text Transfer Protocol (HTTP) request for a web page and sends back the HTTP response reversing the network and port address translation the portal server, essentially acting as a transparent "go-between" to the user and new web server. It will be appreciated, however, that to receive the HTTP request the AAA server must initially open a Transmission Control Protocol (TCP) connection to the another server in line with the user-requested internet address.

After receiving the user's login information, the AAA server will create a user profile utilizing this information so that the user will be able to obtain immediate access to the network next time the user logs in without being required to enter login information again. The AAA server can create a profile for the user in a locally stored user profile database, as described above, or can update the user profile in a database external to the gateway device. Regardless of the location of the user profile, the next time the user attempts to login the user's profile will be located in the user profile database, the user's access rights determined, and the user allowed transparent access to networks or services.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

Additional Disclosure

The following is additional disclosure and is not to be construed as claims.

1. A method for dynamic control of bandwidth by a subscriber during an on-going network session, comprising:
   establishing an authorization account for a subscriber to enable accessing to a computer network through a gateway device, wherein the authorization account includes a maximum bandwidth value and an authorization code;
   authorizing the subscriber based on the authorization code to establishing network access for the subscriber through the gateway device, whereby an information transfer rate of the access is limited to the maximum bandwidth value; and
   receiving request from the subscriber to dynamically adjust the maximum bandwidth value to a second maximum bandwidth value, and in response thereto, substantially instantaneously adjusting the limit on the information transfer rate to the second maximum bandwidth value.

2. The method of claim 1, wherein limiting the information transfer rate comprises selectively queuing information packets associated with the subscriber in a buffer for a period of time before sending to limit the transfer rate.

3. The method of claim 1, further the step of establishing a downlink maximum bandwidth value and an independent uplink maximum bandwidth value.

4. A method for dynamic control of bandwidth by a subscriber during an on-going network session, comprising:
   receiving a data packet;
   retrieving a subscriber selected maximum bandwidth for a subscriber associated with the data packet;
   determining a delay period, if any, for transmitting the packet to limit the subscriber to the maximum bandwidth; and
   queuing the data packet for the delay period before transmitting the packet.

5. A system for dynamic control of bandwidth by a subscriber during an on-going network session, comprising:
   a bandwidth manager that processes a data packet to determine if the data packet is to be queued for a period of time before being transmitted in order to limit the bandwidth of the subscriber to which the data packet is associated, and if the data packet is to be queued then determining a length of the period of time; and
   a queue for queuing the data packet for the period of time if needed.

6. The system of claim 5, further including a traffic shaping mechanism that utilizes the queue for queuing data packets to provide priority bandwidth service to the subscriber.

7. A method for dynamically creating a tunnel in a computer network to provide a subscriber computer access to a destination network, comprising:
   storing a subscriber profile, wherein the subscriber profile includes authorization data for logging onto the destination network;
   receiving at a gateway device a request from the subscriber for access to the destination network;
   creating a tunnel having a first protocol using the authorization data, wherein a first end point at the gateway device and a second end point at the destination network, and
   receiving at the gateway device packets from the subscriber computer for delivery to the tunnel over a link having a second protocol.

8. The method of claim 1, wherein the step of storing comprises storing a network access identifier and a password.

9. The method of claim 1, wherein the step of creating a tunnel comprises the steps of determining if the tunnel exists.

10. The method of claim 1, wherein the step of creating a tunnel comprises requesting additional authorization data for logging into the destination network.

11. A system for dynamically creating a tunnel in a computer network to provide a subscriber computer access to a destination network, comprising:
    a storage device that stores a subscriber profile, wherein the subscriber profile includes authorization data for logging onto the destination network;
    means for receiving at a gateway device a request from the subscriber for access to the destination network;
    means for creating a tunnel having a first protocol using the authorization data, wherein a first end point at the gateway device and a second end point at the destination network, and
    means for receiving at the gateway device packets from the subscriber computer for delivery to the tunnel over a link having a second protocol.

12. A system for dynamically creating a tunnel in a computer network to provide a subscriber computer access to a destination network, comprising:
    an internet infrastructure;
    an enterprise network connected to the internet infrastructure through a firewall;

a subscriber computer connected to the internet infrastructure;

a gateway device connected between the subscriber computer and the enterprise network, wherein the gateway device stores authorization information of the subscriber computer for establishing a tunnel dynamically.

1. A method for communicating to a network user data during an ongoing networking session, the method comprising the steps of:
   establishing computer network access to a user's host through a gateway device interface;
   creating pop-up control panel packets at the gateway device;
   sending the pop-up control panel packets to the user's host; and
   generating a pop-up control panel on the monitor of the user's host that comprises data.

2. The method of claim 1, wherein the data is user-specific data.

3. The method of claim 1, further comprising the step of communicating with databases in communication with the gateway device to determine user-specific data.

4. The method of claim 3, further comprising the step of creating pop-up control packets that reflect the user-specific data.

1. A system for enabling transparent communication between a computer and a service provider network, comprising:
   a computer;
   a network gateway device in communication with said computer for connecting said computer to a computer network, wherein the network gateway device receives user data that represents a user attempting to access said computer network; and
   a service provider network in communication with said network gateway device, comprising
   an authentication server in communication with said network gateway device and having therein a database comprising user profiles that represent users authorized to access said computer network, wherein said authentication server compares said user data to said user profiles to determine if said user attempting to access said computer network can access said computer network.

2. The system of claim 1, further comprising an accounting system for maintaining historical data concerning use of said service provider network.

3. A method for enabling transparent communication between a computer and a service provider network, comprising
   allowing a computer operator to access a computer network via a network gateway device;
   collecting data corresponding to a customer's identity in said network gateway device;
   reconfiguring said data to one of the predetermined data formats which may be received by an authentication server located within a service provider network; and
   transmitting the reconfigured data to the authentication server, wherein said authentication server:
   compares said reconfigured data to user profiles stored within said authentication server to determine if said computer operator can access said service provider network.

1. A system for enabling a management system to communicate with a network gateway device to automatically bill a computer operator for access to a computer network, comprising:
   a computer;
   a network gateway device in communication with said computer for connecting the computer to the computer network, wherein the network gateway device maintains data representative of the computer operator's access to the computer network; and
   a management system connected to said network gateway device for automatically billing the computer operator based upon usage of the computer network, wherein said management system is configured to communicate according to at least one predetermined protocol,
   wherein the network gateway device reconfigures the data to meet one of the predetermined protocols supported by said management system, and wherein said management system receives the data reconfigured by the network gateway device and utilizes the data reconfigured by the network gateway device for automatic billing purposes.

2. The system of claim 1, further comprising a translator in communication with the gateway device and management system for receiving the data reconfigured by the network gateway device, said translator adapted to further reconfigure the reconfigured data, and to transmit the further reconfigured data to the management system.

3. The system of claim 1, wherein the data representative of the computer operator's access to the computer network comprises data representative of the computer operator's location.

4. A method for enabling a management system to communicate with a network gateway device to automatically bill a customer for access to a computer network, comprising:
   allowing a computer operator to access a computer network via a network gateway device;
   collecting data corresponding to a customer's local network access in said network gateway device;
   reconfiguring said data to one of the predetermined data formats which may be received by a management system; and
   transmitting the reconfigured data to the management system.

1. A method for implementing location-based identification and authorization in a computer network, the method comprising the steps of:
   establishing a network connection between a host and a network;
   sending out network packets from the host through a port;
   receiving the network packets at an access controller;
   tagging the network packets at the access controller with a port identifier that corresponds to a media access control (MAC) address;
   receiving the tagged network packet at a gateway device; and
   incorporating the port identifier into a database in communication with the gateway device.

2. The method of claim 1, wherein the step of tagging implements the use of VLAN for communicating between the access controller and the gateway device.

3. A method for implementing location-based identification and authorization in a computer network, the method comprising the steps of:
   establishing a network connection between a host and a network;
   sending out network packets from the host through a port;
   receiving the network packets at a gateway device;
   sending a port identifying query to an access controller in response to receiving the network packets;
   receiving the port identifying query at an access controller;
   sending a port identifying response query back to the gateway device; and incorporating the port identifier into a database in communication with the gateway device.

4. The method of claim 3, wherein the step of sending a port identifying query further comprises sending an SNMP (Simple Network Management Protocol) query.

1. A gateway device comprising:
a subscriber interface for adapting to a subscriber computer that is connected to the gateway device to facilitate communications between the subscriber computer and at least one network without requiring the subscriber computer to be reconfigured;
an XML interface for communicating with an external device via a series of XML commands and responses.

2. A gateway device according to claim 1 further comprising an internal web server for communicating with both said XML interface and the internet to thereby facilitate XML-based communications between the gateway device and external devices connected to the internet.

3. A gateway device according to claim 1 wherein said XML interface comprises a parser front end, a parser section and a building section.

4. A method for communicating between a gateway device and an external device via the internet, the method comprising:
receiving an XML command at the gateway device from the external device;
parsing the XML command;
passing the parsed XML command to a respective application program;
receiving a response from the respective application program; and
transmitting an XML response from the gateway device to the external device based upon the response received from the respective application program.

5. A method according to claim 4 wherein receiving an XML command comprises receiving an XML command at the gateway device from a billing and content server.

1. A method for authorizing, authenticating and accounting users having transparent access to a destination network, wherein the users otherwise have access to a home network through home network settings resident on the user's computers, and wherein the users can access the destination network without altering the home network settings, comprising:
receiving at a gateway device a request from a user for access to the destination network;
identifying an attribute associated with the user based upon a packet received by the gateway device, wherein the packet is transmitted from the user's computer, wherein the user's computer remains configured for accessing the home network, and wherein no additional configuration software need be installed on the user's computer to access the destination network;
accessing a user profile corresponding to the user and stored in a user profile database, where the user profile is accessed based upon the attribute associated with the user; and
determining if the user is entitled to access the destination network based upon the user profile.

2. The method of claim 1, further comprising assigning a location identifier to the location from which requests for access to the destination network are transmitted, and wherein the location identifier is the attribute associated with the user.

3. The method of claim 1, further comprising updating the user database when a new user accesses the destination network.

4. The method of claim 1, further comprising maintaining in the user profile a historical log of the user's access to the destination network.

5. The method of claim 1, wherein the attribute associated with the user is based upon a VLAN ID assigned to the location from which the request for access to the destination address was transmitted.

6. The method of claim 1, wherein receiving at the gateway device a request from a user for access comprises the step of receiving an Internet destination address from the user.

7. The method of claim 1, wherein determining if the user is entitled to access the destination network further comprises denying the user access where the user profile indicates that the user is denied access.

8. The method of claim 1, wherein determining if the user is entitled to access the destination network further comprises directing the user to a login page where the user profile is not located within the user profile database.

9. A system for authorizing, authenticating and accounting users having transparent access to a destination network, wherein the users otherwise have access to a home network through home network settings resident on the user's computers, and wherein the users can access the destination network without altering the home network settings, comprising:
a gateway device for receiving a request from a user for access to the destination network;
means for identifying an attribute associated with the user based upon a packet received by the gateway device, wherein the packet is transmitted from the user's computer, wherein the user's computer is configured for accessing the home network, and wherein no additional configuration software need be installed on the user's computer;
a user profile database comprising stored access information and in communication with the gateway device, and wherein access information corresponding to the user is identified by the attribute associated with the user, and
an Authentication, Authorization and Accounting (AAA) server in communication with the gateway device and user profile database, where the AAA server determines if user is entitled to access the destination network based upon the access information stored within the user profile database.

10. The system of claim 9, wherein the packet received by the gateway device include at least one of VLAN ID, a circuit ID, and a MAC address.

11. The system of claim 9, wherein the means for identifying comprises an access concentrator in communication with the gateway device.

12. The system of claim 9, wherein the AAA server is located within the gateway device.

13. The system of claim 9, wherein the user profile database includes a plurality of user profiles, wherein each respective user profile of the plurality of user profiles contains access information.

14. The system of claim 12, wherein the user profile database is located within the AAA server.

15. The system of claim 13, wherein each respective user profile contains historical data relating to the duration of destination network access for use in determining the charges due for the destination network access.

What is claimed is:
1. A method of managing network access, the method comprising:
receiving at a network communications port a request from a computer for access to a destination address external to a computer network;

redirecting the computer to a portal page;

receiving authentication-related information from the computer;

formatting the authentication-related information into a predetermined data format corresponding to a property management system (PMS) protocol; and transmitting the formatted authentication-related information to a PMS device; wherein the PMS device is configured to automatically associate a billing entry to a customer's account for network access by utilizing the formatted authentication-related information; and wherein no specialized software configured for the computer network is required to be installed on the computer for the computer to communicate with the computer network.

2. The method of claim 1, further comprising determining, using a processing unit, if the computer is entitled to access a site associated with the destination address.

3. The method of claim 2, wherein redirecting the computer to the portal page comprises sending transmission control protocol handshake completion data to the computer in response to a request for connection from the computer, the transmission control protocol handshake completion data configured to appear to be from the destination address, wherein the processing unit need not communicate with the destination address if the computer is not entitled to access to the site associated with the destination address.

4. The method of claim 1, wherein the authentication-related information comprises time of request.

5. The method of claim 1, wherein the authentication-related information comprises information related to a physical location associated with the computer.

6. The method of claim 5, wherein the physical location comprises a room number.

7. The method of claim 1, wherein the portal page includes a link configured to direct the computer to an authentication system.

8. The method of claim 1, wherein the authentication-related information includes a unique code.

9. The method of claim 1, wherein the authentication-related information is related to an agreement needed to access a site associated with the destination address.

10. The method of claim 1, wherein the authentication-related information includes information relating to a credit card.

11. The method of claim 1, wherein the computer utilizes software comprising a dynamic host configuration protocol (DHCP) service.

12. A system for managing network access, the system comprising:

a network communications port; and a hardware processing system communicating with the network communications port and configured to process a request from a computer for access to a destination address external to a computer network received through the network communications port, the processing system including programming which, when accessed by the hardware processing system, causes the hardware processing system to:

process authentication-related information from the computer;

format the authentication-related information into a predetermined data format corresponding to a property management system (PMS) protocol; and transmit the formatted authentication-related information to a PMS device; wherein the PMS device is configured to utilize the formatted authentication-related information to associate a billing entry for network access to a customer's account; and wherein the network communications port and the hardware processing system are components of a computer network and no software configured specially for the computer network is required to be installed on the computer for the computer to communicate with the computer network.

13. The system of claim 12, wherein the programming, when accessed by the processing system further causes the processing system to determine if the computer is entitled to access a site associated with the destination address.

14. The system of claim 13, wherein the programming, when accessed by the processing system further causes the processing system to send transmission control protocol handshake completion data to the computer in response to a request for connection from the computer, the transmission control protocol handshake completion data configured to appear to be from the destination address, wherein the hardware processing system need not communicate with the destination address if the computer is not entitled to access to the site associated with the destination address.

15. The system of claim 12, wherein the authentication-related information comprises time of request.

16. The system of claim 12, wherein the authentication-related information comprises information related to a physical location associated with the computer.

17. The system of claim 12, wherein the authentication-related information relates to a room number.

18. The system of claim 12, wherein the authentication-related information includes a unique code.

19. The system of claim 12, wherein the computer utilizes software comprising a DHCP service.

20. A system for managing network access, the system comprising:

means for receiving a request from a computer for access to a destination address external to a computer network;

means for redirecting the computer to a portal page;

means for receiving authentication-related information from the computer;

means for formatting the authentication-related information into a predetermined data format corresponding to a property management system (PMS) protocol; and means for transmitting the formatted authentication-related information to a PMS device; wherein the PMS device is configured to utilize the formatted authentication-related information to automatically associate the request for access to a computer network with a customer account; and wherein no specialized software configured for the computer network is required to be installed on the computer for the computer to communicate with the computer network.

21. The system of claim 20, wherein means for redirecting the computer to the portal page comprises means for sending transmission control protocol handshake completion data to the computer in response to a request for connection from the computer, the transmission control protocol handshake completion data configured to appear to be from the destination address, wherein the system need not communicate with the destination address if the computer is not entitled to access to the site associated with the destination address.

22. The system of claim 20, wherein the authentication-related information comprises time of request.

23. The system of claim 20, wherein the computer utilizes software comprising a DHCP service.

* * * * *